US011923727B2

(12) United States Patent
Nashiki

(10) Patent No.: US 11,923,727 B2
(45) Date of Patent: Mar. 5, 2024

(54) MOTOR AND CONTROL DEVICE THEREFOR

(71) Applicant: Masayuki Nashiki, Aichi (JP)

(72) Inventor: Masayuki Nashiki, Aichi (JP)

( * ) Notice: Subject to any disclaimer, the term of this patent is extended or adjusted under 35 U.S.C. 154(b) by 416 days.

(21) Appl. No.: 17/265,544

(22) PCT Filed: Jul. 24, 2019

(86) PCT No.: PCT/JP2019/029031
§ 371 (c)(1),
(2) Date: Dec. 20, 2021

(87) PCT Pub. No.: WO2020/031698
PCT Pub. Date: Feb. 13, 2020

(65) Prior Publication Data
US 2022/0115919 A1    Apr. 14, 2022

(30) Foreign Application Priority Data

Aug. 6, 2018   (JP) .................................. 2018-147546

(51) Int. Cl.
*H02K 1/14* (2006.01)
*H02K 3/28* (2006.01)
*H02P 25/092* (2016.01)

(52) U.S. Cl.
CPC .............. *H02K 1/146* (2013.01); *H02K 3/28* (2013.01); *H02P 25/092* (2016.02); *H02K 2213/03* (2013.01)

(58) Field of Classification Search
CPC ...... H02K 3/28; H02K 2213/03; H02K 21/22; H02K 11/33; H02K 19/103; H02K 1/246;
(Continued)

(56) References Cited

U.S. PATENT DOCUMENTS 5,376,851 A * 12/1994 Lipo ..................... H02P 25/089
318/400.4
5,864,477 A    1/1999 Webster
(Continued)

FOREIGN PATENT DOCUMENTS

JP        07-163124     6/1995
JP        11-191987     7/1999
(Continued)

*Primary Examiner* — Antony M Paul
(74) *Attorney, Agent, or Firm* — Clark & Brody LP

(57) ABSTRACT

A motor has windings and a control device, which applies appropriately one-way current to each of the windings. Two full-pitch windings, which are located adjacently to both ends of an A-phase stator magnetic pole, and driving transistors are connected in series to each other to supply an A-phase current component, thereby exciting an A-phase magnetic flux component passing through the A-phase stator magnetic pole, resulting in generation of torque. This excitation is also applied to other phases. The respective stator magnetic poles can be excited selectively, and voltages across both ends of the serially connected windings become a voltage for corresponding magnetic flux components which should be provided by the windings, thus providing a more simplified motor structure and higher motor performance. The windings and transistors can be used commonly in two phases, providing an improved usage rate, thus making the motor more compact in size and reducing manufacturing cost.

18 Claims, 54 Drawing Sheets

(58) Field of Classification Search
CPC ............ H02K 21/14; H02K 1/16; H02K 1/14;
H02K 1/276; H02K 1/2791; H02K 16/02;
H02K 21/12; H02K 3/18; H02K 1/27;
H02K 17/12; H02K 19/06; H02K 21/227;
H02K 3/00; H02K 37/02; H02K 21/145;
H02K 16/04; H02K 41/03; H02K 41/031;
H02K 41/00; H02K 41/033; H02K 16/00;
H02P 25/08; H02P 2207/05; H02P 25/22;
H02P 2207/055; H02P 27/06; H02P 6/14;
H02P 25/022; H02P 25/00; H02P 23/00;
H02P 25/03; H02P 25/062; H02P 25/064;
H02P 25/107; H02P 27/00; H02P 27/04;
H02P 27/08; H02P 6/00; H02P 6/28;
H02P 6/32; H02P 1/26; H02P 1/42; B60L
2220/18; B60L 2220/14; B60L 50/51;
H01F 41/06

See application file for complete search history.

(56) References Cited

U.S. PATENT DOCUMENTS

| | | |
|---|---|---|
| 6,384,564 B1 | 5/2002 | Pollock |
| 2009/0021089 A1 | 1/2009 | Nashiki |
| 2009/0134734 A1 | 5/2009 | Nashiki |
| 2012/0169267 A1 | 7/2012 | Nashiki et al. |

FOREIGN PATENT DOCUMENTS

| | | |
|---|---|---|
| JP | 2009-118629 | 5/2009 |
| JP | 2011-172481 | 9/2011 |
| JP | 2015-053756 | 3/2015 |
| WO | 98/05112 | 2/1998 |
| WO | 2012/061458 | 5/2012 |

* cited by examiner

FIG. 83 <RELATED ART>
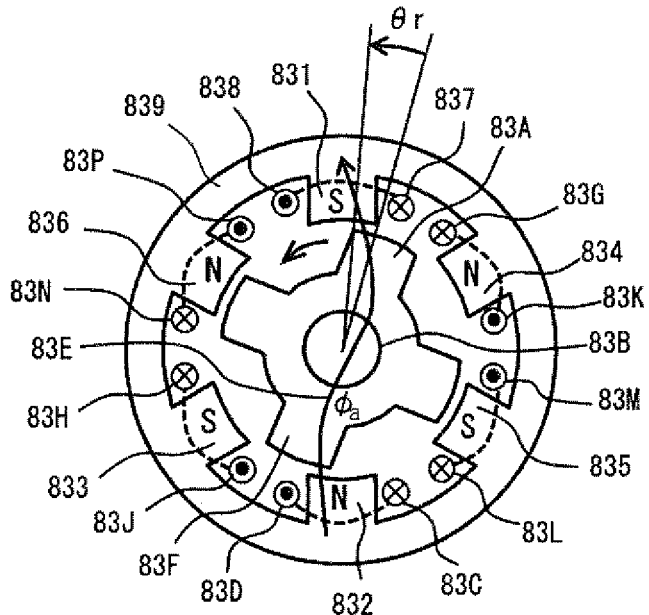
FIG. 84 <RELATED ART>
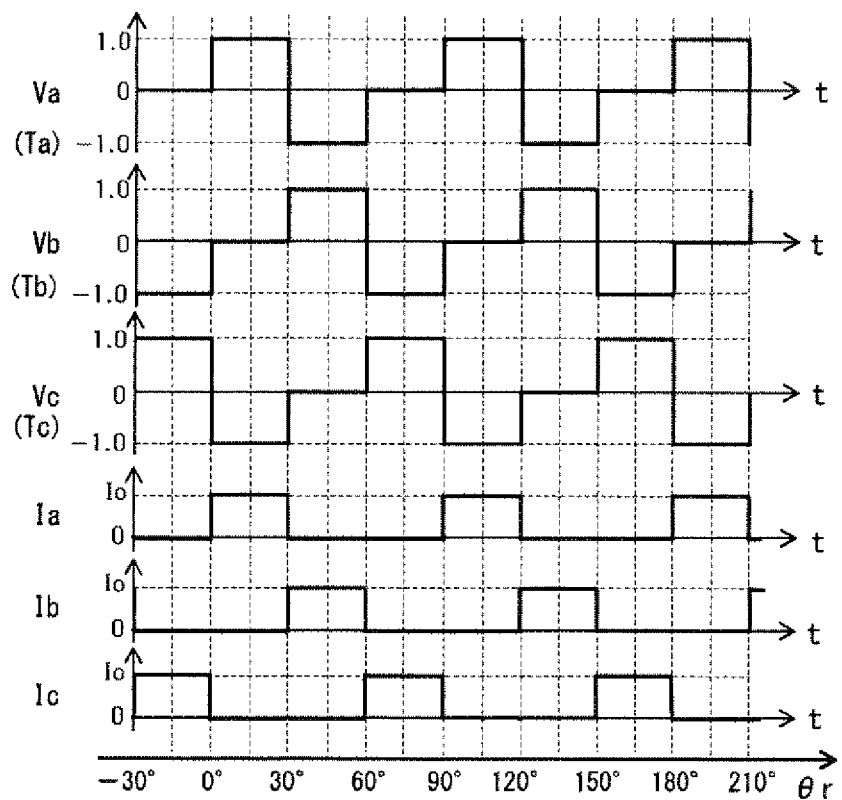

<RELATED ART>

MOTOR AND CONTROL DEVICE THEREFOR

CROSS-REFERENCE TO RELATED APPLICATION

This application is based on and claims the benefit of priority from earlier Japanese Patent Application No. 2018-147546 filed on Jul. 24, 2018 the description of which is incorporated herein by reference.

TECHNICAL FIELD

The present invention relates to an AC electronic motor energized with AC currents as well as a DC electric motor energized with a DC current, that is, relates to an electric motor having windings to which one-way current(s) is supplied in a controlled manner, a drive circuit and a control apparatus which are for the motor. Accordingly, the motor includes a stator with windings energized with current in which the currents generate magnetomotive forces which operate only in one way path of each stator magnetic poles. The motor and control apparatus according to the present invention are improved and developed compared to the conventional reluctance motor and control apparatus, and, for instance, the prevent invention provides a technique of driving a permanent magnet rotor efficiency by the one-way current(s).

Applications to which the present invention can be applied are for main engine motors of electric vehicles, motors of home electric appliances, motors of industrial apparatuses, and others. The present invention relates to a technique for giving higher performance, higher efficiency, more compact size, lighter weight, and lower production const.

RELATED ART

AC motors are the current mainstream motors and are widely used. However, when changing the viewpoint, AC motors have some inconveniences. For example, an AC motor requires four transistors to produce one alternating current. If the motor is driven by direct current, it can be controlled by a single transistor. In terms of power, direct current is often superior to sinusoidal current. Also, as the reluctance motor, in addition to an AC reluctance motor, a so-called switched reluctance motor that controls and drives a direct current is known.

An example of a cross-sectional view of a conventional reluctance motor is shown in FIG. 83. This motor is a reluctance motor with 6 magnetic poles on the stator and 4 magnetic poles on the rotor. This motor is also called a switched reluctance motor. Reference numeral 839 is a stator, and reference numeral 83B is a rotor shaft. Reference numerals 83A, 83F and the like are salient poles of the rotor, which have a circumferential width of 30° and are arranged at four locations on the entire circumference at equal intervals. Reference numeral 831 is an A-phase stator magnetic pole, and A-phase concentrated winding 837 and 838 are wound as shown by a broken line.

The current of each winding of this motor is a one-way current, and each winding is indicated by a current symbol, indicating the direction in which the current flows. The winding 837 energizes an A-phase current Ia flowing from the front side to the back side of the paper surface, and the winding 838 energizes the A-phase current Ia flowing from the back side to the front side of the paper surface. Therefore, when the current is supplied, the A-phase stator magnetic pole 831 becomes the S pole. Reference numeral 832 is an A/ phase stator magnetic pole having a relationship opposite to that of the A phase. A/ phase concentrated windings 83C and 83D are wound as shown by a broken line. The A-phase current Ia is also applied to the A/ phase winding, and the A/ phase stator magnetic pole 832 becomes the N pole. The A-phase stator magnetic pole 831 and the A/ phase stator magnetic pole 832 are excited at the same time, and a magnetic flux component φa indicated by an arrow 83E is passed through the stator magnetic pole 832, the rotor magnetic pole 83F, the rotor magnetic pole 83A, and the stator magnetic pole 831 from the lower side to the upper side of the paper surface. The magnetic flux component φa makes a round through the back yoke of the stator. In the state of FIG. 83, CCW torque in the counterclockwise rotation direction is generated in the rotor.

Similarly, reference numeral 833 is a B-phase stator magnetic pole. Concentrated winding windings 83H and 83J are wound around the B-phase stator magnetic pole, and a B-phase current Ib is energized. Reference numeral 834 is a B/ phase stator magnetic pole. Concentrated winding windings 83G and 83K are wound around the B/ phase stator magnetic pole 834, and the B-phase current Ib is energized. Φb passes through the magnetic flux from the stator magnetic pole 834 to the B-phase stator magnetic pole 833. Reference numeral 835 is a C-phase stator magnetic pole. Concentrated winding windings 83L and 83M are wound around the C-phase stator magnetic pole 835, and a C-phase current Ic is energized. Reference numeral 836 is a C/ phase stator magnetic pole. Concentrated winding windings 83N and 83P are wound around the B/ phase stator magnetic pole, and the C-phase current Ic is energized. From the stator magnetic pole 836 to the C-phase stator magnetic pole 835, φc passes through the magnetic flux. Each stator magnetic pole has a circumferential width of 30° and is arranged at six locations on the entire circumference at equal intervals.

Next, the operation of the reluctance motor of FIG. 83 will be described. Regarding the rotation position of the rotor, the rotation position of the end in the clockwise rotation direction of the A-phase stator magnetic pole 831 is defined as the start point of the rotor. As shown in the figure, a rotor rotation angle position θr is defined as a rotation angle from this start point to the end of the rotor magnetic pole 83A in the CCW direction. The A-phase windings 837 and 838 and the A/ phase windings 83C and 83D are connected in series, and a constant current Io having a value close to the continuous rating as the A-phase current Ia is energized. In this energized state, the rotor is rotated to CCW at a constant speed Vso.

Winding voltage at this time is voltage Va, as shown in FIG. 84. In FIG. 84, the horizontal axis of this voltage Va is shown as time t. At the bottom of the figure, the rotor rotation angle position θr that provides the voltage Va is shown. The CCW direction shown in FIG. 83 corresponds to the right direction of the paper surface of FIG. 84. In the present invention, the angle at which the rotor, which is a part of the basic configuration of the reluctance motor shown in FIG. 83, rotates once is defined as an electric angle of 360°. For example, when the configuration shown in FIG. 83 is multi-polarized into a pair of two poles and deformed, one rotation of the rotor has a mechanical angle of 360° and an electric angle of 720°.

In addition, since the rotor magnetic pole pitch may be used as a reference in other patents and documents, it is confirmed here so as not to be confused. Here, the unit of Vso is represented by [radian/sec]. Further, the description will be based on a simple model assuming that the magnetic flux passes through the portions where the stator magnetic poles 831 and 832 and the rotor magnetic poles 83A and 83F face each other through the air gap portion. That is, if this model is used, it is possible to simply calculate the voltage assuming that there is no leakage flux in the space around the stator magnetic pole and the rotor magnetic pole.

Similarly, the B-phase winding 833 and the B/ phase winding 834 are connected in series, and the constant current Io is energized as the B-phase current Ib. In this state, the rotor rotates at the constant speed Vso in the CCW direction. The winding voltage generated during this rotation is represented by voltage Vb shown in FIG. 84. Similarly, the C-phase winding 835 and the C/ phase winding 836 are connected in series, and the constant current Io is energized as the C-phase current Ic. In this energized state, the rotor rotates at the constant speed Vso in the CCW direction. The winding voltage during this rotation is represented by voltage Vc shown in FIG. 84. As a result, the relationship between the rotor rotation angle positions θr at which each phase can generate torque is confirmed.

Next, the operation of rotating the reluctance motor of FIG. 83 in the CCW direction while generating a constant torque will be described. From the characteristics of the voltage Va shown in FIG. 84, in the A-phase, it is possible to generate torque in the CCW direction between 0° and 30° and between 90° and 12°, and the A-phase current shown in Ia of FIG. 84 is energized. Similarly, from the characteristics of the voltage Vb shown in FIG. 84, in the B-phase, it is possible to generate torque in the CCW direction between 30° and 60° and between 120° and 150°, during which the B-phase current Ib, which is 30° out of phase with Ia in FIG. 84, is energized. From the characteristics of the voltage Vc in FIG. 84, in the C-phase, CCW torque can be generated between 60° and 90° and between 150° and 180°, during which the C-phase current 60° out of phase with Ia in FIG. 84 is energized. The torque cycle of the reluctance motor is 180°. By energizing the currents Ia, Ib, and Ic according to the rotor rotation position θr, a constant torque can be obtained in the CCW direction.

Further, the operation of rotating the reluctance motor of FIG. 83 with a constant torque in the CW direction will be described. This is the same as the generation of torque in the CCW direction described above. As the A-phase current Ia, a current whose phase is delayed by 30° from Ia in FIG. 84 is energized. Negative torque is obtained by this energization. As the B-phase current Ib, a current whose phase is delayed by 60° from Ia in FIG. 84 is energized. This gives a negative torque. As the C-phase current Ic, a current 90° out of phase with Ia in FIG. 84, that is, the same current as Ia in FIG. 84 is energized. This gives a negative torque. By energizing the currents Ia, Ib, and Ic according to the rotor rotation position θr, a constant torque can be obtained in the CW direction.

An advantage of the conventional reluctance motor shown in FIG. 83 is that the rotor has a simple structure and is robust. As a result, the motor can easily rotate at high speed. Moreover, this motor can be driven without using a permanent magnet. That is, torque is generated by the suction force which is the reluctance force. This simplifies the drive algorithm. Since the stator winding is also a concentrated winding around the salient pole, the structure is simple and it is easy to manufacture. And above all, it has the potential to provide motor systems with lower manufacturing costs.

Next, the problems of the conventional reluctance motor of FIG. 83 will be described. That is, it is a problem related to the motor configuration and the operation description. The first problem of the conventional reluctance motor is that the continuous rated torque is inferior to that of the permanent magnet type synchronous motor having the same motor size. In this regard, depending on the application, a large torque that is three times or more the continuous rated torque at low speed rotation is also desired. Generally, in a large torque region, the torque constant tends to decrease due to a decrease in power factor or the like. This causes a problem that the size of the motor increases and the weight increases. Copper loss is dominant in motor loss at low speed rotation. The second problem is that the power factor is low in the vicinity of the maximum torque of the motor and the size of the inverter becomes large. In particular, the motor for the main engine of an electric vehicle requires a large torque that is three times or more the continuous rated torque. However, the problem of low power factor and the problem of torque ripple become prominent.

The third problem is related to the torque generated by each part constituting the reluctance motor. The temporal ratio and spatial ratio of generating this torque are as low as about 33% (⅓) in the example of FIG. 83. In the case of FIG. 83, 33% of the motor contributes to torque generation. However, the remaining 67% (⅔) of the motor is not working. In other words, it can be said that the utilization rate is 33%. This third problem is also the cause of other problems. This third problem also applies to the drive circuit of FIG. 5 shown later. In addition, there are noise problems and torque ripple problems. Motors that use permanent magnet rotors and their controls have slightly different behaviors but similar problems.

As described above, the conventional reluctance motor shown in FIG. 83 has some advantages, but has many problems. By solving most of these problems, it is thought that the reluctance motor can be put into practical use as a motor for the main engine of an electric vehicle. In other words, it is considered that such a reluctance motor has competitiveness with the conventional permanent magnet type synchronous motor and becomes attractive. Further, the permanent magnet rotor can be improved in performance by applying the same technology as the reluctance motor and its control device.

[PTL 1] JP Patent No. 3157162
[PTL 2] JP Patent No. 5333419
[PTL 3] JP Patent No. 5751147

SUMMARY

An object of the present disclosure is to realize high performance, high efficiency, miniaturization, weight reduction, and cost reduction of a conventional permanent magnet type synchronous motor which is an AC motor and its drive circuit. In other words, a motor that energizes a one-way current, that is, a motor that can be said to be a DC motor, and the excellent points of its drive circuit are collected and realized by making full use of new technology.

The first problem of the present disclosure is to solve the first problem. That is, the continuous rated torque is improved. Further, a torque as large as 3 times or more of the continuous rated torque is also desired. A second object of the present disclosure is to solve the second problem. That is, the power factor at the time of large torque output is improved, and the inverter is downsized. A third object of the present disclosure is to solve the third problem. That is, the utilization rate of each part of the motor and the drive circuit is improved, and other problems can be solved.

In the disclosure according to a mode 1, a motor and control apparatus therefor is characterized in that the motor and control apparatus comprises:

a stator STR1, comprising

"SN1×MN1" pieces or more stator magnetic poles arranged in a circumferential direction of the stator STR1, the magnetic poles being stator magnetic poles SP11, SP12, SP13, and SP14 arranged in the circumferential direction, a slot SL11 located between the stator magnetic poles SP11 and SP12, a slot SL12 located between the stator magnetic poles SP12 and SP13, a slot SL13 located between the stator magnetic poles SP13 and SP13, a winding SW11 arranged at the slot SL11, the winding SW11 being a full-pitch winding SWF wound at two different slots whose electric angle positions are separated by 180 degrees or an annular winding SWR wound in a toroidal form from a slot to a back yoke, a winding SW12 arranged at the slot SL12 in the same manner, and a winding SW13 arranged at the slot SL13 in the same manner;

a rotor RTR1 equipped with rotor magnetic poles RP arranged on the rotor along a circumferential direction thereof and composed of "RN1×MN1" pieces soft magnetic members;

a power element PE11 electrically connected in series to the winding SW11;

a power element PE12 electrically connected in series to the winding SW11; and a power element PE13 electrically connected in series to the winding SW12, wherein the power element PE11, the winding SW11, the winding SW12, and the power element PE12 are electrically connected in series to each other, the power element PE13, the winding SW13, the winding SW12, and the power element PE12 are electrically connected in series to each other, and the serially connected windings and power elements supply excitation currents to excite the respective stator poles, wherein the respective windings are allowed to be replaced by electromagnetically equivalent windings in arrangement on a circuit, wherein the numeral SN1 is a positive integer of 6 or more, the numeral RN is a positive integer of 2 or more, and the numeral MN1 shows the numeral of pole pairs and is a positive integer of 1 or more.

According to this configuration, the full pitch winding windings on both sides of the stator magnetic pole are connected in series, and the exciting current component of the stator magnetic pole is energized. As a result, the stator magnetic pole can be selectively excited to excite the magnetic flux component of the phase of the stator magnetic pole. Further, such energization does not have an electromagnetic effect on other stator magnetic poles. Since both windings are full pitch windings, they are affected by interlinking with the magnetic flux components of all other phases, but the voltage across both windings is not electromagnetically affected because the magnetic fluxes of the other phases cancel each other out with each other. As a result, the exciting current component can be easily and accurately energized without being affected by an excessive voltage of another phase or a complicated voltage.

Further, since the full pitch winding is adopted, the winding can be shared for the excitation of the adjacent stator magnetic poles. Therefore, the utilization rate is improved, and the copper loss in the slot can be reduced to ½ as compared with the concentrated winding.

Further, the current flowing through the full pitch winding is an added value in which the phase current components of the two stator magnetic poles on both sides are superimposed. Due to this unique circuit configuration and winding arrangement, the current components of the two phases of each full pitch winding can be freely separated from each other and energized. Then, each transistor superimposes the current components of the two phases and energizes them. At the same time, the energization path can be doubled and the utilization rate of each transistor can be doubled. As a result, the output of the drive circuit can be doubled as compared with the conventional one. Since the current control is a one-way current control, the two phase current components can be superimposed and separated from each other relatively easily.

In the disclosure according to a mode 2, a motor and control apparatus therefor is characterized in that the motor and control apparatus comprises:

a stator STR2; comprising

"SN2×MN3" pieces or more stator magnetic poles arranged in circumferential direction of the stator STR2, the magnetic poles being stator magnetic poles SP21 and SP22 arranged in the circumferential direction;

a concentrated winding SW21 wound around the stator magnetic pole SP21;

a concentrated winding SW22 wound around the stator magnetic pole SP22;

a rotor RTR2 equipped with rotor magnetic poles RP arranged on the rotor along a circumferential direction thereof and composed of "RN2×MN2" pieces soft magnetic members;

a power element PE21 electrically connected in series to the winding SW21;

a power element PE22 electrically connected in series to the winding SW22; and a power element PE23 electrically connected in series to the winding SW22, wherein the power element PE21, the winding SW21 and the power element PE22 are electrically connected in series with each other, the power element PE23, the winding SW22, and the power element PE22 are electrically connected in series with each other, and the respective windings and the respective power elements are energized by excitation currents so as to magnetically excite the respective stator magnetic poles, wherein the respective windings are allowed to be replaced by windings electromagnetically equivalent windings thereto in a circuit, and the numeral SN2 is a positive integer of 4 or more, the numeral RN2 is a positive integer of 2 or more, and the numeral MN2 indicates the number of pole pairs and a positive integer of 1 or more.

According to this configuration, since the current control is performed by the one-way current control, each transistor can be shared, and the drive circuit can be miniaturized and the cost can be reduced.

In the disclosure according to a mode 3, the motor and control apparatus therefor according to mode 1 or 2 is characterized in that the number SN3 of the stator magnetic poles SP is $((2 \times KN31) \times MN3)$, the rotor RTR1 is a rotor RTR3 provided with rotor magnetic poles composed of permanent magnets, the rotor RTR3 is provided with rotor magnetic poles RP whose number RN3 is $((2+4 \times KN32) \times MN3)$, wherein the numeral KN31 is a positive integer of 3 or more, the numeral KN32 is a positive integer of 2 or more, and the numeral MN3 indicates the number of pole pairs of 1 or more According to this configuration, since the current control is performed by the one-way current control, it is possible to efficiently drive a specific permanent magnet type rotor. In addition, the utilization rate of each transistor can be doubled, and the efficiency, miniaturization, and cost of the motor and its control device can be reduced.

In the disclosure according to a mode 4, a motor and control apparatus therefor is characterized in that the motor and control apparatus comprises:

a stator STR1, comprising
  4 stator magnetic poles SP arranged in a circumferential direction of the stator STR4, the stator magnetic poles SP including a single A-phase stator magnetic pole SP41,
  a B-phase stator magnetic pole SP42 located adjacent to the A-phase stator magnetic pole SP41 in the circumferential direction,
  a A/ phase stator magnetic pole SP43 located adjacent to the B-phase stator magnetic pole SP42 in the circumferential direction,
  a B/ phase stator magnetic pole SP44 located adjacent to the A/ phase stator magnetic pole SP43 in the circumferential direction,
  a slot SL41 located between the stator magnetic poles SP44 and SP41,
  a slot SL42 located between the stator magnetic poles SP41 and SP42,
  a slot SL43 located between the stator magnetic poles SP42 and SP43,
  a slot SL44 is located between the stator magnetic poles SP43 and SP44,
    an AB phase full-pitch winding SWAB or an annular winding wound in the slots SL41 and SL43, and
    a BA phase full-pitch winding SWBA or an annular winding wound in the slots SL44 and SL42;
a rotor RTR4 provided with RN4-pieces rotor magnetic poles RP composed of a soft magnetic member or a permanent magnet and arranged in a circumferential direction of the rotor;
a power element PE41 electrically connected to the AB phase full-pitch winding SWAB or the annular winding;
a power element PE42 electrically connected to the BA phase full-pitch winding SWBA or the annular winding; and
a power element PE43 producing a current in an opposite direction to a current supplied to the AB phase full-pitch winding SWAB by the power element PE41,
wherein, when the rotor magnetic poles are given a circumferential pitch RHB4, the B-phase stator magnetic pole SP42, when being viewed from the A-phase magnetic pole SP41, is located at a position defined by an odd-number times of (RHB4/2) in the circumferential direction, both the A-phase stator magnetic pole SP41 and the A/ phase stator magnetic pole SP43 are related to each other by an electromagnetically and relatively opposite-phase relationship, wherein magnetic flux components φa of both the A- and A/ phases pass though both the stator magnetic poles, both the A-phase stator magnetic pole SP41 and the A/ phase stator magnetic pole SP43 are related to each other by an electromagnetically and relatively opposite-phase relationship, wherein magnetic flux components φb of both the A- and A/ phases pass though both the stator magnetic poles, the power element PE41, the winding SW41, the winding SW42, and the power element PE42 are electrically connected in series to each other, and the serially connected windings and power elements are configured to receive excitation currents to magnetically excite the respective stators, wherein the numeral RN2 is a positive integer of 2 or more and the number of pole pairs of the motor is either 1, or, 2 or more.

According to this configuration, the full pitch winding windings on both sides of the two stator magnetic poles are connected in series, and the exciting current component is energized there. As a result, the corresponding stator magnetic pole can be selectively excited to excite the magnetic flux component of the phase of the stator magnetic pole. In addition, it does not have an electromagnetic effect on other stator magnetic poles. Since both windings are full pitch windings, they are affected by interlinking with the magnetic flux components of other phases, but the voltage across both windings is affected by the magnetic fluxes of the other phases canceling each other out, thus no affecting on the magnetic fluxes. As a result, the exciting current component can be easily and accurately energized without being affected by the voltage of the other phase. Since this motor is driven by two phases of stator magnetic poles and two full pitch windings, the utilization rate is basically high. Further, if the voltage problem can be solved, high torque, high power factor, and high output can be realized even at high speed rotation.

In the disclosure of a mode 5, a motor and control apparatus therefor is characterized in that the motor and control apparatus comprises:

a stator STR5, comprising
  4 stator magnetic poles SP arranged in a circumferential direction of the stator STR5, the stator magnetic poles SP including a single A-phase stator magnetic pole SP51,
  a B-phase stator magnetic pole SP52,
  a A/ phase stator magnetic pole SP53 which is electromagnetically opposite-phase to the A-phase stator magnetic pole SP1,
  a B/ phase stator magnetic pole SP54 which is electromagnetically opposite-phase to the B-phase stator magnetic pole SP2,
  a concentrated winding SW51 wound around the A-phase stator magnetic pole SP51,
  a concentrated winding SW52 wound around the B-phase stator magnetic pole SP52,
  a concentrated winding SW53 wound around the A/ phase stator magnetic pole SP53, and
  a concentrated winding SW54 wound around the B/ phase stator magnetic pole SP54;

a rotor RTR5 provided with RN5-pieces rotor magnetic poles RP composed of a soft magnetic member or a permanent magnet and arranged in a circumferential direction of the rotor;

a power element PE51 electrically connected in series to the winding SW51, wherein both the windings SW51 and winding SW53 are electrically connected in series to each other, a power element PE53 electrically connected in series to the winding SW53;

a power element PE52 electrically connected in series to the winding SW52, wherein both the winding SW52 and the winding SW54 are connected in series to each other, and a power element PE54 electrically connected in series to the winding SW54, wherein, when the rotor magnetic poles are given a circumferential pitch RHB5, the B-phase stator magnetic pole SP52, when being viewed from the A-phase magnetic pole SP51, is located at a position defined by an odd-number times of (RHB5/2) in the circumferential direction, both the A-phase stator magnetic pole SP51 and the A/ phase stator magnetic pole SP53 are related to each other by an electromagnetically and relatively opposite-phase relationship, wherein magnetic flux components φa of both the A- and A/ phases pass though both the stator magnetic poles, both the A-phase stator magnetic pole SP51 and the A/ phase stator magnetic pole SP53 are related to each other by an electromagnetically and relatively opposite-phase relationship, wherein magnetic flux components φb of both the A- and A/ phases pass though both the stator magnetic poles, the power element PE51, the winding SW51, the winding SW53, and the power element PE53 are electrically connected in series to each other, an excitation current Ia5 is supplied to the serially connected circuit to magnetically excite both the stator magnetic poles, and the power element PE52, the winding SW52, the winding SW54, and the power element PE54 are electrically connected in series to each other, an excitation current Ib5 is supplied to the serially connected circuit to magnetically excite both the stator magnetic poles, wherein the numeral RN5 is a positive integer of 3 or more and the number of pole pairs of the motor is either 1, or, 2 or more.

According to this configuration, since the cross-sectional area of the slot can be widened with a simple motor configuration, high efficiency can be achieved by reducing copper loss. Further, the drive circuit can also have a simple configuration. In addition, continuous torque generation in one direction and high efficiency by using magnets are also possible.

In the disclosure of a mode 6, a motor and control apparatus therefor according to any one of the modes 1 and 3 is characterized in that the motor and control apparatus,
the stator magnetic poles comprise "SN6×MN6"-piece stator magnetic poles SP61, SP62, SP63 and SP64 which are arranged in the circumferential direction of the stator,
the motor comprises a rotor RTR6 provided with rotor magnetic poles whose number is "SN6×MN6"-piece or more, but "3×SN6×MN6" or less, wherein
each of the stator magnetic poles has a circumferential angle width θst6 which is smaller than "360°/RN6–720°/(SN6×RN6)", and
each of the rotor magnetic poles has a circumferential angle width θrt6 which is smaller than "360°/RN6–720°/(SN6×RN6)",
wherein the numeral SN6 is a positive integer of 6 or more, the angle is an electrical angle, and the numeral MN6 indicates the number of pole pairs and is a positive integer of 1 or more.

According to this configuration, since the cross-sectional area of the slot can be widened, high efficiency can be achieved by reducing copper loss. It is also possible to improve efficiency by using magnets.

In the disclosure of a mode 7, a motor and control apparatus therefor set forth in the mode 6 is characterized in that the motor and control apparatus comprises:
a stator, comprising:
stator magnetic poles SP71, SP72 and SP73 whose number is "SN7×MN7" pieces, arranged in a circumferential direction of the stator,
a winding SW71 wound to magnetically excite the stator magnetic pole SP71,
a winding SW72 wound to magnetically excite the stator magnetic pole SP72,
a winding SW73 wound to magnetically excite the stator magnetic pole SP73,
a power element PE71 electrically connected in series to the winding SW71,
a power element PE72 electrically connected in series to the winding SW72, and
a power element PE73 electrically connected in series to the winding SW73,
a rotor RTR7 provided with rotor magnetic poles whose number is a RN7 piece which is defined as being "SN7×MN7"-piece or more and "3×SN7×MN7" or less,
wherein
each of the stator magnetic poles has a circumferential angle width θst7 which is smaller than "360°/RN7–720°/(SN7×RN7)", and
each of the rotor magnetic poles has a circumferential angle width θrt7 which is smaller than "360°/RN7–720°/(SN7×RN7)",
wherein the numeral SN7 is a positive integer of 6 or more, the angle is an electrical angle, and the numeral MN7 indicates the number of pole pairs and is a positive integer of 1 or more.

According to this configuration, since the cross-sectional area of the slot can be widened, copper loss can be reduced and the motor can be made highly efficient. It is also possible to improve efficiency by using magnets.

In the disclosure of a mode 8, a motor and control apparatus therefor is characterized in that the motor and control apparatus comprises:
a stator, comprising:
stator magnetic poles SP81, SP82, SP83 and SP84 whose number is "SN8×MN8" pieces or more, arranged and aligned in a circumferential direction of the stator,
a slot SL81 located between the stator magnetic poles SP81 and SP82,
a slot SL82 located between the stator magnetic poles SP82 and SP83,
a slot SL83 located between the stator magnetic poles SP83 and SP84, a winding 81 wound in the slot SL81, the widening 81 being composed of a full-pitch winding SWF wound through two slots which are different from each other by an electrical angle position of 180 degrees or an annular winding SWR wound in a toroidal form through the slot via an outside of a back yoke, a winding 82 wound in the slot SL82 in the same way, and a winding 83 wound in the slot SL83 in the same way, a rotor comprising "RN8×MN8"-pieces rotor magnetic poles RP arranged in a circumferential direction of the rotor, a DC power source Vs8 provided with a positive side terminal VsP8 and a negative side terminal VsN8;

a power element PE81 electrically connected in series, thereto, in a circuit connecting the positive side terminal Vs8 and the winding SW81;

a power element PE82 electrically connected in series, thereto, in a circuit connecting the winding 81 and the negative side terminal VsN8;

a power element PE83 electrically connected in series, thereto, in a circuit connecting the positive side terminal VsP8 and the winding SW82;

a power element PE84 electrically connected in series, thereto, in a circuit connecting the winding 82 and the negative side terminal VsN8;

a power element PE85 electrically connected in series, thereto, in a circuit connecting the positive side terminal VsP8 and the winding SW8;

a power element PE86 electrically connected in series, thereto, in a circuit connecting the winding SW83 and the negative side terminal VsN8;

a diode DD81 electrically connected in series to the winding SW81;

a diode DD82 electrically connected in series to the winding SW82; and a diode DD83 electrically connected in series to the winding SW83;

wherein in a state where the winding SW81, the diode DD81, the winding SW82, the diode DD82, the winding SW83 and the diode SS83 are connected in series, the winding SW81, the winding SW82, and the winding SW83 are supplied with a one-way current, when a direction of the current passing through the slot SL81 is defined as a positive direction, the slot SL82 is energized with a current having a negative direction which is opposite to the positive direction and the slot SL83 is energized with the current having the positive direction, and the power elements supply excitation currents to the respective windings for magnetically exciting the respective stator magnetic poles, wherein the respective windings are allowed to be replaced by windings electromagnetically equivalent windings thereto in a circuit, and the numeral SN8 is a positive integer of 6 or more, the numeral RN8 is a positive integer of 2 or more, and the numeral MN8 indicates the number of pole pairs and a positive integer of 1 or more.

According to this configuration, each full pitch winding is formed as an annular connection. It can be easily and accurately energized without being affected by excessive voltage of other phases or complicated voltage.

In the disclosure of a mode 9, the motor and control apparatus therefor according to any one of the modes 1 to 7 comprises:

a DC voltage source which supplies power for power running to the motor, and either a DC voltage source Vs92 regenerating magnetic energy or power of a power supply, or magnetic regenerative voltage amplifying means MRGM equivalently amplifying voltage for the power generation.

According to this configuration, the magnetic energy of each winding can be regenerated to the DC voltage source in a shorter time. As a result, the controllability of the current of each phase can be improved and the torque can be increased.

In the disclosure of a mode 10, the motor and control apparatus therefor according to any one of the modes 1, 2, 4, 5, 6, 7 and 8, comprising:

an N-pole stator magnetic pole SPA1 and an S-pole stator magnetic pole SPA2 which are arranged in line in the circumferential direction;

a permanent magnet PMA1 arranged between, closely to, a tip portion of a tooth of the N-pole stator magnetic pole SPA1 and a tip portion of a tooth of the S-pole stator magnetic pole SPA2.

According to this configuration, the magnetic flux of the permanent magnet is passed through the teeth, which are the stator magnetic poles, in the opposite direction, whereby the magnetic flux is reverse biased. As a result, the magnetic flux density of the tooth is reduced and the amount of magnetic flux that can pass through the tooth is increased. Therefore, the tooth width is reduced to increase the slot cross-sectional area, reduce the iron loss of the tooth, and the like.

In the disclosure of a mode 11, the motor and control apparatus therefor according to any one of the modes 1, 2, 4, 5, 6, 7 and 8, comprising:

a soft magnetic member MMB1 which allows magnetic fluxes to pass therethrough in the motor, and a soft magnetic member MMB2 whose saturated magnetic flux density is larger than that of the soft magnetic member MMB1, wherein the soft magnetic member MMB2 is mounted in a portion of a tooth of a stator also serving as the stator magnetic pole SP, the portion being a ½ or lower portion of the tooth, and the soft magnetic member MMB2 is mounted in a portion of a tooth of a rotor also serving as the rotor magnetic pole RP, the portion being a ½ or lower portion of the tooth.

According to this configuration, a member having a partially high magnetic flux density is used in a portion of the stator magnetic pole where magnetic saturation is likely to occur. This increases the average torque and reduces the torque ripple. Moreover, by such partial use, the influence of the magnetic saturation can be kept within an acceptable range.

In the disclosure of a mode 12, the motor and control apparatus therefor according to any one of the modes 2, 4, 5, 7 and 8, comprising:

two or more N-pole stator magnetic poles SPC1 arranged adjacently in the circumferential direction of the stator, two or more S-pole stator magnetic poles SPC2 arranged adjacently in the circumferential direction of the stator; and a permanent magnet PMC1 arranged between the N-pole stator magnetic pole SPC1 and the S-pole stator magnetic pole SPC2 at a back yoke in conformity with magnetic properties of the stator magnetic poles.

According to this configuration, the exciting load of the motor can be reduced. As a result, the motor efficiency is greatly improved especially in the light load region. There are many applications where the light load area is used frequently, and the energy saving effect is great.

In the disclosure of a mode 13, the motor and control apparatus therefor according to any one of the modes 1, 2, 4, 5, 6, 7, and 8, comprising:
N-pole stator magnetic poles SPD1 arranged in a circumference of the stator,
S-pole stator magnetic poles SPD2 arranged in the circumference of the stator;
a back yoke BYSD1 magnetically connecting the N-pole stator magnetic poles SPD1;
a back yoke BYSD2 magnetically connecting the S-pole stator magnetic poles SPD2; and
a permanent magnet PMD1 arranged between the back yoke BYSD1 and the back yoke BYSD2 in conformity with magnetic properties of the stator magnetic poles.

According to this configuration, the exciting load of the motor can be reduced. As a result, the motor efficiency is greatly improved especially in the light load region. There are many applications where the light load area is used frequently, and the energy saving effect is great. Further, since there are few restrictions on the arrangement of the stator magnetic poles in the circumferential direction, it can be used in combination with other modes.

In the disclosure of a mode 14, the motor and control apparatus therefor according to any one of the modes 1 to 8, characterized in that
the stator magnetic poles each has a circumferential width $\theta stE$,
the rotor magnetic poles each has a circumferential width RHBE,
the motor and control apparatus therefor, comprising:
a first rotation portion which is one of the elements configuring the rotor magnetic poles and which has the largest a radial permeance PMAE1 (1/a magnetic resistance average MRE1) per unit area of a unit angle width of the rotor in the circumferential direction in an overall length in an axial direction of the rotor,
a second rotation portion which is another of the elements configuration the rotor magnetic poles, arranged in the circumferential direction of the first rotation portion, and configured to have a circumferential width $\theta rtE2$; and
a third rotation portion which is another of the elements configuration the rotor magnetic poles, arranged adjacently to the second rotation portion in the circumferential direction, and configured to have a circumferential width $\theta rtE3$;
wherein
a radial permeance PMAE2 (1/a magnetic resistance average MRE2), which is obtained per unit area of a unit angle width of the second rotation portion in the circumferential direction in the overall length in the axial direction of the rotor, is in a range of 15 to 85% of a radial permeance PMAE3 (1/a magnetic resistance average MRE3), which is obtained per unit area of a unit angle width of the third rotation portion in the circumferential direction in the overall length in the axial direction of the rotor,
the circumferential width $\theta stE$ of each of the stator magnetic poles is larger than the circumferential width $\theta rtE2$ of the second rotation portion, and
a sum ($\theta rtE2+\theta rtE3$) of the circumferential width $\theta rtE2$ of the second rotation portion and the circumferential width $\theta rtE3$ of the third rotation portion is set to larger than ½ (RHBE/2) the circumferential pitch of the rotor magnetic poles.

According to this configuration, the angle of rotation width at which each stator magnetic pole generates torque can be increased. Further, torque ripples, vibrations, and noise can be reduced as a smoother torque change, such as changing the torque waveform shape of each phase from a rectangular waveform to a two-stage shape.

In the disclosure of a mode 15, the motor and control apparatus therefor according to any one of the modes 1 to 8, characterized in that
as a current for each phase, the current includes a DC current component Ij which is supplied continuously and a variable current component Ik which is varied depending on a rotor rotation angle position $\theta r$.

According to this configuration, the waste of time for transferring the magnetic energy generated in each winding to and from the DC voltage source is reduced. As a result, the increase in current can be accelerated, so that the torque in the high-speed rotation region can be increased, and the limit of the high-speed rotation speed can be raised.

In the disclosure of a mode 16, the motor and control apparatus therefor according to any one of the modes 1 to 8, comprising:
a DC excitation winding SWME exciting the respective phase stator magnetic poles; and
a power element PEG1 suppling the DC current component Ij to the field winding SWME.

According to this configuration, actions and effects similar to those of the mode 16 can be obtained, and the exciting current components of each stator magnetic pole can be collectively energized by the power element PEG1. As a result, the current load on the drive circuit can be reduced, the reactive current is reduced, and the power factor is improved. The direct current component Ij is a reactive current component, and the magnetic energy of each stator magnetic pole circulates in the direct current exciting winding SWME.

In the disclosure of a mode 17, the motor and control apparatus therefor according to any one of the modes 1, 2, 4, 5, 7 and 8, comprising:
"SNH×MNH"-pieces stator magnetic poles SPB arranged in the circumferential direction of the stator,
"SKH"-pieces small salient poles SPK arranged at a pitch of 360 degrees/(RNH×MNH) in the circumferential direction in a surface of the stator which is opposed to the stator magnetic poles SBP; and
"RNH×MNH"-pieces rotor magnetic poles RPK arranged in the circumferential direction of the rotor RTRH,
wherein the numeral SNH is a positive integer of 6 or more, the numeral SKH is a positive integer of 2 or more, the numeral RNH is a positive integer of "SNH× MNH×SKH" or more, the numeral MNH indicates the number of pole pairs and is a positive integer of 1 or more.

According to this configuration, since the stator magnetic poles and the rotor magnetic poles are multi-polarized, the torque output can be further increased in a relatively low rotation speed region.

In the disclosure according to a mode 18, a motor and control apparatus therefor set forth in the modes 17 is characterized in that the motor and control apparatus therefor, comprising:
"SNH×MNH"-pieces stator magnetic poles SPB arranged in the circumferential direction of the stator,
"SKH"-pieces small salient poles SPK arranged at a pitch of 360 degrees/(RNH×MNH) in the circumferential direction in a surface of the stator which is opposed to the stator magnetic poles SBP; and "RNH×MNH"-pieces rotor magnetic poles RPK arranged in the circumferential direction of the rotor RTRH, wherein the numeral SNH is a positive integer of 6 or more, the numeral SKH is a positive integer of 2 or more, the numeral RNH is a positive integer of "SNH× MNH×SKH" or more, the numeral MNH indicates the number of pole pairs and is a positive integer of 1 or more.

According to this configuration, a large torque can be output in a low rotation speed region. On the other hand, since high-speed rotation can also be driven, the ratio between the base rotation speed and the maximum rotation speed can be made large.

A novel technique of the present invention provides a motor comprising a full pitch winding that carries a unidirectional current. In this motor, excessive and complicated voltage characteristics are simplified, current is easily applied, and high torque and high power factor are realized. In addition, the winding is shared by using the full pitch winding, and the motor loss is reduced. As a result, the continuous rated torque and the maximum torque can be increased. In addition, the power supply path of the drive circuit is increased. As a result, the inverter output can be increased. In addition, the magnetic saturation of each part of the motor is reduced. This makes it possible to increase the maximum torque. In addition, the technology for adding permanent magnets further enhances efficiency. In addition, torque ripple is reduced and the effect of noise reduction can be obtained.

BRIEF DESCRIPTION OF THE DRAWINGS

In the accompanying drawings:

FIG. 83 is a lateral sectional view of a conventional reluctance motor,

FIG. 84 is a graph showing voltages, currents, and torque values provided by the conventional reluctance motor.

DETAILED DESCRIPTION OF THE PREFERRED EMBODIMENTS

First Embodiment

Figure 1:
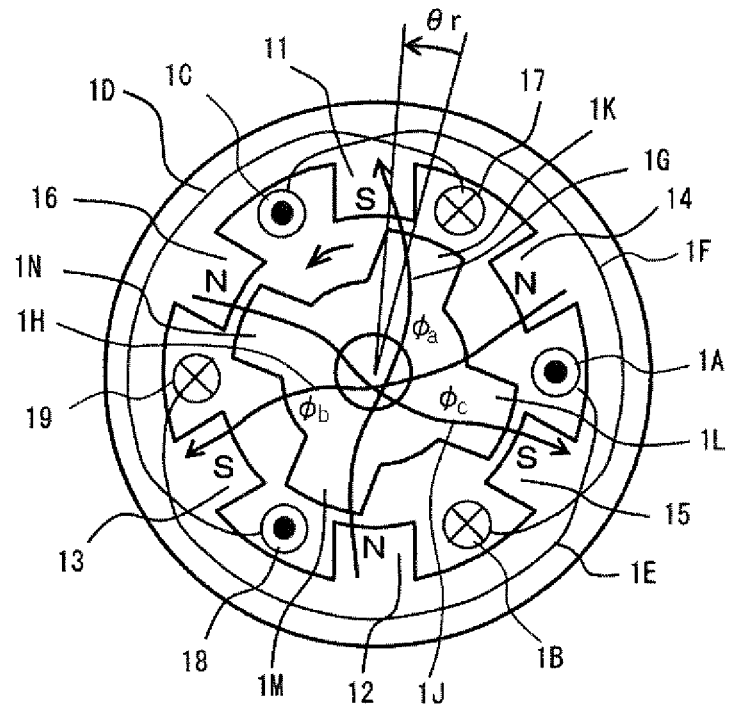
FIG. 1 exemplifies a lateral sectional view of a motor provided with full-pitch windings.

FIG. 1 shows an example of a cross-sectional view of a reluctance motor of the present invention. As shown in FIG. 1, this reluctance motor includes stator poles 11, 12, 13, 14, 15, and 16. The width of each of these stator magnetic poles in the circumferential direction is 30°. These stator magnetic poles are arranged at six places at equal intervals in the circumferential direction. Further, the reluctance motor has rotor magnetic poles 1K, 1L, 1M and 1N. The width of each of these rotor magnetic poles in the circumferential direction is 30°. These rotor magnetic poles are arranged at four locations at equal intervals in the circumferential direction. The shapes of the stator magnetic pole and the rotor magnetic pole in FIG. 1 are the same as the magnetic pole shapes in FIG. 83 described above. The configuration of FIG. 1 aims to double the cross-sectional area of each winding passing through a slot and reduce copper loss in the slot.

In each winding shown in FIG. 1, a concentrated winding of each stator magnetic pole shown in FIG. 83 described above is replaced with a full pitch winding. Further, the two concentrated windings in each slot shown in FIG. 83 are integrated into one winding. In FIG. 1, a winding pitch indicated by a winding 17, a coil end portion 1D thereof, and a winding 18 has an electric angle of 180°. This winding is a full pitch winding of a AB phase, and a AB phase current Iab is energized. Also, a winding pitch indicated by a winding 19, a coil end portion 1E thereof, and a winding 1A is 180° in terms of electrical angle. This winding is a BC-phase full pitch winding, and a BC-phase current Ibc is energized. Further, a winding pitch indicated by a winding 1B, a coil end portion 1F thereof, and a winding 1C has an electric angle of 180°. This winding is a CA-phase full pitch winding, and a CA-phase current Ica is energized.

Here, consider a case where each phase winding of FIG. 1 is a concentrated winding like the each phase winding of FIG. 83. Specifically, the current of each phase that energizes each concentrated winding of each stator magnetic pole and the magnetic flux of each phase that is generated are defined. A-phase current Ia is energized in a A-phase concentrated winding wound around a A-phase stator magnetic pole 11 and a A/ phase stator magnetic pole 12, and a A-phase magnetic flux φa represented by 1G is generated. A B-phase current Ib is energized in a B-phase concentrated winding wound around a B-phase stator magnetic pole 13 and a B/ phase stator magnetic pole 14, and a B-phase magnetic flux φb indicated by 1H is generated. A C-phase current Ic is applied to a C-phase concentrated winding wound around a C-phase stator magnetic pole 15 and a C/ phase stator magnetic pole 16, and a C-phase magnetic flux φc represented by 1J is generated.

In the present invention, a symbol "/" (i.e., diagonal) is used to indicate the opposite phase, such as a A/ phase, which is the opposite phase of a A phase. Then, it is used as a name of a proper noun such as A/ phase stator magnetic pole. However, the "/" symbol is not used for variable names such as current, voltage, and magnetic flux. Since variable names are used in arithmetic expressions, they can be confused with division expressions.

In FIG. 1, currents Iab, Ibc, and Ica of the full pitch winding winding of each phase and phase currents Ia, Ib, and Ic assuming the configuration of the concentrated winding have the following relationship. However, it is assumed that the number of turns of each winding of FIGS. 1 and 83 is the same.

$$Iab=Ia+Ib \quad (1)$$

$$Ibc=Ib+Ic \quad (2)$$

$$Ica=Ic+Ia \quad (3)$$

In the equation (1), it is shown that a AB phase current Iab flowing through a AB phase winding 17 of FIG. 1 is the sum of a A phase current Ia flowing through a A phase winding 837 of FIG. 83 and a B phase current Ib flowing through a B/ phase winding 83A. In the equation (2), it is shown that a BC phase current Ibc flowing in a BC phase winding 19 of FIG. 1 is the sum of a B phase current Ib flowing in the B phase winding 83H of FIG. 83 and a C phase current Ic flowing in a C/ phase winding 83N. In the equation (3), it is shown that a CA phase current Ica flowing in a CA phase winding 1B of FIG. 1 is the sum of a C phase current Ic flowing in a C phase winding 83L of FIG. 83 and the A phase current Ia flowing in a A/ phase winding 83C.

Therefore, a method of calculating the current of each winding in FIG. 1 is as follows. First, current values Ia, Ib, and Ic of each phase in the concentrated winding are obtained, and then Iab, Ibc, and Ica are obtained according to the equations (1), (2), and (3), and these currents are supplied. As a result, torque is generated by being excited by the same magnetic flux as in the case of FIG. 83. It is a simple formula, but it's not easy to get the value on the left side directly.

Respective phase currents Ia, Ib, and Ic are expressed by the following equations by modifying the equations (1), (2), and (3) and expressing them by currents Iab, Ibc, and Ica of the full pitch winding of each phase.

$$Ia=(Iab-Ibc+Ica)/2 \quad (4)$$

$$Ib=(Iab+Ibc-Ica)/2 \quad (5)$$

$$Ic=(-Iab+Ibc+Ica)/2 \quad (6)$$

Here, six variables are used in the equations (1), (2), (3), (4), (5), and (6). Each of these six variables, the current value, can take both positive and negative values. However, in the present invention, each current value is basically taken as a positive value, and this is applied to the motor and the drive circuit. One mode of its application is a DC motor and a DC drive circuit.

Therefore, other conditions are added to these equations. In the case of an full pitch winding of FIG. 1, currents Iab, Ibc, and Ica of the full pitch winding actually energized in the circuit are all values of 0 or more, not negative values. On the other hand, in the case of a concentrated winding shown in FIG. 83, phase currents Ia, Ib, and Ic actually energized in the circuit are all values of 0 or more, not negative values. Although it is technically possible to set the current of each phase to a negative value by adding a drive circuit, the present invention basically relates to a technique of energizing a one-way current. However, the technique of applying a bidirectional current in addition to the structure of the present invention is included in the present invention.

Here, in the case of the full pitch winding shown in FIG. 1, there is a new possibility. That is, even if the currents Iab, Ibc, and Ica of the full pitch winding are values of 0 or more, negative phase current components Ia, Ib, and Ic can be created. However, as a constraint condition for that, it is naturally necessary that Iab, Ibc, and Ica, which are the left sides of the equations (1), (2), and (3), have a value of 0 or more. For example, when Ia=10, Ib=6, and Ic=−5, Iab=16, Ibc=1, and Ica=5. In this way, a positive current can be applied to the currents Iab, Ibc, and Ica of the full pitch winding to create a negative phase current component Ic=−5. This drive control technique can be utilized when a permanent magnet rotor according to the mode 3 is used. For example, assume that a torque target value is CCW torque. When each phase current is 0, one of the stator magnetic poles generates CCW torque Tccw by the permanent magnet, and one of the other stator magnetic poles generates CW torque Tcw by the permanent magnet. Therefore, a state in which both torques Tccw and Tcw cancel each other out occurs. At this time, by setting the phase current of the stator magnetic pole that generates Tcw to a negative value, Tcw is reduced, and as a result, CCW torque can be generated. Further, since the mode 12 and 13 show a configuration in which the permanent magnet is arranged on the stator, even in that case, the phase current component can be set as a negative value and used for torque generation similar to the above.

Next, the characteristics and features of the full pitch winding of FIG. 1 will be described. For example, AB phase current Iab represented by the equation (1) is energized in AB phase windings 17, 1D, and 18. This is used when exciting a A-phase stator magnetic pole 11 and a A/ phase stator magnetic pole 12, and when exciting a B-phase stator magnetic pole 13 and a B/ phase stator magnetic pole 14. That is, it is shared for two purposes. This configuration is different from the configuration in which each concentrated winding shown in FIG. 83 is a dedicated winding for exciting the corresponding stator magnetic pole.

Then, in the slot in which a AB phase winding 17 is arranged in the configuration shown in FIG. 1, a A phase winding 837 and a B/ phase winding 83G are arranged in FIG. 83. Therefore, if the number of windings is the same, a winding cross-sectional area of the AB phase winding 17 can be doubled, and a winding resistance in the slot is halved. Therefore, when the currents Ia and Ib of the formula (1) are not energized at the same time, the AB phase winding 17 shown in FIG. 1 can reduce copper loss by ½. This is a big attraction. However, as the time during which the currents Ia and Ib are energized at the same time increases, the relative ratio of copper loss reduction decreases.

One problem with the full pitch winding winding shown in FIG. 1 is that the coil end portions 1D, 1E, and 1F of each full pitch winding winding become long. This tends to result in problems such as increased winding resistance, increased space for arranging each coil end, complicated winding production for concentrated winding windings, and reduced winding space factor. However, it is often used by multiplying the number of motor poles to a logarithm such as a 4-pole pair. By doing so, the load derived from the coil end portion of the motor as a whole can be reduced. Further, it is one of the methods to reduce the burden derived from the coil end portion that a motor shape is not a flat shape but an elongated motor shape.

The number of pole pairs in the present invention is defined as that the number of pole pairs is 1 in a configuration including the basic stator magnetic pole and the rotor magnetic pole. Therefore, in the case of the configuration of FIG. 1, in the present invention, a configuration including 6 stator magnetic poles and 4 rotor magnetic poles is defined as a 1-pole pair. An angular width occupied by this one-pole pair in the circumferential direction is 360° in terms of electrical angle. The same applies to the other types of motors shown in the present invention. Also in the case of the rotor shown in FIG. 37 using the permanent magnet described later, the rotor has 14 magnetic poles, and this is a one-pole pair. In this case, it is defined in the present invention that the electric angle is 360° on the entire circumference of FIG. 37. In general, in other motors such as reluctance motors and vernier motors, pole logarithms and electrical angles different from those described above may be defined, such as definitions based on electromagnetic operating cycles, so be sure not to be confused.

In the case of the full pitch winding shown in FIG. 1, since magnetic fluxes of other phases are also interlinked with the winding of each phase, there is a big problem that the winding voltage of each phase becomes complicated and an excessive voltage is generated in the winding of each phase. For example, while only a A-phase magnetic flux φa is linked to the A-phase winding shown in FIG. 83, a magnetic flux of (φa+φb−φc) is linked to the AB-phase windings 17 and 18 shown in FIG. 1. As a result, as will be shown later in the equations (20) and (21), the control of the AB phase current Iab becomes complicated, and the voltage of the AB phase winding becomes excessive. For example, there is a problem that a voltages of the AB phase voltage Vab and a CA phase voltage Vca are biased when driving mainly in the A phase. As a result, not only the current control becomes complicated, but also voltage load of the drive circuit increases, and inverter becomes large.

Next, in order to clarify the problem of the magnetic flux interlinking with each full pitch winding of the reluctance motor of FIG. 1 and other problems, the current, magnetic flux, voltage, torque, and output power of each phase are expressed and described by mathematical formulas. However, since these mathematical formulas are intended to clarify qualitative correlations, they will be explained using various simplified conditions. Specifically, these conditions are as follows. A soft magnetic material is magnetically saturated at 2.0 Tesla, changes linearly in the region of 2.0 Tesla or less, and its relative magnetic permeability is sufficiently large as 2000 or more. Since the magnetic flux excited by the current is generated only through the narrow air gap between the stator magnetic pole and the rotor magnetic pole, leakage flux to the surrounding space is sufficiently small. Magnetic resistance of this air gap is sufficiently small. Each winding resistance is ignored, and voltage drop when the current is applied is also ignored.

Consider a state in which the reluctance motor of FIG. 1 is rotating at a constant speed. That is, it is assumed that the rotor is rotated in the CCW direction at a constant speed Vso [radians/sec] while a constant current Io [A] having a value close to the continuous rating is energized. In this state, the relationship between A-phase, B-phase, C-phase magnetic flux φa, φb, φc [Wb], voltage Va, Vb, Vc [V], reluctance motor output power Pa, Pb, Pc [W], and torque Ta, Tb, Tc [Nm] is examined.

Figure 3:
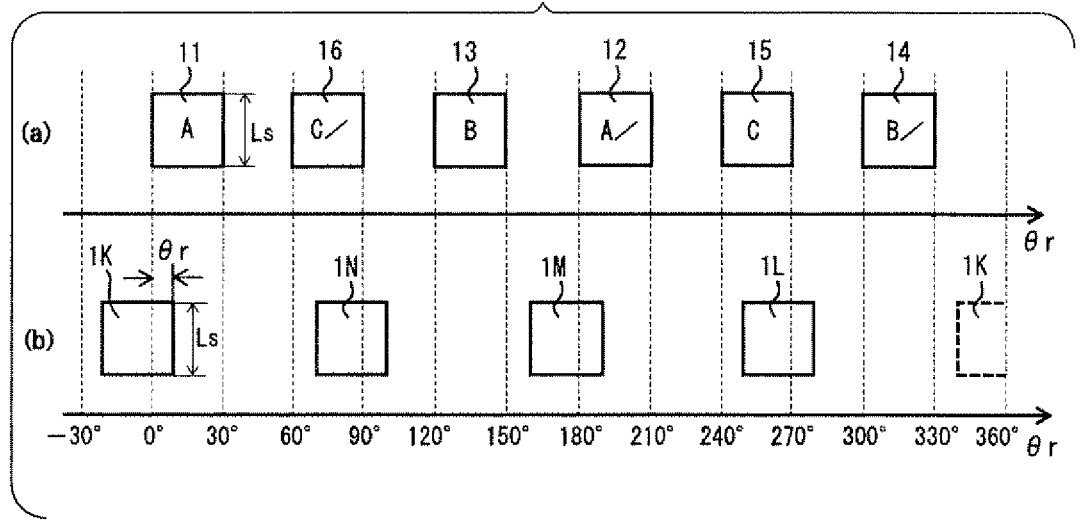
FIG. 3 is a horizontally developed view of stator magnetic poles and rotor magnetic poles of the motor according to the present invention.

FIG. 3A is a diagram showing the shape of the inner peripheral surface of each stator magnetic pole of the reluctance motor of FIG. 1. This figure is a diagram in which the shape of the inner peripheral surface is linearly developed in the circumferential direction when viewed from the air gap surface. The horizontal axis indicates the rotor rotation angle position θr. The counterclockwise rotation direction CCW in FIG. 1 is to the right on the paper in FIG. 3, and indicates the rotation angle position θr from −30° to 360°. The vertical axis of FIG. 3 indicates the rotor axis direction. Each stator magnetic pole in FIG. 3 has a shape having a circumferential width of 30° and a rotor axial length of Ls.

FIG. 3B is a view in which the outer peripheral surface shape of each rotor magnetic pole of FIG. 1 is linearly developed in the circumferential direction when viewed from the air gap surface. Rotor magnetic poles 1K, 1L, 1M, and 1N in FIG. 1 are indicated by the same reference numerals in FIG. 1. The rotor magnetic poles 1K, 1L, 1M, and 1N of FIG. 3 move to the right on the paper of FIG. 3 when the rotor of FIG. 1 rotates in the CCW direction. Each rotor magnetic pole in FIG. 3 has a shape having a circumferential width of 30° and a rotor axial length of Ls.

Regarding the rotation position of the rotor in FIG. 1, rotation position of the clockwise end of the A-phase stator magnetic pole 11 is defined as the start point of the rotor. As shown in the figure, a rotor rotation angle position θr is the rotation angle from this start point to the end of a rotor magnetic pole 1K in the CCW direction. The portions of stator magnetic poles of FIG. 3A and rotor magnetic poles of FIG. 3B, which are vertically located on paper surface of FIG. 3, are portions facing each other. Further, the portion through which the magnetic flux passes is between the stator magnetic pole and the rotor magnetic pole.

A minute change rate Δφa of the passing magnetic flux φa and a minute rotation angle Δθr of the rotor in the portion (???) where the area where the A-phase stator magnetic pole and the rotor magnetic pole face each other increase in FIGS. 1 and 3. Let a rotor radius be Rr.

$$\Delta\varphi a = Ls \times Bo \times \Delta\theta r \times Rr \qquad (7)$$

$$d\varphi a/d\theta r = Ls \times Bo \times Rr \qquad (8)$$

Bo means a magnetic flux density of the magnetic flux in the portion where the stator magnetic pole and the rotor magnetic pole face each other in a state where a constant current Io is applied to the winding of the stator magnetic pole.

As described above, a voltage Vab of the AB phase full pitch windings 17 and 18, a voltage Vbc of the BC phase full pitch windings 19 and 1A, and a voltage Vca of the CA phase full pitch windings 1B and 1C in FIG. 1 have complicated voltages. Therefore, first, let us consider the phase voltage assuming that the stator magnetic poles of each phase are wound in a concentrated manner. That is, those phase voltages are virtual phase voltages that can be obtained assuming that each concentrated winding shown in FIG. 83 is applied to the stator magnetic pole of FIG. 1. Specifically, the sum of a voltage of the concentrated winding wound around the A-phase stator magnetic pole 11 and a voltage of the concentrated winding wound around the A/ phase stator magnetic pole 12 in FIG. 1 is an A-phase voltage Va, and these two series windings are referred to as A-phase windings Wa. The sum of a voltage of concentrated winding wound around the B-phase stator magnetic pole 13 and a voltage of concentrated winding wound around the B/ phase stator magnetic pole 14 is a B-phase voltage Vb, and these two series windings are referred to as B-phase windings Wb. The sum of a voltage of the concentrated winding wound around the C-phase stator magnetic pole 15 and a voltage of the concentrated winding wound around the C/ phase stator magnetic pole 16 is a C-phase voltage Vc, and these two series windings are referred to as C-phase windings Wc.

The A-phase voltage Va induced in the A-phase winding Wa is obtained by the following equation because the windings wound around the two stator magnetic poles are connected in series. Here, the sum of the winding times of both windings is Nwa, and winding resistance is ignored. The winding voltage is the time change rate of a magnetic flux chain crossing number (Nwa×φa).

$$Va = Nwa \times d\varphi a/dt \qquad (9)$$

$$= Nwa \times (d\varphi a/d\theta r) \times (d\theta r/dt)$$

$$= Ls \times Nwa \times Bo \times Rr \times Vso \qquad (10)$$

Since a constant velocity Vso can be written as follows, it is substituted.

$$Vso = d\theta r/dt \qquad (11)$$

In equation (10), (Ls×Nwa×Bo×Rr×Vso) is a constant value. Here, in FIG. 84, in order to simply express each phase voltage, it is normalized to the equation (12) and illustrated.

$$(Ls \times Nwa \times Bo \times Rr \times Vso) = 1 \qquad (12)$$

In the reluctance motor of FIG. 1, it is assumed that the current of each phase is a constant current Io [A] and the rotor is rotated in the CCW direction at a constant speed Vso [radian/sec]. The phase voltages Va, Vb, and Vc in this state can be shown as FIG. 84 from the relationship between the equations (10), (12) and FIG. 3.

Power Pa supplied by the A-phase winding is the product of voltage and current, and is given by the following equation.

$$Pa = Va \times Io \qquad (13)$$

Then, the torque Ta generated by the A phase is given by the following equation, assuming that the electric power and the mechanical power are equal.

$$Ta = Pa/Vso \qquad (14)$$

$$= Va \times Io/Vso \qquad (15)$$

Since Io/Vso is assumed to be a constant value in the equation (15), the A-phase torque Ta is a value proportional to the A-phase voltage Va. The units are [W] for power, [Nm] for torque, [V] for voltage, [A] for current, [radian/sec] for speed, and [m] for Ls and Rr.

Since the relationships of the above equations (8) to (15) are the same for the B phase and the C phase, the relationship is as follows.

$$Vb = Ls \times Nwa \times Bo \times Rr \times Vso \qquad (16)$$

$$Vc = Ls \times Nwa \times Bo \times Rr \times Vso \qquad (17)$$

$$Tb = Vb \times Io/Vso \qquad (18)$$

$$Tc = Vc \times Io/Vso \qquad (19)$$

However, these equations hold in the portion or section where the area where the stator magnetic pole and the rotor magnetic pole of each phase face each other increases.

Further, based on the equations (15), (18), and (19), the phase torques Ta, Tb, and Tc related to the reluctance motor of FIGS. 1 and 83 are proportional to the respective phase voltages Va, Vb, and Vc, respectively. It is because (Io/Vso) is assumed to be a constant value. In order to show the proportional relationship, the symbols of the phase torques Ta, Tb, and Tc are added in parentheses under the notation of the phase voltages Va, Vb, and Vc in FIG. 84.

Next, a method of generating continuous torque in the positive direction of CCW with the reluctance motor of FIG. 1 will be described. A range in which Ta, which is the A-phase torque in FIG. 84, generates a positive torque is between 0° and 60° and between 90° and 150° for θr. In these ranges, a current shown in Ia of FIG. 84 is energized. The range in which Tb, which is the B-phase torque in FIG. 84, generates a positive torque is between θr of 30° and 90° and between 120° and 180°. In these ranges, a current Ib whose phase is delayed by 30° with respect to Ia in FIG. 84 is energized. The range in which Tc, which is the C-phase torque in FIG. 84, generates a positive torque is between θr of 60° and 120° and between 150° and 210°. In these ranges, a current Ic whose phase is delayed by 60° with respect to Ia in FIG. 84 is energized. The voltage and torque of each phase shown in FIG. 84 in the CCW direction have a magnitude of 1.0, an angle width of 30°, and a torque generation range of each phase of 30°. As a result, the total torque is constant. Here, currents Iab, Ibc, and Ica to be energized in the full pitch winding winding of FIG. 1 can be obtained by substituting the phase currents Ia, Ib, and Ic into equations (1), (2), and (3).

The operation and phenomenon of FIG. 1 have been described above. These are also related to other modes described below and have been described in a little more detail. However, the problem that the voltage of the full pitch winding of FIG. 1 is complicated and the problem that an excessive voltage is generated in the full pitch winding of FIG. 1 have not been described in detail yet.

Hereinafter, these phenomena will be described, and the countermeasures of the present invention corresponding to these problems will be described.

Next, interlinkage magnetic flux and the winding voltage of the full pitch winding of FIG. 1 will be described with reference to FIG. 4. A motor model of FIG. 4 will be described as a generalized motor configuration. As a result, this motor model can be applied not only to the reluctance motor of FIG. 1 but also to reluctance motor of FIG. 19 (b) and FIG. 25 (b) in which the number of stator magnetic poles and the number of rotor magnetic poles are different.

Figure 4:
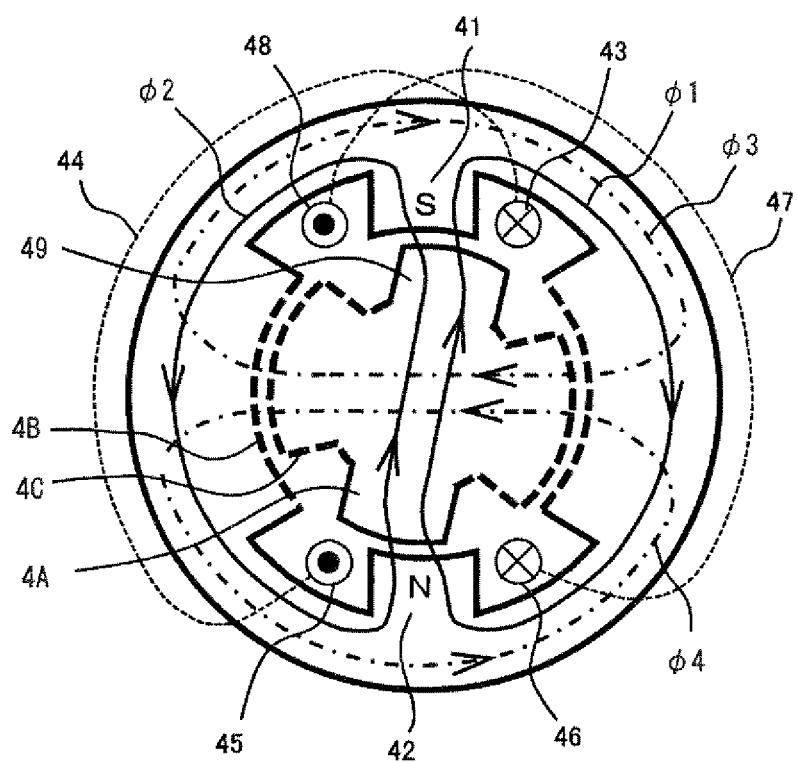
FIG. 4 is a view showing a relationship of linkage between the full-pitch windings and magnetic fluxes.

A reference numeral 41 in FIG. 4 indicates an AX phase stator magnetic pole, and a reference numeral 42 indicates an AX/ phase stator magnetic pole. The number of windings is Nwx/2. Reference numerals 49 and 4A are rotor magnetic poles. A reference numeral 4B shown by a broken line indicates a portion of the stator other than the stator magnetic poles 41 and 42, and the number of stator magnetic poles and the like is not limited. A reference numeral 4C shown by a broken line indicates a part of the rotor other than both the rotor magnetic poles 49 and 4A, and the number of rotor magnetic poles and the like is not limited. That is, this configuration can be applied to various motors.

Here, there are two conditions for limiting the motors of FIGS. 1 and 4. One is that the structure and configuration are point-symmetrical with respect to the center point of the rotor axis. The other is that the current that energizes the windings WX1 and WX2 is given by the current as shown in Eq. (1), (2) and (3) which is obtained by converting the current of the concentrated winding of FIG. 83 into the current value of the full pitch winding of FIG. 1.

The magnetic fluxes generated in FIG. 4 under these conditions, for example, AX phase stator magnetic poles 41 and 42 can be aggregated into two types: magnetic fluxes $\varphi 1$ and $\varphi 2$ passing through an AX/ phase stator magnetic pole 42 and magnetic fluxes of other phases crossing as shown in $\varphi 3$ and $\varphi 4$ in FIG. 4. At this time, voltage Vw1 of an full pitch winding W1 and voltage Vw2 of an full pitch winding W2 are given by the following equations.

$$Vw1 = Nwx/2 \times d(\varphi 1 + \varphi 2 + \varphi 3 + \varphi 4)/dt \tag{20}$$

$$Vw2 = Nwx/2 \times d(\varphi 1 + \varphi 2 - \varphi 3 - \varphi 4)/dt \tag{21}$$

$$Vh = Nwx/2 \times d(\varphi 3 + \varphi 4)/dt \tag{22}$$

If there is no magnetic flux $(\varphi 3 + \varphi 4)$ crossing left and right in FIG. 4, voltage Vh of equation (18) becomes 0, and Vw1 and Vw2 have equal values. However, if $(\varphi 3 + \varphi 4)$ exists, a voltage component Vh acts differentially on Vw1 and Vw2, which becomes complicated. One factor of the complication is the adverse effect of the change in magnetic flux accompanying the change in the current of each phase on the voltage of the other phase. Another factor is that the change in magnetic flux due to the rotation of the rotor acts differentially on the two windings that excite the other phase, resulting in a phenomenon in which the voltages of the two windings are biased.

Normally, even with the reluctance motor having a relatively simple configuration as shown in FIG. 1, the magnetic flux $(\varphi 3 + \varphi 4)$ in FIG. 1 becomes a magnetic flux $(\varphi b - \varphi c)$, and the magnetic flux change rate is about twice as large as a magnetic flux $(\varphi 1 + \varphi 2)$ corresponding to a magnetic flux $\varphi a$. Therefore, the influence of the voltage represented by the equation (22) is large. Moreover, since it acts differentially, the voltage of one of Vw1 and Vw2 becomes small, and the voltage of the other becomes large, causing a large imbalance. As described above, the configuration of the full pitch winding shown in FIG. 1 has a great merit of reducing copper loss because the winding resistance can be reduced. However, it faces the problems that it becomes difficult to control the current of the motor, current control is limited, and the differential voltage component increases the voltage and increases the voltage load on each drive circuit, resulting in an increase in the size of the inverter.

For example, in the case of a three-phase reluctance motor shown in FIG. 1, the timing of increasing or decreasing the current of each phase coincides with the timing of increasing or decreasing the current of the other phase, which adversely affects each other and makes current control difficult. Further, in the case of a multi-phase reluctance motor having four or more phases as shown in (b) of FIG. 19 and (b) of FIG. 25, in addition to the adverse effect of the voltage when the current is increased or decreased, a voltage bias occurs. In the range where the two phases generate torque at the same time, they interact with each other because there is a constant magnetic flux change with the rotation of the rotor. Therefore, a constant voltage that should be generated in the two windings to be excited acts differentially, and a voltage bias occurs.

It is proposed a method for driving voltage and current easily and efficiently by converting these complicated phenomena into a simple voltage formula by combining each full pitch winding and drive circuit. That is a method of connecting the full pitch winding WX1 and the full pitch winding WX2 in series. The voltage across them is the sum of the equations (20) and (21) as shown in the following equation. As a result, the magnetic flux $(\varphi 3 + \varphi 4)$ crossing in FIG. 4 can be eliminated, the voltage equation can be simplified, and an excessive voltage is not generated.

$$Vw1 + Vw2 = Nwx \times d(\varphi 1 + \varphi 2)/dt \tag{23}$$

As shown in FIG. 4, the full pitch winding windings WX1 and WX2 are also windings that excite the magnetic flux $(\varphi 1 + \varphi 2)$. A drive circuit to which the relationship of the equation (23) is applied will be shown later in FIGS. 6, 20, 26, 61, 62, and 63, and will be specifically described. It is a current energization method that is not affected by the crossing magnetic flux $(\varphi 3 + \varphi 4)$ shown in FIG. 4.

Figure 5:
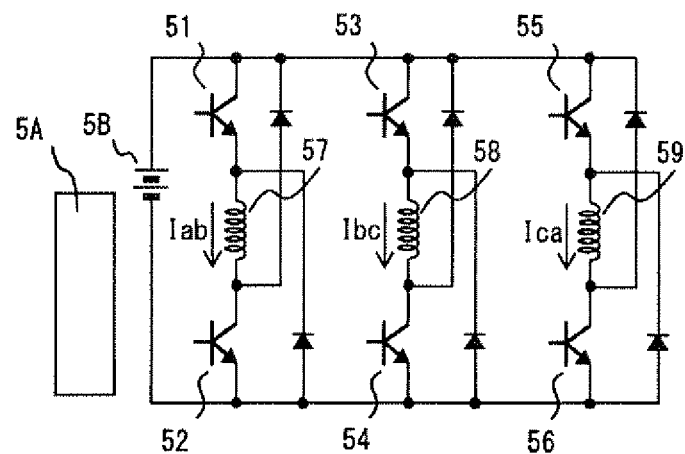
FIG. 5 is a diagram exemplifying a drive circuit of a reluctance motor.

FIG. 5 is a conventional typical drive circuit for driving the concentrated winding of FIG. 83 and the full pitch winding of FIG. 1. A reference numeral 5A is a control circuit of the entire drive circuit, a reference numeral 5B is a DC voltage source, and reference numerals 51, 52, 53, 54, 55 and 56 are drive transistors. Further, a reference numeral 57 is the AB phase full pitch winding wound shown by 17 and 18 in FIG. 1, and the AB phase current Iab is energized. A reference numeral 58 is the BC-phase full pitch winding wound shown by 19 and 1A in FIG. 1, and the BC-phase current Ibc is energized. A reference numeral 59 is the CA-phase full pitch winding wound shown by 1B and 1C in FIG. 1, and the CA-phase current Ica is energized. The remaining 6 diodes are power regeneration diodes.

Now, when the AB phase current Iab and the CA phase current Ica are energized in order to excite the A-phase stator magnetic pole 11 and the A/ phase stator magnetic pole 12, the resistance value of the full pitch winding is small, so that there is an effect of reducing copper loss. However, an excessive voltage represented by the equations (20) and (21) is generated in an AB phase full pitch winding 57 and a CA phase full pitch winding 59 in FIG. 5.

On the other hand, it is assumed that the concentrated winding as shown in FIG. 83 is driven by the drive circuit shown in FIG. 5. In this case, since the magnetic flux interlinking each phase winding is only the magnetic flux of that phase, there is no problem that the phase voltage becomes complicated. However, as described above, since it is necessary to wind the dedicated windings of each phase, the winding resistance increases. Therefore, the copper loss becomes large and the motor becomes large. Further, an example of a specific voltage waveform of the full pitch winding will be shown later in FIG. 14, and problems such as voltage complexity and generation of excessive voltage will be described.

Next, a method for alleviating problems such as a complicated voltage of the full pitch winding shown in the equations (20), (21), and (22) and an excessive voltage being generated in the full pitch winding will be described. It is a combination of the full pitch winding of the reluctance motor of FIG. 1 and a drive circuit of FIG. 6. One of the features of such a combination configuration is a connection method capable of exhibiting a simple voltage based on the voltage equation of each full pitch winding, that is, a current drive method. One of the other features is that, in the drive circuit of FIG. 6, a plurality of currents can be energized in parallel in a manner that has little influence on each other. This driving method not only solves the above-mentioned problems, but also enables an electric power output twice that of the conventional driving circuit of FIG. 5.

In the configuration of FIG. 1, the AB phase current Iab of the AB phase full pitch winding 1D, the BC phase current Ibc of the BC phase full pitch winding 1E, and the CA phase current Ica of the CA phase full pitch winding 1F can be represented by the A-phase current Ia, the B-phase current Ib, and the C-phase current Ic of the concentrated winding wound around each stator magnetic pole according to the equations (1), (2), and (3).

In the configuration of FIG. 1, the A-phase voltage Va, B-phase voltage Vb, and C-phase voltage Vc when the concentrated winding is wound around each stator magnetic pole are expressed by the following equations based on the relationship with the interlinkage magnetic fluxes φa, φb, and φc, as in the above equation (9). Here, the number of turns Nwa is the sum of the number of turns of two concentrated windings wound around the two stator magnetic poles arranged on opposite sides by 180° in the configuration of FIG. 1.

$$Va = Nwa \times d\varphi a/dt \tag{9}$$

$$Vb = Nwa \times d\varphi b/dt \tag{24}$$

$$Vc = Nwa \times d\varphi c/dt \tag{25}$$

Next, the AB phase voltage Vab of the AB phase full pitch winding 1D, the BC phase voltage Vbc of the BC phase full pitch winding 1E, and the CA phase voltage Vca of the CA phase full pitch winding 1F are expressed by the following equations in the same manner as in FIG. 4, equation (20) and (21) and based on the relationship of the interlinkage magnetic flux of the full pitch winding of each phase in the configuration of FIG. 1. Here, the number of windings of the full pitch winding of each phase is Nwa/2. Needless to say, these voltage equations are based on Faraday's law of electromagnetic induction. The direction of each winding is defined with the inflow side of the direct current of the winding as positive and the outflow side as negative.

$$Vab = Nwa/2 \times d(\varphi a + \varphi b - \varphi c)/dt \tag{26}$$

$$= (Va + Vb - Vc)/2 \tag{27}$$

$$Vbc = Nwa/2 \times d(-\varphi a + \varphi b + \varphi c)/dt \tag{28}$$

$$= (-Va + Vb + Vc)/2 \tag{29}$$

$$Vca = Nwa/2 \times d(\varphi a - \varphi b + \varphi c)/dt \tag{30}$$

$$= (Va - Vb + Vc)/2 \tag{31}$$

Here, since differential voltages corresponding to the voltage components of equation (22) are applied to equations (27), (29), and (31), their phase voltages are complicated, and further, a large peak voltage is obtained. Therefore, as shown in FIG. 4 and Eq. (23), two windings are connected in series to cancel the components of the differential voltage of Eq. (22), thereby providing a simplified energization configuration. That is, when the components of the differential voltage of Eq. (22) are canceled by connecting the two windings in series, two of the voltages represented by the equations (27), (29) and (31) become the phase voltage of each phase simplified as in the following equation. Therefore, an excessive voltage is not generated at both ends of the winding circuit in which two windings are connected in series, the problem of voltage bias can be solved, and the voltage burden on the drive circuit can be eliminated.

$$Vab + Vbc = Vb \tag{32}$$

$$Vbc + Vca = Vc \tag{33}$$

$$Vca + Vab = Va \tag{34}$$

This will be specifically described in the description of the drive circuit such as FIG. 6 described later.

As described above, based on the equations (26) to (34), the problematic voltage of the drive circuit, particularly the overvoltage, has been mainly described. However, the problem is not only that, but the currents Iab, Ibc, and Ica of the full pitch winding of each phase have an electromagnetic effect on the stator magnetic poles of all the phases, as shown by the equations (26) to (31), respectively. For example, when only the B-phase stator magnetic pole 13 and the B/ phase stator magnetic pole 14 are excited, as can be seen from equations (26), (28) and (32), it is necessary to accurately energize the B-phase current component Ib to both the AB-phase winding 17 and the BC-phase winding 19. In this way, the voltage component that cancels out when the two windings are connected in series and the magnetomotive force component that cancels out when a current is applied to the two windings have a two-sided relationship. Further, as in the above example, from the viewpoint of the current energized in each slot, the value of the B-phase current component Ib energizing the two windings is the same as the value of the B-phase current Ib energizing the virtual B-phase concentrated winding of FIG. 1.

The relationship between the current, interlinkage magnetic flux, voltage, torque, and power of the full pitch winding is complicated. Therefore, the current, interlinkage magnetic flux, voltage, torque, and power of the concentrated winding wound around each stator magnetic pole can be converted and analyzed by the above equations. This makes it easier to understand the excitation method and the control method. It should be noted that a simple model can be made by ignoring winding resistance and the like. As a result, the product and sum of the phase currents Ia, Ib, and Ic of the concentrated winding and the phases voltages Va, Vb, and Vc are obtained as power [W], and torque [Nm] can be obtained by dividing the power by rotation speed [rad/sec].

Figure 2:
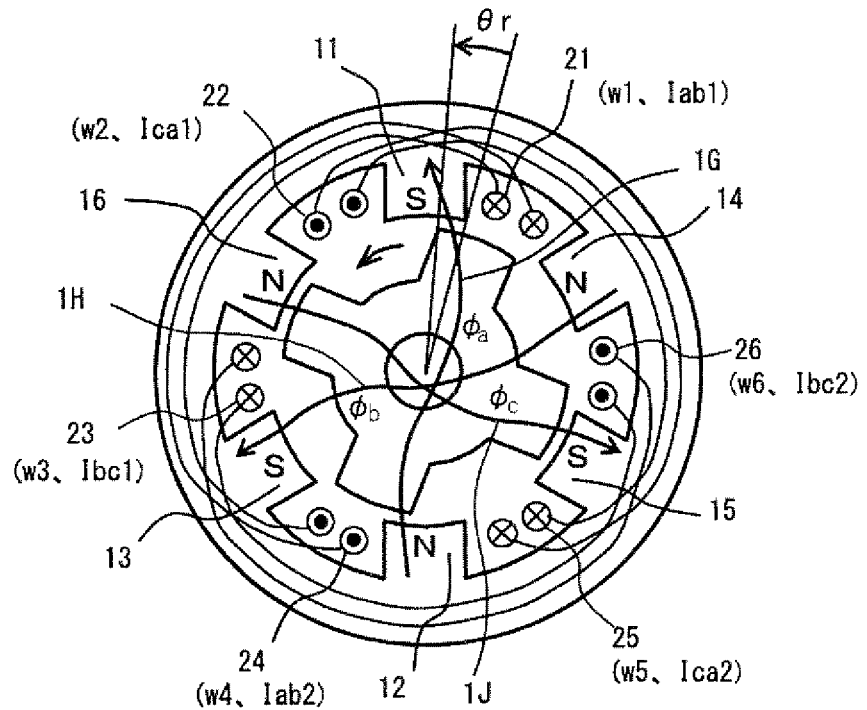
FIG. 2 exemplifies a lateral sectional of a motor according to the present invention.

Next, an example in which the full pitch winding of each phase of the reluctance motor of FIG. 1 is driven by the drive circuit of FIG. 6 will be described. A configuration according to the above equations (32), (33) and (34) is provided. In this configuration, it is desirable to eliminate unnecessary voltage components that are harmful to driving. Therefore, each phase winding requires two windings, for a total of six windings, in order to obtain voltages Vab, Vbc, and Vca. Therefore, each of the AB-phase full pitch winding, the BC-phase full pitch winding, and the CA-phase full pitch winding in FIG. 1 is converted into two parallel windings. An example of this configuration is shown in FIG. 2. In FIGS. 1 and 2, the configurations other than these windings are the same.

In FIG. 2, reference numerals 21 and 24 indicate two parallel windings obtained by converting the AB phase full pitch winding windings 17, 1D, and 18 of FIG. 1. In FIG. 2, in the vicinity of the AB phase full pitch winding 21, a winding number w1 and the energized a AB phase current Iab1 which are commonly shown in both the drive circuit shown in FIG. 6 and the cross-sectional view of the other motor are shown in parentheses. The number of turns of the windings 21 and 24 is (Nwa/2). The values of the phase current Iab1 and Iab2 are (Iab/2), and the currents have the same value. The windings are electrically insulated and are placed at different locations in the drive circuit of FIG. 6 to energize.

Similarly, in FIG. 2, reference numerals 23 and 26 are two parallel windings obtained by converting the BC phase full pitch winding windings 19, 1E, and 1A of FIG. 1. In the vicinity of the BC phase full pitch winding 23, a winding number w3 and a BC phase current Ibc1 to be energized, which are commonly shown in both the drive circuit shown in FIG. 6 and the cross-sectional view of the other motor, are added in parentheses. Further, in the vicinity of the BC phase full pitch winding 26, a winding number w6 and a BC phase current Ibc2 to be energized are added in parentheses.

Similarly, in FIG. 2, reference numerals 25 and 22 are two parallel windings obtained by converting the CA phase full pitch winding windings 1B, 1F, and 1C shown in FIG. 1. In the vicinity of the CA-phase full pitch winding 22, a winding number w2 and a CA-phase current Ica1 to be energized, which are commonly shown in both the drive circuit shown in FIG. 6. Further, in the vicinity of the CA phase full pitch winding 25, a winding number w5 and a CA phase current Ica2 to be energized are added in parentheses.

Figure 15:
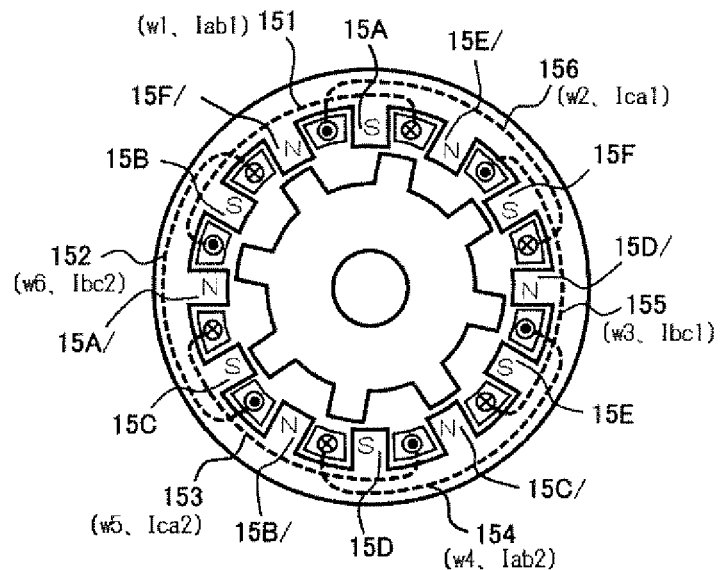
FIG. 15 is a sectional view exemplifying a motor according to the present invention, which has paired magnetic poles
Figure 16:
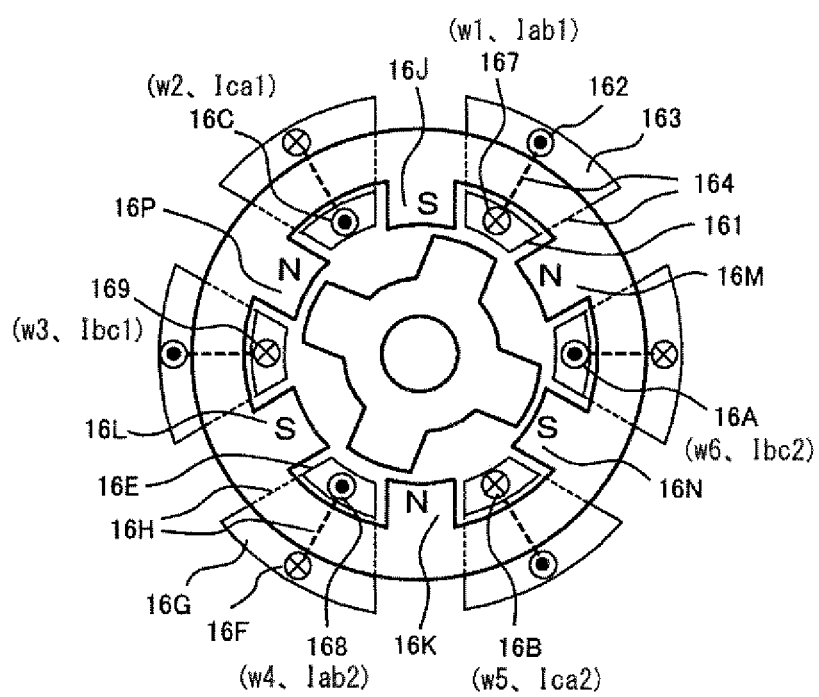
FIG. 16 is a lateral sectional view exemplifying a motor having annular windings, according to the present disclosure.

Later, FIG. 15 shows a motor in which the motor shown in FIG. 1 is paired with two poles. Further, FIG. 16 shows a motor in which a toroidal annular winding is wound around the motor shown in FIG. 1. In the case of the motors shown in FIGS. 15 and 16, two sets of windings having the same phase are composed of a total of six windings. Therefore, the windings can be driven by the drive circuit of FIG. 6 without dividing the two sets of windings into the same slot and providing them in parallel.

Figure 6:
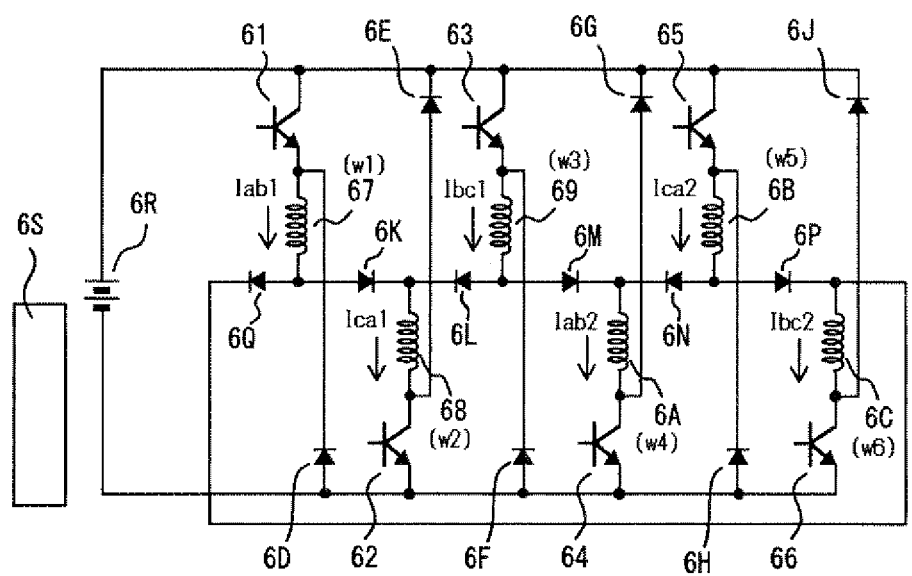
FIG. 6 is a diagram exemplifying the windings and a drive circuit according to the present disclosure.

However, it is required to control the voltages of the two in-phase windings of the drive circuit shown in FIG. 6 to the same value more accurately. To that end, even in these motors, the windings in all slots are divided into two parallel windings, which are connected in series with each other. As a result, two parallel in-phase windings are produced and incorporated as two in-phase windings in the circuit of FIG. 6. This enables strict voltage control. In that case, the interlinkage magnetic fluxes of the two winding groups are the same, and voltage imbalance does not occur. That is, for example, even if there is magnetic asymmetry such as a non-uniform air gap of the motor, or if a current control error occurs in the drive circuit of FIG. 6, no imbalance occurs in the voltages of the two in-phase winding groups shown in FIG. 6. However, since the windings of all the slots are divided into two parallel windings, the winding structure of the windings becomes complicated.

In FIG. 6, a reference numeral 6S indicates a control circuit of the entire drive device, a reference numeral 6R indicates a DC voltage source, and reference numerals 61, 62, 63, 64, 65, 66 indicate a driving transistor. In FIG. 6, a reference numeral 67 is one winding 21 of the two AB phase full pitch winding windings which are the parallel windings shown in FIG. 2. The winding number w1 which is commonly shown in other motor cross-sectional views is assigned to the winding 21, and the AB phase current Iab1 is energized by a transistor 61. (w1) in parentheses is added in the vicinity of the reference numeral 67. A reference numeral 6A is the other parallel winding and indicates a winding 24 shown in FIG. 2. The AB phase current Iab2 is energized in this winding by a transistor 64. A winding number (w4) in parentheses is added in the vicinity of the reference numeral 6A.

Similarly, in the circuit of FIG. 6, a reference numeral 68 indicates a winding 22 of FIG. 2. This winding 22 is one of the CA phase full pitch winding windings, and a winding number (w2) is added. The CA phase current Ica1 is energized in the winding 22 by a transistor 62. A reference numeral 6B is the other parallel winding, and indicates a winding 25 shown in FIG. 2. The CA phase current Ica2 is energized in the winding 25 by a transistor 65. A winding number (w5) in parentheses is added in the vicinity of the reference numeral 6B. Similarly, in FIG. 6, a reference numeral 69 indicates a winding 23 shown in FIG. 2. This winding 23 is one of the BC phase full pitch winding windings, and a winding number (w3) is added. The BC phase current Ibc1 is energized by a transistor 63 in the winding 23. A reference numeral 6C is the other parallel winding, indicating a winding 26 shown in FIG. 2. The BC phase current Ibc2 is energized in the winding 26 by a transistor 66. A winding number (w6) in parentheses is added in the vicinity of a reference numeral 6C. An energizing current is a direct current, and the winding direction is arranged according to the direction of the current. Further, in order to protect each of these transistors from a negative voltage, a diode in antiparallel may be added.

In the configuration of FIG. 6, a diode 6Q is arranged between an AB-phase full pitch winding 67 and a CA-phase full pitch winding 6C in the forward current direction. Further, a diode 6K is arranged between the AB phase full pitch winding 67 and a BC phase full pitch winding 68 in the forward current direction. A diode 6L is arranged between the BC-phase full pitch winding 68 and a CA-phase full pitch winding 69 in the forward current direction. A diode 6M is arranged between the CA-phase full pitch winding 69 and an AB-phase full pitch winding 6A in the forward current direction. A diode 6N is arranged between the AB phase full pitch winding 6A and a BC phase full pitch winding 6B in the forward current direction. A diode 6P is arranged between the BC-phase full pitch winding 6B and a CA-phase full pitch winding 6C in the forward current direction.

The current flowing through each winding and each diode is expressed by the relationship of equations (1), (2), and (3). An A-phase current component Ia/2 flows through the diode 6Q, a B-phase current component Ib/2 flows through the diode 6K, a C-phase current component Ic/2 flows through the diode 6L, the A-phase current component Ia/2 flows through the diode 6M, the B-phase current component Ib/2 flows through the diode 6N, and the C-phase current component Ic/2 flows through the diode 6P. These diodes reduce the influence of overvoltages on other windings, where no current flows through each other when an overvoltage is generated in each winding. However, each transistor is connected in series to each winding, and the function of controlling the average voltage and current of PWM of each winding is exhibited. Therefore, depending on the driving conditions and driving states of the reluctance motor, it is possible to remove some or all of these six diodes.

Remaining six diodes 6D, 6E, 6F, 6G, 6H, and 6J regenerate power to the DC voltage source 6R. These diodes are also used to carry flywheel current for each phase.

Next, the voltage of each winding shown in FIG. 6 will be described. The voltage in the circuit part of the AB-phase full pitch winding 67, the diode 6K, and the CA-phase full pitch winding 68 is defined by the relation of equation (34), and the voltage across those windings is the A-phase voltage Va. The complex voltage and overvoltage represented by the AB phase voltage Vab of the equation (27) and the CA phase voltage Vca of the equation (31) is offset by connecting the AB phase full pitch winding 67 and the BC phase full pitch winding 68 in series.

Further, the AB phase current Iab1 flowing through the winding 67 becomes ½ of the current of the equation (1), and the CA phase current Ica1 flowing through the winding 68 becomes ½ of the current of the equation (3). Among them, the current component flowing from the winding 67 to the winding 68 is ½ of the A-phase current component Ia.

The same voltage is applied to the winding 67 and the winding 6A, and the same current flows. Further, the same voltage is applied to the winding 68 and the winding 6B, and the same current flows. Therefore, the voltage across the winding 6A and the winding 6B is also the same, and the same action and effect can be obtained. Then, the sum of the current component flowing from the winding 67 to the winding 68 and the current component flowing from the winding 6B to the winding 6A becomes the A-phase current component Ia. Then, the sum of the current component flowing from the winding 67 to the winding 68 and the current component flowing from the winding 6B to the winding 6A becomes the A-phase current component Ia.

In the circuit configuration of FIG. 6, the voltage in the circuit portion of the BC-phase full pitch winding 69, the diode 6M, and the AB-phase full pitch winding 6A is defined by the relationship of equation (32). The voltage across those circuit parts is the A-phase voltage Vb. As a result, the complex voltage and excessive voltage shown by the BC phase voltage Vbc of the formula (29) and the AB phase voltage Vab of the formula (27) are offset by connecting the BC-phase full pitch winding 69 and the AB-phase full pitch winding 6A in series.

Further, the BC phase current Ibc1 flowing through the winding 69 is ½ of the current of the equation (2), and the AB phase current Iab2 flowing through the winding 6A is ½ of the current of the equation (1). Among them, the current component flowing from the winding 69 to the winding 6A is ½ of the B-phase current component Ib.

The same voltage is applied to the winding 69 and the winding 6C, and the same current flows. Further, the same voltage is applied to the winding 6A and the winding 67, and the same current flows. Therefore, the voltage across the winding 67 and the winding 6C is also the same, and the same action and effect can be obtained. Then, the sum of the current component flowing from the winding 69 to the winding 6A and the current component flowing from the winding 67 to the winding 6C becomes the B-phase current component Ib. This current Ib excites the B-phase stator magnetic pole 13 and the B/ phase stator magnetic pole 14 shown in FIG. 2.

In the circuit configuration of FIG. 6, the voltage in the circuit portion of the BC-phase full pitch winding 69, the diode 6L, and the CA-phase full pitch winding 68 is defined by Eq. (33), and the voltage across them is the A-phase voltage Vc. The complex voltage and excessive voltage represented by the BC phase voltage Vbc of the formula (29) and the CA phase voltage Vca of the formula (31) are offset by connecting the BC-phase full pitch winding 69 and the AB-phase full pitch winding 68 in series.

Further, the BC phase current Ibc1 flowing through the winding 69 is ½ of the current of the equation (2), and the CA phase current Ica1 flowing through the winding 68 is ½ of the current of the equation (3). Among them, the current component flowing from the winding 69 to the winding 6A is ½ of the C-phase current component Ic.

The same voltage is applied to the winding 69 and the winding 6C, and the same current flows. The same voltage is applied to the winding 68 and the winding 6B, and the same current flows. Therefore, the voltage across the winding 6B and the winding 6C is also the same, and the same action and effect can be obtained. Further, the sum of the current component flowing from the winding 69 to the winding 68 and the current component flowing from the winding 6B to the winding 6C is the C-phase current component Ic. This current Ic excites the C-phase stator magnetic pole 15 and the B/ phase stator magnetic pole 16 shown in FIG. 2.

Next, an outline of the operation when the rotor rotates in the CCW direction in FIG. 2 will be described with reference to FIG. 6. At the position where the rotor rotation angle position θr is 0°, the rotor magnetic poles approach the A-phase stator magnetic pole 11 and begin to face each other. Then, while the rotor rotation angle position θr is from 0° to 30°, the areas of both magnetic poles facing each other increase. During this increase, the A-phase stator magnetic pole 11 is excited by the A-phase current component Ia represented by the equations (1) and (3), and torque in the CCW direction is generated. This operation is the same for the A/ phase stator magnetic pole 12.

Similar to the A phase and the A/ phase, at the position where the rotor rotation angle position θr is 30°, the rotor magnetic pole approaches the B phase stator magnetic pole 13 and starts to face each other. Then, while the rotor rotation angle position θr is from 30° to 60°, the areas of both magnetic poles facing each other increase. During this increase, the B-phase stator magnetic pole 13 is excited by the B-phase current component Ib represented by the equations (1) and (2), and torque in the CCW direction is generated. This operation is the same for the B/ phase stator magnetic pole 14.

Similar to the above, at the position where the rotor rotation angle position θr is 60°, the rotor magnetic poles approach the C-phase stator magnetic poles 15 and begin to face each other. Then, while the rotor rotation angle position θr is from 60° to 90°, the areas of both magnetic poles facing each other increase. During this increase, the C phase stator magnetic pole 15 is excited by the C phase current component Ic represented by the equations (2) and (3), and torque in the CCW direction is generated. This operation is the same for the C/ phase stator magnetic pole 16.

In this way, when the rotor rotates in the CCW direction, the A phase, the B phase, and the C phase operate alternately and in order to continuously generate CCW torque, so that the rotor can rotate. The reluctance motor of FIG. 2 does not have a structure in which the energization operation of the stator proceeds in synchronization with the rotation of the rotor unlike the synchronous motor. That is, when the phase of the operating stator magnetic pole changes, the winding to be energized changes by 120° in the circumferential direction, which complicates the energization control. Further, in the above description, the case where the currents Iab1 and Iab2 have the same value, the currents Ibc1 and Ibc2 have the same value, and the currents Ica1 and Ica2 have the same value has been described. On the other hand, for the purpose of reducing torque ripple, motor vibration, noise, etc., it can be deformed so as to be driven by currents having different phases and/or different magnitudes from each other. They are also included in the present invention.

Figure 26:
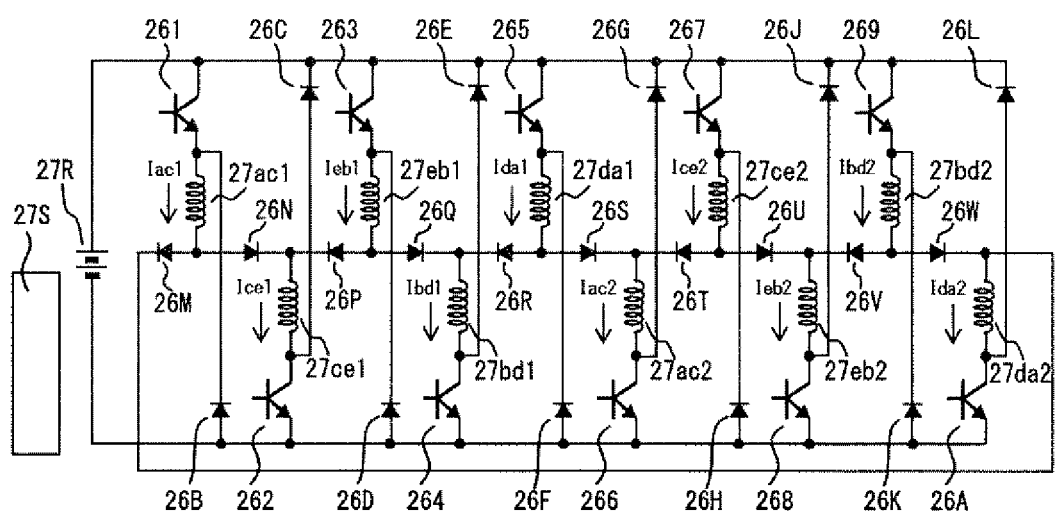
FIG. 26 exemplifies a drive circuit and windings according to the present disclosure.

Further, the types and numbers of currents used in the drive circuits of FIGS. 6 and 26 are doubled as compared with the number of currents of the drive circuits of FIG. 5. Therefore, the burden of detecting each current value in order to control the current increases. In the case of FIG. 6, there are twice as many types of currents as in Eqs. (1), (2), and (3). Since there are two values Jab, Ibc, and Ica on the left side of these equations, it is necessary to detect six types of currents. There are also two currents Ia, Ib, and Ic on the right side, and although there are six types of current, they can be calculated by mutual calculation. There are various types of current detectors, and any of them can be used. One current detection method is a method of collectively detecting two types of currents at a place where the two types of currents merge. In this case, the production of the current detector, the convenience of arrangement on the circuit, and the like can be further simplified. For example, at the connection point between a cathode of the diode 6K and the cathode of the diode 6L in FIG. 6, the current value of the A-phase current component Ia/2 and the C-phase current component Ic/2 is detected from the voltage drop using a shunt resistor. This detection circuit can be made by combining two shunt resistors, and the common potential can be shared. Therefore, the current detector can be simplified. Regarding the detection based on the equation (3), the currents Ia/2 and Ic/2 are detected, and Ica1 can also be detected from the results. The same applies to the other two sets and four current detections. Further, various methods including an analog method and a high-speed digital method can be used for transmitting the current value from the current detection circuit to the control circuit of the entire motor having different potentials.

Next, the specific current, voltage, torque, and power characteristics of the reluctance motors of FIGS. 1 and 2 will be described. For this purpose, the characteristics shown in FIGS. 11, 12, and 13 will be described as examples of motor output characteristics of FIG. 10 and the non-linear electromagnetic characteristics of the soft magnetic material which are largely related to the reluctance motor characteristics.

Figure 10:
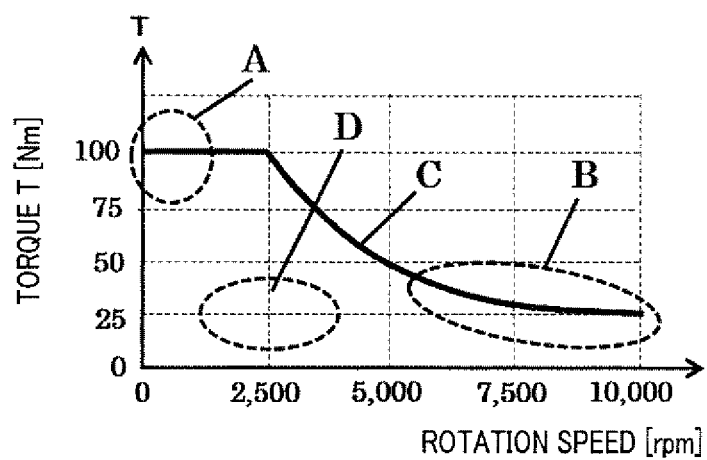
FIG. 10 is a graph exemplifying a speed vs. torque characteristic of a motor.

FIG. 10 shows an example of the characteristics of rotation speed and torque required for an electric vehicle EV or the like. The horizontal axis indicates the number of revolutions, and the maximum number of revolutions is 10,000 rpm. The vertical axis represents the torque T, and the maximum torque is 100 Nm. In the characteristics of FIG. 10, the region indicated by reference numeral A is a region in which a large torque is required at low speed rotation, which is required for uphill driving on a steep slope in the main engine application of an automobile. This area is important. In this region, a large motor current often causes the soft magnetic material to magnetically saturate and reduce the power factor. In addition, a large motor current causes a large copper loss, which is a major factor in increasing the size of the motor. Larger motors pose problems in terms of mounting, weight, and cost. The region indicated by reference numeral B in FIG. 10 is a high-speed rotation region, which is required for high-speed traveling of an automobile. Since the winding voltage is limited by the power supply voltage, it is necessary to reduce the magnetic flux. In the region A and the region B, opposite characteristics are required with respect to the magnitude of the field magnetic flux. In the region B, there are problems of torque pulsation, noise, vibration, and an increase in iron loss.

Even in the conventional magnet type synchronous motor, a large magnetic flux is required in the region A (a large torque is required at low speed rotation). On the other hand, in the region B (constant output characteristic at high speed rotation is required), it is necessary to reduce the amount of magnetic flux, and the field characteristics conflict with each other in both regions. In the region A, there is a problem that the power factor decreases due to magnetic saturation, the copper loss of the motor increases, and the size of the motor increases. In the region B, there is a problem that the power factor decreases due to the weakening of the field, the voltage becomes excessive, and the inverter becomes large.

In the characteristic example of FIG. 10, the region indicated by reference numeral C is a constant output region, the base rotation speed is 2,500 rpm, and the output is 26.18 kW. The region indicated by reference numeral D in FIG. 10 is a region frequently used for driving an automobile, but has little influence on the size, weight, and manufacturing cost of the motor and inverter. However, since it is used frequently, it is important in terms of efficiency and fuel efficiency. In addition, quietness is required, and noise reduction is particularly necessary. As described above, as shown in the typical operating regions A, B, C and D shown in FIG. 10, various characteristics are required for the EV main engine motor. The technique of the present invention that meets these required characteristics will be described.

Figure 11:
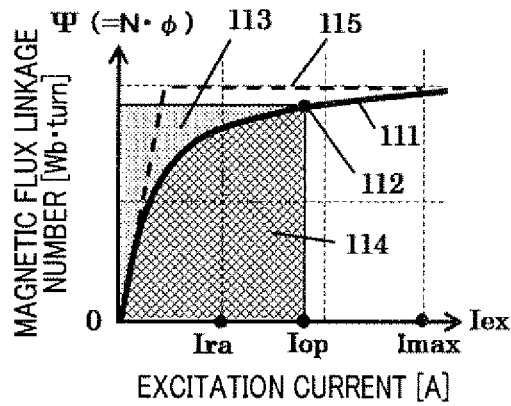
FIG. 11 is a graph exemplifying a relationship between excitation current and the number of interlinkage magnetic fluxes.

Next, the characteristics of the reluctance motor and the electromagnetic characteristics that form the basis of the output are shown in FIG. 11.

A solid line 111 of FIG. 11 shows the magnetic characteristics of the A-phase stator magnetic pole 11, A/ phase stator magnetic pole 12, rotor magnetic poles 1K and 1M of FIG. 1, and an example of the magnetic characteristics of the soft magnetic material of the back yoke of the stator, that is, the magnetic characteristics of the A-phase magnetic flux φa. A horizontal axis Iex indicates the exciting current, and corresponds to the A-phase current Ia of the A-phase winding Wa when it is assumed that the concentrated winding is wound around the reluctance motor of FIG. 1. Reference numeral Ira indicates a continuous rated current, reference numeral Imax indicates a maximum current, and reference numeral Iop indicates a current value in the state described with reference to FIG. 11. The vertical axis represents magnetic flux interlinkage number Ψ, which is the product of the number of turns Nwa and an interlinkage magnetic flux φ, and the unit is [Wb·turn].

The characteristics relating to the A phase in FIG. 1 are indicated by reference numeral 111. When the A-phase current Ia acts as the operating current Iop in FIG. 11, the gradient is large and linear in the region where the current Iop is small, but magnetic saturation occurs as the current value increases. When the exciting current Iex reaches an operating point 112 at Iop in FIG. 11, the area of the concave substantially triangle indicated by reference numeral 113 represents magnetic energy Em, the unit of which is [Wb·turn·A], and [joule]. The area of the convex substantially triangular represented by reference numeral 114 indicates magnetic co-energy Eco, and its unit is [Wb·turn·A] and is also [Joule].

As a condition for obtaining the characteristics shown in FIG. 11, first, consider a state in which the entire surfaces of both the A-phase stator magnetic pole 11 and the rotor magnetic pole 1K face each other, that is, a stationary state at the rotor rotation angle position θr=30°. Assuming that the inductance of the A-phase winding Wa in this state is La, the A-phase voltage Va induced in the A-phase winding Wa is expressed by Eq. (35) based on Eq. (9).

$$Va = Nwa \times d\varphi a/dt = La \times dIa/dt \qquad (35)$$

Then, the magnetic flux chain crossover number T is obtained by time-integrating the equations on both sides.

$$\Psi = Nwa \times \varphi a = La \times Ia \qquad (36)$$

However, here, when the inductance La, which is a proportional constant, changes non-linearly as the current Ia increases, a large error occurs in (La×Ia) on the right side. The inductance La changes greatly depending on the value of the current Ia, and also changes greatly depending on the rotor rotation angle position θr. The inductance La changes greatly depending on the value of the current Ia, and also changes greatly depending on the rotor rotation angle position θr.

A state in which the A-phase current Ia is increased from 0 to the value Iop in a stationary state at the rotor rotation angle position θr=30° will be described. In this state, a time integral of the product (Va×Ia) of the voltage and current of the A-phase winding Wa is equal to the area 113 shown in FIG. 11. This area corresponds to the magnetic energy Em, and its unit is [joule]. At this time, the energy supplied from the power supply side to the motor side is only the magnetic energy Em having an area of 113, and the magnetic co-energy Eco having the area 114 is not given.

Next, a case where the rotor rotates at a constant speed Vso from θr=0° or a slightly negative value to 30° with the A-phase current Ia reaching the value Iop will be described. In this case, the A-phase voltage Va is represented by the equations (9) and (10), and has a constant value Vop. The time integration of the product (Va×Ia) of the voltage and current of the A-phase winding Wa during this rotation is the sum of the area 113 and the area 114 shown in FIG. 11. In this state, the energy supplied from the power supply side to the motor side is the magnetic energy Em of the area 113 and the magnetic co-energy Eco of the area 114, and the magnetic co-energy Eco is converted into the torque of the motor and output. On the other hand, since the A-phase current Ia drops from the value Iop to 0, the magnetic energy Em is regenerated from the motor side to the power supply side. These cycles are repeated and torque and power are output. How to regenerate this magnetic energy Em to the power source is one of the issues of the reluctance motor. An example of the regenerative operation will be described later with reference to FIG. 14.

The motor shown in FIG. 1 has magnetic characteristics as shown in FIG. 11. Therefore, in the region where the current is small with a light load, the active power corresponding to the magnetic energy Em and the active power corresponding to the magnetic co-energy Eco are substantially equal. Therefore, the power factor is about 50 [%]. As the load increases, the ratio of magnetic co-energy Eco increases, and the power factor becomes 80 [%] or more. From such characteristics, it can be seen that the reluctance motor of FIG. 1 utilizes the magnetic saturation characteristics to improve the power factor.

Equations (7), (8), and (14) to (19) are used to explain the outline of the motor output. These equations discuss the outline of the motor output in the region where the motor output is larger than the continuous rated output. The outline is described under the condition of electromagnetic simplification on the assumption that the magnetic energy Em of the operating point 112 in FIG. 11 is 0. The current, voltage, magnetic flux, and torque in a state where a certain large current Io is energized and rotated at a constant speed Vso are shown schematically.

On the other hand, in the description of FIGS. 11 to 13, the transient current, voltage, torque, and power of the reluctance motor will be described. Therefore, qualitative electromagnetic characteristics such as magnetic saturation characteristics, the magnetic energy Em, and the magnetic coenergy Eco of the soft magnetic material are shown. These transient and saturated conditions are somewhat inconsistent, but they are used properly to the extent that there is no problem. Since the reluctance motor operates in a magnetically non-linear region and generates a large torque, it is difficult to express and explain.

Figure 12:
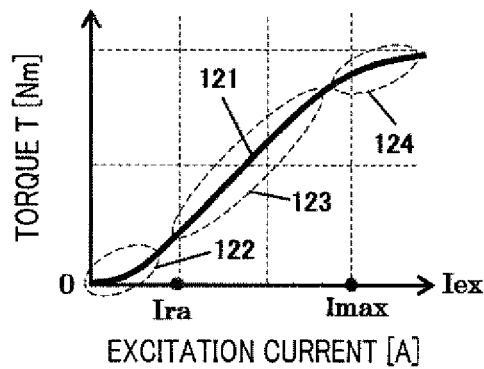
FIG. 12 is a graph exemplifying a relationship between the excitation current and torque.

Next, reference numeral 121 shown in FIG. 12 is an example of the torque characteristics of the reluctance motor shown in FIG. 1. The horizontal axis Iex indicates the exciting current, which is the same as in FIG. 11. The vertical axis shows the torque. It is assumed that at the rotor rotation angle position θr=20°, two-thirds of the rotor magnetic pole 1K approaches the A-phase stator magnetic pole 11 shown in FIG. 1. The region indicated by reference numeral 122 in FIG. 12 indicates a magnetically relatively linear region. In this region, the exciting current Iex, that is, in the region where the A-phase current Ia is small, the magnetic flux density at the tip of the A-phase stator magnetic pole 11 and the tip of the rotor magnetic pole 1K becomes a value of 1.5 [T] or less, and exhibits relatively linear torque characteristics. That is, the torque characteristic has a square shape. In FIG. 12, the region of reference numeral 123 is a region where the magnetic flux density at the tip of the A-phase stator magnetic pole 11 is magnetically saturated and usually shows a value of 1.7 to 2.0 [T]. Demonstrates a nearly linear torque characteristic. The region of reference numeral 124 shown in FIG. 12 is a region in which the magnetic resistance increases. In this region, not only the tip of the stator magnetic pole and the tip of the rotor magnetic pole, but also the magnetic flux density of the entire tooth or the back yoke becomes high.

Figure 13:
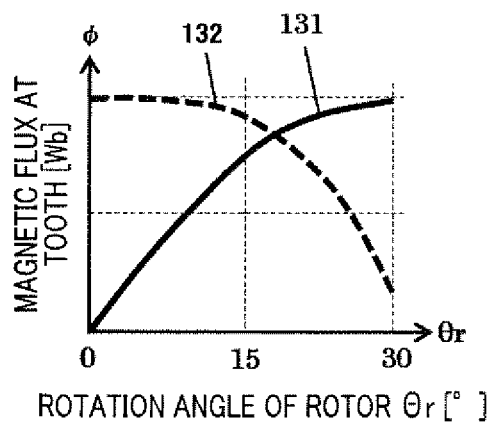
FIG. 13 is a graph exemplifying rotor rotation angles θr and magnetic fluxes at a tooth.
Figure 85:
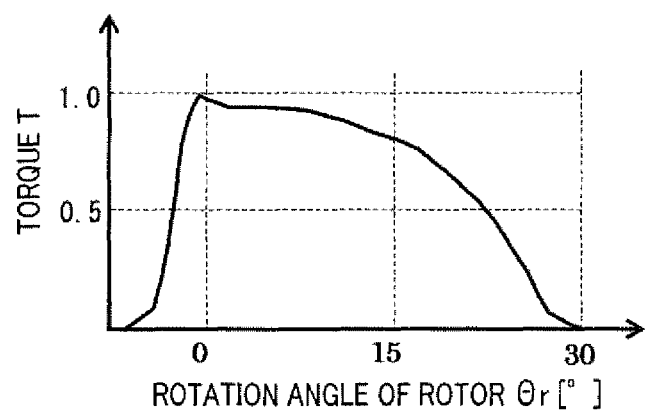
FIG. 85 is a graph exemplifying a torque characteristic of the conventional reluctance motor.

Next, reference numeral 131 shown in FIG. 13 indicates the relationship between the rotor rotation angle position θr and the magnitude φ [Wb] of the magnetic flux passing through the teeth of the stator. Up to the vicinity of the rotor rotation angle θr of 15°, the magnetic saturation of the corners of the salient poles of the stator and the corners of the salient poles of the rotor is involved. In the vicinity of the rotor rotation angle θr of 30°, the magnetic resistance of the entire magnetic path of the stator and rotor teeth and the back yoke is often involved. The simple model torque is shown by the curve of reference numeral 132 shown in FIG. 13. FIG. 85 shows an example of the torque generated by the stator magnetic pole of the conventional reluctance motor described with reference to FIG. 83. Here, as a result of the magnetic flux characteristics shown in FIG. 13, the torque decreases in the vicinity of 30° of the rotor rotation angle θr.

As described above, as shown in FIGS. 11, 12, and 13, the reluctance motor described in FIG. 1 is a motor that operates in a region where the magnetic flux density is magnetically saturated. The degree of saturation has a characteristic that depends on the current value of the exciting current Iex and the rotor rotation angle position θr, and is not simple. Therefore, although FIG. 14 shows an example of current and voltage waveforms, the degree of saturation changes depending on the driving conditions.

In order to avoid obscuring each mathematical expression due to these magnetic non-linearities, the present invention describes an inductance L of each winding as little as possible. As shown in FIGS. 11 and 12, the reluctance motor of the present invention utilizes magnetic non-linearity to realize power factor and efficient torque output and power output. Therefore, the inductance of each winding at the main operating point of the reluctance motor of the present invention changes greatly, and the advantage in expressing the inductance, which should be a proportional constant in the first place, is impaired. Therefore, as shown in Eq. (36), if mathematical expressions are expressed by factors such as the number of turns Nwa, the interlinkage magnetic flux φa, and the magnetic flux interlinkage number Ψ, voltage V, and current I, these are physical quantities, so they are expressed including magnetic non-linearity.

Figure 14:
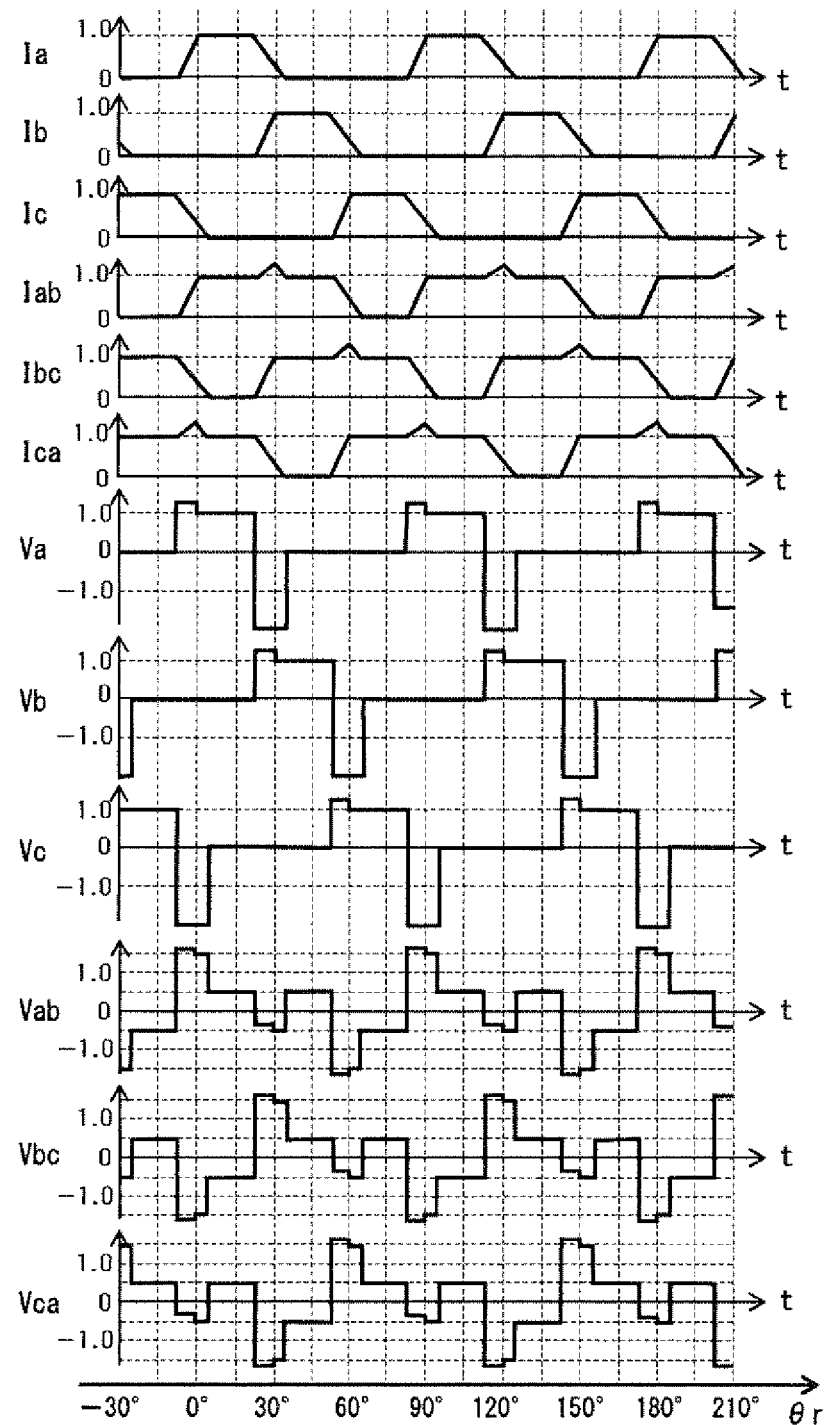
FIG. 14 is a graph exemplifying respective phase currents and respective phase voltages of a motor according to the present disclosure.

Next, in FIG. 14, an example of the waveform of the current and voltage of each phase is shown when the reluctance motor of FIG. 1 is rotationally driven in the CCW direction at the constant rotation speed Vso by generating a constant torque in the CCW direction using the drive circuit of FIG. 1. Reference numeral Ia in FIG. 14 is the A-phase current of the A-phase winding Wa assuming that the concentrated windings are wound around the stator poles 11 and 12 of the A-phase and A/ phase shown in FIG. 1 and connected in series with each other. Reference numeral Va is the A-phase voltage of the A-phase winding Wa. Similarly, the B-phase current Ib and the B-phase voltage Vb of the B-phase winding Wb and the C-phase current Ic and the C-phase voltage Vc of the C-phase winding We are shown. In FIG. 14, reference values of the current value and the voltage value are set to 1.0, respectively, and are shown as relative values. The voltage value is expressed by Eq. (12). The reference value 1.0 of the current value refers to a constant current Io [A] such as the equation (13).

In FIG. 14, as shown by the current waveform. The value of the A-phase current Ia is such that the rotor rotation angle position θr increases the current from −7.5° to 0°, and the constant current value is 1.0 when the angle position θr is from 0° to 25°, and the angular position θr decreases from 25° to 35° to 0. The period of the current is 90°, which corresponds to the pitch of the rotor magnetic poles. The B-phase current Ib is 30° behind the A-phase current Ia, and the C-phase current Ic is 60° behind the A-phase current Ia. FIG. 14 illustrates a case where the time when the A-phase current Ia increases and the time when the A-phase current Ia decreases differ by 2.5° in terms of the rotor rotation angle position.

As for the A-phase voltage Va shown in FIG. 14, the A-phase current Ia starts to increase at the position where the rotor rotation angle position θr is −7.5°. At this time, the A-phase stator magnetic pole 11 and the rotor magnetic pole 1K in FIG. 1 are not yet opposed to each other through the air gap, but are close to each other, so that a leakage flux is generated. Therefore, the A-phase voltage Va of the equation (9) begins to increase. In this state, the drive circuit of FIG. 6 starts to supply the magnetic energy Em of the motor and the magnetic co-energy Eco which is the power output of the motor to the motor side, and torque starts to be generated.

The A-phase voltage Va from 0° to 22.5° in the rotor rotation angle position θr becomes a constant voltage according to Eq. (10), and the drive circuit of FIG. 6 supplies the magnetic energy Em of the motor and the magnetic co-energy Eco which is the power output of the motor to the motor side. Then, the magnetic co-energy Eco is converted into a torque output. Of course, the input power related to the A-phase stator magnetic pole in FIG. 1 is the product (Ia×Va) of the A-phase current Ia and the A-phase voltage Va in FIG. 14.

While the rotor rotation angle position θr is from 22.5° to 30°, the A-phase current Ia decreases, and the magnetic energy Em accumulated between the rotor rotation angle position θr of −7.5° and 22.5° is regenerated to the DC voltage source 6R shown in FIG. 6. Therefore, the A-phase voltage Va becomes a large negative voltage. The regenerative power is represented by (Ia×Va). Even during this regenerative operation, a magnetomotive force proportional to the A-phase current Ia acts on the magnetic circuit of the motor. Therefore, a torque in the CCW direction corresponding to the A-phase current Ia is generated.

While the rotor rotation angle position θr is from 30° to 35°, the regenerative operation of the magnetic energy Em is continued until the A-phase current Ia further decreases to 0. During this period, the rotor magnetic pole 1K is a section away from the A-phase stator magnetic pole 11, and the rotor is rotating in the CCW direction, and torque in the CW direction is generated. That is, the torque is negative, and power is generated, and this generated power is also regenerated to the DC voltage source 6R shown in FIG. 6.

Further, the regenerative power between the rotor rotation angle position θr from 22.5° to 35° is related to the magnetic energy Em in FIG. 11, and therefore shows a large value. This regeneration method is one of the objects of the present invention. The regenerative power (Ia×Va) and the regenerative voltage at the time of regeneration greatly affect the voltage waveforms of the AB phase voltage Vab, the BC phase voltage Vbc, and the CA phase voltage Vca in FIG. 14.

As can be seen from this voltage waveform, the phase of the B-phase voltage Vb is 30° behind the A-phase voltage Va, and the phase of the C-phase voltage Vc is 60° behind the A-phase voltage Va.

Next, the AB phase current Iab flowing through the AB phase full pitch winding 1D actually wound around the reluctance motor shown in FIG. 1 is represented by Eq. (1), and in FIG. 14, the waveform of the AB phase current Iab is exhibited. The BC phase current Ibc flowing through the BC phase full pitch winding 1E is represented by the equation (2), and in FIG. 14, the waveform of the BC phase current Ibc is exhibited. Further, the CA phase current Ica flowing through the CA phase full pitch winding 1F is represented by the equation (3), and in FIG. 14, the waveform of the CA phase current Ica is exhibited.

The ratio of the energization time of each phase current Ia, Ib, and Ic is about ⅓. On the other hand, the ratio of the energization time of the AB phase current Iab, the BC phase current Ibc, and the CA phase current Ica is about ⅔, which is about twice. Further, the current waveform of the phase current in the case of the concentrated winding and the current waveform in the case of the full pitch winding are different from each other. The total current flowing through each slot is always the same in both equations. In that sense as well, the magnetic flux of each stator magnetic pole generated by both equations and the generated torque are the same.

The AB phase voltage Vab of the AB phase full pitch winding winding 1D shown in FIG. 1 has a value represented by the equation (27) based on its interlinkage magnetic flux. This voltage Vab is a complex voltage related to the phase voltages Va, Vb, and Vc of each phase, and has the voltage waveform of Vab shown in FIG. 14. Here, the AB phase voltage Vab and the AB phase current Iab provided by the AB phase winding Wab configured as a full pitch winding will be considered. In FIG. 14, when the rotor rotation angle position θr is between −7.5° and 0°, the AB phase current Iab increases from 0 to 1.0. However, in this range, the AB phase voltage Vab has a large voltage exceeding 1.0. In this range, the AB phase current Iab is particularly unlikely to increase in the entire range of the AB phase voltage Vab. In particular, it is a disadvantageous range for the regenerative voltage of the C-phase voltage Vc.

The above-mentioned phenomenon becomes a big problem when the reluctance motor provided with the full pitch winding shown in FIG. 1 is driven by using the conventional drive circuit shown in FIG. 5. When the AB phase current Iab is energized to the AB phase full pitch winding 1D, a large reverse voltage is generated in the AB phase full pitch winding 1D due to the influence of the C phase at the timing of increasing the current Iab. This interferes with current control. That is, in each phase, the mutual reverse voltage hinders the current control.

When the rotor rotation angle position θr is between 52.5° and 65°, the AB phase current Iab decreases from 1.0 to 0. In this range, the AB phase voltage Vab becomes a negative voltage exceeding −1.0. In this range, it is particularly difficult to reduce the AB phase current Iab among all ranges of the AB phase voltage Vab. This difficulty acts particularly disadvantageously on the regenerative voltage of the B-phase voltage Vb.

As described above, the current control of the AB phase winding Wave becomes a big problem. The reason is that the AB phase voltage Vab is interlinking the magnetic fluxes of each phase as shown in the equation (27). This problem is classified into a problem in which a large voltage is partially generated and a problem in which a voltage is generated that hinders an increase or decrease in current. In the case of the conventional drive circuit shown in FIG. 5, the voltage load on the DC voltage source 5B and the voltage load on each drive transistor become large. Moreover, when the voltage of the DC voltage source 5B is increased, the regenerative voltage of the C-phase voltage Vc and the regenerative voltage of the B-phase voltage Vb, which are problematic, also increase by the same amount. Therefore, it cannot be solved simply. Further, there is a problem that the AB phase voltage Fab becomes complicated and it becomes difficult to control the voltage and current of the phase.

The BC phase voltage Vbc of the BC phase full pitch winding 1E is expressed by Eq. (29). The phase of this voltage Vbc is delayed by 30° as compared with that of the AB phase voltage Vab. The CA phase voltage Vca of the CA phase full pitch winding 1F is represented by the equation (31), and the phase is delayed by 60° as compared with the AB phase voltage Vab.

Further, in the actual current control, PWM control is usually performed on each transistor to provide an arbitrary equivalent average voltage and current. Therefore, the above description is strictly different. Further, although the description is omitted in FIG. 6, in order to perform precise current control by PWM control, a current detecting means for detecting the current value of each phase and feedback control using the current detection signal are required. Further, it is necessary to detect the rotor rotation angle position θr by the encoder.

Further, the circumferential width of the stator magnetic pole and the rotor magnetic pole can be widened from 30° to 35° or 40° in FIG. 1. The degree of freedom in the time of the regenerative operation of the magnetic energy Em increases by the angle at which the width in the circumferential direction is widened. However, in that case, since the slot cross-sectional area decreases, the winding resistance increases by that amount and the copper loss increases.

Next, the utilization efficiency of the drive circuit shown in FIG. 6 will be described. A reluctance motor in which each full-knot winding in FIG. 1 is changed to two full-knot winding windings in parallel is shown in FIG. 2. The electromagnetic operation of this motor is equivalent to the winding structure of FIG. 1. When the reluctance motor shown in FIG. 2 is driven by the drive circuit shown in FIG. 6, there are some advantages. One of the advantages is that the drive circuit can be miniaturized.

It is assumed that the three full pitch winding windings shown in FIG. 1 are driven by the conventional drive circuit shown in FIG. 5. In this case, the A-phase stator magnetic pole 11 and the A/ phase stator magnetic pole 12 are driven. This drive is realized by energizing the AB-phase full pitch winding consisting of windings 17 and 18 and the CA-phase full pitch winding consisting of windings 1B and 1C. As described above, even when power can be supplied from the two paths, if there is no problem such as excessive voltage, the maximum output Pfmax of the conventional drive circuit shown in FIG. 5 may be expressed by the following equation.

$$Pf\max = Vdc \times Irat \times 2 \tag{37}$$

Here, Vdc is a power supply voltage and Irat is a current capacity of the transistor.

On the other hand, 831 shown in FIG. 83 is a phase A stator magnetic pole. In this case, the drive is applied to the concentrated winding windings 837 and 838 and the concentrated winding windings 83C and 83D in the A-phase current Ia. Under this condition, the maximum output Pcmax of the conventional drive circuit shown in FIG. 5 is expressed by the following equation because power is supplied from one of the three phases.

$$Pc\max = Vdc \times Irat \tag{38}$$

The maximum output Pfmax defined by the above equation (37) is twice the maximum output Pcmax of the equation (38). However, in the conventional drive circuit shown in FIG. 5, the winding voltage is represented by the equations (27), (29), and (31). That is, the change in voltage becomes complicated, and an excessive voltage is generated at the time of a heavy load of high-speed rotation. Therefore, the maximum output Pfmax of the equation (37) cannot be obtained.

Next, when the drive circuit of the present invention shown in FIG. 6 is used to drive the reluctance motor of the full pitch winding winding shown in FIG. 1, the utilization efficiency of the drive circuit will be described.

As described above, for driving using the drive circuit shown in FIG. 6, the full pitch winding windings of each phase of FIG. 1 are composed of two sets of windings in parallel. As can be seen from FIG. 6, the AB phase full pitch winding with coil end 1D is described as w1 and w4, the CA phase full pitch winding with coil end 1F is described as w2 and w5, the BC phase full pitch winding windings having the coil end portion 1E are described as w3 and w6. The winding 67 shown in FIG. 6 is w1, the winding 68 is w2, the winding 69 is w3, the winding 6A is w4, the winding 6B is w5, and the winding 6C is w6.

Now, it is assumed in FIG. 1 that a torque in the CCW direction is generated in a state where the rotor rotation angle position θr=10°. In this case, the A-phase stator magnetic pole 11 and the A/ phase stator magnetic pole 12 are excited. Therefore, as the AB phase currents Iab1 and Iab2 to be supplied to the AB phase full pitch windings w1 and w4, a current (Ia/2) converted to the A phase concentrated winding is set and energized. At the same time, the CA-phase currents Ica1 and Ica2 of the CA-phase full pitch windings w2 and w6 are also energized with currents (Ia/2) converted to A-phase concentrated windings.

In the circuit configuration shown in FIG. 6, the above-mentioned current (Ia/2) passes from the transistor 61 via the winding 67 (w1), the diode 6Q, the winding 6C (w6), and the transistor 66. At the same time, the current (Ia/2) passes from the transistor 63 via the winding 69 (w3), the diode 6M, the winding 6A (w4), and the transistor 64. After that, as the rotor rotates, the B-phase stator magnetic pole 13 and the B/ phase stator magnetic pole 14 and the C-phase stator magnetic pole 15 and the C/ phase stator magnetic pole 16 are excited. Along with this transition, the energizing current is sequentially switched.

The maximum output Pnmax of the electric power supplied by the drive circuit of the present invention shown in FIG. 6 in the above-mentioned energized state is expressed by the following equation because the electric power is supplied using two paths.

$$P n\max = V d c \times I r a t \times 2 \qquad (39)$$

The maximum output Pnmax of the formula (39) is twice the maximum output Pcmax of the formula (38) in which the reluctance motor of the conventional concentrated winding is driven by the conventional drive circuit shown in FIG. 5. In the circuit of FIG. 6, the number of transistors is six, which is the same as the number of transistors used in the circuit of FIG. 5, so it can be said that the drive circuit is downsized.

As described above, in the circuit of FIG. 6, the sum of the voltages of the two windings connected in series is represented by the equations (32), (33), and (34), and the voltage components represented by (22) are offset.

As described above, an example in which the entire reluctance motor winding shown in FIG. 2 is efficiently driven by the drive circuit shown in FIG. 6. According to this, the resistance value of the full pitch winding can be reduced to ½ as compared with the concentrated winding, so that the copper loss can be reduced. It is relatively estimated from the fact that two-thirds of all the windings shown in FIG. 2 are used when the A-phase stator magnetic pole 11 and the A/ phase stator magnetic pole 12 are excited by energizing the A-phase current component. In the case of concentrated winding, only ⅓ of the winding can be used.

Further, windings are arranged and connected as in the drive circuit shown in FIG. 6. Therefore, the problem of voltage complications, overvoltage, and voltage bias due to rotor rotation described using equations (20), (21), and (22), (27), (29), and (31) has been resolved. This is because the voltage-related winding arrangement based on the equations (32), (33), and (34) can be realized. Further, in the drive circuit shown in FIG. 6, since power can be always supplied through two paths, twice the power can be supplied with the same number of transistors. From this point as well, the drive circuit can be miniaturized.

One of the mainstream motors currently in use is a synchronous motor using a permanent magnet. A drive circuit for a three-phase AC, a sinusoidal voltage, or a sinusoidal current is often used as a drive circuit for this synchronous motor. In this drive circuit, as an example, voltage and current are controlled by PWM control using six transistors. Normally, it has a three-terminal winding with a star connection and can supply power for only one path. Therefore, the maximum output Psmax is the same as that of the equation (38) and is expressed by the following equation.

$$P s\max = V d c \times I r a t \qquad (40)$$

Therefore, the connection structure between the drive circuit according to the present invention and each winding of the full pitch reluctance motor shown in FIG. 6 can be reduced to half the size of the drive circuit of the current synchronous motor applied to a permanent magnet, and there is a possibility that the cost can be reduced.

On the other hand, in the drive circuit of a brushed DC motor, electric power is supplied in one path using four transistors. Therefore, the drive circuit of the present invention according to FIG. 6 may be smaller than the drive circuit of the brushed DC motor.

The reluctance motor that can be driven by the drive circuit shown in FIG. 6 has some conditions. The first condition is that, as shown in each figure, the rotor magnetic poles are attracted by exciting each stator magnetic pole with a direct current, and rotational torque is sequentially generated. The shape of each magnetic pole is not limited to the rectangular salient pole as shown in FIG. 2. In addition, the width in the circumferential direction can be changed to some extent according to the required motor characteristics.

The second condition is that the windings arranged in the slot can excite the stator magnetic poles on both sides of the winding in the circumferential direction. That is, the winding can be shared. This is based on the relationship of equations (1), (2) and (3). For example, it is shown as the full pitch winding motor shown in FIGS. 2 and 4. On the contrary, in the reluctance motor shown in FIG. 83, a dedicated concentrated winding is wound around each stator magnetic pole, and the winding cannot be shared. Therefore, it cannot be driven by the drive circuit shown in FIG. 6.

The third condition is that the two windings can be connected in series so that the voltage component shown in Eq. (22) can be offset.

On the other hand, the first condition when configuring the drive circuit shown in FIG. 6 is, as described above, to connect the two corresponding windings in series and to each other so that the voltage components of the equation (22) cancel each other out based on the relationship of equations (32), (33), and (34).

The second condition is that the two current paths can be energized at the same time because of the relationship represented by the equations (1), (2), and (3). Furthermore, all currents based on the relationships represented by the equations (1), (2), and (3) can be energized at the same time. The order of winding arrangement in the drive circuit illustrated in FIG. 6 corresponds to the arrangement order of the equations (1), (2), and (3). Further, in the drive circuit shown in FIG. 6, the order of the winding arrangement may be changed. For example, since windings of the same phase are equivalent even if they are arranged in reverse, the arrangement may be rewritten or converted on the drawing in the order of winding arrangement.

Further, in the drive circuit shown in FIG. 6, one end of the winding 6C is connected to a cathode of the diode 6Q, and an example is shown in which the path circulates in the entire drive circuit. As a result, each winding is efficiently driven. However, this structure is also variously deformable. For example, a transistor that supplies a current to one end of the winding 6C and a transistor that conducts the current of the diode 6Q may be added. With the addition, it is possible to change to a form without the above circulation. It is also possible to change the position of each transistor and the position of each winding. In such a modification, if the configuration of the drive circuit is within the scope of the gist of the present invention, the drive circuit is included in the present invention.

Second Embodiment

Next, another embodiment of the drive circuit according to the mode 1 is shown in FIG. Hereinafter, FIG. 7 will be described. In the case of the motor shown in FIG. 1, the number of full pitch windings is 3, which is small and odd. Further, a method of energizing two windings in series can be adopted. However, in this case, an asymmetrical portion is required, which causes a burden on the circuit. In order to eliminate this circuit load, in the example of FIG. 2, each phase winding is connected in parallel to form six windings, which are driven by the drive circuit shown in FIG. 6. In FIG. 6, the voltage and current of each phase are divided into two sets, and each phase is driven. Therefore, the number of transistors is six, and the number is large, but the above-mentioned circuit burden does not occur. Accordingly, the current value of each transistor is halved, and the total capacity of the currents of all the transistors is a small value, thus the inverter can be miniaturized from a simple logical point of view.

Figure 7:
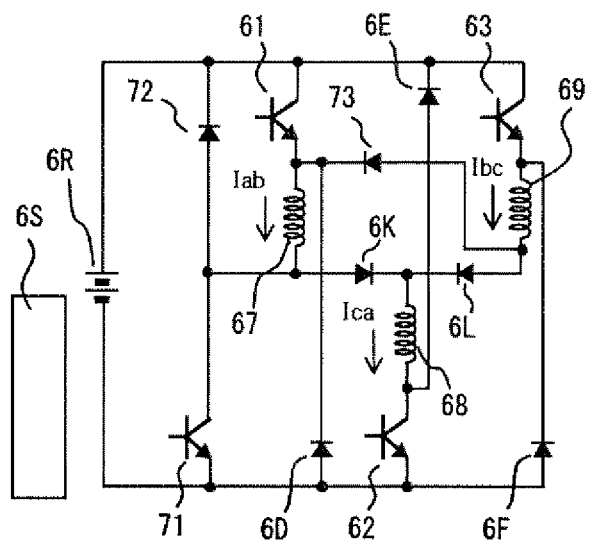
FIG. 7 is another diagram exemplifying the windings and a drive circuit according to the present disclosure.

FIG. 7 is a method of directly driving the three full pitch windings of FIG. 1. Compared to FIG. 1, the right half is deleted on the paper. Transistors 61, 62 and 63, windings 67, 68, and 69, and diodes 6D, 6E, 6F, 6K, and 6L around them have the same arrangement and configuration as those shown in FIG. 6. A transistor 71 and diodes 72 and 73 are newly added. These circuit elements are responsible for compensating for the asymmetry described above. In the drive circuit shown in FIG. 7, each winding shown in FIG. 1 does not form a parallel winding unlike the winding shown in FIG. 2, so that the current value of each part is doubled as compared with that of FIG. 6.

Next, the operation of the circuit in FIGS. 7 and 1 will now be described.

The AB phase current Iab is energized to an AB phase full pitch winding 67. The BC phase current Ibc is energized to a BC phase full pitch winding 69. The CA phase current Ica is energized to a CA phase full pitch winding 68. Each current is represented by the relationship of equations (1), (2), and (3). The A-phase current component Ia is controlled from the transistor 61 through the AB phase full pitch winding 67, the diode 6K, the CA phase full pitch winding 68, and the transistor 62. The C-phase current component Ic is controlled through the transistor 63, the BC-phase full pitch winding 69, the diode 6L, the CA-phase full pitch winding 68, and the transistor 62. The B-phase current component Ib is controlled through the transistor 63, the BC-phase full pitch winding 69, the diode 73, the AB-phase full pitch winding 67, and the transistor 71.

In the control of the B-phase current component Ib, when the energization of the current Ib overlaps with the energization of the currents Ia and Ic, interference of a voltage different from that in FIG. 6 occurs. Therefore, it is necessary to devise a control. The device is illustrated in FIG. 14 in terms of voltage waveform based on the equations (26) to (34). Since two of these three windings are controlled in series, the current control can be performed without being adversely affected by the excessive voltage caused by the change in the magnetic flux of the other phases as shown in the equations (32), (29), and (34).

This is compared with the case where a conventional motor shown in FIG. 83 is driven by the circuit shown in FIG. 5. According to this comparison, since the winding of the motor of FIG. 1 is a full pitch winding, the copper loss in the slot can be reduced by half. Further, since the number of transistors in FIG. 7 is 4, the total current capacity of all the transistors can be reduced to $4/6=2/3$. However, when a plurality of currents among the current components Ia, Ib, and Ic are energized at the same time, the mutual relationship between the voltage and the current becomes a little complicated, so that control consideration is required.

Third Embodiment

Figure 8:
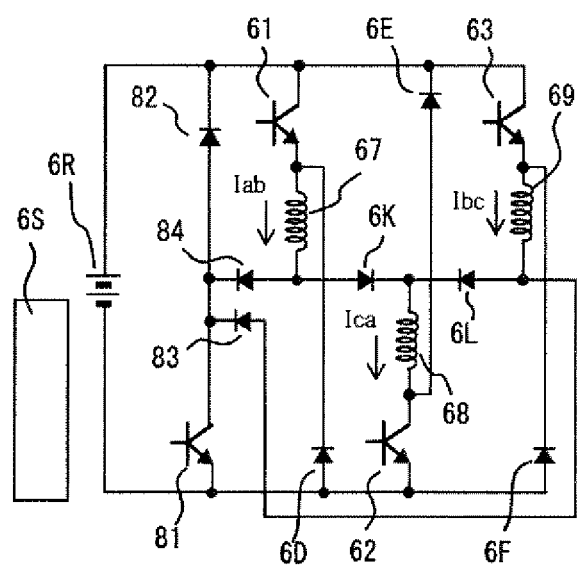
FIG. 8 is another diagram exemplifying the windings and a drive circuit according to the present disclosure.

Next, another embodiment of the drive circuit shown in the mode 1 is shown in FIG. 8. As can be seen from the figure, a transistor 81 and diodes 82, 83, 84 are added as compared with FIGS. 7 and 6 described above. In the drive circuit shown in FIG. 8, the B-phase current component Ib is energized through the transistor 61, the AB-phase full pitch winding 67, the diode 84, and the transistor 81. The other B-phase current component Ib is energized through the transistor 63, the BC-phase full pitch winding 69, the diode 83, and the transistor 81. That is, the B-phase current component Ib of the windings 67 and 69 is energized in parallel by the transistor 81. In this case, as shown in FIG. 14 as an example of the voltage, the excessive voltage caused by the change in the magnetic flux of the other phase is adversely affected. However, the transistor 81 can apply twice the voltage to both windings 67 and 69. Therefore, the voltage problem can be almost solved, and the voltage interference problem is small. However, since the transistor 81 is responsible for parallel energization of the B-phase current component Tb, it requires twice the current capacity of other transistors.

Further, as described above, the transistor 81 is responsible for energizing the B-phase current component Ib of the windings 67 and 69, but since the operating states of the windings 67 and 69 are not the same, the voltages of both windings are different from each other. In order to solve this problem, the transistor 81 can be divided into two transistors 811 and 812. The transistor 811 supplies the B-phase current component to one winding 67, and the transistor 812 supplies the B-phase current component to the other winding 69. In this case, one transistor is added, but the B-phase current components to the windings 67 and 69 can be driven separately. Thereby, the influence of the voltage and potential problems can be further reduced or eliminated.

The voltage of the AB phase full pitch winding 67 is represented by the equations (26) and (27). Therefore, based on these relational expressions, this voltage is affected by the magnetic fluxes of the A, B, and C phases, and at the same time, the current flowing through the winding 67 has an electromagnetic effect on the magnetic poles of the A, B, and C phases. However, by accurately supplying the B-phase current component Ib to both windings 67 and 69, the electromagnetic effects of the B-phase current component Ib on the A-phase magnetic pole and the C-phase magnetic pole cancel each other out. That is, at this time, the B-phase current component Ib of both windings 67 and 69 applies a magnetomotive force based on the B-phase current component Ib only to the B-phase stator magnetic pole and the B/ phase stator magnetic pole.

As another example, in FIG. 8, the transistors 69 and 81 are turned off, and the transistors 61 and 62 supply a current Ixx to the windings 67 and 69. In this case, based on the relationship according to the equations (4), (5), and (6), the current Ixx automatically becomes the A-phase current component, and the electromagnetic effects on the B-phase magnetic pole and the C-phase magnetic pole cancel each other out.

Fourth Embodiment

Figure 9:
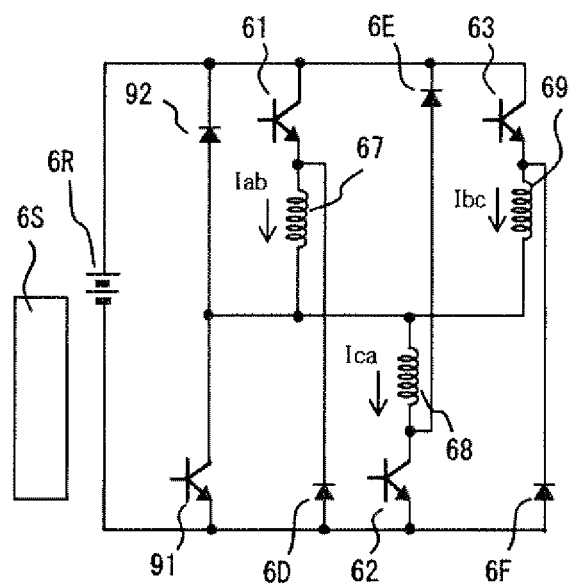
FIG. 9 is another diagram exemplifying the windings and a drive circuit according to the present disclosure.

Next, another embodiment of the drive circuit according to the mode 1 is shown in FIG. 9. As shown in FIG. 9, the diodes 6K and 6L between the windings have been removed and a transistor 91 and a diode 92 have been added, as compared to the configurations of FIG. 8 described above. The operation of the circuit shown in FIG. 9 is similar to the operation of the circuit shown in FIG. 8, but since the diode is absent, mutual influence of the voltage between the windings occurs. In the case of the circuit shown in FIG. 9, the winding 68 is a common series winding for the windings 67 and 69. Therefore, the relationship of the equations (33)

and (34) is maintained, and it is possible to control so that the mutual influence of the voltage between the windings is reduced.

On the other hand, in this embodiment, when the number of windings is 4 or more, the problem of mutual voltage interference increases when there is no diode between the windings. Therefore, the relationships shown in the equations (32), (33) and (34) cannot be maintained. Therefore, the effect of connecting the windings on both sides of the stator magnetic poles in series with each other to cancel and eliminate the influence of the voltage caused by the magnetic flux components of the other phases is diminished. In the drive circuit shown in FIG. 6, the number of windings is 6, and the mutual voltage interference is reduced by the diode between each winding. Even if the diode between each winding is removed, energization is possible, but when two or more currents are energized at the same time, the relationship based on the equations (26) to (34) cannot be maintained. Further, since the voltage borne by the drive circuit increases, the number of turns of each winding is reduced to lower the voltage, and the current must be increased. As a result, the inverter from which the diode between each winding is removed causes an increase in the total current capacity of each transistor, resulting in an increase in size and cost.

Fifth Embodiment

Next, another embodiment according to the mode 1 is shown in FIG. 15. The reluctance motor shown in FIG. 15 is a motor in which the configuration shown in FIG. 1 is paired with two poles. The stator of this motor includes twelve salient pole-shaped stator poles and windings. Each winding is a full pitch winding with an electric angle of 180° pitch, and is configured as a concentrated winding in which a one-phase winding is concentratedly wound in each slot. It has a total of 6 full pitch windings. The rotor of this motor has eight salient pole-shaped rotor poles. According to one example, the circumferential widths of the stator magnetic pole and the rotor magnetic pole are both 30° in electrical angle and 15° in mechanical angle. This winding configuration is similar to the configuration in FIG. 2 in which the full pitch winding windings of each slot are divided into two full pitch winding windings arranged in parallel. That is, the number of windings of each is (Nwa/2). For example, the energizing current of the two AB phase windings is (Iab/2). The same applies to the other windings, the two BC phase windings and the two CA phase windings. In this case, the voltage and current of each winding shown in FIG. 15 show substantially similar characteristics, although the drive frequency is different from that shown in FIG. 2.

Reference numerals 15A and 15D shown in FIG. 15 indicate A2 phase stator magnetic poles, and reference numerals 15A/ and 15D/ indicate A2/ phase stator magnetic poles. Further, reference numerals 15B and 15E indicate B2 phase stator magnetic poles, and reference numerals 15B/ and 15E/ indicate B2/ phase stator magnetic poles. Also, reference numerals 15C and 15F indicate C2 phase stator magnetic poles, and reference numerals 15C/ and 15F/ indicate C2/ phase stator magnetic poles.

Moreover, reference numeral 151 indicates an AB 2-phase winding, which corresponds to the winding 67 shown in the drive circuit shown in FIG. 6. The current Iab1 is supplied to this winding. Reference numeral 154 indicates an AB 2-phase winding, which corresponds to the winding 6A of the drive circuit shown in FIG. 6. The current Iab2 is supplied to this winding.

Similarly, reference numeral 152 indicates a BC 2-phase winding, which corresponds to the winding 6C of the drive circuit shown in FIG. 6, and the current Ibc2 is supplied to this winding. Reference numeral 155 indicates a BC 2-phase winding, which corresponds to the winding 69 of the drive circuit shown in FIG. 6. The current Ibc1 is supplied to this winding. Reference numeral 153 indicates a CA 2-phase winding, which corresponds to the winding 6B of the drive circuit shown in FIG. 6. The current Ica2 is supplied to this winding. Reference numeral 156 indicates a CA 2-phase winding, which corresponds to the winding 68 of the drive circuit shown in FIG. 6. The current Ica1 is supplied to this winding.

The currents Iab1 and Iab2 are currents that flow to different circuit units, but have the same phase and amplitude. Therefore, in the circuit shown in FIG. 6, the positions of windings 151 and 154 shown in FIG. 15 can be interchanged with each other.

Similarly, in the circuit of FIG. 6, windings 152 and 155 shown in FIG. 15 can be interchanged with each other, and windings 153 and 156 can be interchanged with each other. In particular, in the configuration of FIG. 15, the bias of the coil end portion of each winding and the degree of overlap between the coil ends are balanced. Therefore, the winding arrangement which is excellent in the manufacturability of the winding is illustrated. For example, the windings 152, 154, and 156 can be wound first, and then the windings 151, 153, and 155 can be wound in the shortest time.

A reluctance motor of FIG. 15 having a two-pole pair of full pitch winding windings has 12 slots and windings. The winding has two windings having the same phase, and two windings carrying currents in completely opposite directions. Therefore, there is a degree of freedom in selecting two slots at the winding connection destination of the coil end portion. That is, for a motor having a certain electromagnetic action, the connection relationship of windings cannot be unconditionally limited. Therefore, the correspondence between each winding shown in FIG. 15 and each winding shown in FIG. 6 can be variously modified. Furthermore, it can be transformed into a wave winding, and various combinations are possible.

Further, the reluctance motor shown in FIG. 15 employs a full pitch winding from the viewpoint of rational production, but in a sense, it is a limitation of winding connection. That is, each winding must be connected to either of the two slot windings having a phase difference of 180° in electrical angle. From this point of view, the arrangement order of each winding shown in FIG. 15 and each winding shown in FIG. 6 on the drawing, and the temporal energization order at the time of rotation in the CCW direction may be different from those of the configuration shown in FIG. 2. In the embodiment of FIG. 16 described later, a toroidal annular winding is illustrated. In this case, there is no winding connection between the slots at the coil end portion, and there are no restrictions on the winding connection described above.

As described above, the windings can be arranged, and each phase current can be energized as the rotor rotates to generate torque to drive the rotor to rotate. Effects obtained from the method, features, etc. of driving the reluctance motor shown in FIG. 15 by the drive circuit described with reference to FIG. 6 are the same as the effects obtained when the reluctance motor shown in FIG. 2 is driven by the drive circuit shown in FIG. 6. That is, the resistance value of the full pitch winding can be reduced to ½ as compared with the concentrated winding shown in FIG. 83. Further, since power can always be supplied through two paths, twice the power can be supplied with the same number of transistors, and therefore the drive circuit can be miniaturized. In this case, the problems of voltage complication, excessive voltage, and voltage bias due to rotation of the rotor can be improved or solved from the relationships shown in the equations (32), (33), and (34).

The reluctance motor shown in FIG. 15 is a motor obtained by pairing the structure of FIG. 1 into two poles. Therefore, there are a total of six full pitch winding windings for each phase, two for each phase, and can be conveniently driven by the drive circuit shown in FIG. 6. Therefore, in the case of the structure shown in FIG. 2, the structure in which all the knot windings of each slot are divided into two and arranged in parallel is illustrated, but in the case of the structure of FIG. 15, there is no need for such a parallel arrangement, and therefore the full pitch winding can be made relatively simple.

However, since the interlinkage magnetic flux of each winding is affected by factors such as the shape error of each part of the motor, an error occurs in the interlinkage magnetic flux and the generated voltage of each phase. If you want to handle the interlinkage magnetic flux and voltage more strictly, you can also use parallel windings as in the motor shown in FIG. 2. That is, in the case of the motor shown in FIG. 15, for example, a AB 3-phase winding is carried by two windings 151 and 154. Therefore, each of these two windings is composed of parallel windings, and two windings are connected in series to form two sets of the AB 3-phase winding, and these 3-phase windings are arranged as AB-phase windings 67 (w1) and windings 6A (w4) shown in FIG. 6. The interlinkage magnetic fluxes of the two sets of AB 3-phase windings are equal to each other. A BC 3-phase winding and a CA 3-phase winding have the same configuration. Further, it is possible to provide a motor in which the configuration of FIG. 1 is paired with four poles. In this case, two in-phase full pitch windings are connected in series and can be driven by the drive circuit shown in FIG. 6. Alternatively, the drive circuit shown in FIG. 6 can be doubled and 12 full pitch windings can be driven by 12 transistors. Such modifications are also included in the concept of the present invention.

Sixth Embodiment

Next, another embodiment according to the mode 1 is shown in FIG. 16 In this embodiment, except for the winding, the structure of each stator magnetic pole and each rotor magnetic pole is the same as the magnetic pole structure shown in FIG. 1. A structure is provided in which the windings for each slot are individually wound. Reference numeral 16J indicates an A3 phase stator magnetic pole, reference numeral 16K indicates an A3/ phase stator magnetic pole, reference numeral 16L indicates a B3 phase stator magnetic pole, reference numeral 16M indicates a B3/ phase stator magnetic pole, reference numeral 16N indicates a C3 phase stator magnetic pole, and reference numeral 16P indicates a C3/ phase stator magnetic poles.

In the structure shown in FIG. 16, a winding 167 in the slot is the same as the winding 17 in the slot of the AB phase winding shown in FIG. 1, and shows the AB 3-phase winding. However, this winding does not adopt a full pitch winding. This winding is wound from the slot through a coil end portion 164 to a winding 162 on the outside of the back yoke. Reference numeral 161 exemplifies the cross-sectional shape of the winding 167, and reference numeral 163 exemplifies the cross-sectional shape of the winding 162. This form of winding is also referred to as an annular winding or a toroidal winding. In FIG. 16, reference numeral 168 is also the AB 3-phase winding, and is similarly wound around a winding 16F outside the back yoke through a coil end portion 16H. This 3-phase winding is also a toroidal annular winding. The direction of the winding of the winding 168 is opposite to that of the winding 167. Reference numeral 16E exemplifies the cross-sectional shape of the winding 168, and reference numeral 16G exemplifies the cross-sectional shape of the winding 16F. Similarly, reference numerals 169 and 16A are windings constituting the BC 3-phase winding, and reference numerals 16N and 16P are windings constituting the CA 3-phase winding.

An interlinkage magnetic flux of the windings 167 and 168 (that is, the annular windings) is half the interlinkage magnetic flux of the full pitch winding. Therefore, in order to make the winding voltages of both motors uniform, the number of windings of the annular winding is set to Nwa, which is twice that of FIG. 1. This also means that the magnetic flux chain crossing number F, which is the product of the magnetic flux and the number of turns, is made equal to those values in FIG. 1. Also, in order to make the torques generated by both motors shown in FIGS. 16 and 1 the same value, it is necessary to make the product [A×turn number] of the current energized in each slot and the number of turns to be the same value. Therefore, Iab/2=(Ia+Ib)/2 is supplied to the AB 3-phase windings 167 and 168 of FIG. 16 as AB 3-phase currents, respectively.

Similarly, in FIG. 16, reference numerals 169 and 16A are BC 3-phase windings, which are wound to the outside of the back yoke in the same manner as the AB 3-phase windings 167 and 168 of FIG. 16. Ibc/2=(Ib+Ic)/2 is supplied to these BC 3-phase windings 169 and 16A a BC 3-phase current, respectively. In FIG. 16, reference numerals 16B and 16C are the CA 3-phase windings, and Ica/2=(Ic+Ia)/2 is energized as a CA 3-phase current, respectively. When such each phase current is energized, each phase current is generated inside the motor shown in FIG. 16. As a result, the acting magnetomotive force becomes the same as the magnetomotive force due to each phase current of FIGS. 1 and 2.

The voltages of the AB 3-phase windings 167, 168, the CA 3-phase windings 16B and 16C shown in FIG. 16 are described using the windings 43, 45, 46, 48 shown in FIG. 4 and the magnetic fluxes φ1, φ2, φ3, and φ4, respectively. As shown in FIG. 16, voltage of the winding 167 is Vw11, voltage of 168 is Vw12, voltage of 16B is Vw21, and voltage of 16C is Vw22. From the relationship of position and direction with each magnetic flux in FIG. 4, their voltages can be written as follows.

$$Vw11 = Nwa \times d(\varphi1 + \varphi3)/dt \tag{41}$$

$$Vw12 = Nwa \times d(\varphi2 + \varphi4)/dt \tag{42}$$

$$Vw21 = Nwa \times d(\varphi1 - \varphi4)/dt \tag{43}$$

$$Vw22 = Nwa \times d(\varphi2 - \varphi3)/dt \tag{44}$$

Each of these voltages is different from the voltage obtained from Eqs. (20), (21), and (22). The reason is that it contains the magnetic flux φ3 or φ4 of another phase that crosses the drawing shown in FIG. 4. As a result, as in the equations (20) and (21), a complicated voltage is obtained, and an excessive voltage is generated.

When the windings 167 and 16C are connected in series, the voltage is as follows.

$$Vw11 + Vw22 = Nwa \times d(\varphi1 + \varphi2)/dt \tag{45}$$

When the windings 16B and 168 are connected in series, the voltage has the following equation.

$$Vw21 + Vw12 = Nwa \times d(\varphi1 + \varphi2)/dt \quad (46)$$

In the equations (45) and (46), it can be represented only by the magnetic fluxes φ1 and φ2 passing through the stator magnetic poles of the AX phase and the AX/ phase shown in FIG. 4. Since the magnetic fluxes φ3 and φ4 of the other phases can be excluded, the voltage can be expressed simply. Excessive voltage does not occur. The magnetic flux (φ1+φ2) corresponds to an A3 phase magnetic flux φa3 passing through an A 3-phase stator magnetic pole 16J in FIG. 16.

When the relationship between these windings, interlinkage magnetic flux, and voltage is applied to each winding shown in FIG. 16, the relationship of the following equation is obtained.

$$Vabt1 + Vcat2 = Nwa \times d(\varphi a3)/dt = Va3 \quad (47)$$

$$Vabt2 + Vcat1 = Nwa \times d(\varphi a3)/dt = Va3 \quad (48)$$

$$Vbct1 + Vabt2 = Nwa \times d(\varphi b3)/dt = Vb3 \quad (49)$$

$$Vbct2 + Vabt1 = Nwa \times d(\varphi b3)/dt = Vb3 \quad (50)$$

$$Vcat1 + Vbct2 = Nwa \times d(\varphi c3)/dt = Vc3 \quad (51)$$

$$Vcat2 + Vbct1 = Nwa \times d(\varphi c3)/dt = Vc3 \quad (52)$$

Here, voltage of the winding 167 is indicated by Vapt1, voltage of the winding 168 is indicated by Vbt2, voltage of the winding 169 is indicated by Vbct1, voltage of the winding 16A is indicated by Vbct2, voltage of the winding 16B is indicated by Vcat1, and voltage of the winding 16C is indicated by Vcat2. The voltage assuming that the concentrated winding of the number of windings Nwa is wound around the A 3-phase stator magnetic pole 16J is indicated by A3 phase voltage Va3. Assuming the same, B 3-phase voltage of a B 3-phase stator magnetic pole 16L is indicated by Vb3, and C 3-phase voltage of a C 3-phase stator magnetic pole 16N is indicated by Vc3.

When the windings 167 and 16C are connected in series with each other, the total magnetic flux interlinking both the windings corresponds to the A-phase magnetic flux φa, which is the interlinking magnetic flux of the winding 837 (concentrated winding) shown in FIG. 83. Similarly, when the windings 16B and 168 are connected in series with each other, the total magnetic flux interlinking the windings also corresponds to the A-phase magnetic flux φa of the concentrated winding 83C shown in FIG. 83.

The windings in FIGS. 16 and 83 are functionally different in the following respects. In FIG. 16, each annular winding can excite the stator magnetic poles on both sides in the circumferential direction and can be shared. On the other hand, the windings 837 and 838 shown in FIG. 83 are dedicated windings for exciting the A-phase stator magnetic pole 831. Further, the winding resistance in the slot of each annular winding shown in FIG. 16 is reduced to ½ of the winding resistance in the slot of each winding of FIG. 83.

Next, the correspondence between each winding shown in FIG. 16 and each winding of the drive circuit shown in FIG. 6 and each current to be energized will be described.

The AB 3-phase winding 167 of FIG. 16 is connected as the winding 67 in the figure, and Iab1=Iab/2, which is the AB 3-phase current, is energized. In the vicinity of the AB 3-phase winding 167, the winding number w1 and the current name Iab1 having a symbol common to other motors are added in parentheses.

Similarly, the AB 3-phase winding 168 is connected as the winding 6A in FIG. 6, and Iab2=Iab/2, which is the AB 3-phase current, is energized. In the vicinity of the AB 3-phase winding 168, the winding number w4 and the current name Iab2 are added in parentheses. The BC 3-phase winding 169 is connected as the winding 69 in FIG. 6, and Ibc1=Ibc/2, which is the BC 3-phase current, is energized. In the vicinity of the BC 3-phase winding 169, the winding number w3 and the current name Ibc1 are added in parentheses. The BC 3-phase winding 16A is connected as the winding 6C in FIG. 6, and Ibc2=Ibc/2, which is the BC3-phase current, is energized. In the vicinity of the BC 3-phase winding 16A, the winding number w6 and the current name Ibc2 are added in parentheses. The CA 3-phase winding 16B is connected as the winding 6B in FIG. 6, and Ica2=Ica/2, which is the CA 3-phase current, is energized. In the vicinity of the BC 3-phase winding 16B, the winding number w5 and the current name Ica2 are added in parentheses. The CA 3-phase winding 16C is connected as the winding 68 in FIG. 6, and Ica1=Ica/2, which is the CA 3-phase current, is energized. In the vicinity of the CA 3 phase winding 16C, the winding number w2 and the current name Ica1 are added in parentheses. The currents Iab, Ibc, and Ica are represented by the equations (1), (2), and (3).

Next, the voltage of each winding shown in FIG. 16 will be described as the voltage of each winding generated in the drive circuit described with reference to FIG. 6. In FIG. 6, the voltage across the circuit of the winding 67, the diode 6K, and the winding 68 corresponds to the voltage of the circuit in which the winding 167 and the winding 16C are connected in series with each other in FIG. 16. This voltage is expressed by Eq. (47). The voltage components caused by the magnetic fluxes of the other phases interlinking each of the two windings are offset, and the resulting voltage is the A 3-phase voltage Va3. That is, the voltage components caused by the magnetic flux φ3 of the equations (41) and (44) are offset. Since the voltage drop of the diode 6K is small, it is ignored.

Similarly, in FIG. 6, the voltage across the circuit of the winding 69, the diode 6L, and the winding 68 corresponds to the voltage of the circuit in which the winding 169 and the winding 16C are connected in series with each other in FIG. 16. This voltage is represented by Eq. (52). The voltage components caused by the magnetic fluxes of the other phases are offset. The resulting voltage is the C 3-phase voltage Vc3.

Similarly, in FIG. 6, the voltage across the circuit of winding 69, diode 6M, and winding 6A corresponds to the voltage of the circuit in which winding 169 and winding 168 are connected in series with each other in FIG. 16. This voltage is expressed by Eq. (49). The voltage components caused by the magnetic fluxes of the other phases are offset. The resulting voltage is the B 3-phase voltage Vb3.

Similarly, in FIG. 6, the voltage across the circuit of winding 6B, diode 6N, and winding 6A corresponds to the voltage of the circuit in which winding 16B and winding 168 are connected in series with each other in FIG. 16. This voltage is expressed by Eq. (48). The voltage components caused by the magnetic fluxes of the other phases are offset. The resulting voltage is the A 3-phase voltage Va3.

Similarly, in FIG. 6, the voltage across the circuit of the winding 6B, the diode 6P, and the winding 6C corresponds to the voltage of the circuit in which the winding 16B and the winding 16A are connected in series with each other in FIG. 16. This voltage is expressed by Eq. (51). The voltage components caused by the magnetic fluxes of the other phases are offset. The resulting voltage is the C 3-phase voltage Vc3.

Similarly, in FIG. 6, the voltage across the circuit of winding 67, diode 6Q, and winding 6C corresponds to the voltage of the circuit in which winding 167 and winding 16A are directly connected to each other in FIG. 16. This voltage is expressed by Eq. (50). The voltage components caused by the magnetic fluxes of the other phases are offset. The resulting voltage is the B 3-phase voltage Vb3.

As shown above, the voltage between each transistor provided in the drive circuit of FIG. 6 provides a circuit configuration and winding arrangement in which each of the two windings is connected in series and the voltage components due to the magnetic fluxes of the other phases interlinking both windings are offset. As a result, the drive circuit of FIG. 6 is driven by a relatively simple voltage as represented by the equations (47) to (52). Therefore, an excessive voltage is not generated, the current controllability is good, and the drive can be performed efficiently.

Next, the operation for continuously rotating the reluctance motor shown in FIG. 16 in the CCW direction by the drive circuit of FIG. 6 will be described. When the rotor rotation angle position θr is 0°, the rotor magnetic pole approaches the A 3-phase stator magnetic pole 16J and begins to face each other. At this time, the current energizing the winding shown in FIG. 6 is, as described above, the AB 3-phase current is Iab=Iab2=Iab/2, the BC 3-phase current is Ibc1=Ibc2+Ibc/2, and the CA 3-phase current is Ica1=Ica2=Ica/2. The currents Iab, Ibc, and Ica are represented by the equations (1), (2), and (3), respectively.

While the rotor rotation angle position θr is from 0° to 30°, the areas facing each other between the A 3-phase stator magnetic pole 16J and the rotor magnetic pole increase. During this increase, the AB 3-phase current Iab1 is energized to the winding 67 of FIG. 6, and the CA 3-phase current Ica1 is energized to the winding 68. The specific current waveform is exemplified by the A-phase current Ia shown in FIG. 84. Based on the equations (1) and (3), excitation is executed by the A 3-phase current component Ia/2, and torque in the CCW direction is generated. In parallel with this, the A3/ phase stator magnetic pole 16K also operates in the same manner. The AB 3-phase current Iab2 is energized to the winding 6B of FIG. 6, and the CA 3-phase current Ica2 is energized to the winding 6A. The current value is the same as the A3-phase current component Ia/2 based on the equations (1) and (3), and the A3/ phase stator magnetic pole 16K is excited to generate torque in the CCW direction.

While the rotor rotation angle position θr is from 30° to 60°, the areas facing each other between the B 3-phase stator magnetic pole 16L and the rotor magnetic pole increase. During this increase, Ibc1 is energized to the winding 69 of FIG. 6 and Iab2 is energized to the winding 6A. The specific current waveform is exemplified as a current waveform whose phase is delayed by 30° from the A-phase current Ia in FIG. 84. Based on the equations (1) and (2), excitation is executed by the B 3-phase current component Ib/2, and torque in the CCW direction is generated. In parallel with this, the B3/ phase stator magnetic pole 16M also operates in the same manner. Iab1 is energized to the winding 67 of FIG. 6, and Ibc2 is energized to the winding 6C. The current value is the B 3-phase current component Ib/2 based on the equations (1) and (2), and the B3/ phase stator magnetic pole 16M is excited to generate torque in the CCW direction.

While the rotor rotation angle position θr is from 60° to 90°, the areas facing each other between the C 3-phase stator magnetic pole 16N and the rotor magnetic pole increase. During this increase, the winding 6B of FIG. 6 is energized with Ica2 and the winding 6C is energized with Ibc2. An example of the specific current waveform is a current waveform whose phase is delayed by 60° from the A-phase current Ia in FIG. 84. Based on the equations (2) and (3), excitation is executed with the C 3-phase current component Ic/2, and torque in the CCW direction is generated. In parallel with this, the C3/ phase stator magnetic pole 16P also operates in the same manner. Ibc1 is energized to the winding 69 of FIG. 6, and Ica1 is energized to the winding 68. The current value is the C 3-phase current component Ic/2 based on the equations (2) and (3), and the C3/ phase stator magnetic pole 16P is excited to generate torque in the CCW direction. In this way, when the rotor rotates in the CCW direction, the A-phase, the B-phase, and the C-phase operate alternately and in order. Therefore, the torque is continuously generated in the CCW direction, so that the motor can rotate.

The above-mentioned current value is a model example. In practice, drive conditions based on energized voltage and current, consideration of magnetic non-linearity, reduction of vibration noise, reduction of torque ripple, and the like may be considered. In that case, the current value may be corrected by those factors. Further, in FIG. 6, since there is a degree of freedom in the energizing current, it is possible to set some current values to current values deviating from the equations (1), (2), and (3). Further, as will be described later, it is also possible to apply an electric current to all the paths of FIG. 6.

As described above, an example in which the annular winding winding of the reluctance motor shown in FIG. 16 is efficiently driven by the drive circuit of FIG. 6 has been shown. In this case, the resistance value in the slot of the annular winding of FIG. 16 can be reduced to ½ as compared with the concentrated winding. Therefore, copper loss can be reduced. However, since the winding is required on the outside of the back yoke as in the winding 162 shown in FIG. 16, there is also a problem that the copper loss increases. In this respect, in principle, the above advantages are offset. However, as in the motor shown in FIG. 17 described later, such an outer winding can be effectively utilized by devising the structure of the entire motor or by combining the motor as shown in FIG. 18. Therefore, there is a possibility of miniaturization, weight reduction, and cost reduction of the motor.

Further, the drive circuit shown in FIG. 6 solves the problem of voltage complication, the problem of excessive voltage, and the problem of voltage bias due to the rotation of the rotor shown by the equation (41), (42), (43), and (44) by adopting the winding arrangement according to the voltage relationship shown by the equation (47) to (52). Further, by cooperating with the drive circuit of FIG. 6 and the configuration of such a winding arrangement, electric power can be supplied efficiently in terms of voltage without waste and in terms of current through two paths. Therefore, even if the number of transistors is the same, it is possible to supply twice as much power as the conventional one. Accordingly, it is possible to reduce the size, weight, and cost of the drive circuit.

Seventh Embodiment

Next, a method of driving the annular winding shown in FIG. 16 based on a voltage and current relationship similar to the method shown in FIG. 2 will be described. In this case, the annular winding of FIG. 6 is divided into two parallel windings, and the two windings separated by an electric angle of 180° are formed so as to be connected in series. In the case of the annular winding shown in FIG. 16, since the windings of each slot are independent, the degree of freedom of connection between the windings is high. That is, there are no restrictions on the winding connection between each slot, which is seen in all range windings.

Specifically, the AB 3-phase winding 167 shown in FIG. 16 is divided into two sets of windings Wabt1 and Wabt2. The AB 3-phase winding 168 is divided into two sets of windings Wabt3 and Wabt4. Similarly, the BC 3-phase winding 169 is divided into two sets of windings Wbct1 and Wbct2. The BC 3-phase winding 16A is divided into two sets of windings Wbct3 and Wbct4. Similarly, the CA 3-phase winding 16B is also divided into two sets of windings Wcat1 and Wcat2. The CA 3-phase winding 16C is divided into two sets of windings Wcat3 and Wcat4.

Further, the windings Wabt1 and Wabt3 of the AB 3-phase winding are connected in series with each other to form a winding Wab31. The windings Wabt2 and Wabt4 are connected in series with each other to form a winding Wab32. These windings Wab31 and Wab32 correspond to the windings 21 and 22 shown in FIG. 2, as shown in equations (53) and (54) described later. Therefore, the electromagnetic characteristics are equivalent. The story goes back and forth, but in order to achieve equivalence, it is necessary to change the number of windings. The number of windings of each annular winding shown in FIG. 16 was Nwa in the third embodiment, but in the fourth embodiment, the number of windings of Wabt2 and Wabt4 is set to Nwa/2. This is because the two windings are connected in series. The currents energizing the windings Wab31 and Wab32 are the same as those of the windings 21 and 22 shown in FIG. 2, and are set to Iab/2.

The same applies to the BC 3-phase winding. The windings Wbct1 and Wbct3 are connected in series with each other to form a winding Wbc31. In addition, the windings Wbct2 and Wbct4 are connected in series with each other to form a winding Wbc32. Similarly, in the CA 3-phase winding, the windings Wcat1 and Wcat3 are connected in series with each other to form a winding Wca31, and the windings Wcat2 and Wcat4 are connected in series with each other to form a winding Wca32.

The voltage characteristics of the windings Wab31, Wab32, Wbc31, Wbc32, Wca31, and Wca32 formed from each winding shown in FIG. 16 are evaluated and confirmed. Therefore, the interlinkage magnetic flux and voltage of the winding will be considered using the motor model of FIG. 4. Now assume that the windings 43, 45, 46, and 48 in FIG. 4 are the annular windings shown by reference numerals 167, 168, 16B, 16C in FIG. 16. When the voltage of the winding Wab31 is Vab31 and the voltage of the winding Wca31 is Vca31, the following equations can be obtained by using the amount of each magnetic flux $\varphi1$, $\varphi2$, $\varphi3$, and $\varphi4$ and the equations (20), (21), (22) and (41) to (44).

$$Vab31 = \tag{53}$$
$$Vw11/2 + Vw12/2 = Nwx/2 \times d(\varphi1 + \varphi2 + \varphi3 + \varphi4)/dt = Vw1$$
$$Vca31 = \tag{54}$$
$$Vw21/2 + Vw22/2 = Nwx/2 \times d(\varphi1 + \varphi2 - \varphi3 - \varphi4)/dt = Vw2$$
$$Vhs = Nwx/2 \times d(\varphi3 + \varphi4)/dt \tag{55}$$

The values based on the equations (53), (54) and (55) are the same as the values based on the equations (20), (21) and (22) assuming the reluctance motor shown in FIG. 1, respectively. In FIG. 2, each winding shown in FIG. 1 is divided into two windings to form a parallel winding, but the number of windings of each winding is the same. Therefore, in both FIGS. 2 and 1, the interlinkage magnetic flux and the voltage of each winding are the same. Therefore, the windings Wab31, Wab32, Wbc31, Wbc32, Wca31, and Wca32 obtained by modifying each winding shown in FIG. 16 are equivalent to the windings 21, 24, 23, 26, 25, and 22 shown in FIG. 2, respectively. Therefore, the voltage and current can be controlled by the drive circuit shown in FIG. 6 as if these windings are full pitch windings shown in FIG. 2. For example, magnetic flux components $\varphi3$ and $\varphi4$ appearing in the equations (53) and (54) are magnetic fluxes of other phases. This magnetic flux element generates an excessive voltage. However, in the present embodiment, the winding Wab31 and the winding Wca31 are connected and arranged in series with each other in the drive circuit shown in FIG. 6. Therefore, the magnetic flux components $\varphi3$ and $\varphi4$, which cause an excessive voltage, cancel each other out, and the influence thereof can be eliminated.

For example, the winding Wab31 does not assume that the interlinkage magnetic flux with the winding 167 and the interlinking magnetic flux with the winding 168 shown in FIG. 16 are the same. Therefore, both magnetic fluxes are interlinking. Accordingly, the method described in Example 4 has the following advantages over the method described in Example 3. Specifically, it is possible to offset the manufacturing shape error of each magnetic pole, the voltage error caused by the shape error of the air gap, and the like, and the characteristics are more stable.

In this embodiment 4, an example of deforming each winding shown in FIG. 16 is described. In the case of this example as well, various electromagnetically equivalent deformations are possible. For example, the windings of the same phase can be exchanged on the circuit shown in FIG. 6. It is also possible to mix the configuration described in the third embodiment and the configuration described in the fourth embodiment. These modified configurations are also included in the gist of the present invention.

Figure 19:
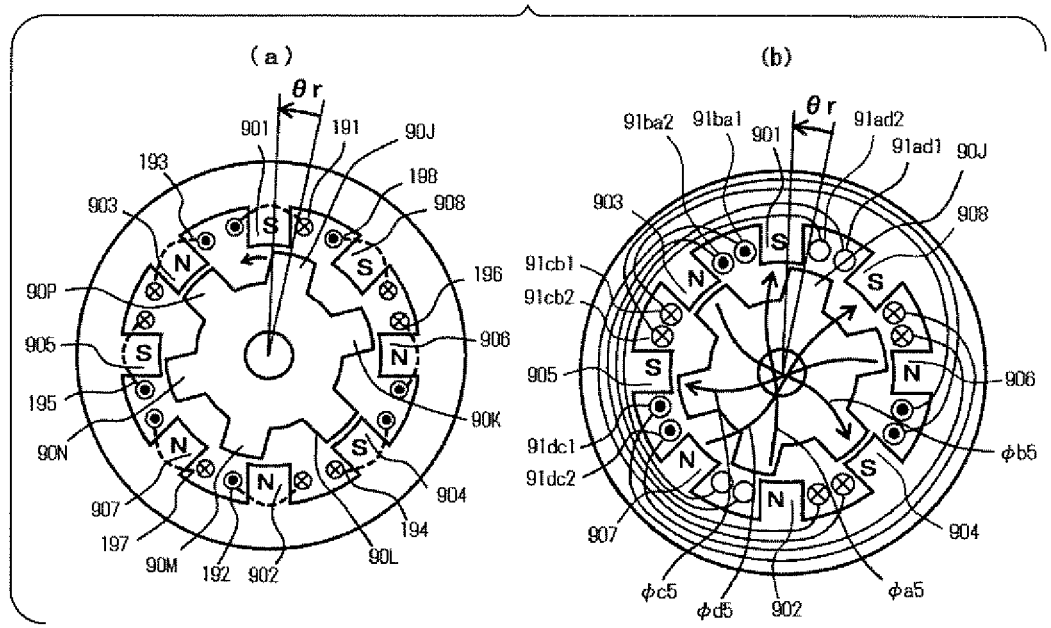
FIG. 19 is a lateral sectional view exemplifying a motor according to the present disclosure.
Figure 25:
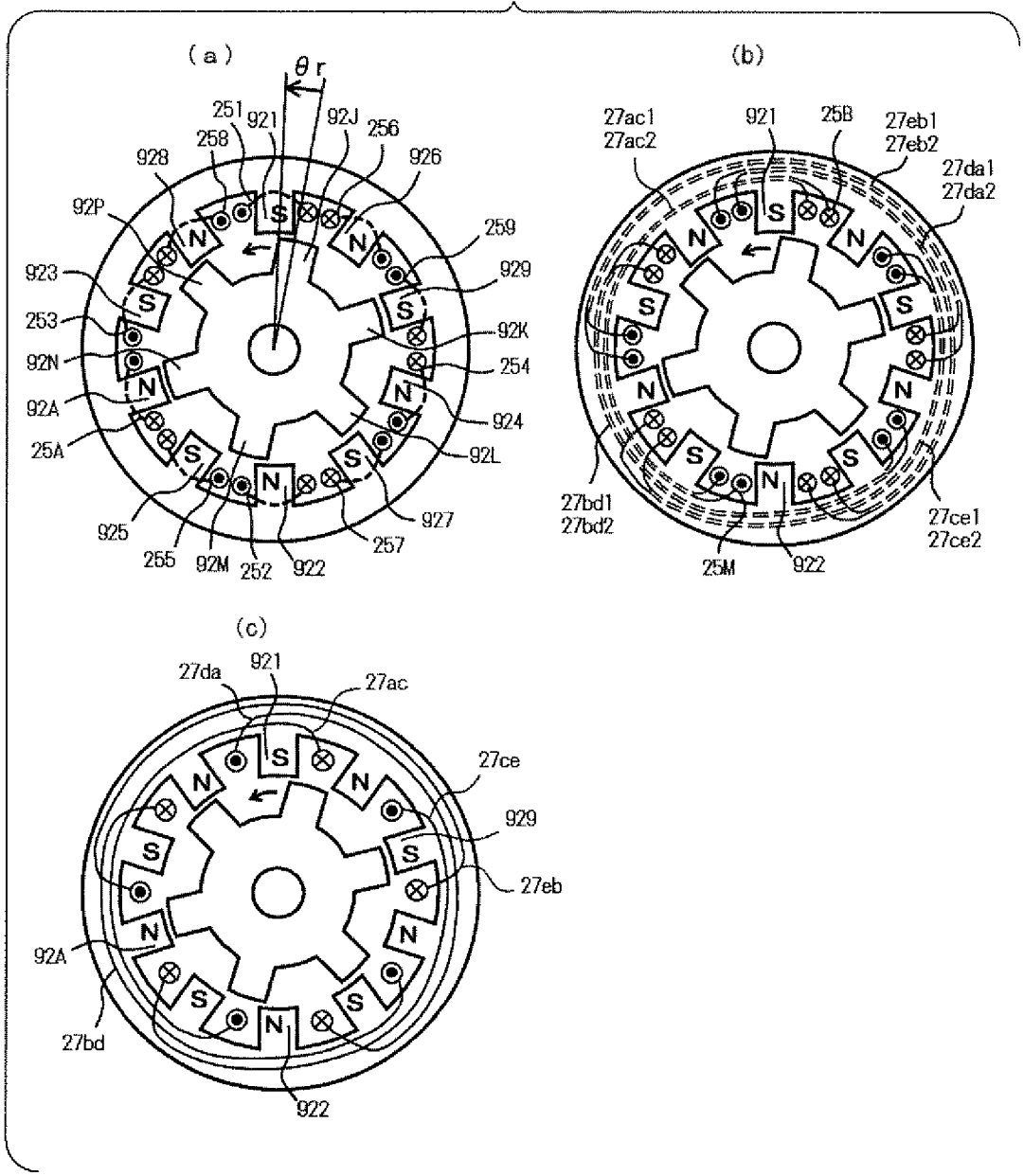
FIG. 25 is a lateral sectional view exemplifying a motor according to the present disclosure.

Further, the annular winding has an advantage that the winding can be simplified as compared with the full pitch winding. Toroidal aligned windings can be formed from each slot so as to surround the back yoke, facilitating winding fabrication and improving winding space factor. On the other hand, as shown in the drawings of FIGS. 19 and 25, when the number of phases is large and the winding is formed by the full pitch winding method, the winding structure of the coil end portion becomes complicated. However, if the toroidal winding as shown in FIG. 16 is used, the winding structure is simplified and the space is increased because there is no intersection with the windings of other phases.

On the other hand, the winding on the outer diameter side of the back yoke of FIG. 16 is not useful for generating the magnetomotive force inside the motor, like the winding of the coil end portion of FIG. 1. Therefore, one method of reducing the load on the outer diameter side winding is to apply this winding structure to a flat motor. This will give you the advantage of the simplicity of the annular winding.

Further, in this embodiment, a part of the annular winding is exposed to the outer peripheral portion of the rotor. Therefore, the cooling effect can be increased. Since the thermal conductivity of the copper wire is high, the heat of copper loss generated in the slot can be effectively dissipated to the outer peripheral portion. For heat dissipation, not only natural air cooling but also methods such as forced air cooling and liquid cooling of the outer peripheral portion of the motor can be adopted.

Eighth Embodiment

Figure 17:
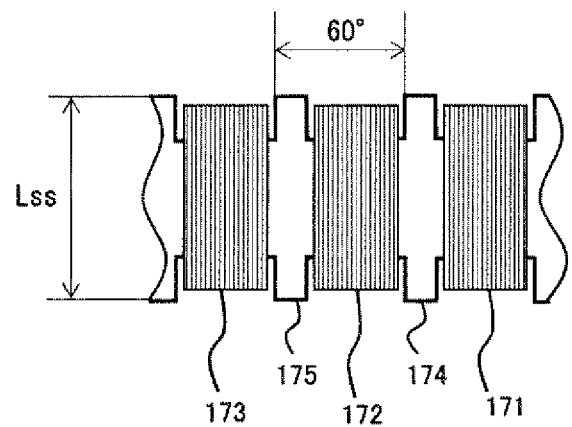
FIG. 17 exemplifies annular windings whose winding lengths and coil end lengths are shortened.
Figure 18:
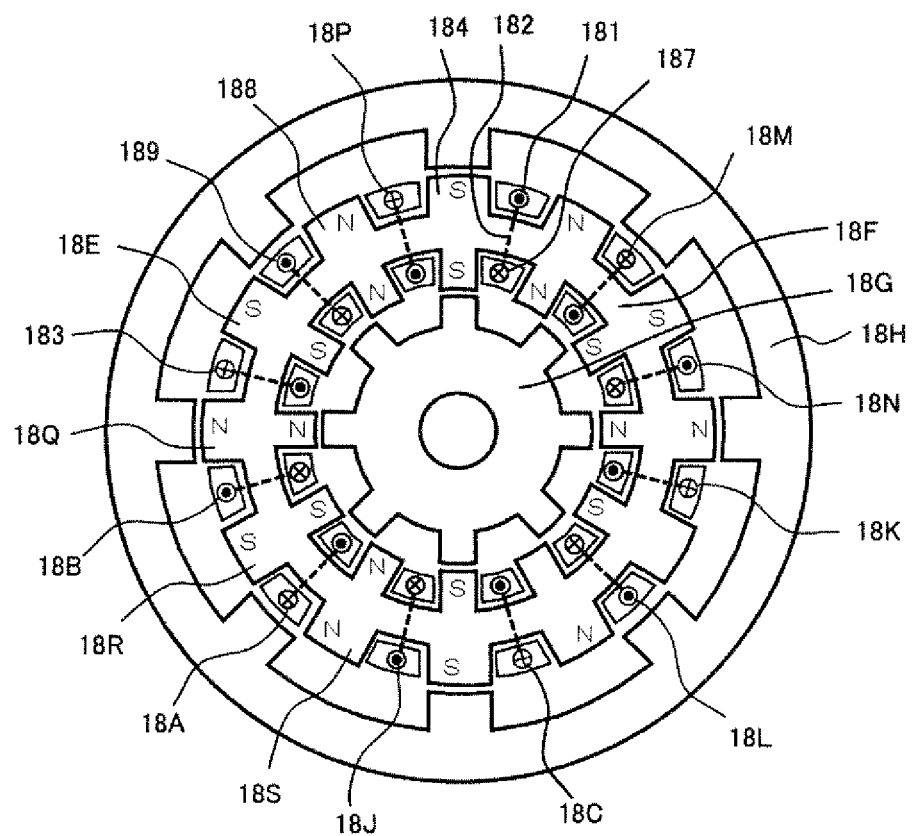
FIG. 18 is a lateral sectional view exemplifying a dual motor into which the motor of the present invention is practiced.

Next, FIG. 17 shows an example of a motor having a characteristic structure in which the reluctance motor shown in FIG. 16 is formed more flattened.

FIG. 17 is a linear development of the circumferential shape of FIG. 16 as viewed from the outside. The vertical direction of the paper surface in FIG. 17 is the rotor axial direction, and the horizontal direction of the paper surface is the direction in which the shape in the circumferential direction is linearly developed. In FIG. 17, winding 171 are windings 163 and 167 of FIG. 16. A winding 172 is the winding 16C of FIG. 16. A winding 173 is the winding 169 of FIG. 16. A stator magnetic pole 174 corresponds to the stator magnetic pole 11 shown in FIG. 16. A stator magnetic pole 175 corresponds to the stator magnetic pole 16 shown in FIG. 16. The angular width of each stator magnetic pole in the circumferential direction is 60°. On paper, the left and right edges of FIG. 17 are drawn with wavy lines, indicating a partial omission of the drawing.

In FIG. 17, a part of the back yoke of the stator is recessed in the rotor axial direction. The winding is wound around the space created by this dent. Reference numeral Lss is the rotor axial length of the stator, and this length is the same as a rotor axial length Ls in FIGS. 1 and 16. Therefore, in the case of the configuration shown in FIG. 17, the size of the coil end portion is shortened to twice the length in the rotor axial direction. As a result, a flatter reluctance motor can be realized. Since the length of each coil can be shortened, copper loss can be reduced and the cost of copper wire can be reduced. As mentioned above, external cooling is easy. When incorporating a motor into various devices such as electric vehicles, flat motors are often used. However, it is necessary to secure a cross-sectional area for the magnetic flux to pass through the back yoke portion of the stator. In this case, it is necessary to slightly increase the stator diameter. In addition, the shape of the soft magnetic material of the stator becomes complicated. For this reason, it is necessary to devise a part of the stator (that is, a part where the shape needs to be complicated), such as using a dust core that can easily form a three-dimensional structure.

Ninth Embodiment

Next, another embodiment according to the mode 1 is shown in FIG. 18. This embodiment relates to a composite motor in which two sets of motors, an inner diameter side motor and an outer diameter side motor, are integrally arranged. In the motor configuration of FIG. 18, the motor configuration of FIG. 16 described above is arranged as the inner diameter side motor, and the outer diameter side motor having a structure in which the inner diameter side and the outer diameter side are symmetrical is arranged. As a result, a reluctance motor having a two-pole paired configuration is provided.

In the configuration of FIG. 18, reference numeral 18G is a rotor of the inner diameter side motor, reference numeral 18H is a rotor of the outer diameter side motor, and each motor has eight rotor magnetic poles. The stator of the inner diameter side motor and the stator of the outer diameter side motor are arranged back to back, and the back yoke portion 18F is integrated. The back-to-back stator poles are in-phase stator poles. Twelve stator magnetic poles are provided on the inner diameter side motor and the outer diameter side, respectively. Each winding is configured as a toroidal annular winding. The winding of the inner diameter side stator and the winding of the outer diameter side stator are integrated and used in common.

One of the features of the reluctance motor shown in FIG. 18 is that the magnetomotive force generated by an AB 4-phase winding 181 arranged in the outer diameter side slot can be effectively utilized for the electromagnetic action between the outer diameter side stator and the outer diameter side rotor. In this respect, for example, in the case of the reluctance motor shown in FIG. 16 described above, the magnetomotive force of an outer diameter portion 162 of a slot portion 167, a side surface portion 164 and the outer diameter portion 162 of the AB 3-phase annular winding was not utilized. This is an advantage. Further, another feature of the configuration of the motor shown in FIG. 18 is that it can be effectively used as a motor from the outer diameter portion to the inner diameter portion of the motor. As a result, the output density of the motor can be increased.

In the reluctance motor shown in FIG. 18, reference numeral 184 is an A 4-phase stator magnetic pole, and a stator magnetic pole on the inner diameter side thereof is the A4-phase stator magnetic pole of the inner diameter side motor. Similarly, reference numeral 18Q is an A4/ phase stator pole, reference numeral 18E is a B 4-phase stator pole, reference numeral 18S is a B4/ phase stator pole, reference numeral 18R is a C 4-phase stator pole, and reference numeral 188 is a C4/ phase stator magnetic pole. The six stator poles, which are between 360° with the remaining electrical angle, are arranged in the same manner.

This winding corresponds to the windings 167, 164, and 162 shown in FIG. 16. A winding 183 is also the AB 4-phase winding, but the direction of the winding is opposite to that of the windings 187 and 18.

The AB 4-phase winding is composed of windings 181, 183, 18J, and 18K. A BC 4-phase winding is composed of windings 189, 18A, 18L, and 18M. A CA 4-phase winding is composed of windings 18B, 18C, 18N, and 18P.

Next, a method of driving the reluctance motor shown in FIG. 18 by the drive circuit shown in FIG. 6 will be described. The AB 4-phase windings 181 and 183 are connected in series to the winding 67 (w1) of FIG. 6 and wired. The AB 4-phase windings 18J and 18K are connected in series to the winding 6A (w4) and arranged. The winding directions are aligned with the current directions.

Similarly, the BC 4-phase windings 189 and 18A are connected in series to the winding 69 (w3) and arranged. The BC 4-phase windings 18L and 18M are connected in series to the winding 6C (w6) and arranged. The CA 4-phase windings 18P and 18B are connected in series to the winding 68 (w2) and arranged. The CA 4-phase windings 18C and 18N are connected in series to the winding 6B (w5) and arranged.

After connecting and arranging the windings in this way, the reluctance motor shown in FIG. 18 is driven by the drive circuit shown in FIG. 6 in the same manner as the drive method described in FIG. 16. That is, a predetermined drive is achieved by supplying a voltage and a current according to the rotation position of the rotor.

In addition, in the arrangement of each of the above windings, the windings having the same phase can be replaced. It is also possible to change the winding connection such as series or parallel. However, on the other hand, the interlinkage magnetic flux of each winding causes an error in the interlinkage magnetic flux and the generated voltage of each phase due to an error in the shape of each part of the motor. If it is desired to handle the interlinkage magnetic flux and voltage more strictly, a parallel winding can be adopted as in the motor shown in FIG. 2. That is, in the case of the motor shown in FIG. 18, for example, the AB 4-phase winding is formed of four windings 181, 183, 18J, and 18K. Therefore, each of these windings may be formed by parallel windings to form two sets of AB 4-phase windings in which four windings are connected in series. The two sets of AB 4-phase windings can also be arranged as the AB phase windings 67 (w1) and windings 6A (w4) shown in FIG. 6. The interlinkage flux to the two sets of AB 4-phase windings is equal. The same applies to the BC 4-phase winding and the CA 4-phase winding.

By adopting the motor configuration shown in FIG. 18, the annular winding can be effectively utilized. In addition, the inner diameter side of the motor space is also effectively utilized. Therefore, a motor having a high output density is provided. It is also possible to provide the stator configuration shown in FIG. 17, and therefore the motor can be flattened. In particular, in the case of a reluctance motor having a large number of phases as shown in FIG. 19(b) and FIG. 25(b), if full pitch winding is adopted, the winding structure of the coil end portion becomes complicated. In this case, if the motor configuration shown in FIG. 18 is adopted, the coil end portion can be simplified. As a result, the copper loss of the coil end portion can be reduced, the copper loss member of the coil end portion can be reduced, and the motor can be miniaturized. Further, the configuration of FIG. 18 shows a composite motor having elements on the inner diameter side and the outer diameter side. As another example, by forming two motors in the rotor axial direction, the motor elements may be changed to a composite motor in which the motor elements are arranged in the axial direction.

Tenth Embodiment

Figure 20:
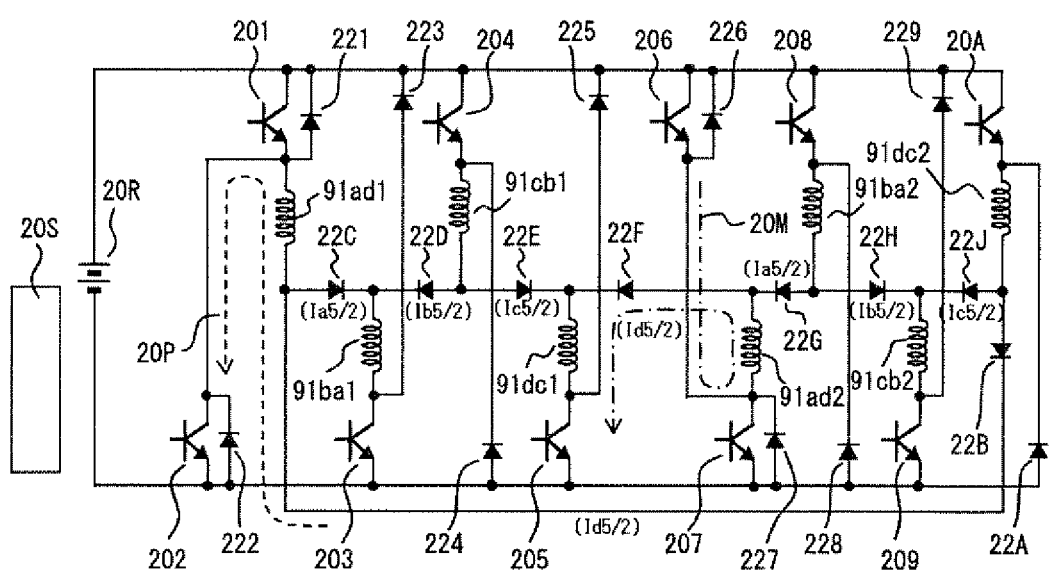
FIG. 20 is an example showing a drive circuit and windings according to the present disclosure.

Next, another embodiment according to the mode 1 is shown in the cross-sectional view of FIG. 19 and the drive circuit of FIG. 20. FIG. 19 illustrates a reluctance motor having eight stator magnetic poles and six rotor magnetic poles. FIG. 19(a) shows a conventional reluctance motor, which uses a concentrated winding. FIG. 19(b) exemplifies a reluctance motor in which full pitch winding windings in parallel are wound in each slot. The reason for arranging the windings in parallel is the same as in the case of the configuration shown in FIG. 2. This motor is driven using the circuit shown in FIG. 20. The windings on both sides of each stator pole are connected in series and a current is applied. Therefore, when each stator magnetic pole is excited, the interlinkage magnetic fluxes of the other phases are canceled out and are not affected by the interlinkage magnetic flux.

In FIG. 19(a), reference numeral 901 is an A5 phase stator magnetic pole, and reference numeral 902 is an A5/ phase stator magnetic pole. Reference numeral 904 is a B5 phase stator magnetic pole, and reference numeral 903 is a B5/ phase stator magnetic pole. Reference numeral 905 is a C5 phase stator magnetic pole, and reference numeral 906 is a C5/ phase stator magnetic pole. Reference numeral 908 is a D5 phase stator magnetic pole, and reference numeral 907 is a D5/ phase stator magnetic pole. Reference numerals 901 and 908 are S poles, and magnetic poles of the same S pole in the circumferential direction are arranged in the circumferential direction. Reference numerals 902 and 907 are N poles, and magnetic poles of the same N poles are arranged in the circumferential direction. In other stator magnetic poles, north poles and south poles are alternately arranged in the circumferential direction.

In FIG. 19(a), a concentrated winding is wound around each stator magnetic pole. Windings 191 and 192 wound around the stator poles 901 and 902 of the A5 phase and the A5/ phase are A5 phase concentrated winding windings Wa5, and an A 5-phase current is energized by Ia5. The total number of turns around both stator magnetic poles is Nwa. Similarly, Windings 193 and 194 that wind around the B 5-phase and the B 5/ phase stator magnetic poles 904 and 903 are B 5-phase concentrated winding windings Wb5, and Ib5 is energized with a B5 phase current. Windings 195 and 196 that wind around the C5 phase and C5/ phase stator magnetic poles 905 and 906 are Wc5 for the C5 phase concentrated winding, and Ic5 is energized for a C5 phase current. Windings 197 and 198 that wind around the D5 phase and D5/ phase stator magnetic poles 908 and 907 are Wd5 for the D5 phase concentrated winding, and Id5 is energized for a D5 phase current.

The reluctance motor shown in FIG. 19 is configured to be point-symmetrical with respect to the center point of the rotor. Further, the magnetic flux generated in the stator magnetic pole is configured to pass 180° opposite to the electric angle. In that case, if the number of stator magnetic poles is a multiple of 4, as shown in FIG. 19, there will be a portion where the north pole and the south pole of the stator magnetic poles cannot be arranged alternately in the circumferential direction. The polarities of the stator magnetic poles are partially arranged irregularly. When the number of stator magnetic poles is 6, 10, 14, or 18 in FIG. 83, the north and south poles of the stator magnetic poles can be alternately arranged in the circumferential direction. FIG. 19 shows an example in which the number of stator magnetic poles is a multiple of 4, and the north and south poles cannot be arranged alternately. As a result, in FIG. 19(a), the current symbol of the winding 191 shows a positive, the current symbol of the winding 198 shows a negative, and positive and negative currents are applied in the same slot. This also applies to the windings 197 and 192. In the case of the full pitch winding shown in FIG. 19(b) shown later, it is necessary to change the current of some windings positively and negatively. FIG. 19 shows a motor in which such an inconvenience occurs, and shows an example of how to deal with it.

In FIG. 19(b), the concentrated winding in FIG. 19(a) is changed to a full pitch winding. Moreover, the windings parallel in the same slot are divided into two full pitch windings. That is the same reason as in the case of FIG. 2 above. When this motor is driven by the circuit of FIG. 20, the windings on both sides that excite the stator magnetic poles are connected in series to energize the current, and the interlinkage magnetic flux of the other phases is canceled out so that it is not affected by it.

Reference numerals 91ad1 and 91ad2 indicate coil ends. These coil ends are AD 5-phase full pitch windings connected to slots 180° apart and wound in parallel, and Iad5/2, which is ½ of the AD phase current Iad5, energizes each winding. Reference numerals 91ba1 and 91ba2 indicate coil ends. These coil ends are also BA 5-phase full pitch windings that are connected to slots 180° apart and wound in parallel, and similarly, Iba5/2, which is ½ of the BA phase current, energizes each winding. Reference numerals 91ccb1 and 91ccb2 indicate coil ends. These coil ends are also connected to slots 180° apart, and are CB 5-phase full pitch winding windings wound in parallel, and Icb5/2, which is ½ of the CB phase current, energizes each winding. Reference numerals 91*dc*1 and 91*dc*2 indicate coil ends. These coil ends are also connected to slots 180° apart, and are DC 5-phase full pitch winding windings wound in parallel, and Idc5/2, which is ½ of the DC phase current, energizes each winding.

In FIG. 19(*b*), the following relationship holds between the current energized in one of the full pitch windings wound in parallel and the current energized in the virtual concentrated winding.

$$Iad5=Ia5-Id5 \tag{56}$$

$$Iba5=Ia5+Ib5 \tag{57}$$

$$Icb5=Ib5+Ic5 \tag{58}$$

$$Idc5=Ic5+Id5 \tag{59}$$

Here, since the current Iad5 of the equation (56) is the difference between Ia5 and Id5, if Ia5 is large, it becomes a positive value, and if Id5 is large, it becomes a negative value. That is, it takes an irregular value. Therefore, it is desired that only the drive circuit of the current Iad5 can carry a positive current and a negative current, and cancel the magnetic flux components of other phases described later. In this case, it is necessary to connect in series to all the knot windings located in the adjacent slot in the circumferential direction and energize.

The magnetic flux of each phase shown in FIG. 19(*b*) will be described. Reference numeral φa5 indicates an A5 phase magnetic flux passing from the A5/ phase stator magnetic pole 902 to the A5 phase stator magnetic pole 901. Reference numeral φb5 indicates a B5 phase magnetic flux passing from the B5/ phase stator magnetic pole 903 to the B5 phase stator magnetic pole 904. Reference numeral φc5 indicates a C5 phase magnetic flux passing from the C5/ phase stator magnetic pole 906 to the C5 phase stator magnetic pole 905. Reference numeral φd5 indicates a D5 phase magnetic flux passing from the D5 phase stator magnetic pole 907 to the D5 phase stator magnetic pole 908.

The direction of the current is represented by the current symbol. A symbol with an X letter in a circle indicates energization from the front side to the back side of the paper, and a symbol with a black circle in a circle indicates energization from the back side to the front side of the paper. Current symbols for windings 91*ab*1 and 91*ab*2 are indicated by white circles. This current symbol is a special symbol that indicates the energization of positive and negative currents. Specifically, when exciting the A5 phase magnetic flux φa5 passing from the A/ phase stator pole 902 to the A5 phase stator pole 901, on the paper surface of FIG. 19, the AD phase current Iad5 flowing from the front side to the back side of the paper surface is energized in the winding of the slot between the A 5-phase stator magnetic pole 901 and the D5phase stator magnetic pole 908.

On the other hand, when exciting the D5 phase magnetic flux φd5 passing from the D5/ phase stator pole 907 to the D5 phase stator pole 908, on the paper surface of FIG. 19, the AD phase current Iad5 directed from the back side to the front side of the paper surface is energized in the winding of the slot between the A5 phase stator magnetic pole 901 and the D5/ phase stator magnetic pole 908. That is, energization is based on the relationship of Eq. (56).

Voltages Va5, Vb5, Vc5, and Vd5 of the concentrated windings Wa5, Wb5, Wc5, and Wd5 shown in FIG. 19(*a*) are represented by the following equations:

$$Va5=Nwa\times d(\varphi a5)/dt \tag{60}$$

$$Vb5=Nwa\times d(\varphi b5)/dt \tag{61}$$

$$Vc5=Nwa\times d(\varphi c5)/dt \tag{62}$$

$$Vd5=Nwa\times d(\varphi d5)/dt \tag{63}$$

In FIG. 19(*b*), the number of windings of each full pitch winding is set to Nwa/2, as in the case of FIG. 2. Voltages Vad5, Vba5, Vcb5, and Vdc5 of these full pitch winding windings 91*ad*1, 91*ba*1, 91*ccb*1, and 91*dc*1 are represented by the following equations from the direction of each magnetic flux shown in FIG. 19. It should be noted that there are two sets of full pitch windings in each slot, but they have the same voltage.

$$Vad5=Nwa/2\times d(\varphi a5-\varphi b5+\varphi c5-\varphi d5)/dt \tag{64}$$

$$Vba5=Nwa/2\times d(\varphi a5+\varphi b5-\varphi c5+\varphi d5)/dt \tag{65}$$

$$Vcb5=Nwa/2\times d(-\varphi a5+\varphi b5+\varphi c5-\varphi d5)/dt \tag{66}$$

$$Vdc5=Nwa/2\times d(\varphi a5-\varphi b5+\varphi c5+\varphi d5)/dt \tag{67}$$

As can be seen from the above equation, the voltages of the two sets of full pitch windings have a very complicated voltage waveform because they interlink with the magnetic fluxes of all the phases exhibited by those windings. In addition, a large voltage is also generated due to a rapid increase or decrease in the exciting currents of the other phases. Even in the range where the current of each phase shows a constant value, the magnetic flux increases with the rotation of the rotor. Therefore, for one winding, the voltage increases, and for the winding in the opposite direction, a negative voltage is induced. That is, a voltage bias occurs.

Although the voltage is complicated as described above, the methods shown in (32), (33), and (34) can be applied. That is, two predetermined windings are connected in series. As a result, the voltage has only the magnetic flux component of the predetermined phase, and the magnetic flux components of the other phases are canceled out. Specifically, two full pitch winding windings arranged on both sides of the one-phase stator magnetic pole in the circumferential direction are connected in series. These two full pitch windings are oriented in opposite directions. Therefore, if the two windings are connected in series, the voltage components caused by the magnetic flux components of the other phases are always canceled. As a result, the relationship of the following equation is derived from the equations (64) to (67).

$$Vad5+Vba5=Nwa\times d(\varphi a5)/dt=Va5 \tag{68}$$

$$Vba5+Vcb5=Nwa\times d(\varphi b5)/dt=Vb5 \tag{69}$$

$$Vcb5+Vdc5=Nwa\times d(\varphi c5)/dt=Vc5 \tag{70}$$

$$Vdc5-Vad5=Nwa\times d(\varphi d5)/dt=Vd5 \tag{71}$$

However, as shown in the equation (56), when the D 5-phase and D 5/ phase stator poles 908 and 907 are excited, the AD 5-phase current Iad5 becomes a reverse current. Therefore, the sign of the AD 5-phase voltage Vad5 in the equation (71) is negative.

According to the equations (68) to (71), the complicated voltages as in the equations (64) to (67) are canceled out to form a simple voltage relationship. The drive circuit shown in FIG. 20 realizes the voltage relationship of the equations (68) to (70). In this drive circuit, any exciting current component that excites each stator magnetic pole can be energized simultaneously and in parallel.

FIG. 20 is an example of the drive circuit for driving the reluctance motor of FIG. 19(b). The windings shown in FIG. 20 are indicated by the same reference numerals as the windings shown in FIG. 19. Compared to the combination of the reluctance motor shown in FIG. 2 and the drive circuit shown in FIG. 6, the phase is changed from 3 to 4, and the windings 91ad1 and 91ad2 are configured to be able to carry positive and negative currents. In FIG. 20, reference numeral 20S indicates a control circuit that controls the entire drive circuit, and reference numeral 20R indicates a DC voltage source. Each transistor is controlled by PWM control or the like under the control of the control circuit 20S. As a result, voltage and current are supplied to each winding.

Reference numeral 201 indicates a transistor that supplies the A 5-phase current component (Ia5/2) based on the equations (56) and (57) to the AD 5-phase full pitch winding 91ad1. The reference numeral (Ia5/2) is a current driven by a transistor 203 through a diode 22C and the full pitch winding 91ba1 of the BA 5-phase. For the sake of clarity, the current components passing through each part of FIG. 20 are shown in parentheses, for example, (Ia5/2).

The BA 5-phase current Iba5 based on the equation (57) is energized by the transistor 203 in the BA 5-phase full pitch winding 91ba1. The CB 5-phase current Icb5 based on the equation (58) is energized by a transistor 204 in the CB 5-phase full pitch winding 91ccb1. The DC 5-phase current Idc5 based on the equation (59) is energized by a transistor 205 in the DC 5-phase full pitch winding 91dc1. Therefore, a B 5-phase current component (Ib5/2) passes through a diode 22D, a C 5-phase current component (Ic5/2) passes through a diode 22E, and a D 5-phase current component (Id5/2) passes through the diode 22F.

Further, on the right side of the paper in FIG. 20, the BA 5-phase current Iba5 based on the equation (57) is energized by a transistor 208 in the BA 5-phase full pitch winding 91ba2. The CB 5-phase current Icb5 based on the equation (58) is energized by a transistor 209 in the CB5 phase full pitch winding 91ccb2. The DC 5-phase current Idc5 based on the equation (59) is energized by a transistor 20A in the DC 5-phase full pitch winding 91dc2. Therefore, the A 5-phase current component (Ia5/2) passes through a diode 22G, the B 5-phase current component (Ib5/2) passes through a diode 22H, and the C 5-phase current component (Ic5/2) passes through a diode 22J, and the D 5-phase current component (Id5/2) passes through a diode 22B.

The AD 5-phase current Iad5 based on the equation (56) is energized in the AD 5-phase full pitch winding 91ad2. This current Iad5, however, takes both positive and negative values because it takes the value of the difference between the A-phase current component (Ia5/2) and the D phase current component (Id5/2). Therefore, the drive circuit needs to be able to carry the negative current as well. Therefore, a transistor 206 is added to energize a current (−Id5/2) that takes a negative value for the full pitch winding 91ad2 in the direction indicated by an alternate long and short dash line 20M. The same applies to the other AD 5-phase full pitch winding 91ad1, and a transistor 202 is added to energize a current (−Id5/2) that takes a negative value for the full pitch winding 91ad1 in the direction indicated by a broken line 20P.

Diodes 221, 222, 223, 224, 225, 226, 227, 228, 229, and 22A are diodes for power regeneration or for circulating current in a drive circuit to carry so-called flywheel energization. Further, the diodes 22B, 22C, 22D, 22E, 22F, 22G, 22H, and 22J reduce the influence of the voltage of each winding and its transistor on the other phases. However, if each transistor is controlled by the PWM method, the voltage applied to each winding can be changed, and the voltage influence from other phases can be absorbed to some extent. Therefore, not all of these diodes are necessary.

Figure 22:
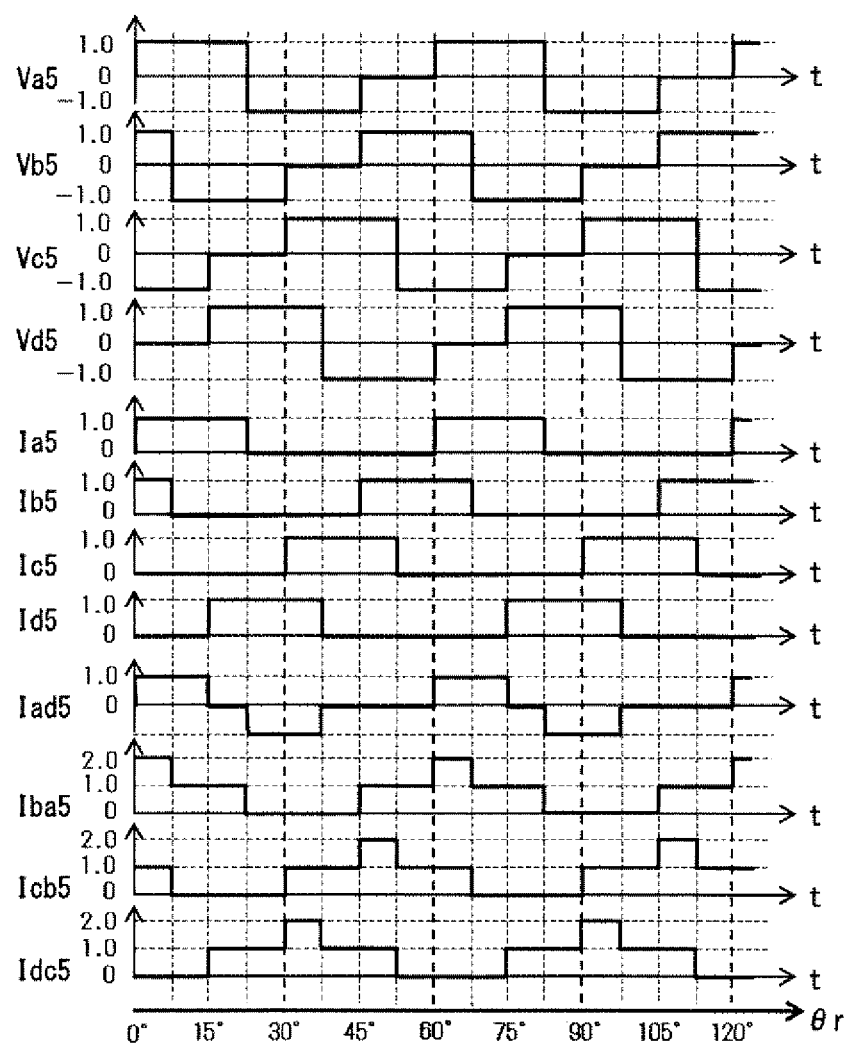
FIG. 22 is a graph exemplifying voltages and currents of the respective phases of a motor according the present disclosure.

Next, the voltage characteristics of the reluctance motor shown in FIG. 19 are illustrated in FIG. 22. Explaining this, the rotation angle position θr of the rotor indicates the rotation angle from the end of the A 5-phase stator magnetic pole 901 in the CW direction to the end of a rotor magnetic pole 90J in the CCW direction, as shown in FIGS. 1 and 2. An example of voltage, current, and torque when the rotor rotates at a constant speed in the CCW direction will be described. The horizontal axis of FIG. 22 is the time t, and the lowermost stage shows the rotation angle position θr of the rotor at that time.

Reference symbol Va5 shown in FIG. 22 shows a voltage induced in the concentrated windings 191 and 192 of the stator poles 901 and 902 of the A5-phase and A5/ phase shown in FIG. 19. This voltage is induced in a state where it is assumed that the A5 current Ia5 having a magnitude similar to that of the continuous rated current is applied to the A5-phase winding Wa5. At this time, the magnetic flux density at the portion where the stator magnetic poles 901 and 902 and the rotor magnetic poles face each other is a value close to 2.0 [T], which is the saturation magnetic flux density of the soft magnetic material. Similarly, Vb5 indicates the voltage induced in the virtual concentrated winding Wb5 of the stator poles 904 and 903 of the B 5-phase and the B5/ phase. This voltage is induced on the assumption that the concentrated winding Wb5 is energized with the current Ib5 having a magnitude equal to that of the rated current.

Further, reference symbol Vc5 indicates a voltage induced in the virtual concentrated winding Wc5 of the C5-phase and the C5/ phase stator magnetic poles 905 and 906. This voltage is induced on the assumption that the concentrated winding Wc5 is energized with the current Ic5 having a magnitude similar to that of the rated current. Also, Vd5 indicates the voltage induced in the virtual concentrated winding Wd5 of the D5-phase and the D5/ phase stator magnetic poles 908 and 907. This voltage is induced on the assumption that the concentrated winding Wd5 is energized with the current Id5 having a magnitude of the rated current. Each voltage value in FIG. 22 is normalized and is shown with an amplitude of 1.0.

For example, in the range where the voltage Va5 is a positive value, that is, in the range where the rotation angle position θr of the rotor is 0° to 22.5°, the A5 phase and A5/ phase stator poles 901 and 902 generate CCW torque with respect to the rotor. No torque is generated in the range where θr is 45° to 60°. Further, the torque cycle is 60° because the number of rotor magnetic poles is 6. The relationship between the exciting current and the torque is a non-linear characteristic as shown in FIG. 12.

Similarly, as shown in FIG. 22, the voltage Vb5 and torque of the B5-phase are 15° out of phase with those of the A5 phase. The voltage Vc5 and torque of the C5 phase are 30° out of phase with those of the A 5-phase. The B5 phase voltage Vb5 and torque are 45° ahead of the A5 phase voltage.

Next, when the reluctance motor shown in FIG. 19 is rotated in the CCW direction, the current of each phase can be exemplified as shown in FIG. 22. However, FIG. 22 is illustrated by a model in which the regeneration operation of magnetic energy is simplified by ignoring the time of increase and decrease of the current of each phase and setting it to 0.

In the reluctance motor illustrated in FIG. 19, in order to generate CCW torque, the illustrated current Ia5 is energized in the virtual concentrated winding Wa5 between θr=0° and 22.5°. Similarly, the illustrated current Id5 is energized in the virtual concentrated winding Wd5 between θr=15° and 37.5°.
Similarly, the virtual concentrated winding Wc5 is energized with the illustrated current Ic5 between θr=30° and 52.5°. Similarly, the illustrated current Ib5 is energized in the virtual concentrated winding Wb5 between θr=45° and 67.5°. During CCW rotation, the stator magnetic poles operate in the order of A5 phase, D5 phase, C5 phase, B5 phase, and the first A5 phase. In addition, each voltage value and each current value shown in FIG. 22 are normalized.

Next, currents actually energized to each full pitch winding are values according to the equations (56) to (59), and are represented by Iad5, Iba5, Icb5, and Idc5 as shown in FIG. 22. Each of these currents is energized in the drive circuit of FIG. 20 at the same time in two paths, and is energized to the full pitch winding of each phase parallel in FIG. 19 (b).

Further, the voltage of the full pitch winding of each phase is expressed by the equations (64) to (67), and its behavior is complicated. FIG. 22 illustrates a simplified model in which the time of increase and decrease of the current of each phase is set to 0. The voltage of full pitch winding is not shown in abbreviated form. Moreover, the behavior of these voltages is complicated and generates a large voltage. However, when driving at low speed rotation, each voltage is sufficiently smaller than the power supply voltage, so that there is no problem. Also, at low speed rotation, it is possible to secure a sufficient time for increasing and decreasing the current, so that the inaccuracy of the current waveform when the current is increased or decreased is reduced.

Next, an operation example of the drive circuit of FIG. 20 will be described with respect to the case where the reluctance motor shown in FIG. 19 is rotated to CCW. A total of eight currents, two each of the Iad5, Iba5, Icb5, and Idc5 currents shown in the time chart of FIG. 22, are energized in parallel depending on the rotation angle position θr of the rotor to the eight full pitch windings of each of the eight phases shown in FIG. 19(b) and FIG. 20. As can be seen from FIG. 22, a current is constantly applied to the four or six windings. The energization cycle of each current is 60°.

In the range where the rotation angle position θr of the rotor is θr=0° to 7.5°, as shown in FIGS. 19(b) and 22, the A 5 and A5/ phase stator poles 901 and 902 are excited, and the B 5 and B5/ phase stator poles 904 and 903 are excited. Then, the AD5 phase current Iad5 takes 1.0, the BA5 phase current Iba5 takes 2.0, and the CB 5-phase current Icb5 takes 1.0.

The transistor 201 shown in FIG. 20 energizes the winding 91*ad*1 on one side of the AD 5-phase winding with a current of 0.5, which is ½ of the AD 5-phase current Iad. Further, the transistor 203 energizes the winding 91*ba*1 on one side of the BA 5-phase winding with a current of 1.0, which is half that of Iba5. The transistor 204 energizes the winding 91*cb*1 on one side of the CB 5-phase winding with a current of 0.5, which is half that of Icb5. As a result, 0.5 of the current component (Ia5/2) based on the equations (56) and (57) passes through the diode 22C. On the other hand, 0.5 of the current component (Ib5/2) based on the equations (57) and (58) passes through the diode 22D.

On the other hand, in the paper of FIG. 20, the circuit configuration on the right side thereof is also targeted. Specifically, the transistor 207 energizes the other winding 91*ad*2 of the AD 5-phase winding with a current of 0.5, which is ½ of that of Iad5. Further, the transistor 208 energizes the other winding 91*ba*2 of the BA phase winding with a current of 1.0, which is ½ of that of Iba5. The transistor 209 energizes the winding 91*cb*2 with a current of 0.5, which is half that of Icb5. As a result, 0.5 of the current component (Ia5/2) based on the equations (56) and (57) passes through the diode 22G. Further, 0.5 of the current component (Ib5/2) based on the equations (57) and (58) passes through the diode 22H. In this way, in the range where θr is 0° to 7.5°, a current is applied in parallel to the six windings.

As can be seen from FIG. 19(b) and FIG. 22, in the range where the rotor rotation angle position θr is 7.5° to 15°, the A5 phase and A5/ phase stator magnetic poles 902 are excited. At this time, ½ of the current Iad5 is 0.5, and ½ of the current Iba5 is 0.5. The current of 0.5 is applied to the winding 91*ad*1 by the transistor 201. On the other hand, the transistor 208 energizes the winding 91*ba*2 with the current of 0.5. Further, the winding 91*ad*2 is energized with 0.5 of the current component (Ia5/2) by the transistor 207 through the diode 22G.

In the range where the rotor rotation angle position θr is 15° to 22.5°, the A5 phase and A5/ phase stator poles 901 and 902 and the D 5-phase and D5/ phase stator poles 908 and 907 are excited. At this time, ½ of the current Iba5 is 0.5, and ½ of the current Idc5 is 0.5. The current of 0.5 is applied to the winding 91*dc*2 by the transistor 20A. Further, the current of 0.5 is applied to the winding 91*ba*1 by the transistor 203 through the diodes 22B and 22C. At this time, the current Iad5 to be energized to the winding 91*ad*1 is shown by the equation (56). However, in that equation, since the value of (Ia5−Id5)/2 is exactly 0, the transistors 201 and 202 are not driven.

On the other hand, the transistor 208 energizes the winding 91*ba*2 with a current of 0.5. Further, a current of 0.5 is applied to the winding 91*dc*1 by the transistor 205 through the diodes 22G and 22F. Even in this energization, the values of (Ia5−Id5) based on the equation (56) are exactly 0, so the transistors 206 and 207 are not driven.

Here, since it is difficult to understand the circuit operation of FIG. 20 related to the equation (56), another specific example will be supplementarily described. It is irrelevant to each current value shown in FIG. 22. Now, assuming, for example, a case where the A5 phase current Ia5 is 4.0 and the D 5-phase current Id5 is 4.6, the currents of each part of the circuit of FIG. 20 will be described. The currents Ib5 and Ic5 are 0. From equations (56) to (59), Iad5=−0.6, Iba5=4.0, Icb5=0, and Idc5=4.6.

The transistor 20A energizes the winding 91*dc*2 with a current 2.3 corresponding to ½ of the Idc5, and the current passes through the diode 22B. The transistor 203 energizes the winding 91*ba*1 with a current 2.0 corresponding to ½ of the Iba5, and the current also passes through the diode 22C. The transistor 202 is energized with a current 0.3, which is the difference between these currents, in the opposite direction to the winding 91*ad*1 as shown by a broken line 20P. This corresponds to energizing the winding 91*ad*1 with a current (−0.3) that is ½ of that of Iad5 shown in Eq. (56). In this case, the transistor 202 operates only when the time phase in which Iad5 shown in the equation (56) is a negative value. However, in that case, the transistor 201 is not driven and is not energized.

On the contrary, it is assumed that the A5 phase current Ia5 is 4.6 and the D5 phase current Id5 is 4.0. In that case, the transistor 201 is energized with a current of 0.3, which corresponds to ½ of the current based on the equation (56), but the transistor 202 is not energized. The transistors 201 and 202 operate while complementing each other according to the positive value and the negative value of the AD5 phase current Iad5 based on the equation (56). The transistor 202 is a transistor added to apply a negative current to the winding 91ad1. Further, the transistors 206 and 207 also have the same complementary relationship as described above. The transistor 206 shows a negative current based on the equation (56) in the AD 5-phase full pitch winding 91ad2. This energization follows the path indicated by an alternate long and short dash line 20M.

In the range where the rotation angle position θr of the rotor is 22.5° to 30°, the stator poles 908 and 907 of the D 5-phase and the D 5/ phase are excited. The current corresponding to ½ of Iad is −0.5, and the current corresponding to ½ of Idc5 is 0.5. A current of 0.5 is applied to the winding 91dc2 by the transistor 20A, and this current flows through the diode 22B and along the broken line 20P. On the other hand, the transistor 206 energizes the winding 91ad2 with a current of 0.5. This current flows along the alternate long and short dash line 20M. This current flows through the diode 22F, and the transistor 205 energizes the winding 91dc1 with a current of 0.5. At this time, the directions of the currents energizing the winding 91ad1 and the winding 91ad2 are opposite to each other, and take a negative value (−Id5)/2.

In the range where the rotation angle position θr of the rotor is 30° to 37.5°, the C5 phase and C5/ phase stator poles 905 and 906 are excited, and the D5 and D5/ phase stator poles 908 and 907 are excited. The current corresponding to ½ of Iad5 is −0.5, the current corresponding to ½ of Icb5 is 0.5, and the current corresponding to ½ of Idc5 is 1.0. The transistor 20A energizes the winding 91dc2 with a current 1.0 corresponding to ½ of the Idc5 based on the equation (59). The current component Id5/2 in the current of the current Idc5 passes through the diode 22B and flows along the broken line 20P. That is, it flows as the current component −Id5 based on the equation (56). Therefore, the transistor 202 energizes the winding 91ad1 with a current of 0.5, which corresponds to ½. The current component Ic5/2 in the current of the current Idc5 also passes through the diode 22J and flows as an Ic5 component according to the equation (58). Therefore, the transistor 209 energizes the winding 91cb2 with a current of 0.5 corresponding to ½.

On the other hand, the transistor 206 energizes the winding 91ad2 with a current 0.5 corresponding to ½ as the current component −Id5 based on the equation (56) as shown in the alternate long and short dash line 20M. The transistor 204 energizes the winding 91cb1 with a current of 0.5 corresponding to ½ as the current Ic5 according to the equation (58). The transistor 205 supplies the current component Id5 according to the equation (59) to the winding 91dc1 through the diode 22F and the current component Ic5 component through the diode 22E, and as a result, a total current of 1.0, which is (Ic5+Id5)/2, is energized.

In the range where the rotation angle position θr of the rotor is 37.5° to 45°, the stator poles 905 and 906 of the C5 phase and the C5/ phase are excited. The current corresponding to ½ of Icb5 is 0.5, and the current corresponding to ½ of Idc5 is 0.5. A current of 0.5 is applied to the winding 91dc2 by the transistor 20A. That is, this current is applied to the winding 91cb2 by the transistor 209 through the diode 22J. On the other hand, the transistor 204 energizes the winding 91cb1 with a current of 0.5. That is, the current 0.5 is energized by the transistor 209 through the diode 22E to the winding 91cb2.

In the range where the rotation angle position θr of the rotor is 45° to 52.5°, the B5 phase and B5/ phase stator poles 904 and 903 and the C5 phase and C5/ phase stator poles 905 and 906 are excited. The current corresponding to ½ of Iba5 is 0.5, the current corresponding to ½ of Icb5 is 1.0, and the current corresponding to ½ of Idc5 is 0.5. A current of 0.5 is applied to the winding 91dc2 by the transistor 20A. A current of 0.5 is applied to the winding 91ba2 by the transistor 208. The transistor 209 supplies the Ic5 component based on the equation (58) to the winding 91cb2 through the diode 22J and the Ib5 component through the diode 22H, whereby a total current of (Ib5+Ic5)/2 of 1.0 is energized.

On the other hand, the transistor 204 energizes the winding 91cb1 with a current of 1.0 corresponding to (Ib5+Ic5)/2 according to the equation (58). The transistor 205 energizes the winding 91dc1 with a current of 0.5, which corresponds to ½ of the Ic5 component, through the diode 22E. The transistor 203 conducts a current 0.5 corresponding to ½ of the Ib5 component to the winding 91ba1 through the diode 22D.

In the range where the rotation angle position θr of the rotor is 52.5° to 60°, the stator poles 904 and 903 of the B5 phase and the B5/ phase are excited. The current corresponding to ½ of Iba5 is 0.5, and the current corresponding to ½ of Icb5 is 0.5. A current of 0.5 is applied to the winding 91ba2 by the transistor 208. Further, this current flows through the diode 22G, and the transistor 209 energizes the winding 91cb2 with a current of 0.5. On the other hand, the transistor 204 energizes the winding 91cb1 with a current of 0.5. Further, this current flows through the diode 22D, and the current 0.5 is applied to the winding 91ba1 by the transistor 203.

Figure 27:
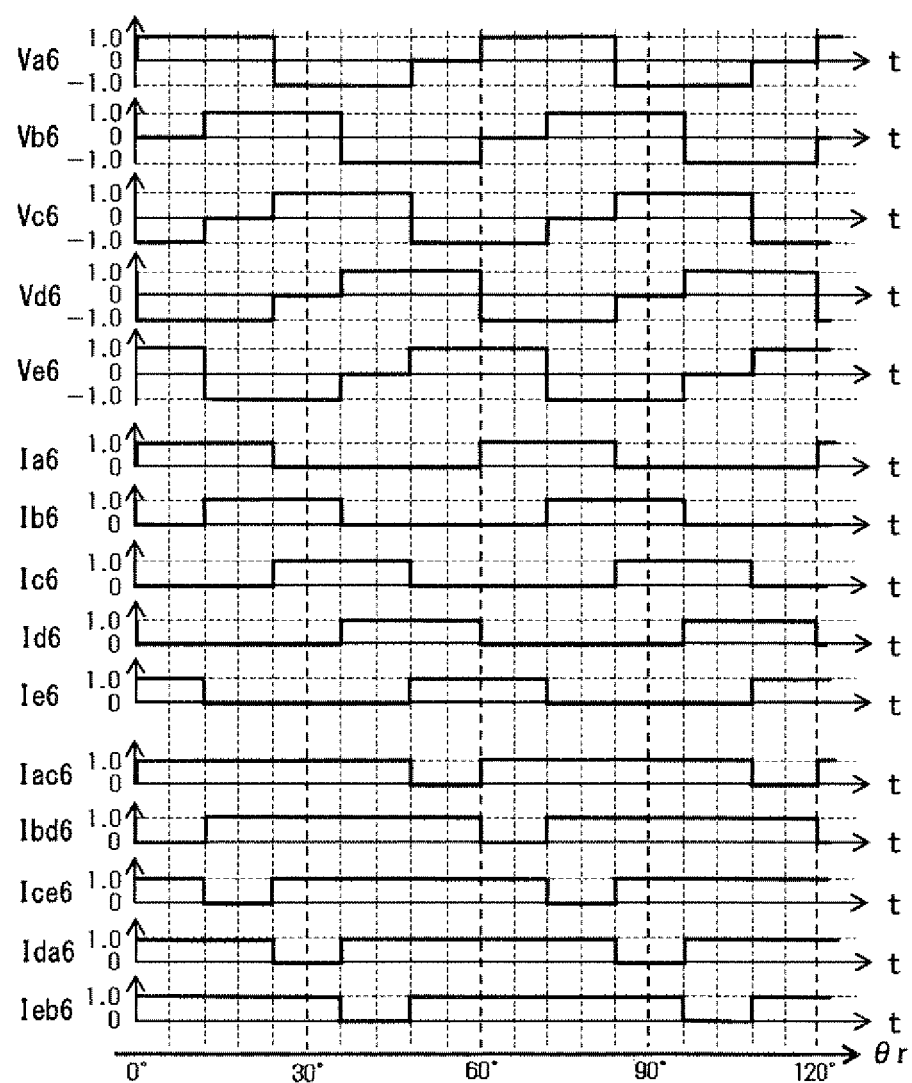
FIG. 27 is a graph exemplifying voltages and currents of the respective phases of a motor according the present disclosure.

The reluctance motor of FIG. 19 has been described above from the viewpoint of the drive circuit of FIG. 20, the drive method for energizing each winding, and the order thereof according to the time chart of FIG. 22. These operations have a period of 60°. Therefore, the rotor is continuously rotated in the CCW direction while repeating the above-mentioned operation of 0° to 60°. The time chart of FIG. 27 illustrates a state in which the rotor is rotated at a constant rotation speed in the CCW direction and by outputting torque in the CCW direction. Further, in the waveforms of the voltage and current of the virtual concentrated winding and the current of each full pitch winding, the time of increase and decrease of each current was set to 0. That is, those waveforms are illustrated using a simplified model in which the time widths of the increase and decrease are omitted and represented by a rectangular waveform.

The following can be inferred from the input power, which is the sum of the products of each phase voltage and each phase current shown in FIG. 22. That is, the motor torque pulsates in an uneven manner with a period of 15°. For example, when observing the current Idc5 flowing through the DC5 phase full pitch winding, the current with θr between 30° and 37.5° is 1.0. This current value is twice the current value of the other ranges and generates twice the torque. In this interval, the current Iad5 decreases its value and the current Icd5 increases its value. The current Iad5 is decreased at a constant rate and the current Icd5 is increased at a constant rate so that the sum of these current values is halved. As a result, the current can be controlled without difficulty. At the same time, it is possible to prevent the occurrence of the uneven torque pulsation. Further, a method of simply reducing the amplitude of the current to reduce the maximum value of the current or reducing the torque ripple can be adopted in the range where the torque is large or the range where the current is large.

In the case of the reluctance motors of FIGS. 1 and 2 described above, as shown in FIGS. 84 and 14, there is a problem that the switching time associated with the control of increasing/decreasing the current of each phase is insufficient, and torque ripple is likely to occur due to this. Further, there is also a problem of generation of torque ripple due to magnetic saturation. On the other hand, in the case of the configuration in which the reluctance motor of FIG. 19 and the drive circuit of FIG. 20 are combined, these problems can be prevented or reduced.

The reluctance motor shown in FIG. 19 employs a full pitch winding as in the motor described in FIG. 2. Therefore, the copper loss in the slot can be significantly reduced as compared with the reluctance motor using the concentrated winding wound for each tooth. Further, it is possible to prevent or suppress the inconvenience that the voltage of each part in the drive circuit shown in FIG. 20 is a complicated and excessive voltage due to the equations (64) to (67). That is, in the drive circuit shown in FIG. 20, since two paired windings are connected in series with each other, the voltage is simplified as shown in the equations (68) to (71). As a result, the excessive voltage can be reduced.

In the case of a conventional drive circuit, as shown in FIG. 5, assuming that each phase current is controlled by two transistors, eight transistors are required. On the other hand, the drive circuit shown in FIG. 20 uses 10 transistors. However, since the power can be supplied by twice the path, the drive circuit can be miniaturized in the control mode for reducing the unevenness (ripple) of the torque. The relative ratio of the drive circuit shown in FIG. 20 to the conventional drive circuit is "(10 pieces/8 pieces)/(double path)"=0.625. Therefore, the drive circuit shown in FIG. 20 can reduce the total current capacity of the transistor to 62.5% as compared with the conventional drive circuit. Since the utilization rate of each transistor in the drive circuit shown in FIG. 20 can be increased, the number of transistors can be reduced in the end.

In the drive circuit shown in FIG. 20, it is necessary to control the current supplied to the AD 5-phase full pitch winding windings 91ad1 and 91ad2 with positive and negative values. Therefore, 10 transistors are required to excite the eight stator magnetic poles by controlling the current of four phases. This is because, in the case of the drive circuit shown in FIG. 6, the drive circuit shown in FIG. 20 requires two more transistors than the case where the number of transistors is six for three phases. Therefore, compared with the drive efficiency of the circuit shown in FIG. 6, the ratio is ⁸⁄₁₀, which is slightly lower.

Various modifications can be provided for the structure of the reluctance motor shown in FIG. 19(b). As an example, as described above, a bipolar paired structure can be adopted. In this case, as shown in FIG. 15, two full pitch windings of each phase can be configured. Therefore, it is not necessary to arrange two full pitch winding windings in parallel in each slot as shown in FIG. 19(b).

As another example, in the configuration shown in FIG. 19(b), a toroidal annular winding can be adopted as shown in FIG. 16. Also in this case, two windings of each phase can be configured between the electric angles of 360°. Therefore, as shown in FIG. 19(b), it is not necessary to arrange two full pitch winding windings in parallel in each slot.

As shown in FIG. 18, the motor configuration shown in FIG. 19(b) may be a composite motor. In the case of this deformation, not only the coil end length can be shortened, but also the space on the inner diameter side of the motor can be utilized more effectively. In the case of FIG. 18, two motors are configured on the inner diameter side and the outer diameter side, but two motors can be configured in the rotor axial direction, or multiple rotors can be arranged in both the radial and axial directions. The width of the stator magnetic pole and the rotor magnetic pole in the circumferential direction can be increased or decreased. The shapes of the magnetic poles facing each other can be transformed into a three-dimensional shape. Average torque, torque ripple, vibration, noise, characteristics at high speed rotation, etc. change.

Eleventh Embodiment

Figure 21:
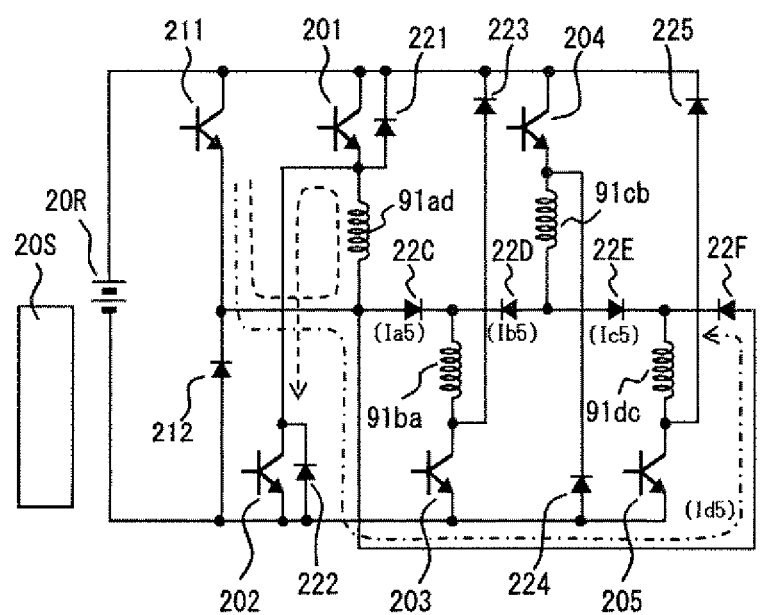
FIG. 21 is an example sowing a drive circuit and windings according to the present disclosure.

Next, another embodiment of the drive circuit according to the mode 1 will be described with reference to FIG. 21. In the case of the drive circuit of FIG. 20, a configuration is adopted in which two sets of currents of each phase can be energized, the symmetry of the circuit is maintained, and each transistor can be driven efficiently. The total current capacity of the transistor is small. However, since two sets of currents in each phase are energized, there is a disadvantage that the number of transistors increases to 10. Therefore, FIG. 21 shows an example of another drive circuit. This drive circuit adopts a configuration in which one transistor is added to compensate for the asymmetry of the circuit, and one set of full pitch windings of each phase shown in FIG. 19(b) is completed. That is, the number of full pitch winding windings shown in FIG. 19(b) is four. The number of transistors is "(10)/2+(1)"=6.

In the drive circuit configuration shown in FIG. 21, the right half of the paper of FIG. 20, that is, the transistors 206, 207, 208, 209, and 20A and their surroundings are removed, and instead transistors 211 and diodes 212 are added. For the circuit configuration of FIG. 20, the current of each phase is one set. Therefore, the current energizing each part of FIG. 21 is double that of FIG. 20. The number of full pitch windings of the motor shown in FIG. 19(b) can be one in each slot.

In the drive circuit shown in FIG. 21, the operation of the portion related to the AD 5-phase winding 91ad and the transistor 211 is different from that of the drive circuit of FIG. 20. This difference is also related to equation (56). The positive or negative of the AD 5-phase current Iad5 changes depending on which of the A 5-phase current component Ia5 and the D 5-phase current component Id5 is larger. Therefore, a specific driving example associated with both positive and negative currents will be described.

First, examples of Ia5=5 and Id5=3 will be described. According to the equation (56), Iad5=2. The transistor 201 outputs a current of "2" to the AD 5-phase winding 91ad. At this time, it is assumed that the transistor 202 is in the off state. The transistor 211 outputs a current "6". Of those currents "8", a current "5" is supplied to the BA 5-phase winding 91ba through the diode 22C as the A 5-phase current component Ia5. A remaining current "3" flows in the direction of the alternate long and short dash line, passes through the diode 22F, and is supplied to the DC5 phase winding 91dc as the D 5-phase current component Id5.

Next, examples of Ia5=3 and Id5=5 will be described. According to the equation (56), Iad5=−2. Since Iad5 is a negative value, the transistor 201 is turned off. Therefore, the transistor 211 outputs a current "10". The transistor 202 flows in the direction indicated by the broken line and supplies a current "−2" to the AD5 phase winding 91ad.

Therefore, a current "3" as the A 5-phase current component Ia5 passes through the diode 22C and is supplied to the BA 5-phase winding 91ba. Since a remaining current "5" flows in the direction of the alternate long and short dash line, it passes through the diode 22F and is supplied to the DC 5-phase winding 91dc as the D 5-phase current component.

The configuration in which the transistor 211 is energized does not maintain the relationship that two windings located on both sides of a certain stator magnetic pole are connected in series and the exciting current component of the stator magnetic pole is energized. Therefore, an excessive voltage or the like is generated in the energized winding, but the transistor 211 can apply a voltage twice that of the other winding to the corresponding winding, so that the voltage problem can be solved. However, the transistor 211 supplies current in three directions. Therefore, the current capacity of the transistor 211 needs to be twice as much as that of the other transistors. In simple logic, the drive circuit shown in FIG. 21 requires an extra transistor 211 as compared with the drive circuit shown in FIG. 20. However, it is excellent in that the number of transistors is as small as six. The drive circuits shown in FIGS. 20 and 21 can be further modified into various configurations, and these modifications are also included in the scope of the present invention.

Twelfth Embodiment

Next, another embodiment of the drive circuit according to the mode 1 will be described with reference to FIGS. 23 and 24. In the drive circuits of FIGS. 19, 20, 21, and 22, the number of stator magnetic poles is eight, and an example of an AC motor that uses full pitch winding and gives priority to reducing copper loss in the slot. Further, in this embodiment, although the copper loss in the slot increases a little, the drive circuit can be realized by five transistors, and the circuit configuration can be made simpler.

Figure 23:
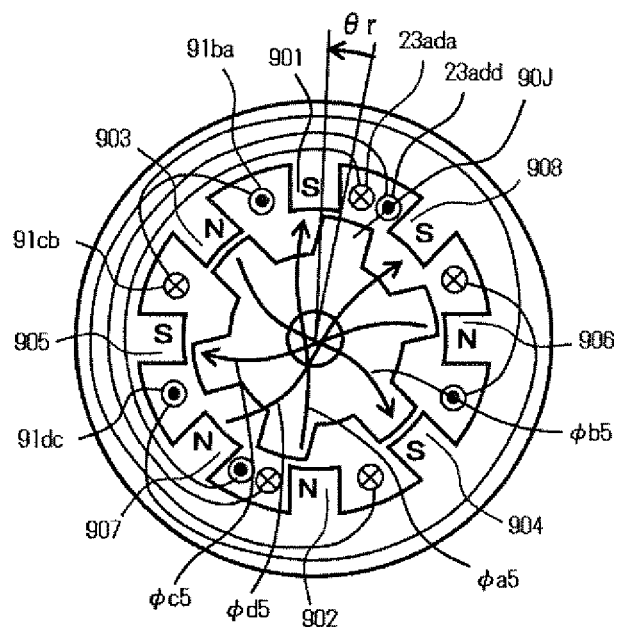
FIG. 23 is a lateral sectional view exemplifying a motor according to the present disclosure.

FIG. 23 shows an AC motor according to this embodiment. This motor is configured by partially modifying of FIG. 19(b). The magnetic flux passing through each stator magnetic pole and each phase is the same as in FIG. 19 (b). The BA 5-phase windings 91ba1 and 91ba2 shown in FIG. 19(b) are integrated with the BA5 phase winding 91ba in FIG. 23 to form a set of full pitch windings. Similarly, the CB phase windings 91cb1 and 91cb2 are configured as CB 5-phase windings 91cb in FIG. 23. The DC 5-phase windings 91dc1 and 91dc2 are configured as DC5 phase windings 91dc in FIG. 23.

The AD 5-phase windings 91ad1 and 91ad2 shown in FIG. 19(b) needs to change the direction of the current depending on whether the A5 phase stator pole 901 and the A/5 phase stator pole 902 are excited or the D5 phase stator pole 907 and the D/5 phase stator pole 908 are excited. Therefore, the load on the drive circuits of FIGS. 20 and 21 is increasing. This is because the two stator magnetic poles are adjacent to each other in the circumferential direction and have the same polarity. That is, although the magnetic direction of the stator magnetic poles is constant, it is necessary to change the current direction of the windings located between them.

On the other hand, the configuration shown in FIG. 23 can be excited without changing the current direction of the winding. Instead of the AD5 phase windings 91ad1 and 91ad2 shown in FIG. 19(b), AD5 phase windings 23ada and 23add are arranged. Although these windings 23ada and 23add are physically full pitch winding windings, they can be energized in the direction of the current symbol of the winding shown in FIG. 23 without changing their current directions.

For example, when exciting the A5 phase stator pole 901 and the A/S phase stator pole 902, that is, in the range where the rotor rotation angle position θr in FIG. 22 is 0° to 22.°, the A5 phase current component Ia5 is energized in the direction of the winding symbols indicated by the reference numerals 23ada and 91ba in FIG. 23. Further, when the D5 phase stator magnetic pole 907 and the D/5 phase stator magnetic pole 908 are excited, that is, when θr is between 15° and 37.5°, the D5 phase current component Id5 is energized in the direction of the winding symbols indicated by the reference numerals 91de and 23add in FIG. 23. These energization also means that the AD5 phase winding 23ada and 23add are properly used according to the direction of the current. However, the A5 phase current component Ia5 and the D5 phase current component Id5 may be simultaneously supplied to the AD5 phase windings 23ada and 23add. Since both currents flowing through both windings are currents in the same slot, the magnetomotive forces can be canceled electromagnetically. In the case of the configuration of FIG. 19(b), the windings arranged in parallel are energized, but in the case of FIG. 23, since the current flows through the windings on one side, the effective resistance value is doubled and the copper loss is increased. As a countermeasure, a design can be devised so that the cross-sectional area of these two slots is larger than that of the other slots.

Figure 24:
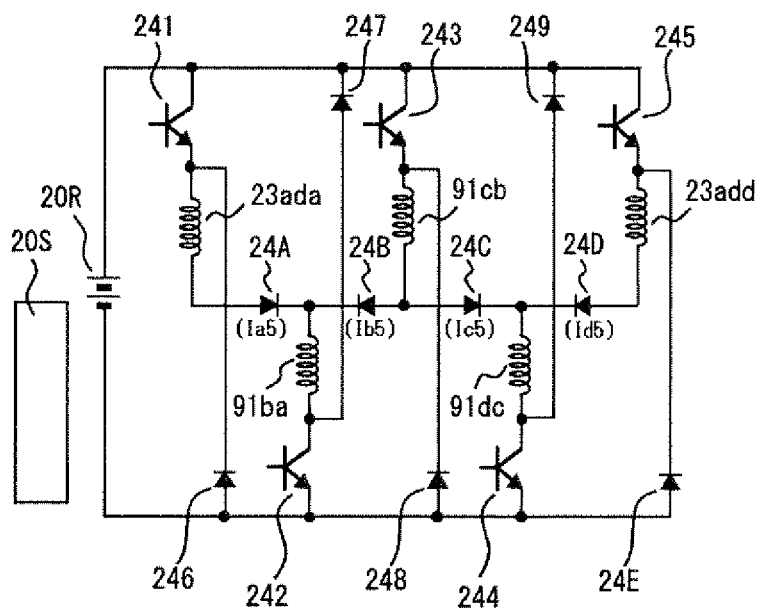
FIG. 24 is an example of a drive circuit and windings according to the present disclosure.

Next, a drive circuit for driving the motor of FIG. 23 is shown in FIG. 24. Each winding has the same code. A transistor 241 energizes the AD5 phase winding 23ada with the A5 phase current component Ia5. The A5 phase current component Ia5 has the current waveform of Ia5 illustrated in FIG. 22. The BA5 phase current Iba5 based on the equation (57) is energized by a transistor 242 to the BA5 phase winding 91ba. This BA5 phase current Iba5 has the current waveform of Iba5 illustrated in FIG. 22. A transistor 243 energizes the CB5 phase winding 91cb with the CB5 phase current Icb5 based on the equation (58). This CB5 phase current Icb5 has the current waveform of Icb5 shown therein in the example of FIG. 22. The DC5 phase current Idc5 based on the equation (59) is energized by a transistor 244 to the DC5 phase winding 91dc. This DC5 phase current Idc5 has the current waveform of Idc5 shown therein in the example of FIG. 22. Similarly, a transistor 245 energizes the AD5 phase winding 23add with the D5 phase current component Id5. This D5 phase current component Id5 also has the current waveform of Id5 shown in the example of FIG. 22.

Here, in FIG. 24, the current Ia5 that energizes the winding 23ada and the current Id5 that energizes the winding 23add have opposite directions of energization, as shown by their winding symbols in FIG. 23. The AD5 phase currents "Ia5" and "−Id5" shown in the equation (56) are currents in the same slot, but are energized separately.

Reference numerals 246, 247, 248, 249, and 24E shown in FIG. 24 indicate regenerative diodes to the power supply. Reference numerals 24A, 24B, 24C, and 24D indicate diodes that prevent reverse conduction. In FIG. 24, for reference, the energizing currents Ia5, Ib5, Ic5, and Id5 are added in parentheses.

Each current based on the equations (56) to (59) is driven by a winding arrangement in which two windings are connected in series from the upper side to the lower side on the paper of FIG. 24. As a result, the voltage across the two windings is simplified as shown in the equations (68) to (71).

Therefore, it is possible to avoid the complicated and excessive voltage problem shown in the equations (64) to (67).

The copper loss in the slot of the motor shown in FIG. 23 will be discussed. Copper loss in 6 slots out of 8 slots can reduce resistance by half compared to the concentrated winding. The copper loss of the remaining 2 slots is equivalent to the resistance value of the concentrated winding. The total copper loss can simply be reduced to 5/8 of the copper loss compared to the concentrated winding. Further, as described above, it can be reduced a little by changing the distribution of the slot cross-sectional area by design.

The motor configuration will now be discussed. The cross section of the in-slot winding and the coil end shown in FIG. 19(b) look complicated, but if the number of pole pairs is 2, one set of windings is arranged in each slot. Therefore, the number of coil ends is also proportional to the number of windings, and the length of the coil ends is also shortened. As shown in FIG. 23, since the winding of the AD5 phase is divided into 23ada and 23add, the motor configuration shown in FIG. 23 is a little more complicated. Each winding has a function of exciting the stator magnetic poles on both sides. Therefore, even when the number of pole pairs is 2, it is not possible to make one set of windings in the slot.

Discuss the configuration of the drive unit. In the configuration of FIG. 21, six transistors are required. Further, the transistor 211 needs a current capacity 1.5 times that of other transistors. The transistor 212 requires only ½ the current capacity. On the other hand, the configuration shown in FIG. 24 is simplified by adopting five transistors. The transistor 241 is dedicated to energizing the current Ia. The transistor 245 is dedicated to energizing the current Id5. Therefore, the current capacity is half that of other transistors. Therefore, in the configuration shown in FIG. 24, the total current capacity is the current capacity of four transistors (transistors 247, Etc.). This current capacity is 4/6=2/3 as compared with FIG. 21, and it is possible to reduce the size and cost.

The combination of the motor shown in FIG. 19(b) and the drive circuit shown in FIG. 21 are compared with the combination of the motor shown in FIG. 23 and the drive circuit shown in FIG. 24. The former is advantageous when the reduction of motor copper loss is emphasized, and the latter is advantageous when the miniaturization of the drive circuit is emphasized. As another modification, a concentrated winding may be used for the winding that excites the D5 phase stator pole 908 and the D/5 phase stator pole 907, and a full pitch winding may be used for the winding that excites the other phases. In that case, only the D5 phase winding can be driven by the half bridge shown in FIG. 5.

The motor shown in FIG. 23 may also be transformed into various modes as described above. Further, when a motor having eight stator magnetic poles and six rotor magnetic poles is configured, it is relatively easy to allow a margin for the time for increasing and decreasing the current in the current control. Further, if the stator magnetic pole width is widened, the average torque can be increased. Thereby, the utilization rate of the winding and the transistor can be improved. Therefore, a well-balanced motor system can be realized in terms of high quality, high efficiency, simplification, and cost reduction.

The configuration of the motor system shown in FIGS. 19 and 20 includes eight stator magnetic poles. The number of magnetic poles may be 12, 16, 20, or the like. In that case, the current of one full pitch winding takes positive and negative values. The drive circuit of these windings can be realized as an extension technique of such a motor system by adding the drive circuits shown in FIGS. 20 and 21 by the number of phases.

Figure 45:
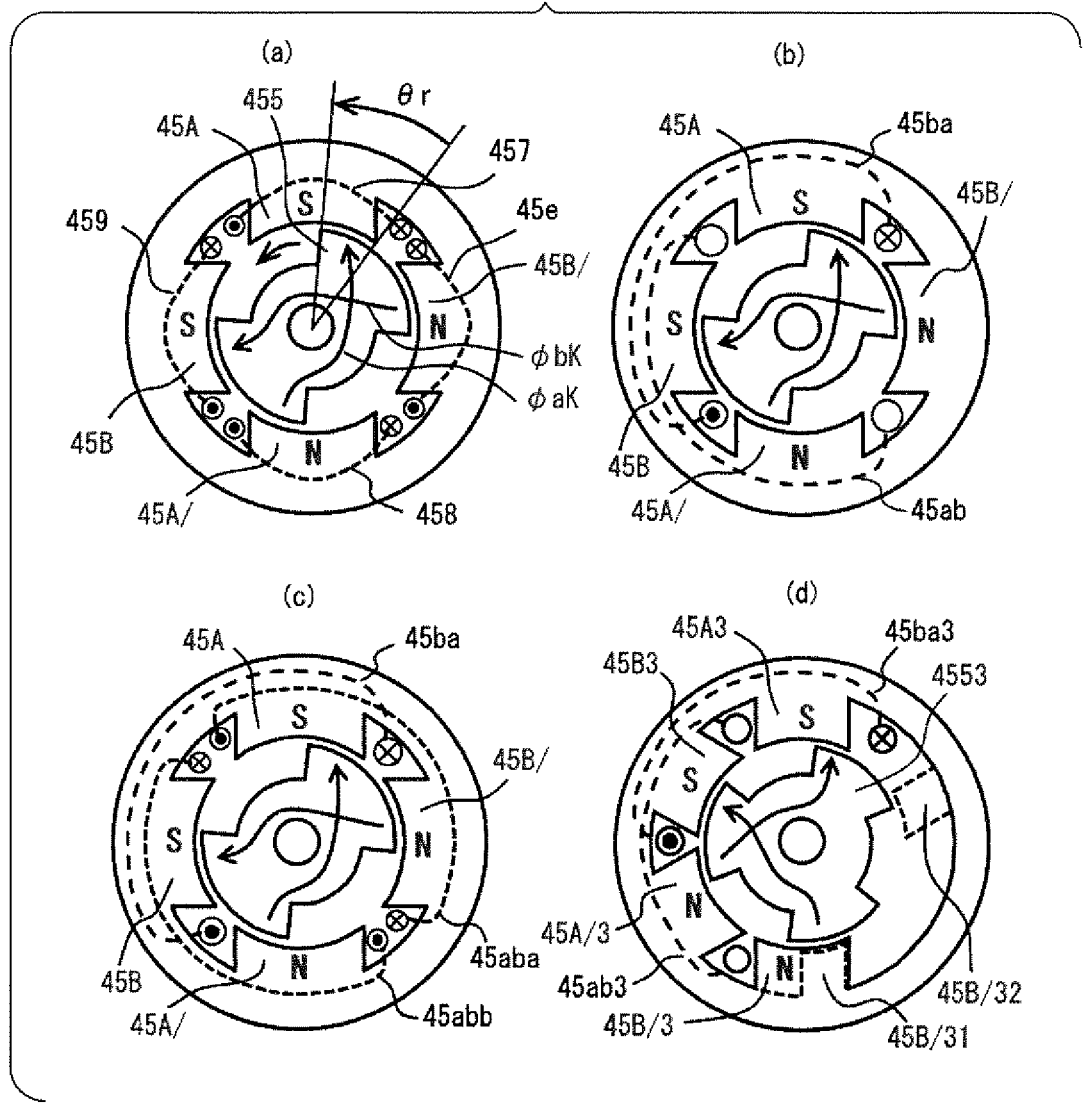
FIG. 45 is a lateral sectional view exemplifying a motor according to the present disclosure.
Figure 53:
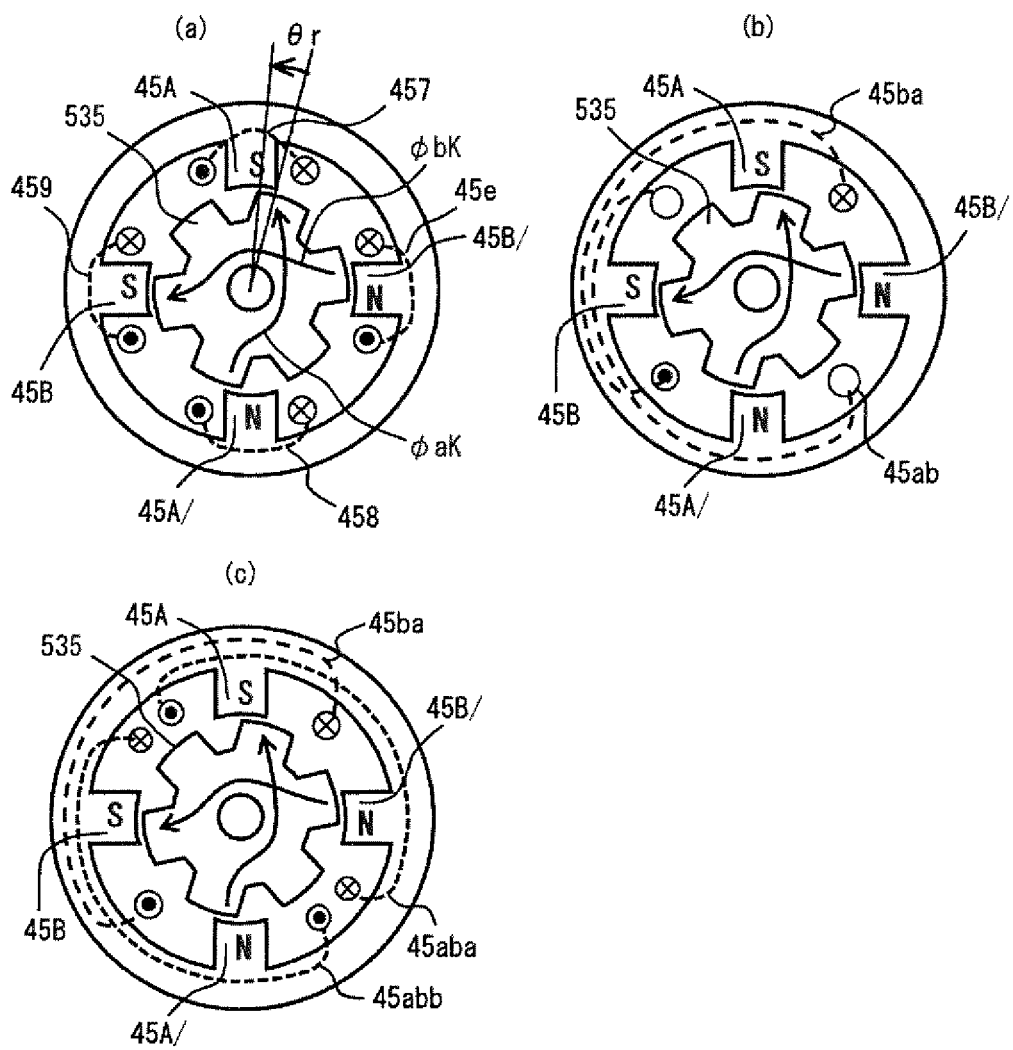
FIG. 53 is a lateral sectional view exemplifying a motor according to the present disclosure.

On the contrary, the number of stator magnetic poles of the reluctance motor shown in FIG. 19 may be reduced to four. Such reluctance motors also exist. Specifically, it is shown in FIGS. 45 and 53, which will be described later. One of these full pitch windings needs to be controlled while changing the current direction to positive and negative values, as in the configuration of FIGS. 19 and 20. In this respect, there are similarities in terms of the control functions shown in FIG. 20. However, in the motor configurations shown in FIGS. 45 and 53, the number of full pitch winding windings is two, and a configuration like a particular solution is adopted. Therefore, the motors shown in FIGS. 45 and 53 will be described later as different configurations.

Thirteenth Embodiment

Next, another embodiment of the mode 1 is shown in the cross-sectional view of FIG. 25 and the drive circuit of FIG. 26.

In the motor configuration according to this embodiment, the number of stator magnetic poles is 10, and the number of rotor magnetic poles is 6. The circumferential width of each magnetic pole is about 18°. In a specific example described later according to this embodiment, the magnetic pole width is exemplified by 24°. In FIG. 25(a), the winding of the motor acts as a concentrated winding. In FIG. 25(b), the winding of the motor is a full pitch winding. For efficient drive, the full pitch winding wound between the two slots is separated into two parallel full pitch windings.

As described above, in the combination of the motor shown in FIG. 2 and the drive circuit shown in FIG. 6, six stator magnetic poles are illustrated. When the number of stator magnetic poles is 6, 10, 14, 18, 22, or the like, the drive circuit shown in FIG. 6 may be increased by the number of phases. Here, an example in which the motor shown in FIG. 25(b) is driven by the circuit shown in FIG. 26 is shown, and this point is similar to the driving method shown in FIG. However, in this example, the utilization rate of the winding is large, the utilization rate of the transistor is large, and the torque ripple is small. That is, an example is shown in which the motor and the inverter can be miniaturized, the cost can be reduced, and the output torque characteristics are high quality.

In FIG. 25(a), a reference numeral 921 indicates an A6 phase stator magnetic pole, and a reference numeral 922 indicates an A6/ phase stator magnetic pole. Reference numeral 251 is an A6 phase winding, and reference numeral 252 is an A6/ phase winding. The total number of turns of both windings Wa6 is Nwa. An A6 phase current Ia6 is passed through the winding Wa6. Let φa6 be the magnetic flux passing through both stator magnetic poles. Reference numeral 923 indicates a B6 phase stator magnetic pole, and reference numeral 924 indicates a B6/ phase stator magnetic pole. Reference numeral 253 indicates a B6 phase winding, and reference numeral 254 indicates a B6/ phase winding. The total number of turns of both windings Wb6 is Nwa. A B6 phase current Ib6 is energized in the winding Wb6. The magnetic flux passing through both stator magnetic poles is φb6.

Reference numeral 925 indicates a C6 phase stator magnetic pole, and reference numeral 926 indicates a C6/ phase stator magnetic pole. Reference numeral 255 indicates a C6 phase winding, and reference numeral 256 indicates a C6/ phase winding. The total number of turns of both windings Wc6 is Nwa. A C6 phase current Ic6 is energized in this winding Wc6. The magnetic flux passing through both stator magnetic poles is φc6. Reference numeral 927 indicates a D6 phase stator magnetic pole, and reference numeral 928 indicates a D6/ phase stator magnetic pole. Reference numeral 257 indicates a D6 phase winding, and reference numeral 258 indicates a D6/ phase winding. The total number of turns of both windings Wd6 is Nwa. A D6 phase current Id6 is energized in this winding Wd6. The magnetic flux passing through both stator magnetic poles is φd6. Reference numeral 929 indicates an E6 phase stator magnetic pole, and reference numeral 92A indicates an E6/ phase stator magnetic pole. Reference numeral 259 indicates an E6 phase winding, and reference numeral 25A indicates an E6/ phase winding. The total number of turns of both windings We6 is Nwa. The E6 phase current Ie6 is energized in this winding We6. Let φe6 be the magnetic flux passing through both stator magnetic poles. The current direction of each winding is indicated by the current symbol of each winding.

In the configuration shown in FIG. 25(c), the concentrated winding shown in FIG. 25 (a) is changed to a full pitch winding. Since the drive circuit shown in FIG. 26 drives two windings of the same phase, the configuration shown in FIG. 25(b) will be described first.

In FIG. 25 (b), like the two parallel full pitch windings shown in FIG. 2, the full pitch winding wound between the two slots is changed to two parallel full pitch windings. It is divided. That is, the two-divided full pitch winding that is wound as shown by reference numeral 25B to reference numeral 25M is an AC6 phase winding, and has coil end portions 27ac1 and 27ac2 thereof. In the display of the coil end portion, the two windings are represented by a double broken line in order to avoid complication in the figure. The number of turns of both windings is Nwa/2, and the currents Iac1 and Iac2 are supplied to the respective windings, respectively. The values of both currents are the same, and the sum of both currents forms the AC6 phase current Iac6. Further, the stator magnetic pole and the magnetic flux passing through are the same or similar as or to those shown in FIG. 25 (a).

Similarly, reference numerals 27bd1 and 27bd2 constitute a BD6 phase winding. Currents Ibd1 and Ibd2 are supplied to each winding, respectively. The values of both currents are the same, and the sum of them forms the BD6 phase current Ibd6. Reference numerals 27ce1 and 27ce2 constitute a CE6 phase winding. Ice1 and Ice2 are supplied to each winding. The values of both currents are the same, and the sum of them forms the CE6 phase current Ice6. Reference numerals 27da1 and 27da2 constitute DA6 phase windings. Currents Ida1 and Ida2 are supplied to each winding, respectively. The values of both currents are the same, and the sum of them forms the DA6 phase current Ida6. Reference numerals 27eb1 and 27eb2 constitute an EB6 phase winding, and currents Ieb1 and Ieb2 are supplied to the respective windings, respectively. The values of both currents are the same, and the sum of them forms the EB6 phase current Ieb6. The number of turns of these windings is Nwa/2.

Similarly, of the full pitch winding windings wound in parallel shown in FIG. 25(b), the current supplied to one winding and the current supplied to the virtual concentrated winding are related by the following equation.

$$Iac6=Ia6+Ic6 \tag{72}$$

$$Ibd6=Ib6+Id6 \tag{73}$$

$$Ice6=Ic6+Ie6 \tag{74}$$

$$Ida6=Id6+Ia6 \tag{75}$$

$$Ieb6=Ie6+Ib6 \tag{76}$$

The voltages Va6, Vb6, Vc6, Vd6, and Ve6 of the concentrated windings Wa6, Wb6, Wc6, Wd6, and We6 shown in FIG. 25(a) are given by the following equations.

$$Va6=Nwa \times d(\varphi a6)/dt \tag{77}$$

$$Vb6=Nwa \times d(\varphi b6)/dt \tag{78}$$

$$Vc6=Nwa \times d(\varphi c6)/dt \tag{79}$$

$$Vd6=Nwa \times d(\varphi d6)/dt \tag{80}$$

$$Ve6=Nwa \times d(\varphi e6)/dt \tag{81}$$

The voltages Vac6, Vbd6, Vce6, Vda6, and Veb6 of the full pitch winding windings 27ac1, 27bd1, 27ce1, 27da1, and 27eb6 shown in FIG. 25(b) are given by the following equations from the direction of each magnetic flux. There are two sets of full pitch windings in each slot, but they have the same voltage.

$$Vac6=Nwa/2 \times d(\varphi a6+\varphi b6+\varphi c6-\varphi d6-\varphi e6)/dt \tag{82}$$

$$Vbd6=Nwa/2 \times d(-\varphi a6+\varphi b6+\varphi c6+\varphi d6-\varphi e6)/dt \tag{83}$$

$$Vce6=Nwa/2 \times d(-\varphi a6-\varphi b6+\varphi c6+\varphi d6+\varphi e6)/dt \tag{84}$$

$$Vda6=Nwa/2 \times d(\varphi a6-\varphi b6-\varphi c6+\varphi d6+\varphi e6)/dt \tag{85}$$

$$Veb6=Nwa/2 \times d(\varphi a6+\varphi b6-\varphi c6-\varphi d6+\varphi e6)/dt \tag{86}$$

An example is a method of connecting two full pitch winding windings arranged on both sides of a one-phase stator magnetic pole in the circumferential direction in series. In the case of this example, those two full pitch windings are oriented in opposite directions. Therefore, if these two windings are connected in series with each other, the voltage components caused by the magnetic flux components of the other phases are always canceled out. This relationship is expressed by the following equations.

$$Vac6+Vda6=Nwa \times d(\varphi a6)/dt=Va6 \tag{87}$$

$$Vbd6+Veb6=Nwa \times d(\varphi b6)/dt=Vb6 \tag{88}$$

$$Vce6+Vac6=Nwa \times d(\varphi c6)/dt=Vc6 \tag{89}$$

$$Vda6+Vbd6=Nwa \times d(\varphi d6)/dt=Vd6 \tag{90}$$

$$Veb6+Vce6=Nwa \times d(\varphi e6)/dt=Ve6 \tag{91}$$

On the contrary, for example, the AC6 phase current Iac6 based on the equation (72) has an electromagnetic effect on all the stator magnetic poles. The reason is that the voltage Vac6 of the AC6 phase winding Wac6 depends on the equation (82). However, here, if the A6 phase current component Ia6 of the formula (72) and the A6 phase current component Ia6 of the formula (75) are energized, the stator magnetic pole of the A6 phase can be selectively excited, and both of the above can be excited. The electromagnetic effect of the A6 phase current component Ia6 on other stator magnetic poles can be offset. The current relationship of equations (72) to (76) and the voltage relationship of equations (87) to (91) have similar interphase relationships.

Next, the configuration when the current is supplied to each of the two sets of full pitch winding windings mounted on the motor shown in FIG. 25(b) will be described using the drive circuit shown in FIG. 26. These configurations and operations are the same as the method of driving the motor shown in FIG. 2 by the circuit shown in FIG. 6 except for the difference in the number of phases. In FIG. 26, reference numeral 27S indicates a control circuit that controls the entire drive circuit, and reference numeral 27R indicates a DC voltage source.

In the drive circuit shown in FIG. 26, reference numeral 261 is a transistor that energizes the AC6 phase current Iac1 to the AC6 phase winding 27ac1. Reference numeral 266 is a transistor that energizes the AC6 phase current Iac2 to the AC6 phase winding 27ac2. Reference numeral 262 is a transistor that energizes the CE6 phase current Ice1 to the CE6 phase winding 27ce1. Reference numeral 267 is a transistor that energizes the CE6 phase current Ice2 to the CE6 phase winding 27ce2. Reference numeral 263 is a transistor that energizes the EB6 phase current Ice1 to the EB6 phase winding 27eb1. Reference numeral 268 is a transistor that energizes the EB6 phase current Ice2 to the EB6 phase winding 27eb2. Reference numeral 264 is a transistor that energizes the BD6 phase current Ibd1 to the BD6 phase winding 27bd1. Reference numeral 269 is a transistor that energizes the BD6 phase current Ibd2 to the BD6 phase winding 27bd2. Reference numeral 265 is a transistor that energizes the DA6 phase current Ida1 to the DA6 phase winding 27da1. Reference numeral 26A is a transistor that energizes the DA6 phase current Ida2 to the DA6 phase winding 27da2.

The diodes 26M, 26N, 26P, 26Q, 26R, 26S, 26T, 26U, 26V, and 26W placed between the windings are diodes for reducing voltage interference between the windings. 26B, 26C, 26D, 26E, 26F, 26G, 26H, 26J, 26K, 26L are diodes that regenerate energy to the DC voltage source 27R.

Next, FIG. 27 illustrates a time chart of the voltage waveform and the current waveform when driving the motor of FIG. 25 (b). In the example of the time chart shown in FIG. 27, the stator magnetic pole width and the rotor magnetic pole width are set to, for example, 24° in terms of electric angle in order to drive the motor of FIG. 25 (b) more efficiently. In the present invention, the number of stator magnetic poles of the motor, the circumferential width of the stator magnetic poles and their shapes, the number of rotor magnetic poles, and the circumferential width of the rotor magnetic poles and their shapes can be appropriately selected depending on the driving conditions.

The horizontal axis of FIG. 27 indicates the time t, and indicates a state of rotating in the CCW direction at a constant rotation speed. The rotor rotation angle position θr is shown at the bottom of FIG. 27. The rotor rotation angle position θr is shown in FIG. 25 (a). Va6 in FIG. 27 shows the voltage induced in the concentrated winding Wa6 assuming the following energized state. The assumed energized state at this time is the continuous rated current in the concentrated windings 921 and 922 of the A6 phase and A6/ phase stator poles 901 and 902 shown in FIG. 25 (a), that is, the A6 phase winding Wa6. It refers to a state in which an A5 current Ia5 having the same magnitude is supplied. This makes it possible to confirm the relative positional relationship between the A6 phase and A6/ phase stator magnetic poles 901 and 902 and the rotor magnetic poles. At this time, the magnetic flux density of the portion where the stator magnetic poles 921 and 922 and the rotor magnetic poles face each other is a value close to 2.0 [T], which is the saturation magnetic flux density of the soft magnetic material.

Further, the induced voltages Vb6, Vc6, Vd6, and Ve6 in the other phases are also voltage waveforms for confirming the relative positional relationship between the stator magnetic pole and the rotor magnetic pole of each phase in the same manner.

Next, the current waveform of each phase when the motor shown in FIG. 25(a) generates the torque in the CCW direction is shown. The A6 phase current Ia6 of the concentrated winding can generate torque in the CCW direction from the waveform of the induced voltage Va6 by energizing in the θr range of 0° to 24°. The period of the current Ia6 is 60° because the number of rotor magnetic poles is 6.

Similarly, the B6 phase current Ib6 exhibits a current waveform whose phase is delayed by 12° from the A6 phase current Ia6. The C6 phase current Ic6 exhibits a current waveform whose phase is delayed by 24° from the A6 phase current Ia6. The D6 phase current Id6 exhibits a current waveform whose phase is 3° behind the A6 phase current Ia6. The E6 phase current Ie6 exhibits a current waveform whose phase is 48° behind the A6 phase current Ia6.

Next, from the above current waveform, a waveform of the phase current supplied to the full pitch winding shown in FIG. 25 (b) is created. Since the AC6 phase current Iac6 is based on the equation (72), the waveforms of the currents Iac6 shown in FIG. 27 can be obtained by adding the current waveforms of both currents Ia6 and Ic6. The other phases also obtain the currents Ibd6, Ice6, Ida6, and Ieb6 shown in FIG. 27 from the equations (73) to (76), respectively.

Next, the operation when each full pitch winding is excited by the above-mentioned phase current will be described using the drive circuit shown in FIG. For example, the AC6 phase windings 27ac1 and 27ac2 are windings wound in parallel. In this case, the AC6 phase currents Iac1 and Iac2 that energize each winding are ½ of the currents Iac6 shown in Eq. (72) and FIG. 27, respectively. The same applies to the currents of the other phases. For reference, the name of the current flowing through each winding in FIG. 26 is added.

From the current waveform shown in FIG. 27, the values of AC6 phase current Iac6, CE6 phase current Ice6, DA6 phase current Ida6, and EB6 phase current Ieb6 are 1.0 in the range where the rotor rotation angle position θr is 0° to 12°. However, the BD6 phase current Ibd6 is 0.

Therefore, in the range of θr=0° to 12°, no current is supplied to the BD6 phase windings 27bd1 and 27bd2 shown in FIG. 26. In FIG. 26, the AC6 phase current Iac1 is energized from the transistor 261 to the AC6 phase winding 27ac1. This current flows through the diode 26M to the DA6 phase winding 27da2 as the DA6 phase current Ida2, and flows to the power supply negative electrode via the transistor 26A. As a result, the above-mentioned current 0.5 is energized in series. Similarly, in parallel, the DA6 phase current Ida1 flows from the transistor 265 to the DA6 phase winding 27da1 and flows as the AC6 phase current Iac2 to the AC6 phase winding 27ac2 via the diode 26S. This current returns to the power supply via the transistor 266. As a result, the above-mentioned current 0.5 is energized in series. In this case, these currents are also components of the A6 phase current Ia6 shown in FIG. 26.

Similarly, in parallel with the above operations, the EB6 phase current Ieb1 flows from the transistor 263 of FIG. 26 to the EB6 phase winding 27eb1. This current passes through the diode 26P, flows through the CE6 phase winding 27ce1 as the CE6 phase current Ice1, and returns to the power supply via the transistor 262. As a result, the above-mentioned current 0.5 is energized in series. Similarly, in parallel with this, the CE6 phase current Ice2 flows from the transistor 267 to the CE6 phase winding 27ce2, and flows as the EB6 phase current Ieb2 to the EB6 phase winding 27eb2 via the diode 26U. This current returns to the power supply via the transistor 268. As a result, the above-mentioned current 0.5 is energized in series. In this case, these currents are also components of the E6 phase current Ie6 in FIG. 26.

Next, in FIG. 27, in the range where the rotor rotation angle position θr is 12° to 24°, the values of the AC6 phase current Iac6, the BD6 phase current Ibd6, the DA6 phase current Ida6, and the EB6 phase current Ieb6 are 1.0. Further, the CE6 phase current Ice6 is 0.

In this range, as can be seen from FIG. 26, the CE6 phase windings 27ce1 and 27ce2 are not excited. Transistors 262 and 267 are off. In this case, from the result of the above examination, the value of all the currents passing through the other transistors and the other windings is 0.5. Here, the energizing current of the transistor also includes the flywheel current of the winding that is the target of the current drive.

In FIG. 27, in the range where the rotor rotation angle position θr is 24° or later, the same operation as described above is performed for each range according to the current value of each phase. As a result, the two directly connected windings of interest are sequentially excited for each range by energizing in series. Therefore, the torque in the CCW direction is continuously output to rotate the rotor in the CCW direction. In the current waveform and voltage waveform of FIG. 27 and the circuit operation of FIG. 26, the time of increase and decrease of the current of each phase is ignored and set to 0. This is to explain the regenerative operation of magnetic energy with a simplified model.

As described above, the reluctance motor shown in FIG. 25 having the number of stator magnetic poles=10 and the number of rotor magnetic poles=6 and adopting full pitch winding windings is driven by a drive circuit (FIG. 26) with a drive current (FIG. 27). An example of operating based on such conditions has been described. Consider from the viewpoint of utilization rate. Compared with the case where the conventional surface permanent magnet type three-phase AC synchronous motor SPMSM is driven by so-called 120° energization, the winding utilization rate is 67% from the viewpoint of energizing each winding. The winding utilization rate of the motor of the present invention shown in FIG. 25 is 80%, which is 20% superior to the 120° energization of SPMSM. When this utilization rate is converted, the copper loss of the motor can be reduced by 20%, and the motor efficiency can be improved.

The drive circuit of this SPMSM usually uses six transistors, and can supply power to the motor from the power supply through only one path. Therefore, the transistor utilization rate is 33%, which is ⅔. In the case of the drive circuit of FIG. 26, since eight of the ten transistors are always used for energization, electric power is supplied to the motor from the power supply through four paths. Therefore, the transistor utilization rate of the drive circuit of the present invention is 80%. By comparison, 80/33=2.4, the total current capacity of the transistor can be reduced to 1/2.4=0.417, and the inverter size can be reduced to less than half.

From the viewpoint of noise and vibration, as can be seen from the driving current example of FIG. 27, torque is always continuously generated at 80% of the windings, and high-quality torque with smaller torque ripple can be generated.

In the case of this example, there is a problem that the coil end length becomes large, but if the number of pole pairs is 2 or more, the coil end length can be shortened. In the case of the two-pole pair configuration, in FIG. 25(b), the problem of arranging two sets of full pitch winding windings in each slot and complicating them can be solved. Further, the problem of coil end length and the problem of complication can be reduced by adopting the annular winding and combining the motor, which will be described later. The number of transistors in the drive circuit shown in FIG. 26 increases to 10, but this is not a major problem. A circuit example of this simplification will be described later.

Next, in the case of the motor of FIG. 25(b), it will be described that the number of pole pairs can be increased, such as a two-pole pair. An example in which the motor shown in FIG. 2 is deformed into a pair of two poles and transformed into the configuration of FIG. 15 has already been shown. Similarly, the motor of FIG. 25 (b) can be transformed into a two-pole pair.

Multi-poles such as 2-pole pair, 3-pole pair, 4-pole pair, etc. are very common motor technologies. This multi-polarization generally has the effect of shortening the coil end length of the full pitch windings, reducing its volume, and reducing the thickness of the back yoke of the stator to reduce the size of the motor. Further, in the case of the motor of FIG. 25 (b), each full pitch winding was divided into two in order to adapt to the drive circuit of FIG. 26.

Therefore, as in the case of FIG. 15, a motor in which the configuration shown in FIG. 25 (b) is paired with two poles can be configured. That is, a total of 10 winding configurations are provided, with 2 full pitch windings for each phase. As a result, it is not necessary to divide the full pitch windings of each slot into two, and the winding can be simplified. In the description of the present invention, a one-pole pair model is described with priority given to ease of explanation. However, in practice, it is often the case that the motor configuration has two or more pole pairs. As the number of pole pairs increases, the thickness of the back yoke of the stator can be reduced, and as a result, the torque and output of the motor can be increased.

As described above, in the description of the present invention, the one-pole pair model is described with priority given to ease of description, and in FIGS. 2, 8, 25, and 30, full pitch windings are used. The configuration described in parallel was explained. However, since these parallel windings have a large mutual inductance, if the leakage inductance of both windings is small, the currents of both windings may become unbalanced, so care must be taken. It is effective not only to accurately control each current, but also to detect unbalanced current components and/or to detect unbalanced components of magnetic flux as necessary to reduce those unbalanced components.

Next, a configuration will be described in which the motor of FIG. 25(b) is replaced with an annular winding in the shape of a so-called toroidal winding. An example of transforming the motor of FIG. 2 into an annular winding and transforming it into the configuration of FIG. 16 has already been shown. Similarly, an annular winding can be adopted for the motor shown in FIG. 25 (b). A winding space on the outer side of the back yoke is required, and there is also a material problem of the conducting wire. However, since the coil end between the slots is not required, it is an advantageous configuration when the motor diameter is large and a thin motor shape is required.

Next, the motor shown in FIG. 25(b) may be a composite motor in which the two motors are integrally incorporated. An example in which the motor of FIG. 2 is combined and deformed as shown in the configuration of FIG. 18 has already been shown. Similarly, the motor shown in FIG. 25(b) can be combined into two motors.

In the case of the configuration of FIG. 18, two motors are arranged on the inner diameter side and the outer diameter side, and the windings are an inner diameter side winding and an outer diameter side winding as an annular winding. Therefore, both windings can be effectively and effectively utilized, and the coil end length at the end in the rotor axial direction of the motor can be significantly shortened. Although there are some modes where the inner diameter side of the motor can be used effectively, the diameter of the motor tends to be large due to the design.

Although not shown, the combination of motors can be realized in the rotor axial direction. In that case, the effects of effective utilization of each winding and shortening of the coil end length can be obtained, and the optimization of the motor diameter is relatively easy, which is excellent in principle. However, since there is a portion where the direction of the magnetic flux is directed toward the rotor axis, inconvenience occurs in terms of iron loss and the like only with the axially laminated structure of the electromagnetic steel sheet. It is desirable to enable magnetic flux propagation in three dimensions, such as by partially using a dust core. Further, it is technically possible to combine the motors in both the radial direction and the rotor axial direction of the motor.

Fourteenth Embodiment

Figure 28:
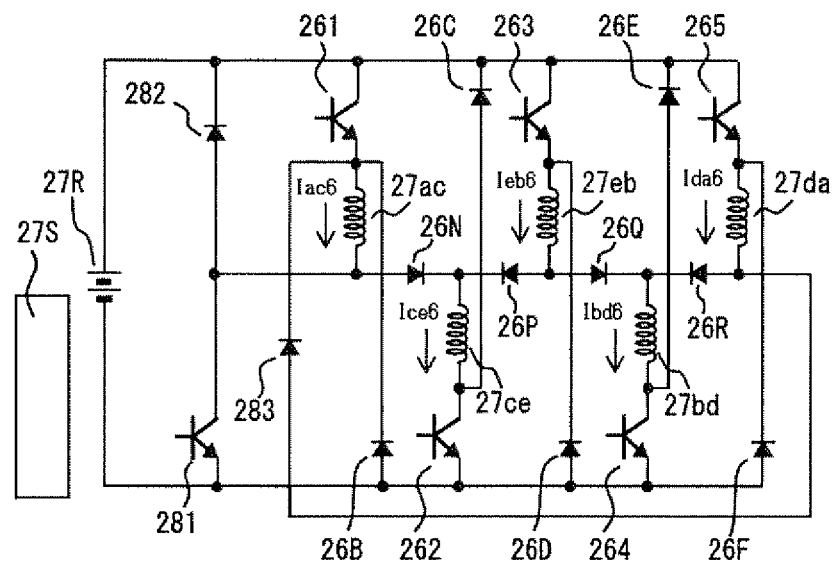
FIG. 28 exemplifies a drive circuit and windings according to the present disclosure.

Next, another embodiment of the mode 1 is shown in FIG. 28. This is a simplified example of the drive circuit of FIG. 26. The method is the same except that the drive circuit of FIG. 6 is simplified to the drive circuit of FIG. 7 and the number of windings is increased from 3 to 5. FIG. 28 shows a configuration in which the five transistors and windings on the right side are removed from the paper of FIG. 28, and all the node windings of each phase are integrated from two parallel windings into one. Then, the transistor 281 and the diodes 282 and 283 are added. The AC6 phase windings 27ac1 and 27ac2 of FIG. 26 are integrated into 27ac. The CE6 phase windings 27ce1 and 27ce2 are integrated into 27ce. The EB6 phase windings 27eb1 and 27eb2 are integrated into 27eb. The BD6 phase windings 27bd1 and 27bd2 are integrated into 27bd. The DA6 phase windings 27da1 and 27da2 are integrated into 27da. The winding of the motor of FIG. 25 (b) is also integrated in the same manner, and has the configuration of the full pitch windings of FIG. 25 (c).

In the drive circuit of FIG. 28, of the DA6 phase current Ida6 based on the formula (75) passing through the DA6 phase winding 27da, the A6 phase current component Ia6 is energized from the transistor 265 to 27da, passes through the diode 283, and is AC6 phase wound. The wire 27ac is energized and driven by the transistor 281. Other circuit operations are approximately the same as those in FIG. 26. In the drive circuit of FIG. 28, the transistor 281 and the diodes 282 and 283 are added to compensate for the circuit asymmetry, so that the total current capacity of the simple logical transistor is increased from that of FIG. 26. However, the number of elements in the entire drive circuit can be significantly reduced and simplified.

Fifteenth Embodiment

Figure 29:
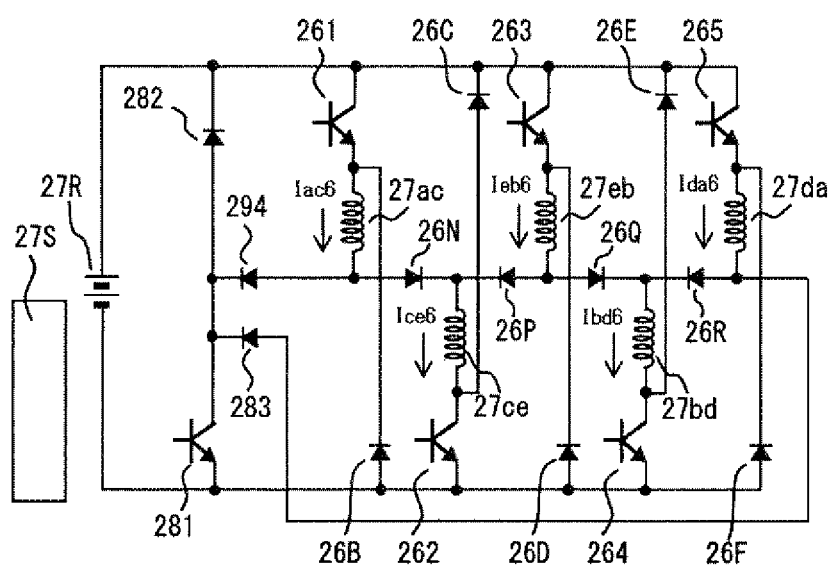
FIG. 29 exemplifies a drive circuit and windings according to the present disclosure.

Next, another embodiment of the mode 1 is shown in FIG 29. This is a simplified example of the drive circuit of FIG. 26. A diode 294 is added to FIG. 28, and the connection destination of the diode 283 is changed from the emitter of the transistor 261 to the collector of the transistor 281. Further, the method is the same except that the drive circuit of FIG. 6 is simplified to the drive circuit of FIG. 85 and the number of windings is increased from 3 to 5.

In the drive circuit of FIG. 29, of the DA6 phase current Ida6 of the formula (75) passing through the DA6 phase winding 27da, the A6 phase current component Ia6 is energized from the transistor 265 to the winding 27da, passes through the diode 283, and is passed through the transistor. It is driven by 281. Further, of the AC6 phase current Iac6 based on the equation (72) passing through the AC6 phase winding 27ac, the A6 phase current component Ia6 also passes through the diode 294 and is driven by the transistor 281. Other circuit operations are approximately the same as those in FIG. 8. In the drive circuit of FIG. 29, a transistor 281 and a diode 282 and 294 are added to compensate for the circuit asymmetry. Further, in FIG. 29, since the transistor 281 energizes the double A6 phase current component Ia6, the current capacity is increased. As a result, the total current capacity of the simple logical transistor will increase from FIG. 26. However, the number of elements in the entire drive circuit can be significantly reduced and simplified.

The embodiment of the mode 1 has been described above. In order to improve efficiency, quality, miniaturization, weight reduction, and cost reduction of motors and drive circuits, several technologies are used in combination to obtain effects. Their functions, actions, and effects will be described together. One of the technologies is a common winding technology, in which the current energizing the winding of a slot can excite the stator magnetic poles on both sides of the slot in the circumferential direction at different occasions. It is possible to share the winding with a full pitch winding or an annular winding, and the utilization rate of the winding and the utilization rate of the transistor for driving the winding can be doubled.

One of the other techniques is that it is not affected by an excessive voltage due to the interlinkage magnetic flux of the other phase, and the windings WXY on both sides of the stator magnetic pole STXY are connected in series. Further, the current component Ixy that energizes these two series windings can selectively excite only the corresponding stator magnetic pole STXY. The current component Ixy does not have an electromagnetic effect on the stator magnetic poles other than the stator magnetic pole STXY. It is the relationship of equations (82) to (91).

One of the other techniques is to continuously satisfy the two conditions of sharing the winding and connecting the two corresponding windings in series as shown in FIG. 26. Two phase current components are energized in each winding as shown in equations (72) to (76). Since it is a full pitch winding, two phase current components can be superimposed.

One of the other techniques is to limit the current of each winding in one way to simplify the drive circuit. In the case of direct current control, one transistor can control one current. It is also excellent that voltage separation and insulation can be easily performed with a diode. Further, the above-mentioned winding common technology compensates for the restriction that a negative current cannot flow. The magnetic flux passing through each stator magnetic pole is also limited to the magnetic flux in one direction, but this point can also be changed to the advantage that the permanent magnet can be effectively used, as will be described later.

One of the other technologies is a drive technology based on a square wave voltage and a square wave current, so that the power supply voltage can be effectively used. Further, the number of stator magnetic poles, the number of rotor magnetic poles, the magnetic pole width, the magnetic pole shape, and the like can be selected according to the application and specifications.

One of the other technologies can be driven without the use of permanent magnets. It is attractive, especially for applications that require low cost. Further, as will be shown later, permanent magnets can be effectively used, and a surface magnet type rotor can also be realized.

Sixteenth Embodiment

Figure 30:
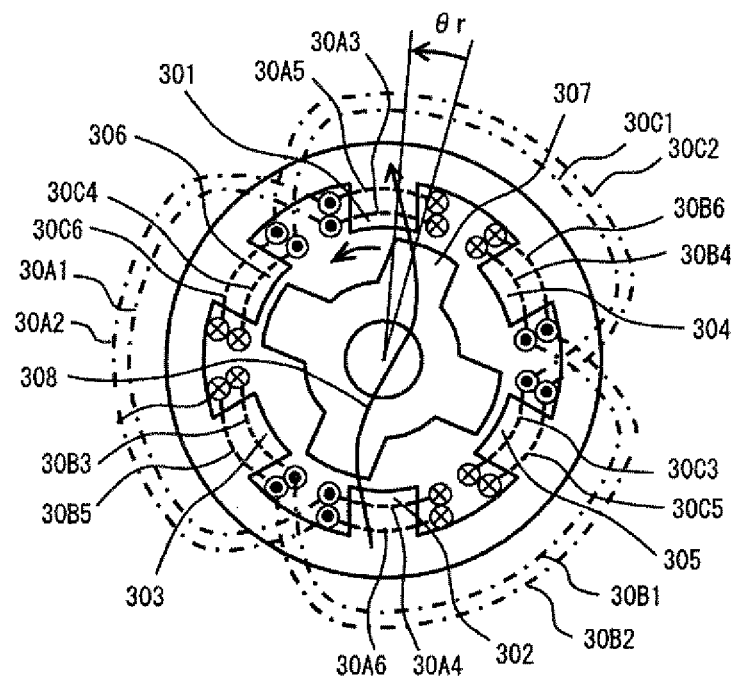
FIG. 30 is a lateral sectional view exemplifying a motor according to the present disclosure.
Figure 31:
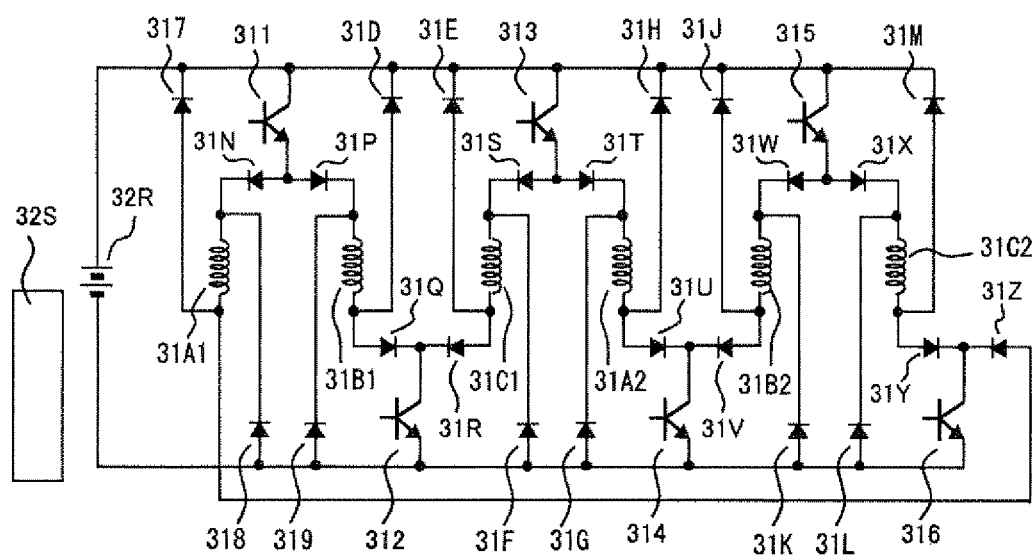
FIG. 31 exemplifies a drive circuit and windings according to the present disclosure.

Next, the embodiment of the mode 2 is shown in FIGS. 30, 31 and the like. This is a method of simplifying and downsizing the drive circuit by driving the concentrated winding windings shown in FIGS. 83 and 30 in common with a transistor. 301 in FIG. 30 is an A7 phase stator magnetic pole, and 302 is an A7/ phase stator magnetic pole. A7 phase concentrated winding windings 30A3 and 30A5, which are divided into two, are wound around the A7 phase stator magnetic pole 301. A7/ phase concentrated winding windings 30A4 and 30A6 divided into two are wound around the A7/ phase stator magnetic pole 302. The A7 phase concentrated winding 30A3 is connected in series with the A7/ phase concentrated winding 30A4 via the connecting wire 30A1 and energizes ½ of the A7 phase current Ia7. The A7 phase concentrated winding 30A5 is connected in series with the A7/ phase concentrated winding 30A6 via the connecting wire 30A2, and the remaining ½ of the A7 phase current Ia7 is energized.

Similarly, the B7 phase concentrated winding 30B3 wound around the B7 phase stator magnetic pole 303 is connected in series with the B7/ phase concentrated winding 30B4 wound around the B7/ phase stator magnetic pole 304 via the connecting wire 30B1. Then, ½ of the B7 phase current Ib7 is supplied. The B7 phase concentrated winding 30B3 is connected in series with the B7/ phase concentrated winding 30B6 via the connecting wire 30B2, and the remaining ½ of the B7 phase current Ib7 is supplied.

Similarly, the C7 phase concentrated winding 30C3 wound around the C7 phase stator magnetic pole 305 is connected in series with the C7/ phase concentrated winding 30C4 wound around the C7/ phase stator magnetic pole 306 via the connecting wire 30C1. Then, ½ of the C7 phase current Ic7 is energized. The C7 phase concentrated winding 30C5 is connected in series with the C7/ phase concentrated winding 30C6 via the connecting wire 30C2, and the remaining ½ of the C7 phase current Ic7 is energized. Note that 307 in FIG. 30 is one of the rotor magnetic poles, and the configuration of each stator magnetic pole in FIG. 30 and the magnetic circuit of each rotor magnetic pole is the same as those in FIGS. 83, 1 and the like.

FIG. 31 is an example of a drive circuit that energizes each winding of FIG. When the motor of the full pitch windings of FIG. 2 was driven by the circuit of FIG. 6, the winding in which the stator magnetic pole was located was connected in series and driven. Then, the phase current components of the phases of the two stator magnetic poles adjacent to each winding were superimposed and energized as in the equations (1), (2), and (3). The purpose of the configuration is to reduce the influence of the magnetic fluxes of the other phases in which the windings are interlinked, and to selectively excite a specific stator magnetic pole without affecting the other phases by the magnetomotive force. It can be said that each transistor and each winding share the current components of the two phases and are energized. It was shown that the utilization rate can be improved by sharing twice, the copper loss of the winding can be significantly reduced, and the drive circuit can be significantly miniaturized.

On the other hand, the concentrated windings of FIG. 30 are a structurally wound excitation winding dedicated to the stator magnetic pole, and is not affected by the magnetic flux of other phases. Since it is a DC-excited motor, as shown in FIG. 6, each transistor in FIG. 31 can share the currents of the two phases and energize. By arranging and connecting the windings in parallel in the drive circuit of FIG. 31, the utilization rate can be improved by sharing each transistor as shown in FIG. 6, and the drive circuit can be significantly downsized . . . . Although the windings of FIGS. 30 and 31 cannot be shared, the copper loss can be significantly reduced by the slot cross-sectional area enlargement technique described later. In addition, the concentrated winding has good manufacturability, a high winding space factor, and a small coil end length. Therefore, the motor of FIG. 2 and the drive circuit of FIG. 6 and the motor of FIG. 30 and the drive circuit of FIG. 31 have their own characteristics.

A reference numeral 32S in FIG. 31 shows a control circuit for the entire drive circuit, and a reference numeral 32R shows a DC voltage source. The winding 31A1 of FIG. 31 shows the A7 phase concentrated winding 30A3 of FIG. 30, the connecting wire 30A1 and the A7/ phase concentrated winding 30A4, and Ia7/2, which is ½ of the A7 phase current, is energized. The winding 31B1 of FIG. 31 shows the B7 phase concentrated winding 30B3 of FIG. 30, the connecting wire 30B1 and the B7/ phase concentrated winding 30B4, and Ib7/2, which is ½ of the B7 phase current, is energized. Reference numerals 31N and 31P show diodes that prevent conduction in opposite directions. Reference numerals 317, 318, 319, and 31D are regenerative diodes. The transistor 311 supplies electric power related to the currents Ia7/2 and Ib7/2 to the windings 31A1 and 31B1. When PWM control or the like is performed and the current of each winding is regenerated or the flywheel is energized, the windings are naturally energized, but there is a time zone in which the transistor 311 is not energized. Further, the transistor 311 is similar to the transistor 61 of FIG. 6 supplying the power of Iab1=Iab/2=(Ia+Ib)/2 and energizing the current.

Similarly, the winding 31C1 of FIG. 31 shows the C7 phase concentrated winding 30C3 of FIG. 30, the connecting wire 30C1 and the C7/ phase concentrated winding 30C4, and Ic7/2, which is ½ of the C7 phase current, is supplied thereto. The transistor 312 supplies electric power related to the currents Ib7/2 and Ic7/2 to the windings 31B1 and 31C1. Further, the transistor 312 is similar to the transistor 63 of FIG. 6 supplying the power of Ibc1=Ibc/2=(Ib+Ic)/2 and energizing the current. 31Q, 31R, 31S, 31T, 31U, 31V, 31W, 31X, 31Y, and 31Z are diodes that prevent conduction in the opposite direction. 31E, 31F, 31G, 31H, 31J, 31K, 31L and 31M are regenerative diodes.

Similarly, the winding 31A2 of FIG. 31 shows the A7 phase concentrated winding 30A5 of FIG. 30, the connecting wire 30A2 and the A7/ phase concentrated winding 30A6, to which the remaining ½ of the A7 phase current, which is Ia7/2, is supplied. The transistor 313 supplies electric power related to the currents Ic7/2 and Ia7/2 to the windings 31C1 and 31A2.

Similarly, the winding 31B2 of FIG. 31 shows the B7 phase concentrated winding 30B5 of FIG. 30, the connecting wire 30B2 and the B7/ phase concentrated winding 30B6, to which the remaining ½ of the B7 phase current, which is Ib7/2, is supplied. The transistor 314 supplies electric power related to the currents Ia7/2 and Ib7/2 to the windings 31A2 and 31B2.

Similarly, the winding 31C2 of FIG. 31 shows the C7 phase concentrated winding 30C5 of FIG. 30, the connecting wire 30C2 and the C7/ phase concentrated winding 30C6, to which the remaining ½ of the C7 phase current, which is Ic7/2, is supplied. The transistor 315 supplies electric power related to the currents Ib7/2 and Ic7/2 to the windings 31B2 and 31C2. The remaining transistors 46 supply electric power related to the currents Ic7/2 and Ia7/2 to the windings 31C2 and 31A1.

Figure 34:
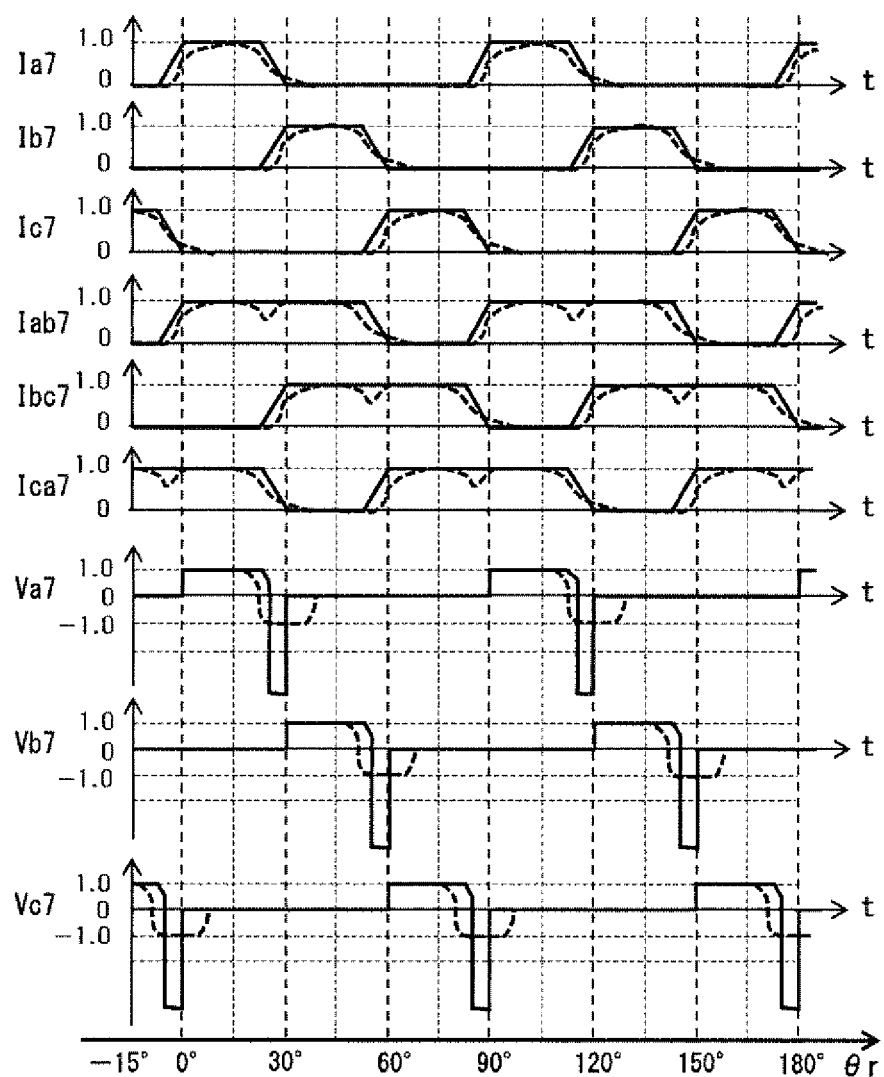
FIG. 34 is a graph exemplifying voltages and currents of the respective phases of a motor according the present disclosure.

Next, a specific energization example of FIGS. 30 and 31 is shown in FIG. 34. Although the horizontal axis of FIG. 34 is time t, it shows a state of rotating to the CCW direction at a constant rotation speed, and the rotor rotation angle position θr is shown at the bottom. The solid line waveforms of the currents Ia7, Ib7, and Ic7 of each phase show how each current is sequentially switched according to the rotation.

The sum of the currents of the two phases is shown in FIG. 34 as the following equations.

$$Iab7 = Ia7 + Ib7 \quad (92)$$

$$Ibc7 = Ib7 + Ic7 \quad (93)$$

$$Ica7 = Ic7 + Ia7 \quad (94)$$

In the example of FIG. 34, the solid line waveforms of the currents Ia7, Ib7, and Ic7 of each phase are used so that the values of Iab7, Ibc7, and Ica7 do not exceed a certain value.

The voltages of the A7 phase windings 31A1 and 31A2 have the same value and are set to Va7. The voltages of the B7 phase windings 31B1 and 31B2 have the same value and are set to Vb7. The voltages of the C7 phase windings 31C1 and 31C2 have the same value and are set to Vc7. The magnetic flux of that phase increases in the range where the rotor magnetic pole faces the stator magnetic pole of each phase, but the decrease in magnetic flux concentrates in the range where the current decreases. Therefore, among the voltage waveforms shown by the solid lines of Va7, Vb7, and Vc7 in FIG. 34, the voltage waveform of the negative portion has a small-time width and a large negative voltage value.

When the motor rotation speed is high, this negative voltage value is a large value, so that the power supply voltage is exceeded, which causes a problem. An example of reducing this negative voltage value is shown by the broken line in FIG. 34. Since the decrease in the current of each phase is in the region where the inductance is large at that time, the rate of change of the current is small, so the timing is a broken line waveform earlier than the solid line waveform. Then, the increase in the current of each phase is as a broken line waveform whose timing is delayed from the solid line waveform because the stator magnetic pole and the rotor magnetic pole are not yet opposed to each other at that time and the current can be rapidly increased because the inductance is small in the range The average torque of the motor is decreased slightly, but can reduce the voltage in question.

Further, in the drive circuit of FIG. 31, care must be taken in switching each phase current in the operating region where the motor rotation speed in FIG. 30 is high and the load current is also large. It is also involved in the negative voltage problem mentioned above. For example, when the rotor rotation angle position θr in FIG. 34 is around 30°, the A7 phase current Ia7 energizing the windings 31A1 and 31A2 decreases, and at the same time, the B7 phase current Ib7 energizing the windings 31B1 and 31B2 increases. It will be. First, since the C7 phase current is 0, it is assumed that the transistors 316 and 313 are in the off state. Then, since we want to increase the B7 phase current Ib7, it is assumed that the transistors 312 and 315 are in the ON state. At the moment when the transistors 311 and 314 are turned off, the magnetic energy of the windings 31A1 and 31A2 is regenerated to the power supply, and the A7 phase current Ia7 decreases. However, at this time, the B7 phase current Ib7 is in the flywheel state because the transistors 312 and 315 are on, but the current cannot be increased.

Next, at the moment when the transistors 311 and 314 are turned on, the currents of the windings 31A1 and 31A2 are in the flywheel state, and the magnetic energy cannot be regenerated to the power supply. The magnetic energy of the windings 31A1 and 31A2 is converted into the CCW torque in the region where θr is smaller than 30°, and becomes CW torque in the region where θr is larger than 30° to generate electricity. On the contrary, in the B7 phase current Ib7, the transistors 311 and 314 are also turned on, so that a voltage is applied and the current increases.

In such a state, the transistors 311 and 314 cannot simultaneously decrease the A7 phase current Ia7 and increase the B7 phase current Ib7. For example, if the transistors 311 and 314 are repeatedly turned on and off by 50% each, the A7 phase current Ia7 decreases at a voltage of ½, and the B7 phase current Ib7 increases at a voltage of ½. In such a state, the current response is delayed.

As one improvement measure for improving the current response speed, as shown by the broken line in FIG. 34, there is a method in which the A7 phase current Ia7 is reduced earlier and the B7 phase current Ib7 is slightly delayed. At least when all transistors are off, the magnetic energy of all currents is regenerated to the power supply. Further, as will be described later, in the current continuous mode in which the currents of all the phases are continuously energized, the current control is slightly different.

The configuration and operation of the concentrated winding motor of FIG. 30 and the drive circuit of FIG. 31 have been described above. Each transistor in FIG. 31 can share and energize two phase currents. Although FIG. 31 shows six transistors, electric power can be supplied through two paths at most rotor rotation positions, and the size can be reduced as compared with the conventional drive circuit shown in FIG. 5 or others. The full pitch winding motor of FIG. 2 and the drive circuit of FIG. 6 have similar operations.

Figure 32:
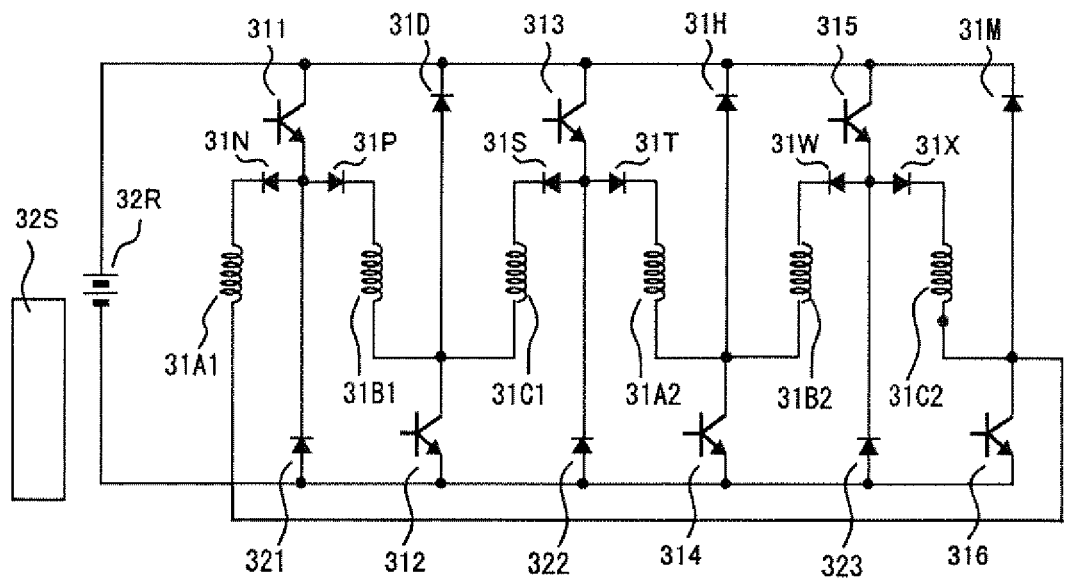
FIG. 32 exemplifies a drive circuit and windings according to the present disclosure.

Next, the configuration shown in FIG. 32 simplifies the drive circuit by removing some of the diodes in FIG. The diodes 31Q, 31R, 31E, 31U, 31V, 31J, 31Y, 31Z and 317 are removed. 318 and 319 are replaced with the diode 321. 31F and 31G are replaced with diodes 322. 31K and 31L are replaced with diodes 323. The operation of the drive circuit of FIG. 32 is almost the same as the operation of FIG. 31.

Seventeenth Embodiment

Figure 33:
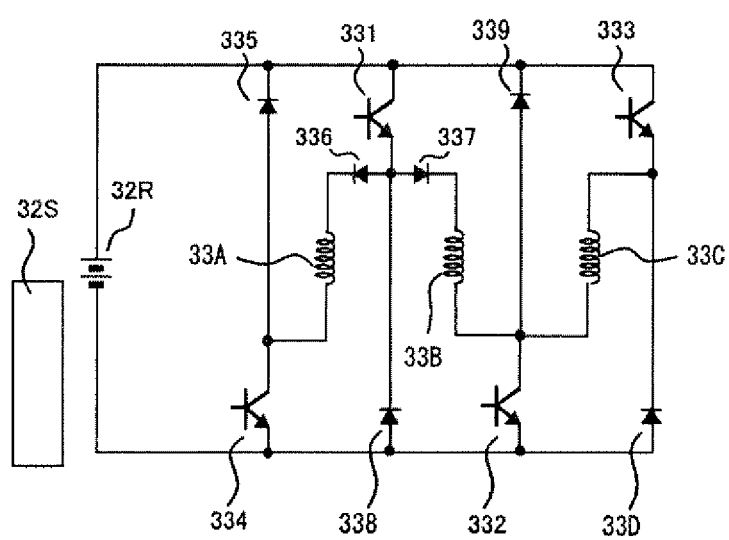
FIG. 33 exemplifies a drive circuit and windings according to the present disclosure.

Next, in the configuration shown in FIG. 33, the concentrated windings divided into the two sets of FIG. 30 are returned to one set of concentrated windings as shown in FIG. 83. 33A is an A7 phase winding, 33B is a B7 phase winding, and 33C is a C7 phase winding. Reference numeral 334 is a transistor for driving the A7 phase winding 33A. Reference numeral 331 is a transistor for driving the A7 phase winding 33A and the B7 phase winding 33B. Reference numeral 332 is a transistor for driving the B7 phase winding 33B and the C7 phase winding 33C. Reference numeral 333 is a transistor for driving the C7 phase winding 33C. 336 and 337 are diodes that prevent reverse conduction.

Reference numerals 335, 338, 339, and 33D are diodes that regenerate power to the power supply.

The operation of the drive circuit of FIG. 33 is the same as that of FIGS. 31 and 32, but the transistors 334 and 333 are dedicated for driving the A7 phase winding 33A and the C7 phase winding 33C, respectively. In the case of FIGS. 31 and 32, power could be supplied to two paths by six transistors, but in the case of FIG. 33, power is supplied to one path by four transistors. As a ratio, the drive circuit of FIG. 33 has one transistor added. From the viewpoint of the utilization rate of the transistor, FIG. 33 is 50%, which is inferior to 67% in FIGS. 31 and 32. However, since the winding of the motor is simple and the number of elements in the drive circuit is small, the motor and the drive circuit are attractive.

Further, in the one-pole pair motor shown in FIG. 30, the number of pole pairs can be increased to two pole pairs or more. In the case of a two-pole pair, the concentrated winding wounds divided in parallel into the two sets shown in FIG. 30 are driven by the circuits of FIGS. 31, 32, and 33 as one concentrated winding dedicated to each stator magnetic pole.

Eighteenth Embodiment

Next, an example of driving the motor of the concentrated windings of FIG. 19(a) by the circuit of FIG. 35 will now be described. The winding 35A is an A5 phase concentrated winding Wa5 in which the A5 phase of FIG. 19A and the windings 191 and 192 wound around the A5/ phase stator poles 901 and 902 are connected in series, and the A5 phase current Ia5 is supplied thereto for energization. Ia5 is driven by transistors 351 and 354. Similarly, the winding 35B is a B5-phase concentrated winding Wb5, and the B5 phase current Ib5 is driven by transistors 351 and 352. The winding 35C is a C5 phase concentrated winding Wc5, and the C5-phase current Ic5 is driven by transistors 353 and 352. The winding 35D is a D5 phase concentrated winding Wc5, and the D5 phase current Id5 is driven by transistors 353 and 354.

The conventional driving method shown in FIG. 19(a) has a circuit configuration as shown in FIG. 5, and is often driven by eight transistors. On the other hand, the circuit shown in FIG. 35 has a simple configuration because the circuit has only four transistors. The drive circuit can be simplified and downsized.

However, as shown by the reference numerals Ia5, Ib5, Ic5, and Id5 in FIG. 22, there is a range where the current of each phase overlaps, and the current capacity of each shared transistor increases. In the case of the configuration of FIG. 35, as a countermeasure, in order to reduce the current capacity of the transistor, it is possible to control the total current of the adjacent windings on the circuit diagram of FIG. 35 so as not to exceed a certain current. In that case, the current capacity of each transistor can be reduced by half.

Nineteenth Embodiment

Next, an example of driving the motor of the concentrated winding of FIG. 19 (a) by the circuit of FIG. 36 will now be described. It is a drive circuit which improved the characteristics of FIG. 35 and reduced the current constraint and the voltage constraint. The A5 phase current Ia5 of the A5 phase winding 35A is driven by the transistors 362 and 363. The C5 phase current Ic5 of the C5 phase winding 35C is driven by the transistors 362 and 361. The B5 phase current Ib5 of the B5 phase winding 35B is driven by the transistors 365 and 364. The D5 phase current Id5 of the D5 phase winding 35D is driven by the transistors 365 and 366. 368, 369, 36C, 36D are diodes that prevent conduction in the opposite direction. The 367, 36F, 36A, 36B, 360, and 36E are diodes that carry a regenerative current to the power supply.

As shown in FIG. 22, the energization of Ia5 and Ic5 does not overlap in time. Therefore, the current load on the transistor 362 that shares the current supply can be reduced. Further, the energization of Ib5 and Id5 does not overlap in time. Therefore, it is possible to reduce the current load on the transistor 365 that shares the current supply. Further, the voltage burden on the transistors 362 and 365 that share the current supply can be reduced.

The number of rotor magnetic poles in FIG. 19 (a) is 6, but the number of magnetic poles can be changed. The number of pole pairs can also be 2 or more. Further, the techniques shown in FIGS. 31, 32, 33, 35, 36 and the like can be extended and applied to motors in which the number of stator magnetic poles and the number of rotor magnetic poles are changed.

Twelfth Embodiment

Figure 37:
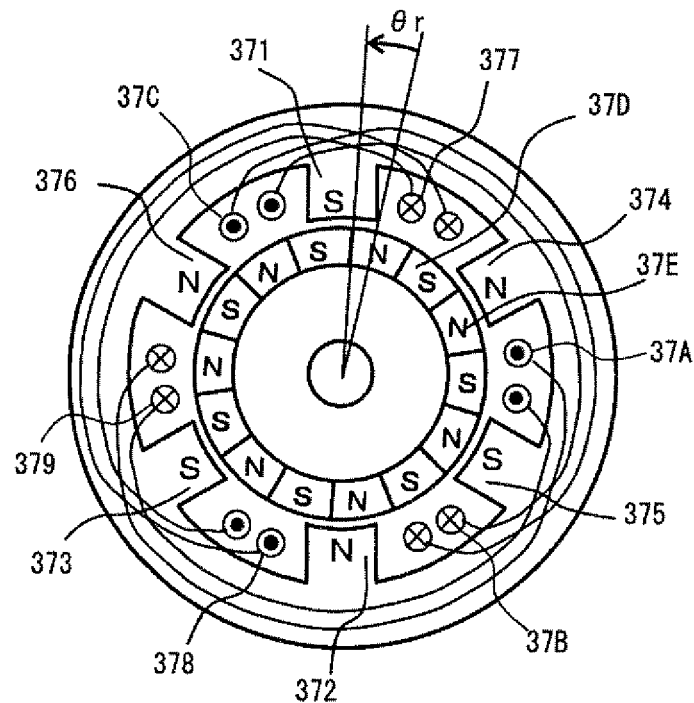
FIG. 37 is a lateral sectional view exemplifying a motor according to the present disclosure.
Figure 39:
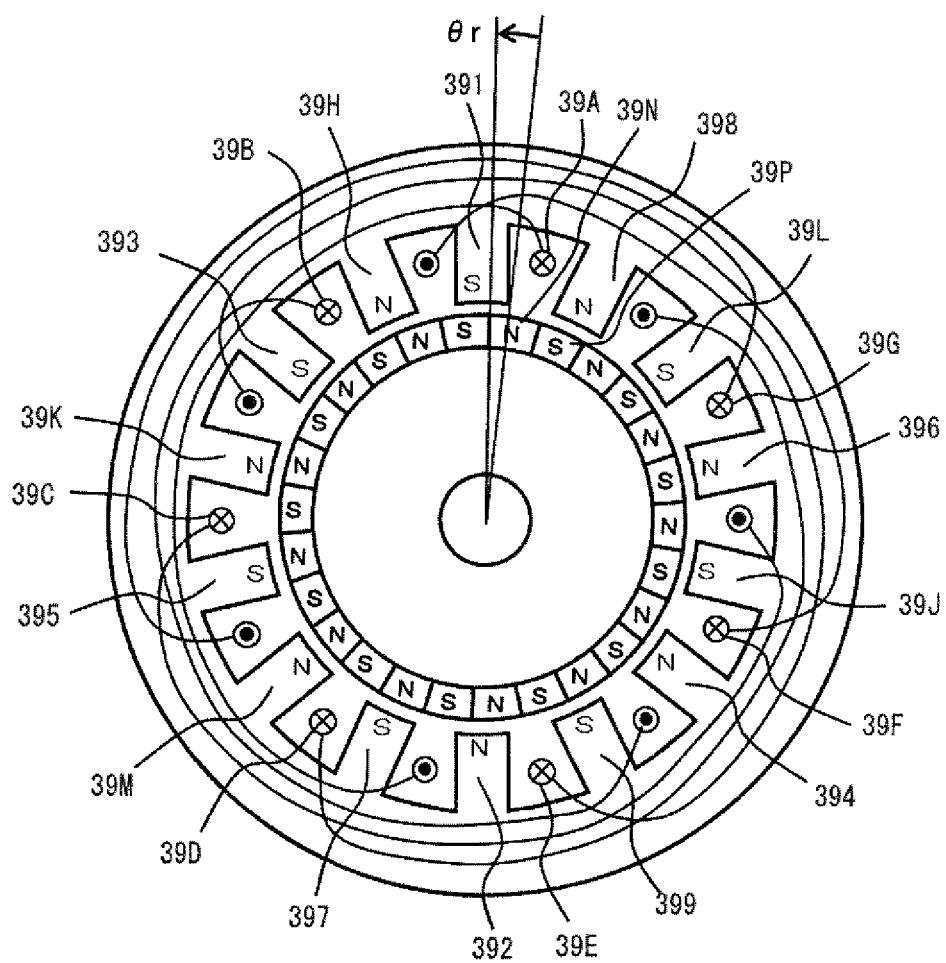
FIG. 39 is a lateral sectional view exemplifying a motor according to the present disclosure.

Next, an embodiment of the mode 3 is shown in FIGS. 37, 39, and the like. This embodiment is related to a motor configuration in which a permanent magnet is applied to the rotor, and the rotor configuration is particularly different from the reluctance type rotor shown in FIGS. 1, 19, 25, 30 and the like. Normally, the surface magnet type synchronous motor SPMSM controls by applying an alternating current to each winding of the stator. The polarity for exciting the stator magnetic poles in FIGS. 1, 19, 25, 30 and the like is one polarity of N or S, and a one-way current is applied to each winding of the stator. The drive current conditions are different from those of the conventional SPMSM, and due to the difference in these characteristics, good motor characteristics and torque characteristics can be obtained in the case of a specific relationship between the number of stator magnetic poles and the number of rotor magnetic poles.

The motor configuration shown in FIG. 37 is an example in which the number of stator magnetic poles is 6 and the number of rotor magnetic poles is 14. The surface of the rotor is an example in which the north and south poles of a permanent magnet are arranged, and the polarities N and S of the rotor magnetic poles are described. The configuration of the stator is similar to that of the stator of FIG. 2, but the circumferential width of the stator magnetic pole in FIG. 37 is adjusted to the circumferential width of the rotor magnetic pole of 25.7° in order to increase the generated torque. Reference numeral 371 is an A8 phase stator magnetic pole, and 372 is an A8/ phase stator magnetic pole. Reference numeral 373 is a B8 phase stator magnetic pole, and 374 is a B8/ phase stator magnetic pole. Reference numeral 375 is a C8 phase stator magnetic pole, and 376 is a C8/ phase stator magnetic pole. Reference numerals 377 and 378 are two sets of full pitch winding windings arranged in parallel, which are composed of an in-slot winding, a coil end portion, and an in-slot winding 180° opposite to each other, and are AB 8-phase windings. Each is energized with Iab8/2, which is ½ of the AB8 phase current. Similarly, 379 and 37A are BC8 phase windings, each energized with Ibc8/2. 37B and 37C are CA8 phase windings, each of which is energized with Ica8/2. The number of turns of each full pitch winding is Nwa/2. 37D is one of the north pole poles of the rotor. 37E is one of the south pole poles of the rotor.

It is assumed that the equivalent concentrated winding winding that excites the A8 phase stator poles 371 and 372 in FIG. 37 is set to Wa8, and the A8 phase current is set to Ia8. Similarly, Wb8 is assumed to be an equivalent concentrated winding that excites 373 and 374, and the B8 phase current is Ib8. Assuming an equivalent concentrated winding that excites 375 and 376, Wc8 is assumed, and C8 phase current is Ic8. Similar to the above equations (1), (2) and (3), the relationships are as follows.

$$Iab8 = Ia8 + Ib8 \quad (95)$$

$$Ibc8 = Ib8 + Ic8 \quad (96)$$

$$Ica8 = Ic8 + Ia8 \quad (97)$$

Let the voltage of the A8 phase concentrated winding Wa8 be Va8, the voltage of the B8 phase concentrated winding Wb8 be Vb8, and the voltage of the C8 phase concentrated winding Wc8 be Vc8. Let the voltage of the full pitch winding Wab8 of the AB8 phase be Vab8, the voltage of the full pitch winding Wbc8 of the BC8 phase be Vbc8, and the voltage of the full pitch winding Wca8 of the CA8 phase be Vca8. The relationships between these voltages are as follows, as in the foregoing equations (26), (28), (30), and (32), (33), (34).

$$Vab8 = (Va8 + Vb8 - Vc8)/2 \quad (98)$$

$$Vbc8 = (-Va8 + Vb8 + Vc8)/2 \quad (99)$$

$$Vca8 = (Va8 - Vb8 + Vc8)/2 \quad (100)$$

$$Vab8 + Vbc8 = Vb8 \quad (101)$$

$$Vbc8 + Vca8 = Vc8 \quad (102)$$

$$Vca8 + Vab8 = Va8 \quad (103)$$

Figure 38:
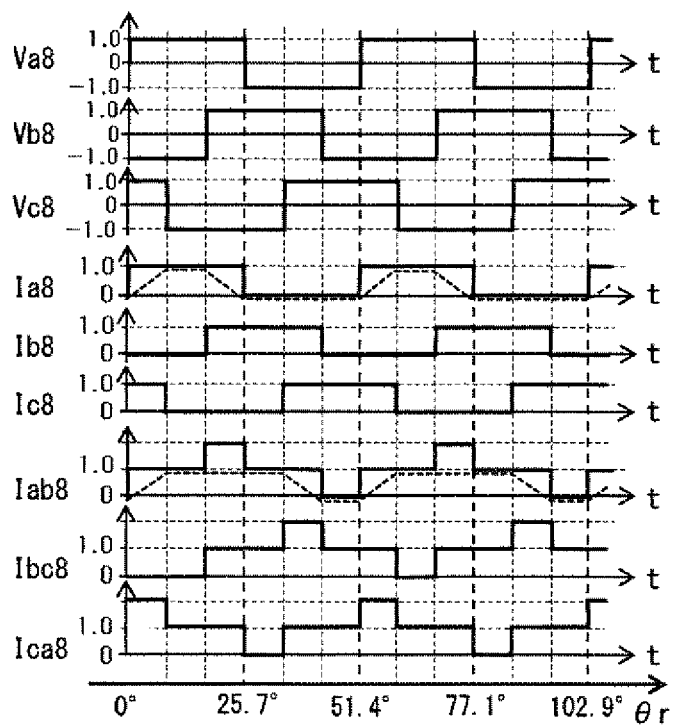
FIG. 38 is a graph exemplifying voltages and currents of the respective phases of a motor according the present disclosure.

The voltages Va8, Vb8, and Vc8 of each phase when the motor shown in FIG. 37 is rotated to the CCW direction at a constant rotation are shown in FIG. 38. The horizontal axis of FIG. 38 is the time t, and the rotation angle position θr of the rotor is shown at the bottom. When the current of each phase is energized in the range where the torque in the CCW direction can be generated, the results are Ia8, Ib8, and Ic8 shown by reference numerals in FIG. 38. Then, the AB8 phase current Iab8, the BC8 phase current Ibc8, and the CA8 phase current Ica8 are shown in FIG. 38. Here, the currents of the windings of FIGS. 37 and 38 are one-way currents, and are not energized with positive and negative currents unlike ordinary AC motors.

As can be seen from the characteristics of FIG. 38, it can be seen that the stator magnetic poles of each phase sequentially generate CCW directional torque, and continuous CCW directional torque can be generated. The torques of each phase overlap each other by 8.6°. The AB8 phase current Iab8, BC8 phase current Ibc8, and CA8 phase current Ica8 in FIG. 38 are capable of generating the CWW torque in a range of 42.9°, which is ⅚ of the range of 51.4°, respectively. As shown therein, the utilization rate of the winding is high. Compared simply with the conventional motor in FIG. 83, the current concentration in FIG. 38 is ((60/72)/0.333)=2.5. As a result, the copper loss becomes 40%, so that the copper loss can be reduced by 60%.

The current waveforms of Iab8, Ibc8, and Ica8 in FIG. 38 are one example showing the possibility. In practice, there are various methods including an energization method for reducing copper loss, an energization method for reducing torque ripple, and an energization method for reducing vibration and noise, and an energization method that reduces the current capacity of each transistor of the drive device at the time of generating a large torque. Hence, there methods can be appropriately selected as options for enhancing motor performance.

For example, the current value is doubled only in one range of the current waveforms Iab8, Ibc8, and Ica8 in FIG. 38, but the current increase and current decrease of each phase current component Ia8, Ib8, Ic8 are equally increased or decreased in one range. Then, twice the current can be eliminated. It is a current waveform as shown by a broken line in Ia8 and Iab8 of FIG. 38. In that case, the winding utilization rate is 67%.

Further, by decreasing the current amplitude value in the range where the current value is twice as described above and increasing the current amplitude value in the range next to it, the maximum value of the current value is reduced, and at the same time, the torque ripple is the principle. It can also be set to 0. The energized range can also be reduced to a ⅚ range, whereby the utilization rate becomes higher.

The drive circuit of the motor of FIG. 37 is shown in FIG. It can be energized and driven in the same manner as when the motor shown in FIG. 2 is driven. The utilization rate of each transistor is 67% when the winding utilization rate is 67%. This is twice as much as the case where a conventional permanent magnet type three-phase AC motor is driven by so-called 120° energization (current supply). The total current capacity of the drive circuit can be reduced by half, and miniaturization is possible. As mentioned above, further improvement is possible.

Further, in FIG. 37, the full pitch winding is divided into two parallel full pitch windings, but of course, one winding may be used for each slot. In that case, the drive circuits of FIGS. 7, 8 and 9 can also be used. Further, various modifications of the motor shown in FIG. 37 are possible, and a toroidal annular winding can be applied, the number of pole pairs can be increased, or two motors can be combined in the radial or axial direction to form an annular winding. It can also be simplified.

Twenty-First Embodiment

Next, another embodiment of the mode 3 is shown in FIG. 39. The number of stator magnetic poles is 14, and the number of rotor magnetic poles is 26, which is an example in which the number of both magnetic poles is large. The circumferential width of the rotor magnetic pole is 13.85°. The circumferential width of the stator magnetic pole is adjusted to the circumferential width of 13.85° of the rotor magnetic pole. The circumferential width of the slot opening is an example of 11.87°. On the surface of the rotor, 26-pole permanent magnets are arranged alternately with N-poles and S-poles in the circumferential direction.

Reference numeral 391 is an A9 phase stator magnetic pole, and reference numeral 392 is an A9/ phase stator magnetic pole. Reference numeral 393 is a B9 phase stator magnetic pole, and reference numeral 394 is a B9/ phase stator magnetic pole. Reference numeral 395 is a C9 phase stator magnetic pole, and reference numeral 396 is a C9/ phase stator magnetic pole. Reference numeral 397 is a D9 phase stator magnetic pole, and reference numeral 398 is a D9/ phase stator magnetic pole. Reference numeral 399 is an E 9-phase stator magnetic pole, and reference numeral 39H is an E9/ phase stator magnetic pole. Reference numeral 39J is a F9 phase stator magnetic pole, and reference numeral 39K is a F9/ phase stator magnetic pole. Reference numeral 39L is a G9 phase stator magnetic pole, and reference numeral 39M is a G9/ phase stator magnetic pole.

Reference numeral 39A is a full pitch winding composed of an in-slot winding, a coil end portion, and an in-slot winding on the opposite side of 180°, and is an AD9 phase winding. The AD9 phase winding 39A is divided into two sets of full pitch windings arranged in parallel to form 39A1 and 39A2, and Iad9/2, which is ½ of an AD9 phase current, is energized in each. The number of turns of each full pitch winding is Nwa/2.

Similarly, reference numeral 39B is a BE9 phase winding, which is divided into two sets of full pitch windings arranged in parallel to form 39B1 and 39B2, and each of them is energized with Ibe9/2, which is ½ of a BE9 phase current. Reference numeral 39C is a CF9 phase winding, which is divided into two sets of full pitch winding windings arranged in parallel to form windings 39C1 and 39C2, and Icf9/2, which is ½ of a CF9 phase current, is energized in each. Reference numeral 39D is a DG9 phase winding, which is divided into two sets of full pitch windings arranged in parallel to form windings 39D1 and 39D2, and Idg9/2, which is ½ of a DG9 phase current, is energized in each. Reference numeral 39E is an EA 9-phase winding, which is divided into two sets of full pitch winding windings arranged in parallel to form windings 39E1 and 39E2, and each of them is energized with Iea9/2, which is ½ of an EA9 phase current. Reference numeral 39F is an FB9 phase winding, which is divided into two sets of full pitch windings arranged in parallel to form windings 39F1 and 39F2, and Ifb9/2, which is ½ of an FB9 phase current, is energized in each. Reference numeral 39O is a GC9 phase winding, which is divided into two sets of full pitch windings arranged in parallel to form windings 39G1 and 39G2, and Igc9/2, which is ½ of a GC9 phase current, is energized in each.

It is assumed that an equivalent concentrated winding that excites the A9 phase stator magnetic poles 391 and 392 in FIG. 39 is set to Wa9, and an A9 phase current is set to Ia9. Similarly, Wb9 is assumed to be an equivalent concentrated winding that excites the B9 phase stator magnetic poles 393 and 394, and a B9 phase current is Ib9. It is assumed that an equivalent concentrated winding that excites the C9 phase stator magnetic poles 395 and 396 is Wc9, and a C9 phase current is Ic9. Assuming an equivalent concentrated winding that excites the D9 phase stator magnetic poles 397 and 398, Wd9 is used, and a D9 phase current is Id9. We9 is assumed to be an equivalent concentrated winding that excites the E9 phase stator magnetic poles 399 and 39H, and an E9 phase current is Ie9. Wf9 is assumed to be an equivalent concentrated winding that excites the F9 phase stator magnetic poles 39J and 39K, and a F9 phase current is If9. It is assumed that an equivalent concentrated winding that excites the G9 phase stator magnetic poles 39L and 39M is Wg9, and a G9 phase current is Ig9.

Similarly to the above equations (1), (2) and (3), the relationships are obtained as follows.

$$Iad9 = Ia9 + Id9 \quad (104)$$

$$Ibe9 = Ib9 + Ie9 \quad (105)$$

$$Icf9 = Ic9 + If9 \quad (106)$$

$$Idg9 = Id9 + Ig9 \quad (107)$$

$$Iea9 = Ie9 + Ia9 \quad (108)$$

$$Ifb9 = If9 + Ib9 \quad (109)$$

$$Igc9 = Ig9 + Ic9 \quad (110)$$

It is assumed that voltage of the concentrated winding Wa9 is Va9, voltage of the concentrated winding Wb9 is Vb9, voltage of the concentrated winding Wc9 is Vc9, voltage of the concentrated winding Wd9 is Vd9, voltage of the concentrated winding We9 is Ve9, voltage of the concentrated winding Wf9 is Vf9, and voltage of the concentrated winding Wg9 is Vg9. Also, it is assumed that voltage of full pitch winding Wad9 is Vad9, voltage of full pitch winding Wbe9 is Vbe9, voltage of full pitch winding Wcf9 is Vcf9, voltage of full pitch winding Wdg9 is Vdg9, voltage of full pitch winding Wea9 is Vea9, voltage of full pitch winding Wfb9 is Vfb9, and voltage of full pitch winding Wgt9 is Vgc9.

The relationships between these voltages are as follows from the interlinkage relationship of the magnetic flux of each phase, as in the foregoing equations (26), (28), and (30).

$$Vad9 = (Va9 + Vb9 + Vc9 + Vd9 - Ve9 - Vf9 - Vg9)/2 \quad (111)$$

$$Vbe9 = (-Va9 + Vb9 + Vc9 + Vd9 + Ve9 - Vf9 - Vg9)/2 \quad (112)$$

$$Vcf9 = (-Va9 - Vb9 + Vc9 + Vd9 + Ve9 + Vf9 - Vg9)/2 \quad (113)$$

$$Vdg9 = (-Va9 - Vb9 - Vc9 + Vd9 + Ve9 + Vf9 + Vg9)/2 \quad (114)$$

$$Vea9 = (Va9 - Vb9 - Vc9 - Vd9 + Ve9 + Vf9 + Vg9)/2 \quad (115)$$

$$Vfb9 = (Va9 + Vb9 - Vc9 - Vd9 - Ve9 + Vf9 + Vg9)/2 \quad (116)$$

$$Vgc9 = (Va9 + Vb9 + Vc9 - Vd9 - Ve9 - Vf9 + Vg9)/2 \quad (117)$$

Similarly to the foregoing equations (32), (33) and (34), the following equations are obtained.

$$Vad9 + Vdg9 = Vd9 \quad (118)$$

$$Vdg9 + Vgc9 = Vg9 \quad (119)$$

$$Vgc9 + Vcf9 = Vc9 \quad (120)$$

$$Vcf9 + Vfb9 = Vf9 \quad (121)$$

$$Vfb9 + Vbe9 = Vb9 \quad (122)$$

$$Vbe9 + Vea9 = Ve9 \quad (123)$$

$$Vea9 + Vad9 = Va9 \quad (124)$$

Figure 40:
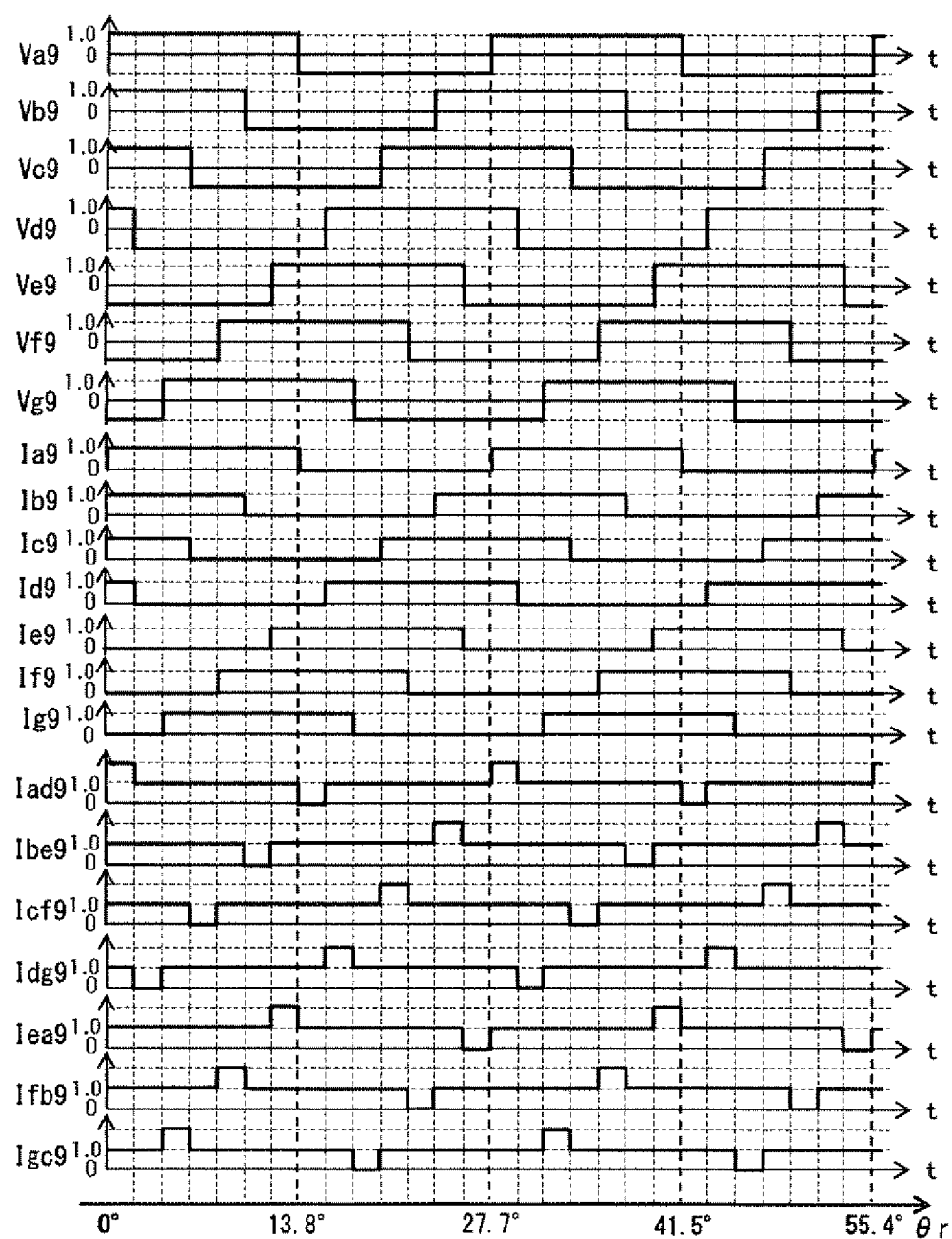
FIG. 40 is a graph exemplifying voltages and currents of the respective phases of a motor according the present disclosure.

The voltages Va9, Vb9, Vc9, Vd9, Ve9, Vf9, and Vg9 of each phase when the motor of FIG. 39 is rotated to CCW at a constant rotation speed are shown in FIG. 40. The horizontal axis of FIG. 40 is the time t, and the rotation angle position θr of the rotor is shown at the bottom. When the current of each phase is energized in the range of the positive voltage that can generate the torque in the CCW direction, it becomes Ia9, Ib9, Ic9, Id9, Ie9, If9, Ig9 in FIG. 40. The AD 9-phase current Iad9, the BE 9-phase current Ibe9, the CF 9-phase current Icf9, the DG 9-phase current Idg9, EA9 phase current Iea9, FB9 phase current Ifb9, and GC9 phase current Igc9 are shown in FIG. 40. Here, the currents of the windings of FIGS. 39 and 40 are unidirectional currents, and are not energized with positive and negative currents unlike ordinary AC motors.

The motor of FIG. 39 and the phase currents Iad9, Ibe9, Icf9, Idg9, Iea9, Ifb9, and Igc9 of FIG. 40 are seven-phase currents. FIG. 6 is the three-phase drive circuit, and FIG. 26 is the five-phase drive circuit. Although not shown, the 7-phase drive circuit has a configuration in which a 2-phase drive circuit is added to the 5-phase drive circuit shown in FIG. 26, and the drive circuit of this form has 14 transistors.

For example, in FIG. 26, assuming that a configuration in which two phases are added on the right side of the paper is a seven-phase drive circuit, the winding of FIG. 39 and the current of FIG. 40 will be described. On the paper of FIG. 26, the seven windings 27*ac*1, 27*ce*1, 27*eb*1, 27*bd*1, 27*da*1, 27*ac*2, and 27*ce*2 from the left side are an AD9 phase full pitch winding 39A1, a DG9 phase full pitch winding 39D1, a GC 9-phase full pitch winding 39G1, a CF9 phase full pitch winding 39C1, a FB9 phase full pitch winding 39F1, a BE9 phase full pitch winding 39B1, an EA9 phase full pitch winding 39E1 in each other. As described above, these windings are one winding obtained by dividing each of the full pitch windings of FIG. 39 into two sets of full pitch windings arranged in parallel.

The winding order of these is the order of each voltage of the equations (118) to (124). For example, the leftmost winding on the paper of FIG. 26 is 39A1, and as for the current, the AD9 phase current Iad9 of the equation (104) is energized, and the DG9 phase current Idg9 of the equation (107) is energized in the second winding 39D1 from the left end. In the drive circuit of FIG. 26, these two windings are connected in series, and the sum of the two voltages, that is, the voltage across the two is expressed by the equation (118), and becomes the D9 phase voltage Vd9. The voltages of both windings 39A1 and 39D1 are represented by the equations (111) and (114), and are complicated because the magnetic fluxes of all the phases are interlinked. However, the sum of both voltages is the D9 phase voltage Vd9, which is not affected by the magnetic fluxes of the other phases. It is not affected by the excessive voltage of other phases.

The currents of both windings 39A1 and 39D1 are represented by the equations (104) and (107), and the common current component that energizes both windings is the D9 phase current component Id9. The D9 phase current component Id9 is also a current component that selectively excites only the D9 phase stator magnetic pole 397 and the D9/ phase stator magnetic pole 398. The other stator magnetic poles are not electromagnetically affected by the D9 phase current component Id9. The characteristic of selectively exciting each stator magnetic pole is one of the important characteristics in driving the permanent magnet type rotors shown in FIGS. 37 and 39.

The same relationship applies to the other windings 39G1, 39C1, 39F1, 39B1 and 39E1. In addition, the same relationship applies to 39A2, 39D2, 39G2, 39C2, 39F2, 39B2, and 39E2 arranged in the right half of the 7-phase drive circuit.

Further, as the 5-phase drive circuit of FIG. 26 is simplified in FIGS. 28 and 29, the 7-phase drive circuit can also be simplified. It is the same method. In that case, in FIG. 39, two sets of full pitch windings arranged in parallel can be integrated into one set of full pitch windings.

Next, the motor of FIG. 39, the drive characteristics by the voltage and current of FIG. 40, the torque, the utilization rate, and the effect will be described. Simply, the product of voltage V and a current I is an input power P, and a output power P is also the product of the output torque T and the rotational angular velocity ω. Here, the rotation angular velocity ω is assumed to be a constant rotation speed. Therefore, from the characteristics of the voltage and current in FIG. 40, it can be seen that each of the seven-phase currents Iad9, Ibe9, Icf9, Idg9, Iea9, Ifb9, and Igc9 generate torque in 13 ranges of the 14 ranges of one cycle shown in FIG. 40. In that sense, the utilization rate of the winding is 92.9%. One cycle of each phase current is 27.7° in the circumferential width of the north and south poles of the rotor.

The current value of each phase in FIG. 40 is doubled in only one range, but various modifications and selections are possible. For example, if the current increase and current decrease of the current components Ia9, Ib9, Ic9, Id9, Ie9, If9, and Ig9 of each phase are equally increased or decreased in one range, the above-mentioned double current value can be eliminated. Torque will be generated in 12 ranges out of 14 ranges in one cycle. Even so, the utilization rate of the winding is as good as 85.7%. Since the current waveform in FIG. 40 is 13/14, the winding utilization rate is 92.86%.

In the drive circuit for driving the voltage and current of FIG. 40, the utilization rate of the winding and the utilization rate of each transistor are the same, 85.7%. Since the utilization rate when the three-phase AC windings of a conventional permanent magnet type motor is energized by so-called 120° with six transistors is 33.3%, 85.7% is a value 2.57 times. Therefore, the drive circuit of the present invention has 1/2.57=0.388 as compared with the conventional one, and the total current capacity can be reduced to 38.8%.

Since the current of each winding in FIGS. 37 and 39 is driven by a one-way current, the winding utilization rate is reduced to half that of the AC motor. However, in the case of a full pitch winding, since it can be used to excite the two stator magnetic poles on both sides of the winding, the utilization rate can be doubled by sharing the winding, and the decrease in the utilization rate of unidirectional current is offset. At the same time, the utilization rate of the current-driven transistor can be improved. Further, by using direct current drive instead of alternating current drive, there are some parts that facilitate simplification of the drive circuit, such as addition and subtraction of current and limitation of conduction by a diode.

Further, with respect to the form of the winding of FIGS. 37 and 39, a toroidal annular winding is also possible, and the number of pole pairs can be 2 or more. It is also possible to arrange two motors on the inner diameter side and the outer diameter side, or to arrange two motors back to back in the rotor axial direction. In that case, since the winding can be an annular winding, the length of the coil end can be reduced and the configuration can be simplified, so that the motor can be miniaturized. In particular, as shown in FIG. 39, when the number of phases is large, the effect is large.

The configuration example of the stator of the full pitch windings of FIGS. 37 and 39 has been described above. This is a configuration example of the mode 3, which is subordinate to the mode 1 and uses a permanent magnet type rotor. The purpose is to reduce the excitation load due to the use of permanent magnets. The burden of supplying, maintaining, and regenerating field energy in a reluctance motor is not small. A configuration in which a concentrated winding stator and a permanent magnet type rotor are used, which is dependent on the mode 2, will be described later.

The configurations of the stator and the permanent magnet rotor of the full pitch windings as shown in FIGS. 37 and 39 are combinations of the number of magnetic poles of each, and there are innumerable types of configurations. However, since it is a permanent magnet and it is a full pitch winding, the motor configuration is limited. The number SPN of the stator magnetic poles is limited to (2+4×SNN), and the number of rotor magnetic poles RPN is limited to (2+4× RNN), in which the numbers SNN and RNN are positive integers.

Further, in the motor configuration showing good torque characteristics, the number of rotor magnetic poles is (SPN×2−2) or (SPN×2+2). Specifically, when the number of stator magnetic poles is 6, the number of rotor magnetic poles is 10 or 14. When the number of stator magnetic poles is 10, the number of rotor magnetic poles is 18 or 22. When the number of stator magnetic poles is 14, the number of rotor magnetic poles is 26 or 30. When the number of stator magnetic poles is 18, the number of rotor magnetic poles is 34 or 38. Further, there is the same regularity when the number of stator magnetic poles is large. However, this is not a limited condition, and especially when the number of stator magnetic poles becomes large, the number of rotor magnetic poles around it may be practical. Further, the number of rotor magnetic poles can be rephrased as "a value before and after twice the number of stator magnetic poles", and qualitatively, good characteristics can be obtained in principle even with "around 4 times" and "around 6 times". However, if the number of rotor poles becomes too large, there are problems such as structural restrictions, an increase in iron loss, and a limit on the control frequency.

The reason for the regularity of the number of rotor magnetic poles is that each winding can be used effectively, and for that purpose and it is preferable that every other stator magnetic pole generates torque in the circumferential direction. Also, N poles and S poles are alternately arranged in the circumferential direction of the stator magnetic poles, and each winding is driven by a direct current in one direction. Characteristically, like a vernier motor, when the rotor rotates by the circumferential width of the north and south poles, the place where torque is generated makes one rotation. In particular, when the number of stator magnetic poles is large, the tendency is easily recognized visually, and examples of FIGS. 39 and 40 with 14 stator magnetic poles are shown. Further, in the examples of FIGS. 39 and 40, the reason why the utilization rate of the winding can be increased is that each winding is a full pitch winding and can be shared as a winding for exciting two stator magnetic poles on both sides. At each rotor rotation angle position θr, each winding is used and an exciting current is energized so as to excite the stator magnetic pole that is convenient for torque generation.

Further, the circumferential width of the stator magnetic pole is close to the circumferential width of the rotor magnetic pole, which is advantageous in terms of torque generation. The same applies from the viewpoint of reducing torque ripple. However, the characteristics change depending on the performance of the permanent magnet and the shape of the tip of the stator magnetic pole. Further, in order to reduce the influence of the leakage flux component of the permanent magnet passing near the slot opening, a magnetic bypass path is provided to absorb the leakage flux components, and the leakage flux components pass each other and cancel each other in a shape such that the respective magnetic fluxes do not interlock with each winding. Also, it can pass to the back yoke side of the stator or to the back yoke side of the rotor. The harmful effect of the leakage flux component can be reduced. Especially in the case of a flat motor shape, the bypass path can be relatively easily formed from the axial side surface of the motor.

The features of the full pitch winding motor according to the mode 3 are that the copper loss of the motor can be reduced and the current capacity of the drive circuit can be reduced, as in the feature of the mode 1. Further, when the number of stator magnetic poles is increased, the motor structure and the drive circuit become complicated, but the torque generation location increases, so that torque ripple reduction and vibration noise reduction can be realized. However, since the opening of each slot is wide open, it is necessary to give design consideration to the shape of the stator magnetic pole, the shape of the rotor magnetic pole, and the like with respect to the leakage flux in the vicinity. For example, it is possible to close the slot opening with a thin soft magnetic material to the extent that torque reduction is acceptable.

Twenty-Second Embodiment

Figure 41:
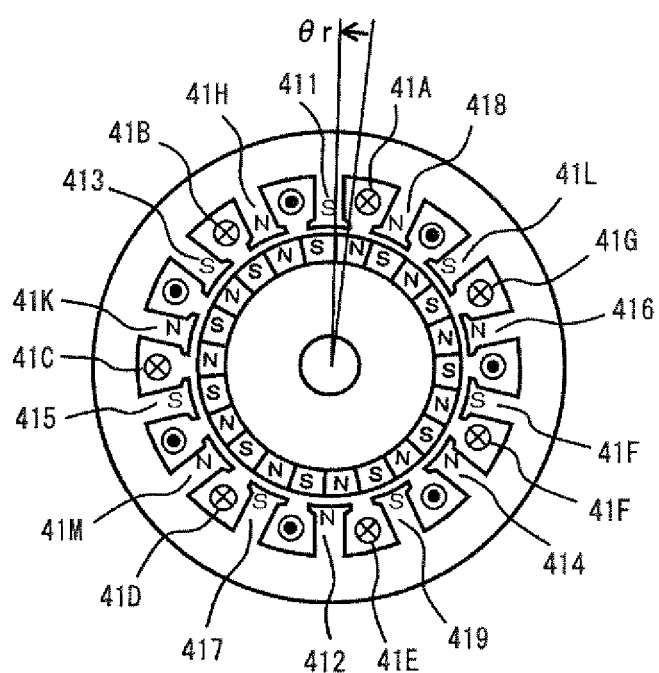
FIG. 41 is a lateral sectional view exemplifying a motor according to the present disclosure.

Next, another embodiment of the mode 3 is shown in FIG. 41. In FIGS. 37 and 39, a specific example of a motor having a shape in which the openings of the slot portions are widely opened has been described. In FIG. 39, the number of magnetic poles of the stator was 14, and the number of magnetic poles of the rotor was 26. FIG. 41 shows an example in which the width of the opening of each slot is reduced, and the characteristics of the motor are changed. Therefore, the number of stator magnetic poles is 14, which is the same as in FIG. 39, but the number of rotor magnetic poles is reduced from 26 to 22, and the opening width of the slot opening is reduced. The stator magnetic pole pitch in FIG. 41 is 360°/14=25.71°, and the circumferential width of the stator magnetic pole facing the rotor is 16.26° in accordance with the circumferential width of the rotor magnetic pole. The ratio of slot openings is 36.36%. Similarly, when the number of rotor magnetic poles is reduced to 18, the ratio of slot openings is reduced to 22.2%.

The arrangement relationship of the stators in FIG. 41 is the same as that in FIG. 39. The voltage and current of each winding of FIG. 41 are the same as those of the motor equations (104) to (124) of FIG. 39, although their values are different. Reference numeral 411 is an AH phase stator magnetic pole, and reference numeral 412 is an AH/ phase stator magnetic pole. Reference numeral 413 is a BH phase stator magnetic pole, and reference numeral 414 is a BH/ phase stator magnetic pole. Reference numeral 415 is a CH phase stator magnetic pole, and reference numeral 416 is a CH/ phase stator magnetic pole. Reference numeral 417 is a DH phase stator magnetic pole, and reference numeral 418 is a DH/ phase stator magnetic pole. Reference numeral 419 is an EH phase stator magnetic pole, and reference numeral 41H is an EH/ phase stator magnetic pole. Reference numeral 41J is a FH-phase stator magnetic pole, and reference numeral 41K is an FH/ phase stator magnetic pole. Reference numeral 41L is a GH phase stator magnetic pole, and reference numeral 41M is a GH/ phase stator magnetic pole.

Reference numeral 41A is a full pitch winding composed of an in-slot winding, a coil end portion, and an in-slot winding on the opposite side of 180°, and is an ADH phase winding. The ADH phase winding 41A is divided into two sets of full pitch winding windings arranged in parallel to form 41A1 and 41A2, and IadH/2, which is ½ of a ADH phase current, is energized in each. The number of turns of each full pitch winding is Nwa/2. It is equivalent to supply a current IadH to the winding 41A.

In the same relationship, reference numeral 41B is a BEH-phase winding and energizes a BEH phase current IbeH. Reference numeral 41C is a CFH-phase winding and energizes a CFH phase current IcfH. Reference numeral 41D is a DGH phase winding and energizes a DGH phase current IdgH. Reference numeral 41E is an EAH phase winding and energizes a EAH phase current IeaH. Reference numeral 41F is a FBH phase winding and energizes a FBH phase current IfbH. Reference numeral 41G is a GCH phase winding and energizes a GCH phase current IgcH.

Assuming an equivalent concentrated winding that excites the AH-phase stator magnetic poles 411 and 412 in FIG. 41, consider a virtual concentrated winding WaH, and let the voltage be VaH. Similarly, consider a concentrated winding WbH of the BH-phase, and let the voltage be VbH. Consider a concentrated winding WcH of the CH phase, and let the voltage be VcH. Consider a concentrated winding WdH of the DH phase, and let the voltage be VdH. Consider a concentrated winding WeH of the EH phase, and let the voltage be VeH. Consider a concentrated winding WfH of the FH phase, and let the voltage be VfH. Consider a concentrated winding WgH of the GH phase, and let the voltage be VgH.

Figure 42:
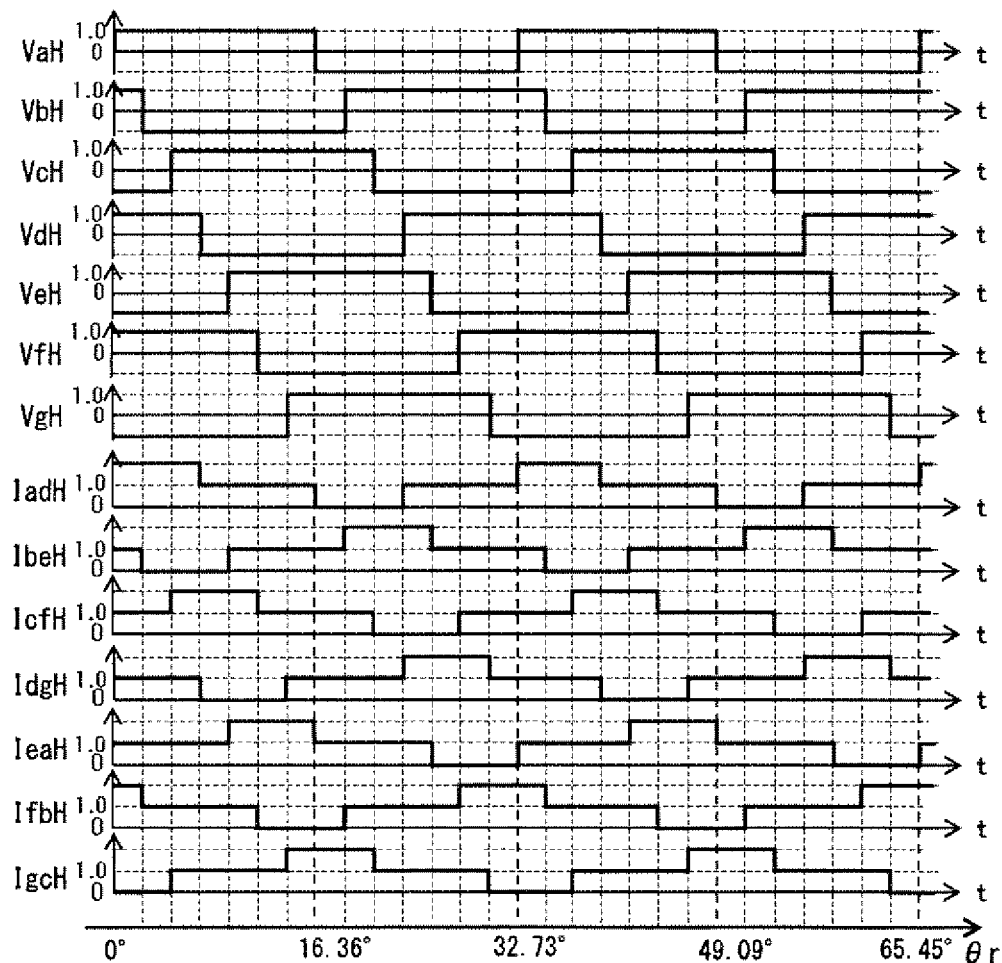
FIG. 42 is a graph exemplifying voltages and currents of the respective phases of a motor according the present disclosure.

The voltages VaH, VbH, VcH, VdH, VeH, VfH, and VgH of each phase when the motor of FIG. 41 is rotated to CCW at a constant rotation are shown in FIG. 42. The horizontal axis of FIG. 42 is the time t, and the rotation angle position θr of the rotor is shown at the bottom. Energize the phase current of each phase in the positive voltage range that can generate torque in the CCW direction. When these phase currents are combined, they become the ADH-phase current IadH, the BEH phase current IbeH, the CFH-phase current IcfH, the DGH-phase current IdgH, the EAH phase current IeaH, the FBH phase current IfbH, and the GCH phase current IgcH in FIG. 42.

The drive circuit for applying each current of FIG. 42 to each winding of the motor of FIG. 41 is the same as the method of driving each current of FIG. 40 described above. As for the torque, as shown in each voltage and each current in FIG. 42, the torque is effectively generated in 14 ranges out of the 17 ranges.

FIG. 42 is a diagram of voltage and current showing the principle characteristics. Actually, various current values can be taken, such as a current control method in which the copper loss becomes smaller and a current control method in which the maximum current of each transistor is suppressed. For example, the current value of each current in FIG. 42 is doubled in three of the 14 ranges, and the current load of the transistor that carries the doubled current is large. Since the torque constants of the currents of each phase are almost the same, it is possible to reduce the currents whose values increase and supplement the torques with other currents.

The utilization rate of the windings shown in FIGS. 41 and 42 is that torque can be generated in 14 of the 17 ranges, which is 76.5% by simple calculation. The utilization rate of the transistor can be considered to be about the same because the average torque can be obtained by a method that avoids the concentration of current. As a result, it was shown that the copper loss can be reduced and the current capacity of the drive circuit can be reduced even with the motor shape and structure in which the opening of the slot is reduced as shown in FIG. 41.

Twenty-Third Embodiment

Next, in another embodiment of the mode 3, an example in which the stator of the concentrated winding and the permanent magnet type rotor are configured will be described. A motor and a drive circuit that are subordinate to the mode 2. In the case of a full pitch winding, the number of stator magnetic poles is limited to 6, 10, 14, 18, etc., but in the case of a concentrated winding, the electromagnetic relationship with the stator magnetic poles adjacent to each other in the circumferential direction is reduced. Therefore, the limitation on the number of stator magnetic poles is reduced. In addition to the number of stator magnetic poles 6, 10, 14, 18, etc., for example, the number of stator magnetic poles may be 8.

Figure 43:
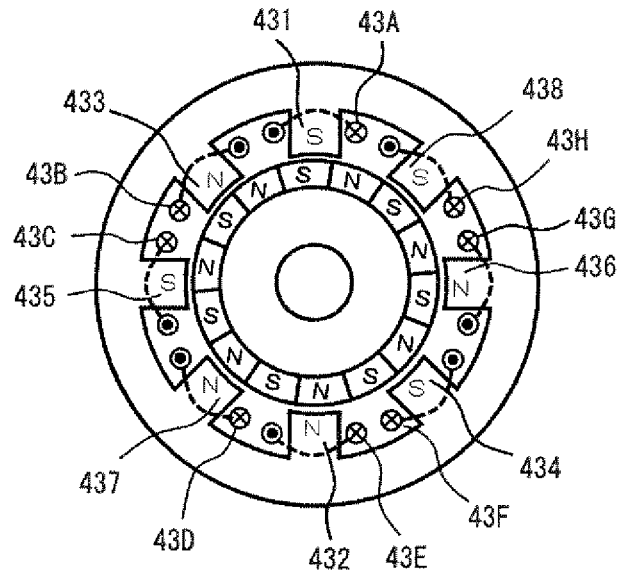
FIG. 43 is a lateral sectional view exemplifying a motor according to the present disclosure.

The motor of FIG. 43 is an example in which the number of magnetic poles of the stator is 8, a concentrated winding is wound around each of the magnetic poles of the stator, and the number of magnetic poles of the rotor of the permanent magnet type is 14. The circumferential width of the rotor magnetic pole is 25.71°. The circumferential width of the portion where the stator magnetic pole faces the rotor shall be 25.71° in accordance with the rotor magnetic pole. The configuration of the stator in FIG. 43 is the same as that in FIG. 19(a) except for the width of the stator magnetic pole.

Reference numeral 431 is an AJ phase stator magnetic pole, and reference numeral 432 is an AJ/ phase stator magnetic pole. AJ phase concentrated winding windings 43A and 43E are wound around x41 and 432, respectively, and connected in series to form an AJ phase winding WaJ, and an AJ phase current IaJ is energized. Let the voltage of the AJ phase winding WaJ be VaJ. Reference numeral 433 is a BJ phase stator magnetic pole, and reference numeral 434 is a BJ/ phase stator magnetic pole. BJ phase concentrated winding windings 43B and 43F are wound around 433 and 434, respectively, and connected in series to form a BJ phase winding WbJ, and a BJ-phase current IbJ is energized (i.e., supplied). Let the voltage of the BJ phase winding WbJ be VbJ. Reference numeral 435 is a CJ phase stator magnetic pole, and reference numeral 436 is a CJ/ phase stator magnetic pole. CJ phase concentrated winding windings 43C and 43G are wound around 435 and 436, respectively, and connected in series to form a CJ phase winding WcJ, and a CJ phase current IcJ is energized. Let the voltage of the CJ-phase winding WcJ be VcJ. Reference numeral 437 is a DJ phase stator magnetic pole, and reference numeral 438 is a DJ/ phase stator magnetic pole. DJ phase concentrated winding windings 43D and 43H are wound around the 437 and 438, respectively, and connected in series to form the DJ phase winding WdJ, and a DJ phase current IdJ is energized. Let the voltage of the DJ-phase winding WdJ be VdJ. Here, the currents of the windings of FIGS. 43 and 44 are unidirectional currents, and are not energized with positive and negative currents unlike ordinary AC motors.

Figure 44:
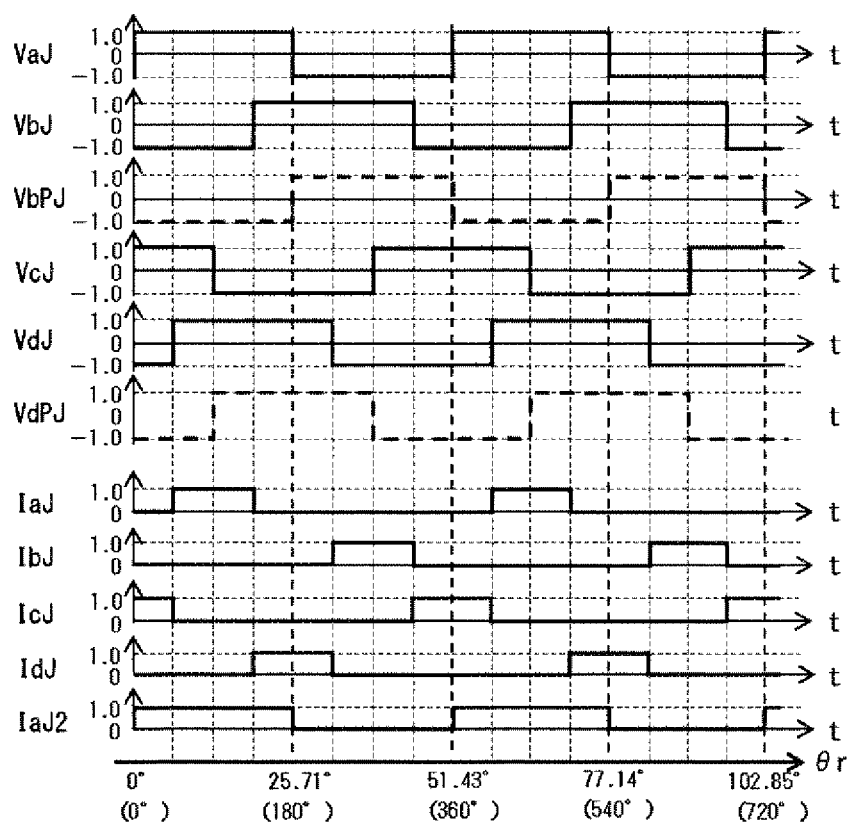
FIG. 44 is a graph exemplifying voltages and currents of the respective phases of a motor according the present disclosure.

The voltages VaJ, VbJ, VcJ, and VdJ of each phase when the motor of FIG. 43 is rotated to CCW at a constant rotation are shown in FIG. 44. The horizontal axis of FIG. 44 is time t, and the rotation angle position θr of the rotor is shown at the bottom. The rising positions of the voltage of each phase are 0°, 135°, 270°, and 45°, and there are irregular surfaces. The position of the surface of the BJ phase stator magnetic pole 433 facing the rotor is moved to CCW by 6.43° (45° in the electrical angle) so that torque can be obtained in a well-balanced manner. At this time, the voltage VbJ changes to VbPJ in FIG. 44. Similarly, the position of the surface of the DJ-phase stator magnetic pole 437 facing the rotor is moved to CCW by 6.43° (45° in the electrical angle). At this time, the voltage VdJ changes to VdPJ in FIG. 44.

Various methods are possible for energizing each phase current, that is, for generating torque. Although it is possible to energize an alternating current in synchronization with each phase voltage, the present invention describes a driving method using a unidirectional current. One driving method is the phase currents IaJ, IbJ, IcJ, and IdJ of FIG. 44, which is an example in which each stator magnetic pole sequentially generates torque to generate continuous torque in the CCW direction.

Figure 35:
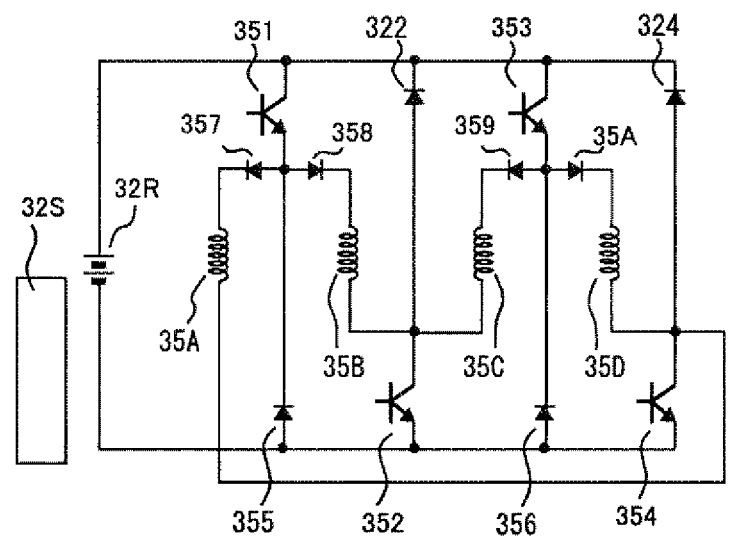
FIG. 35 exemplifies a drive circuit and windings according to the present disclosure.
Figure 36:
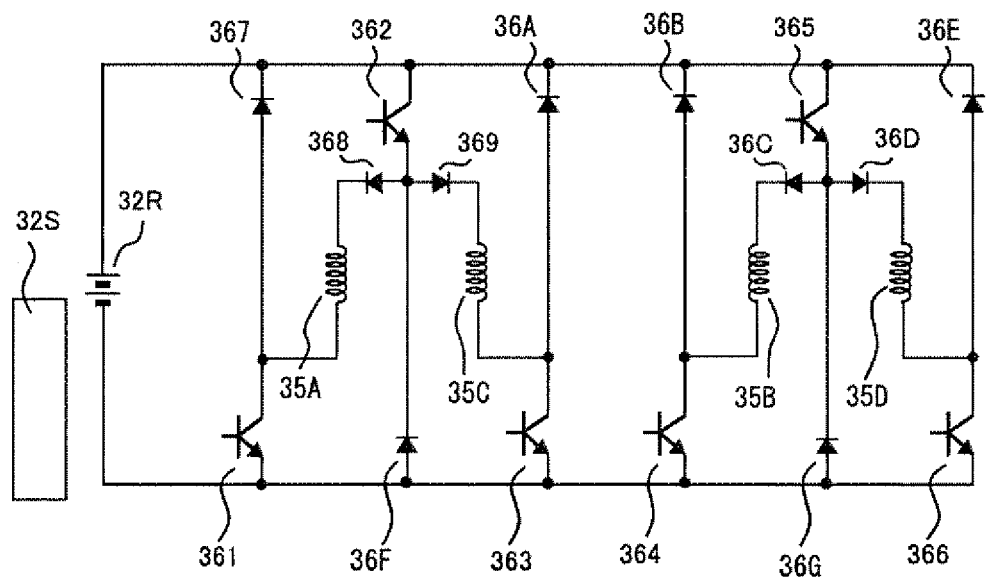
FIG. 36 exemplifies a drive circuit and windings according to the present disclosure.

As the drive circuit in this case, the above-mentioned FIG. 35 can be used. Further, since the induced voltage of each winding is small at low speed rotation, the influence of the reverse induced voltage of each winding is small. For example, the AJ phase current IaJ in FIG. 44 can expand the energization width to Ia2J, and the average output torque can be almost doubled. The same applies to the currents IbJ, IcJ, and IdJ of the other phases.

In high-speed rotation, it takes time to regenerate the magnetic energy component stored in each winding to the power source. Further, since a current that generates a negative torque flows due to the reverse induced voltage of each winding, it is necessary to suppress it. Therefore, there is a restriction on the angle width at which each phase winding of FIG. 44 can be energized.

On the other hand, there are various motor applications, and the required torque characteristics are also various. Among them, a large torque is required at low speed rotation, but at high speed rotation, less than half of the large torque at low speed rotation is good in many applications. The torque characteristics required for automobiles are one of them. In that respect, the drive circuit of FIG. 35 is a simple drive circuit with only four transistors, and is characterized in terms of cost reduction. Further, in the drive circuit of FIG. 36, the number of transistors is increased to 6, but the current constraint condition is relaxed, and the torque characteristics can be improved as compared with the case of FIG. 35. In this case, since the current constraints of each phase of FIGS. 43 and 44 differ depending on the order of energization, the circumferential width, circumferential position, shape, etc. of the surface of each stator magnetic pole in FIG. 43 facing the rotor can be modified and changed in order to reduce the imbalance of each phase.

Next, another embodiment of the mode 3 will now be described. In the motor configuration as shown in FIG. 43, if the magnetic flux density of the permanent magnets of the rotor is not so large, the slot portion in the circumferential direction of each stator magnetic pole may have a slot cross-sectional area that is too wide to fully utilize the motor space. In addition, since the opening of the slot facing the rotor is wide, a large amount of leakage flux of the permanent magnet of the rotor is generated, which may cause a problem in torque generation. In this embodiment, as a countermeasure against these problems, a new stator magnetic pole is additionally inserted into each slot portion in the circumferential direction of each stator magnetic pole as shown in FIG. 43.

In a specific configuration example of the embodiment, first, the number of rotor magnetic poles in FIG. 43 is changed from 14 poles to 18 poles, and the circumferential width of the stator magnetic poles is set to 360°/18=20° for torque generation efficiency. The winding is a concentrated winding. In this state, the relative phase order of each phase changes as in the case of FIG. 43, but the voltage and current characteristics are similar to those of FIG. 44, and the drive can be driven by the drive circuits of FIGS. 35 and 36.

Here, a stator magnetic pole 43J having substantially the same shape as the AJ-phase stator magnetic pole 431 and opposite in the winding direction is further inserted into the slot portion between the AJ-phase stator magnetic pole 431 and the BJ-phase stator magnetic pole 433 in FIG. 43. The AJ phase current IaJ is energized. At this time, the relationship between the stator magnetic pole 43J and the rotor is the same as the torque generated by the AJ-phase stator magnetic pole 431 because the winding directions are opposite to each other. Similarly, for other slot portions, stator magnetic poles having opposite winding directions can be added and inserted. In simple logic, if the number of turns of each winding is the same, the torque is twice that in the case of FIG. 43. If the number of turns is ½, the torque is the same as in FIG. 43.

In the case of this embodiment, the stator magnetic poles are lined up in the circumferential direction of the stator with almost no gap, the leakage flux between the magnetic poles of the stator can be significantly reduced, and the harmful effect of the leakage flux can be eliminated. It also means making more effective use of the permanent magnets of the rotor. Also, the torque can be increased. The characteristics of this embodiment have voltage and current characteristics similar to those of FIG. 44, although the relative phase order changes, and the drive circuits of FIGS. 35 and 36 can be driven in the same manner as the motor of FIG. 43. Further, the stator shape of the other motor of FIG. 41 is also deformed in the same manner, and a stator magnetic pole is added to form a concentrated winding structure, which can be driven in the same manner as in the above embodiment.

Twenty-Fourth Embodiment

Next, an embodiment of the mode 4 will be shown. The mode 4 is a motor having four stator magnetic poles and a control device thereof. An object of the mode 4 is to propose a drive circuit that reduces copper loss as a configuration of a full pitch winding and reduces the adverse effect of a winding voltage due to full pitch windings interlinking with all magnetic fluxes. Further, another object is to reduce the size and cost of the motor and drive circuit. This purpose is qualitatively the same as that of the mode 1, since the number of stator magnetic poles is as small as 4, the motor has a unique configuration in which the number of stator magnetic poles in FIGS. 1 and 2 is 6 or 8 or more.

In a motor having 6 or more stator poles, the current of each phase moves in the circumferential direction as the rotor rotates. However, when the number of stator magnetic poles is 4, the operation is shortened, and the increase/decrease of the two-phase currents are superimposed on each other, which is not simple. Also, it is an operation in which the operations in two directions are alternately repeated. Further, in the motors having 8 stator magnetic poles in FIGS. 19 and 23, the number of stator magnetic poles is special, and the stator magnetic poles in the same direction are arranged in the circumferential direction. Therefore, there are similar points such that the current directions of the AD 2-phase windings 91*ad*1 and 91*ad*2 in FIG. 19 take positive and negative values. The case where the number of pole pairs of this motor is 1 will be described, but the number of pole pairs can be arbitrarily increased to 2, 3, 4, and 5.

FIG. 45(*a*) shows a motor configuration in which the number of stator magnetic poles is four and the number of rotor magnetic poles is two, and the circumferential width of each magnetic pole is about 90°. The winding of the motor has a structure of a concentrated winding. Further, it is a motor that fixes the polarity of the stator magnetic poles, and its magnetisms N and S are added. Reference numeral 45A is an AK phase stator magnetic pole, which winds an AK-phase concentrated winding 457. For 45A/, an AK/ phase concentrated winding 458 is wound by an AK/ phase stator magnetic pole, and both windings are connected in series to energize an AK phase current IaK. Let Nwa be the total number of turns of both windings. Similarly, reference numeral 45B winds a BK-phase concentrated winding 459 with a BK-phase stator magnetic pole. For the winding 45B/, a BK/ phase concentrated winding 45*e* is wound by a BK/ phase stator magnetic pole, and both windings are connected in series to energize a BK phase current IbK. It should be noted that the coil end portion of 457, 458, etc. also refers to the winding in each slot. Reference numeral 455 is one rotor magnetic pole, and the angle from the CW end of the AK phase stator magnetic pole 45A to the CCW end of the rotor magnetic pole 455 on the paper surface is defined as the rotor rotation angle position θr.

FIG. 45(*b*) is a configuration in which two concentrated winding windings arranged in each slot of FIG. 45(*a*) are put together to form a fullpitch winding winding. Reference numeral 45*ab* is an ABK-phase winding and energizes an ABK-phase current IabK. Reference numeral 45*ba* is a BAK phase winding and energizes a BAK phase current IbaK. The number of turns of both windings is Nwa/2. The relationship between each current is as follows.

$$IabK=IaK-IbK \quad (125)$$

$$IbaK=IaK+IbK \quad (126)$$

$$IaK=(IabK+IbaK)/2 \quad (127)$$

$$IbK=(-IabK+IbaK)/2 \quad (128)$$

Next, the relationship between the winding and the magnetic flux shown in FIG. 45 will be described. As shown in the figure, since an AK-phase winding WaK in which reference numerals 457 and 458 of FIG. 45(*a*) are connected in series intersect with a magnetic flux component φaK of the AK-phase, voltage VaK of the AK-phase winding WaK is given by the following equation. Since a BK phase winding WbK in which 459 and 45*e* are connected in series interlinks with a magnetic flux component φbK of the BK-phase, voltage VbK of the BK-phase winding WbK is given by the following equations.

$$VaK=Nwa\times d\varphi aK/dt \quad (129)$$

$$VbK=Nwa\times d\varphi bK/dt \quad (130)$$

The relationship between the-AK phase current IaK and the AK-phase magnetic flux φaK cannot be expressed by a linear equation because a non-linear region as shown in FIG. 10 is often used. Then, it changes greatly depending on the rotor rotation angle position θr. The relationship between the BK-phase current IbK and the BK-phase magnetic flux φbK is also the same. As the normal use area of the motor, it is premised on the non-linear relationship shown in FIGS. 10, 12, and 13 described above. However, since equations (129) and (130) are physical equations, they also hold in a non-linear region. However, the winding resistance and the leakage flux of each winding are complicated and complicated, so they are ignored. Also, the inductance, which should be a constant of proportionality, changes greatly depending on the operating state of the motor, and is not used in the description of the present invention.

Voltage VabK of an ABK phase winding WabK of 45*ab* and voltage VbaK of a BAK-phase winding WbaK of 45*ba* in FIG. 45(*b*) are given by the following equations.

$$VabK=Nwa/2\times d(\varphi aK-\varphi bK)/dt=(VaK-VbK)/2 \quad (131)$$

$$VbaK=Nwa/2\times d(\varphi aK+\varphi bK)/dt=(VaK+VbK)/2 \quad (132)$$

Here, especially in equation (131), when the AK-phase current IaK is increased while the BK-phase current IbK is decreasing, the term (−VbK) becomes a positive voltage, indicating that the increase in the IaK is hindered. Similarly, if the BK-phase current IbK is increased while the AK-phase current IaK is decreasing, the (VaK) term becomes a negative voltage, indicating that the increase in IbK is hindered. In particular, torque output at high speeds is hindered and limited. As described above, the full pitch winding may be able to reduce the copper loss, but is easily affected by the voltage generated by the magnetic flux of the other phase.

In drive circuits of FIGS. 47, 51, and 52, which will be shown later, in FIG. 45(*b*), two full pitch windings represented by reference numerals 45*ab* and 45*ba* are connected in series to carry a current of the corresponding phase. The voltage across the series connection winding is unaffected by the voltage generated by the magnetic fluxes of the other phases. Then, the current component energizing the series connection winding selectively excites the corresponding stator magnetic poles, and the magnetomotive forces that excite the other stator magnetic poles cancel each other out to become zero, and it does not have an electromagnetic effect on other stator magnetic poles. The voltage across the connection body in which the two full pitch windings 45*ab* and 45*ba* shown in FIG. 45(*b*) are connected in series with each other is expressed by the following equations from equations (131) and (132).

$$VabK+VbaK=VaK \quad (133)$$

$$-VabK+VbaK=VbK \quad (134)$$

When increasing the AK-phase current IaK, the current is driven so as to follow the relationship of equation (133). When increasing the BK-phase current IbK, the current is driven so as to follow the relationship of equation (134).

Figure 47:
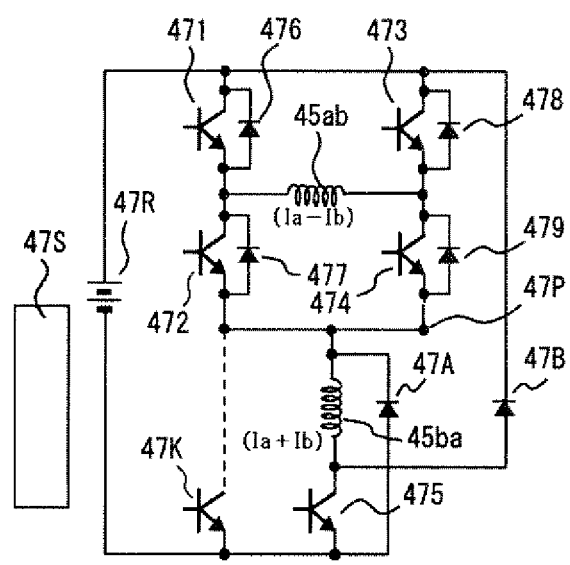
FIG. 47 exemplifies a drive circuit and windings according to the present disclosure.

Next, an example of a drive circuit for driving the motor of FIG. 45(*b*) is shown in FIG. 47. Reference numeral 47S in FIG. 47 is a control circuit for the entire drive circuit, and reference numeral 7R is a DC voltage source. The transistors 471 and 474 are energized to the ABK-phase full pitch winding winding 45*ab* of FIG. 45(*b*) and FIG. 47 when the ABK-phase current IabK of the equation (125) is a positive value. Similarly, the transistors 473 and 472 are energized when IabK is a negative value. The transistor 475 energizes the BAK-phase full pitch winding 45*ba* of the BAK-phase (126) with the BAK-phase current IbaK. Diodes 476, 477, 478, 479, 47A, 47B regenerate energy to the power supply or energize the flywheel current.

Figure 46:
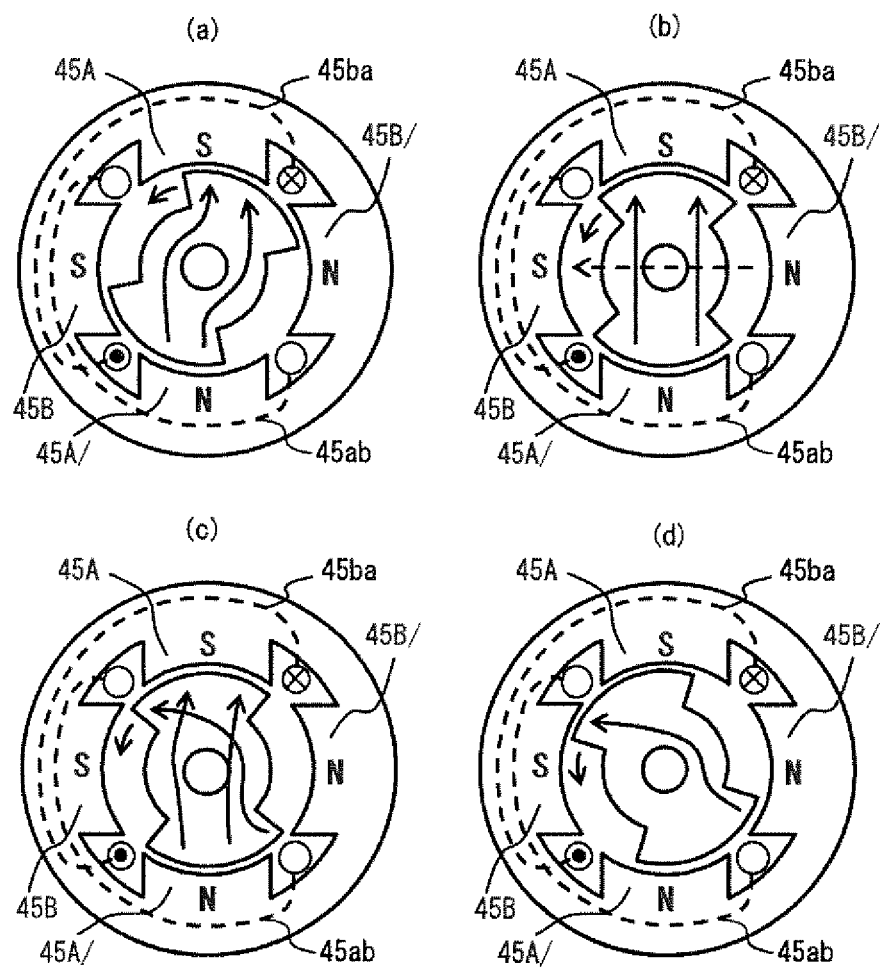
FIG. 46 is a lateral sectional view exemplifying a motor according to the present disclosure.
Figure 48:
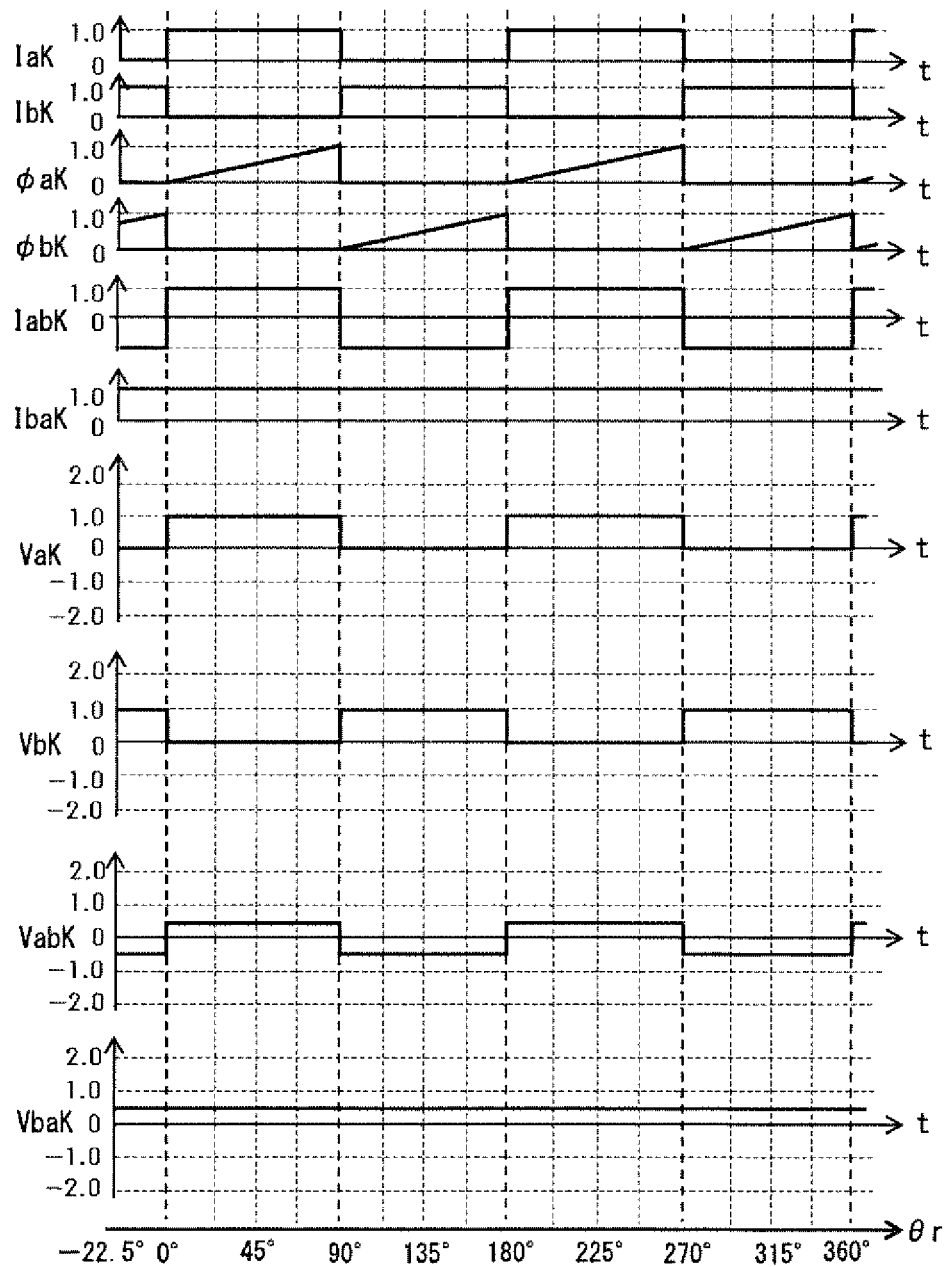
FIG. 48 exemplifies currents, magnetic fluxes, and voltages of the respective phases of a motor according to the present disclosure.

Next, FIG. 48 shows and describes an example of the current and magnetic flux that drive the motor of FIG. 45(*b*). The conditions of the driving example of FIG. 48 are extremely low speed rotation, therefore, the induced voltage accompanying the rotation of the motor can be ignored, and the winding voltage at the timing when the currents of the AK phase and the BK phase decrease rapidly and the magnetic flux also decreases rapidly is ignored, and the rotor treats the operation at the boundary between the AK phase and the BK phase as an ideal model. Further, as described above, the winding resistance and the leakage inductance of the winding are also ignored. The horizontal axis of FIG. 48 is an extremely low speed rotation, but is a time axis, and is matched with other representation methods of the explanatory time chart. This is an operation in which the rotor rotates to the CCW direction, and the relationship with the rotor rotation angle position θr is also shown at the bottom of the page. FIG. 46(*a*), (*b*), (*c*), (*d*) shows the states in which θr is 67.5°, 90°, 100°, and 112.5° when the rotor of FIG. 45(*b*) rotates to the CCW direction. As shown in FIG. 46(*b*), the direction of the magnetomotive force of the AK-phase is from the lower side to the upper side of the paper surface, and the direction of the magnetomotive force of the BK phase is from the right side to the left side of the paper surface. Also, the operating cycle of this motor is 180°

The AK phase current component IaK in FIG. 48 is energized while the rotor rotation angle position θr is between 0° and 90°, and its value is 1.0. Since the AK phase magnetic flux component φaK during that period is a linear region that is not magnetically saturated, θr gradually increases between 0° and 90°, and IaK becomes 0 at 90°, so φaK becomes 0. Similarly, the BK-phase current component IbK is energized while the rotor rotation angle position θr is between 90° and 180°, and its value is 1.0. During that time, the BK-phase magnetic flux component (bK gradually increases while θr is 90° to 180°, and since IbK becomes 0 at 180°, φbK also becomes 0. The ABK phase current IabK is of equation (125), and is a positive and negative square wave current. The BAK phase current IbaK is of equation (126) and has a constant value.

The AK-phase voltage component VaK in FIG. 48 is of equation (129) and has a rectangular wave voltage as shown. The BK phase voltage component VbK is of equation (130) and has a rectangular wave voltage as shown. However, the voltage at the timing at which the magnetic fluxes φaK and φbK rapidly decrease to 0 is ignored and set to 0 as described above. The ABK-phase voltage VabK is of the equation (131), and has a rectangular wave voltage of 0.5 for the positive part and −0.5 for the negative part. The BAK phase voltage VbaK is of the equation (132) and has a constant voltage of 0.5. It should be noted that these operations are ideal models and are operations at extremely low speed rotation. In this operation, under the above assumption, no problem in energization occurs.

Figure 49:
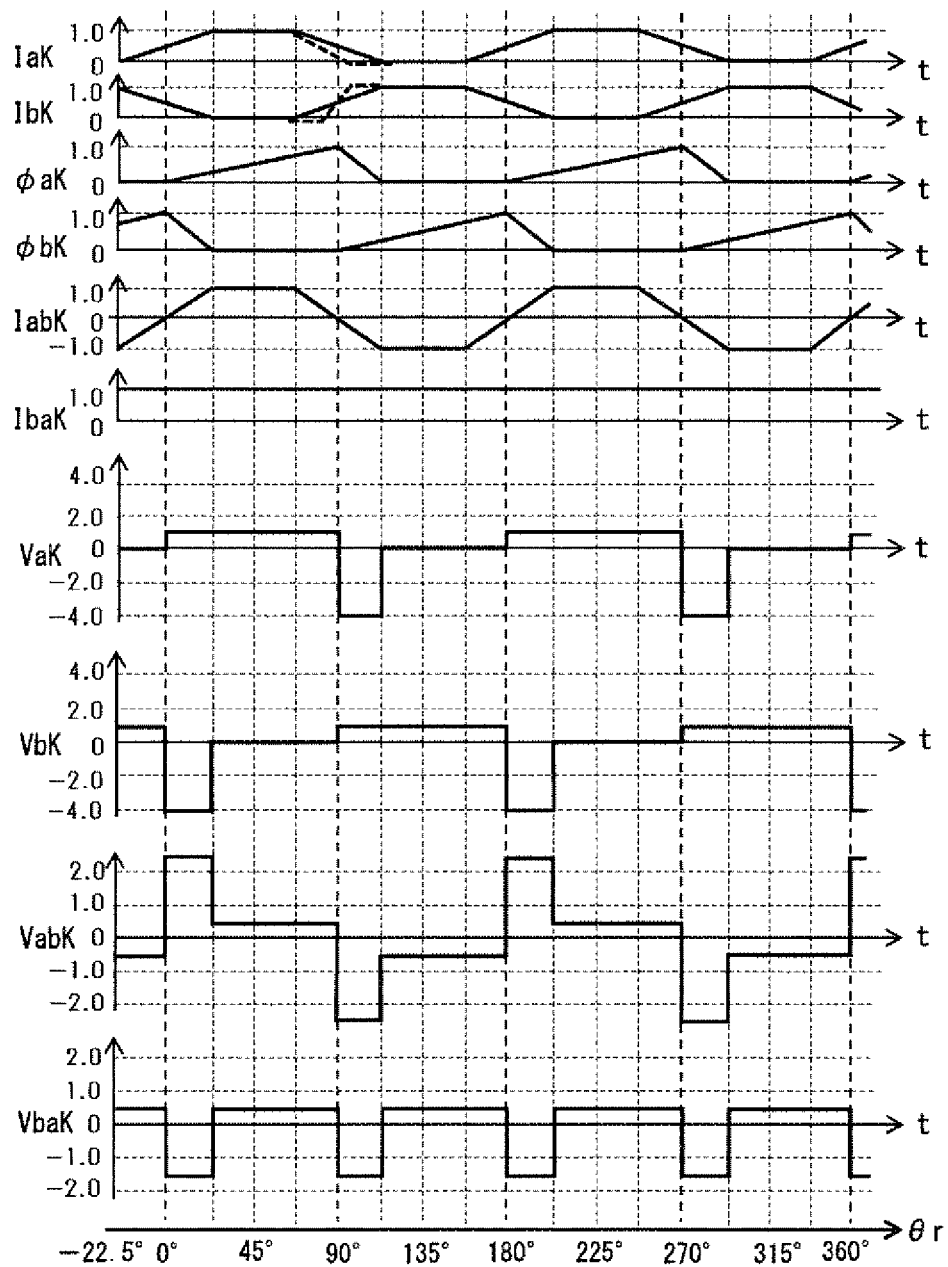
FIG. 49 exemplifies currents, magnetic fluxes, and voltages of the respective phases of a motor according to the present disclosure.

Next, FIG. 49 shows an example of operation when the current value is about twice the current value of magnetic saturation at high speed rotation, and a problem at that time. The relationship between the rotor rotation position θr, the current value, the magnetic flux, and the voltage is handled a little more accurately than in FIG. 48. First, regarding the current value, for example, in the magnetic characteristics of FIG. 11, assuming that the continuous energization current Ira of the motor is twice the current value of magnetic saturation, this corresponds to energizing the Ira current of FIG. 11 to the winding of FIG. 45(*b*). However, here, in order to simplify the drawing of FIG. 49 showing the characteristics and to simplify the voltage and current relations, the magnetic characteristics shown by 111 in FIG. 11 are further simplified as 501 in FIG. 50. The amplitude of the energizing current is Ira, and in a place where the magnetic path is narrow in the magnetic circuit, the magnetic flux density becomes 2.0 [T] due to the current of Ira/2, and the modeling is performed on the assumption that the magnetic saturation occurs. That is, it means that a current twice the magnetically saturated current value is applied to both windings of FIG. 45(*b*). In FIG. 49, the current value Ira is shown as 1.0.

Since FIG. 49 shows a state of high-speed rotation and a large current, the time for increasing or decreasing the current becomes longer and the time is insufficient. Here, an example in which the currents of both windings of FIG. 45(*b*) are increased or decreased while the rotor is rotated by 45° will be described. The AK-phase current component IaK in FIG. 49 increases from 0 to 1.0 when the rotor rotation angle position θr advances by 45° from −22.5° to 22.5°. Since the AK phase magnetic flux component φaK has already reached 0.5 when θr is 0°, θr gradually increases between 0° and 90°. IaK is a constant value of 1.0 when θr is between 22.5° and 67.5°. IaK decreases between 67.5° and 90°, but at 90° IaK is 0.5 and φaK has not yet decreased at this point. It is a range from FIG. 46(*a*) to (*b*). Between 90° and 112.5°, φaK decreases rapidly. Although not accurate, it is assumed that the waveform of (aK in FIG. 49 is approximated by the fact that φaK decreases evenly between 90° and 112.5°. It is a range from (b) to (c) and (d) in FIG. 46.

Similarly, the BK-phase current component IbK in FIG. 49 increases from 0 to 1.0 between 67.5° and 112.5°. It is a constant value of 1.0 between 112.5° and 157.5° and decreases from 1.0 to 0 between 157.5° and 202.5°. The current component IbK is 90° behind IaK in phase. The BK-phase magnetic flux component φbK also has the same magnetic flux waveform with a phase delayed by 90° from the AK-phase magnetic flux component φaK.

The ABK-phase current IabK in FIG. 49 is of equation (125) and has a trapezoidal AC waveform. The BAK-phase current IbaK is of equation (126) and has a constant value.

The AK-phase voltage component VaK in FIG. 49 is of equation (129), and is a constant value of 1.0 when θr is between 0° and 90°. The VaK is −4.0 between 90° and 112.5°. The BK-phase voltage component VbK is of the equation (130), and the phase is delayed by 90° from the voltage component VaK. Since the voltage increases only by the voltages VaK and VbK in FIG. 49, the scale in FIG. 48 is halved.

The ABK phase voltage VabK in FIG. 49 is the equation (131), with a maximum of +2.5 when θr is between 0° and 22.5°, and a negative maximum of −2.5 when θr is between 22.5° and 112.5°. When θr is between 22.5° and 90°, it is a constant value of 0.5, and when θr is between 112.5° and 180°, it is a constant value of −0.5. The BAK phase voltage VbaK is the equation (132), and it becomes −1.5 when θr is between 0° and 22.5° and between 90° and 112.5°. The BAK phase voltage VbaK becomes 0.5. in the other ranges.

VabK in FIG. 49 has a maximum of +2.5 when θr is between 0° and 22.5°, and it has a voltage five times higher than the forward voltage of 0.5 when driving in the CCW direction in other ranges. Therefore, it is difficult to increase the BAK phase current IbaK when θr is between 0° and 22.5°. Similarly, it is also difficult to negatively increase the BAK-phase current IbaK when θr is between 90° and 112.5°.

In FIG. 49, each calculated voltage waveform is shown assuming current examples IaK and IbK at high speed rotation. Then, FIG. 49 shows that there are a number of problems. The first problem is that, as described above, the voltage of the ABK phase voltage VabK becomes +2.5 when θr is between 0° and 22.5°, and the AK phase current component IaK cannot be increased. Further, the BAK-phase current IbaK cannot be negatively increased between 90° and 112.5°, which is a range from (b) to (c) and (d) in FIG. 46. Between 90° and 112.5°, the AK phase magnetic flux component φaK decreases and the AK phase voltage component VaK becomes −4.0, which hinders the increase in the BK phase current component IbK. That is, it is affected by changes in magnetic flux in the other phases.

The energy transfer in which θr in FIG. 49 is between 90° and 112.5° should be understood by observing (IaK×VaK) and (IbK×VbK), which are the power components of the AK-phase and the BK-phase. (IbK×VbK) is positive during this period, generating CCW torque. (IaK×VaK) is negative during this period, and CW torque is generated and regenerated to the power supply.

The second problem is that inverting the positive and negative values of the ABK phase current IabK with the assumed 45° range width generates a voltage of 2.5, which is five times larger than the forward voltage of 0.5 when driving in the CCW direction, so that the increase time and decrease time of the current increase, and the voltage becomes significantly insufficient. The third problem is that when θr in FIG. 49 is between 90° and 112.5°, the (IaK×VaK) becomes negative and a CW torque component is generated, so that the CCW torque is offset and decreased.

First, the configuration of FIG. 47 is shown as an example of the drive circuit of the present invention. The objects of the drive circuit of the present invention are to be able to drive a motor having a full pitch winding or an annular winding and reduce copper loss in each of the slots of the motor. Further, it is to be able to output high torque at high speed rotation and to realize low cost with a simple configuration. The function and operation are energized using the relationship of equations (133) and (134), and are not affected by the magnetic flux of the other phase, and conversely, do not have a magnetic effect on the other phase. Also, IaK and IbK can be desirably controlled so as to have appropriate values for each, and the energy of each winding can be regenerated to the power source at high speed.

In the case of the drive circuit of FIG. 47, the current direction of the current IabK of the ABK-phase winding 45AB can be changed by the transistors 471, 472, 473, 474. For example, when the BK phase current component IbK is energized in both windings and increases, the transistors 473 and 472 are turned on and connected in series with the BAK-phase winding 45ba to energize. Then, the state of the equation (134) is obtained, and IbK can be increased without being affected by the AK-phase magnetic flux φaK of the equation (132). The rotor position for increasing IbK is around 90° for the rotor rotation angle position θr, and is around (b) and (c) in FIG. 46. Since the direction of excitation of the BK phase is from the right side to the left side on the paper surface, the magnetic path of the BK-phase magnetic flux φbK is extremely narrow. Therefore, the inductance of the winding that energizes IbK is extremely small, and if there is no influence of the AK-phase magnetic flux φaK, IbK can be easily increased.

Similarly to the above, for the energization of the AK-phase current component IaK, the transistors 471 and 474 are turned on. As the state of equation (133), IaK can be easily increased when θr is 0° or about 180° without being affected by φbK.

Next, in FIG. 47, a method of independently and freely controlling IaK and IbK will be described. Considering their absolute values in the equations (125) and (126), the BA phase current IbaK is always larger. Therefore, if the energization direction of IabK can be selected and IbaK can be made larger than IabK, IaK and IbK can be controlled independently and desirably. Practically, assuming a state in which each transistor of FIG. 47 is subjected to PWM control of pulse width modulation, the transistors 191 and 472 are turned on. In response to this, the current IabK of the ABK phase winding 45ab is in the flywheel state and maintains the energizing current of the IabK. If the transistor 475 is also turned on, a power supply voltage is applied to the BAK phase winding 45ba, and only the BAK phase current IbaK can be increased. Then, aK and IbK can be increased independently and desirably.

Next, in FIG. 47, a method of rapidly reducing the current IabK of the ABK phase winding 45ab and the BAK phase current IbaK of the BAK phase winding 45ba will be described. If all the five transistors shown in FIG. 47 are turned off, both currents can be regenerated to the power supply in parallel through the regenerative diode. In normal power supply from the power supply side to the winding side, half the power supply voltage is applied to both windings. On the other hand, in the operation in which both windings regenerate to the power supply in parallel, a negative voltage twice as much as in the normal state is applied to both windings, and rapid regeneration can be performed. Further, in FIG. 47, the current of one winding is in the flywheel state. If you want to regenerate the other, you can turn on the transistor that can be in the flywheel state and turn off the other transistor. In this way, rapid regeneration and free regeneration can be performed.

In particular, in FIG. 47, the presence of each regenerative diode is important. In order to regenerate the currents of both windings, it is necessary to connect the anode of the diode 47A to the negative side of the power supply and the cathode to the point of the upper 47P of the BAK phase winding 45ba. Although these regenerative diodes are important, it is possible to substitute the function with a regenerative transistor. In addition to substituting, it is also possible to realize more advanced and flexible power regeneration by the on/off function. However, it is necessary to prevent the reverse voltage applied to the transistor, and the cost burden increases because it becomes complicated.

Twenty-Fifth Embodiment

Figure 51:
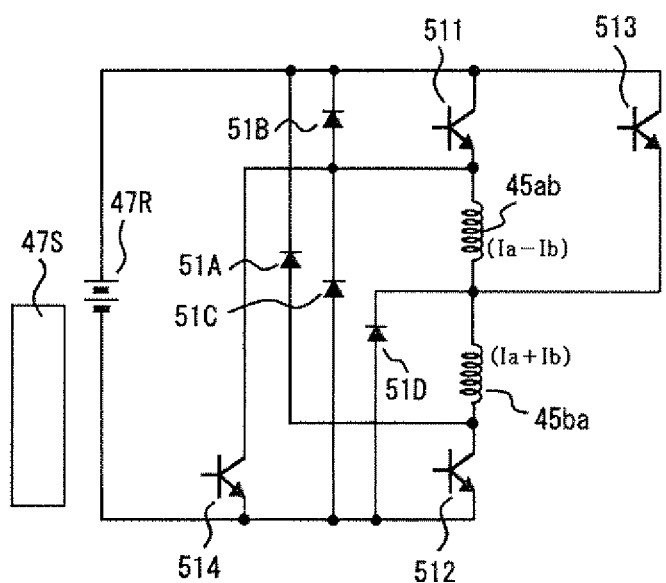
FIG. 51 exemplifies a drive circuit and windings according to the present disclosure.

Next, another embodiment of the mode 4 is shown in FIG. 51. It is a drive circuit of FIG. 51 that drives the motor of FIG. 45(b). The ABK phase full pitch winding 45ab and the BA-phase full pitch winding 45ba are connected in series, and are energized by transistors 511 and 512. The voltage between both windings is not affected by the BK-phase magnetic flux φbK according to the equation (133). When the BAK phase current IbaK is larger than the ABK phase current IabK, a transistor 513 can increase the IbaK. Since the ABK phase current IabK is the value of the equation (125), when it becomes a negative current value, is energized by transistors 513 and 514. In this case, both windings are driven in parallel, and a power supply voltage can be applied to both windings. In this way, arbitrary currents of IabK and IbaK can be supplied.

Twenty-Sixth Embodiment

Figure 52:
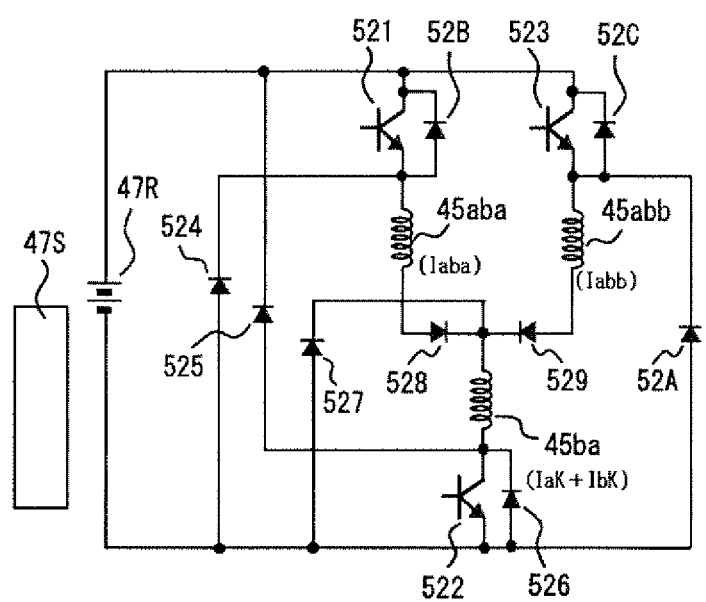
FIG. 52 exemplifies a drive circuit and windings according to the present disclosure.

Next, another embodiment of the mode 4 is shown in FIG. 45(c) and FIG. 52. A motor in which the ABK phase full pitch winding 45ab of the motor of FIG. 45(b) is divided into two parallel full pitch windings 45aba and 45abb is shown in FIG. 45(c). The energizing directions of 45aba and 45abb are the directions of the current symbols shown. When the value of equation (125) is positive, 45aba is energized, and when it is negative, 45abb is energized. The winding resistance values of 45aba and 45abb are twice as high as those of the BAKphase full pitch winding 45ba, and the copper loss in the slot increases. However, since the current direction of both windings can be unidirectional, the drive circuit can be simplified. The number of turns of both windings is Nwa/2.

Next, the circuit for driving the motor of FIG. 45(c) is shown in FIG. 52. It is a simple circuit composed of three transistors, which is advantageous in terms of cost. Continuous torque can also be realized by applying the technology for expanding the torque generation range, which will be described later. When the value of the equation (125) is positive, a transistor 521 energizes the current of IabK to 45aba of the two ABK phase full pitch windings 45aba and 45abb. A transistor 523 energizes the current of (−IabK) to 45abb of the two ABK-phase full pitch windings 45aba and 45abb when the value of the equation (125) is negative.

A transistor 522 in FIG. 52 energizes the current IbaK that energizes the BAK-phase full pitch winding of the equation (125). Since the three transistors 521, 522, and 523 cannot energize the current independently, they are always interlocked with each other to energize. The voltage across the windings 45$aba$ and 45$ba$ in FIG. 52 is of equation (133) and is the AK phase voltage VaK. It is not affected by the magnetic flux and voltage of the BK phase. Therefore, the AK-phase current component IaK can be easily supplied. The voltage across the windings 45$abb$ and 45$ba$ is of the equation (134), which is the BK-phase voltage VbK. It is not affected by the magnetic flux and voltage of the AK-phase. Therefore, the BK-phase current component IbK can be easily supplied.

However, the explanation of the current may be insufficient. From equations (125) and (126), IbaK is larger or equal to the absolute value of IabK. Therefore, in the above description, when IaK and IbK are energized at the same time, there arises a problem that the current flowing through the BA-phase winding 45$ba$ of FIG. 52 is insufficient. To solve this problem, the absolute value of the difference is subtracted from the sum of IaK and IbK to obtain Iabs, and Iabs/2, which is half of Iabs, is superposed on both the windings 45$aba$ and 45$abb$ and energized.

$$Iabs=(IaK+IbK)-|(IaK-IbK)| \quad (135)$$

$$IbaK=Iaba+Iabb \quad (136)$$

At this time, the current components flowing in both the current of the winding 45$aba$ and the current of 45$abb$ are such that both windings are arranged in the same slot and the energization direction is opposite. Therefore, the electromagnetic magnetomotive forces exerted on the outside of these slots cancel each other out and have no effect.

For example, in the equations (125) and (126), the case where IaK is 3 and IbK is 4 will be described. IabK is −1 and IbaK is 7. Iabs=(3+4)−1=6. The current Iaba to be supplied to the winding 45$aba$ of FIG. 52 is Iaba=0+6/2=3 because the value IabK of the equation (125) is −1. Moreover, the current IbaK=Iaba+Iabb=3+4=7 flows through the BA phase winding 45$ba$ in FIG. 52, which matches the value of equation (126). The foregoing energization method and the energization method based on the equations (135) and (136) means that the currents IaK and IbK, which are the current components resulting from the equations (125) and (126), can be independently and controlled in a desired basis.

At the time of stopping or at low speed rotation, the components of IaK and IbK of the equations (125) and (126) are often energized independently. However, in high-speed rotation, the ratio of the time required for the decrease and increase of the current increases, so that the ratio of the time required for simultaneously energizing IaK and IbK increases. Then, independent and flexible control of the currents IaK and IbK, which have less mutual interference as in the equations (133) and (134), is required for high torque output at high speed rotation.

Reference numerals 524, 525, 527, and 52A in FIG. 52 are diodes for regenerative power supply. Reference numerals 52B, 52C, and 526 are diodes for protecting the reverse voltage of the transistor. Reference numerals 528 and 529 are diodes for preventing reverse conduction. The mutual inductance of the ABK phase windings 45$aba$ and 45$abb$ is large.

Next, in the motor of FIG. 45($c$) and the drive circuit of FIG. 52, an operation of regenerating the current energized during rotation in the CCW direction and increasing current component of the next phase will be described. First, it is assumed that the rotor rotation angle position θr is 67.5° in FIG. 46($a$), and the IaK component of the equations (125) and (126) is energized as shown in the waveform of the time chart of FIG. 49. At this point, the IbK component is 0, and as shown by the arrow in FIG. 46($a$), the magnetic flux passes from the AK/ phase stator magnetic pole 45A/ to the AK phase stator magnetic pole 45A, and CCW torque is generated. Transistors 521 and 522 in FIG. 52 are energizing the windings 45$aba$ and 45$abb$ with the IaK component. However, here, it is necessary to replace the winding 45$ab$ of FIG. 46 with the 45$ab$ and 45$ab$ shown in FIG. 45($c$).

At the time of θr=67.5° in FIG. 46($a$), there is magnetic energy Ea=(Nwa×φaK×IaK/2) due to IaK that energizes the windings 45$ba$ and 45$aba$, and as shown in the figure, φaK indicated by the arrow is large.

$$Ea=Nwa \times \varphi aK \times IaK/2 \quad (137)$$

From θr=67.5° in FIG. 46($a$) to θr=90° in ($b$), the AK phase current component IaK of both windings is reduced to regenerate the magnetic energy to the power source. The AK-phase magnetic flux φaK from the bottom to the top on the paper, which is applied from the parts ($a$) to ($c$) in FIG. 46, is large. Therefore, the magnetic energy is large, and a proportional time is required for power regeneration due to a decrease in IaK. In the magnetically linear region, it can be said that the inductance of the winding that energizes IaK is large. A part of the magnetic energy is converted into CCW torque during this period and while the IaK component is a positive value.

In the operation of reducing the current component IaK at θr=67.5° in FIG. 46($a$), the current component IaK is energized through the diodes 524 and 525 by turning off the transistors 521 and 522 in FIG. 52 to regenerate the power supply. With the power supply voltage as Vdc, the power Prga of Vs×IaK is regenerated to the power supply.

$$Prga=Vdc \times IaK \quad (138)$$

On the other hand, from θr=90° to 180°, torque is generated at the BK-phase stator magnetic poles 45B and 45B/, so it is necessary to energize the BK phase current IbK. Immediately before FIG. 46($b$), that is, for example, εr=80°, the IbK energization is started and increased. For that purpose, the transistors 523 and 522 in FIG. 52 are turned on, and the winding 45$abb$ and the winding 45$ba$ are energized to IbK. At the same time, the AK phase current component IaK is being regenerated. The transistor 521 is in the off state, and the transistor 522 repeats on and off according to the magnitude of the BAK phase current IbaK. During this period, regardless of whether the transistor 522 is on or off, the magnetic energy of the equation (137) of the AK-phase current component IaK is converted into magnetic energy in the power supply or to the BK phase and emitted from the AK phase side.

At this time, the BK-phase current component IbK is not affected by the AK-phase magnetic flux φaK, as can be seen from the winding arrangement in FIG. 45($c$). Further, the BK-phase current component IbK does not affect the AK-phase magnetic flux φaK. The winding 45$abb$ and the winding 45$ba$ cancel out the electromagnetic action in the AK-phase direction. This is the relationship of the equation (134). Further, in the state of FIG. 46($b$) or ($c$), the magnetic path from the right side to the left side on the paper is narrow. It can be said that the inductance is small in the magnetically linear region. Therefore, in the vicinity of θr=80° to 100°, the increase in the BK-phase current component IbK is faster than the decrease in the AK-phase current IaK. Utilizing this fact, it is possible to start increasing the BK-phase current component IbK after starting the decrease of the AK-phase current IaK. An example is shown by a broken line in the region of θr=67.5° to 112.5° of IaK and IbK in FIG. 49.

In the current switching operation, the decrease of the AK-phase current IaK is delayed, and the current shifted to or after θr=90° becomes a negative torque with respect to CCW. Similarly, the BK-phase current component IbK energized before θr=90° also has a negative torque with respect to the CCW direction. Therefore, it is necessary not only to increase the positive torque component of the CCW direction, but also to make the negative torque component as small as possible to increase the total torque. For that purpose, as described above, a rapid increase/decrease of both currents is preferable in terms of torque generation. The method of energizing the electric current as shown by the broken line in FIG. 49 is not limited to FIG. 52, but is the same in FIG. 47 and the like. Further, as shown in FIG. 11, as a matter of course, when the current increases, it becomes a magnetically non-linear region. Therefore, it is non-linear in the region where the torque is large and the current is large, and the rate of increase of the magnetic flux with the increase of the exciting current becomes small. Then, in this non-linear region, the small amplitude inductance in the operating region becomes small, and the current increases/decreases quickly.

Twenty-Seventh Embodiment

Next, another embodiment of the mode 4 is shown in FIG. 53(*b*). FIG. 53(*b*) shows a motor having four stator magnetic poles, full pitch winding windings wound around each stator magnetic pole, and six salient pole-shaped rotor magnetic poles of a soft magnetic material. Reference numeral 535 is a rotor, and the circumferential width of each rotor magnetic pole is 30° with the space between the 6 magnetic poles and the magnetic poles equalized. The configuration of FIG. 53(*b*) has a circumferential width that is one-third smaller than that of the stator magnetic pole of FIG. 45(*b*). The number of rotor magnetic poles is tripled to six, and the circumferential width is reduced to one-third. As a result, the drive frequency of the motor of FIG. 53(*b*) is tripled as compared with that of FIG. 45(*b*). However, they are functionally similar, and each stator magnetic pole name and each winding name are the same. In addition, the current name, voltage name, and magnetic flux name of each phase are the same.

The relationship between the voltage, current, and magnetic flux of the winding of the motor of FIG. 53(*b*) is the same as the equations (125) to (134) showing the state of the motor of FIG. 45(*b*). The same applies to the driving operation of the motor. It can be driven in the same manner by the drive circuits of FIGS. 47 and 51.

Since the slot cross-sectional area of the motor configuration shown in FIG. 45(*b*) is small and the winding space is insufficient, there is a problem that the winding tends to be thin and the copper loss tends to be large. Since the slot cross-sectional area of the motor of FIG. 53(*b*) is enlarged to about three times the size of that of FIG. 45(*b*), copper loss can be significantly reduced. However, the drive frequency during rotary drive increases three times, and the iron loss increases. It should be noted that the thickness of the tooth can be sufficiently increased from the tip to the root of the tooth, and the average magnetic flux density can be reduced.

Further, FIG. 45(*d*) shows an example in which the number of rotor magnetic poles is three. Reference numeral 4553 shows a rotor. Although the arrangement of the stator magnetic poles is biased, it can rotate in the same manner as the motor shown in FIG. 45(*b*). Reference numeral 45A3 is an AK-phase stator magnetic pole, reference numeral 45A/3 is an AK/ phase stator magnetic pole, and reference numeral 45B3 is a BK phase stator magnetic pole. Reference numeral 45B/3 is a BK/ phase stator magnetic pole, reference numeral **45*ab*3 is an ABK phase winding, and the ABK phase current IabK is energized. Reference numeral 45*ba*3** is a BAK phase winding and is energized with the BAK phase current IbaK. The circumferential width of the rotor magnetic pole is 60°, and the circumferential width of the stator magnetic pole is also 60°. The operation of FIG. 45(*d*) has three rotor magnetic poles with respect to the operation of FIG. 45(*b*), but operates in the same manner as the case where the number of rotor magnetic poles is two. The driving frequency increases 3/2 times.

In FIG. 45(*d*), since the width of each tooth can be reduced, the slot cross-sectional area can be increased and copper loss can be reduced. If the motor has a 2-pole pair and a 4-pole pair, the slot shape can be deformed relatively easily. In addition, it is normal to deform the shape of the tooth in order to secure the winding space. Various other modifications are possible. For example, the solid line portion of the BK/ phase stator magnetic pole 45B/3 can be divided into 45B/31 and 45B/32 shown by a broken line and arranged. The cross-sectional area of the slot on one side into which the winding **45*ab*3** is inserted can be increased. Since it is a full pitch winding, it is electromagnetically equivalent in a model interpretation.

Further, FIG. 53(*c*) shows an example in which the ABK phase winding **45*ab*** in FIG. 53(*b*) is divided into two full pitch windings of **45*ab*a and 45*ab*b. This is the same as the ABK phase winding 45*ab*** in FIG. 45(*b*) being divided into **45*ab*a and 45*ab*b** and transformed into the motor of FIG. 45(*c*). The motor of FIG. 53 (*c*) can be driven by the circuit of FIG. 52 in the same manner as the motor of FIG. 45(*c*). The motor copper loss is small, and it can be driven by a simple configuration of three transistors. As shown above, the motor of FIG. 45(*b*) can be variously modified, such as the other motor of FIG. 45 and the motor of FIG. 53. In addition, it can be combined with other technologies described later to improve functionality and performance.

Twenty-Eighth Embodiment

Figure 54:
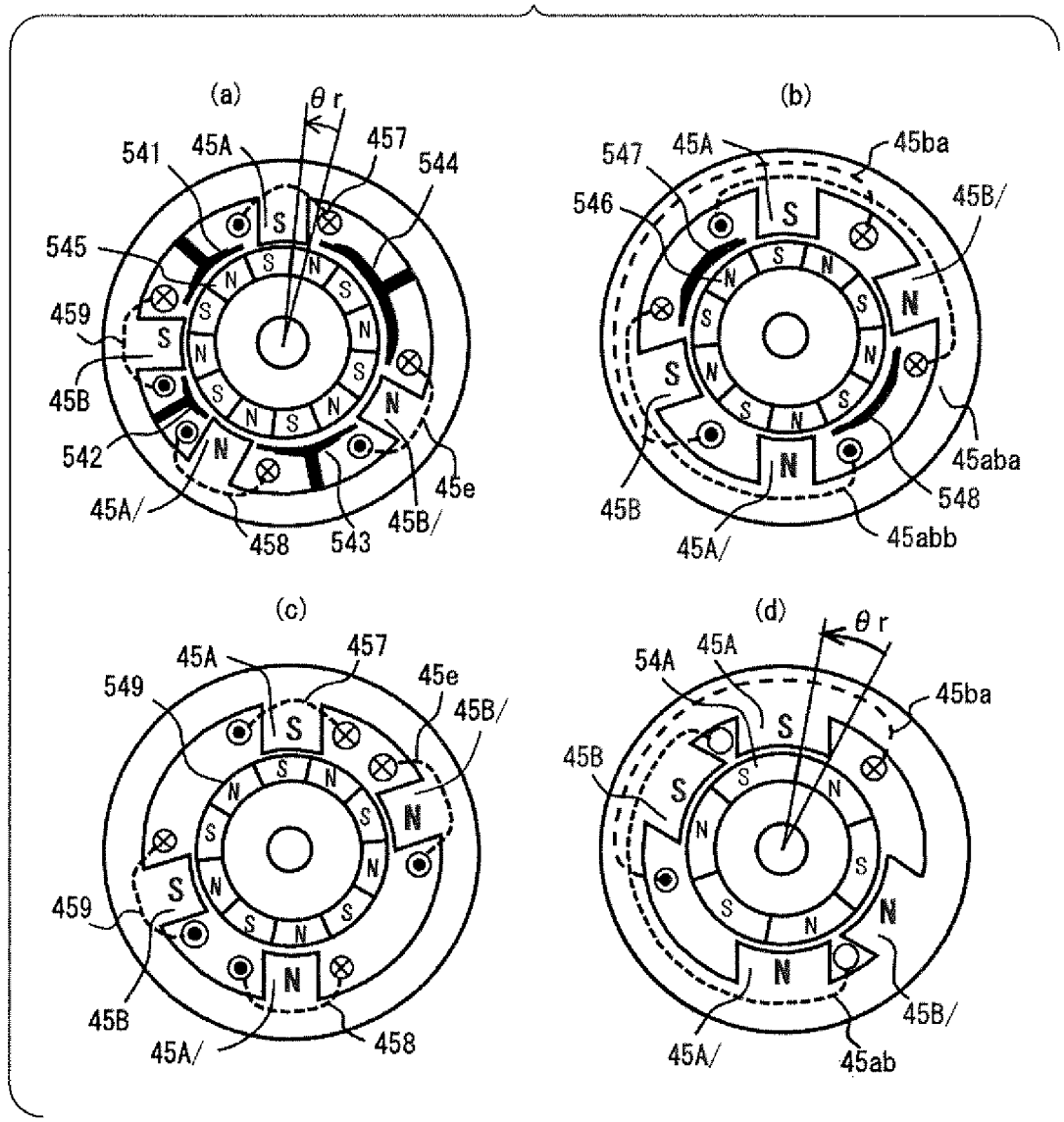
FIG. 54 is a lateral sectional view exemplifying a motor according to the present disclosure.

Next, another embodiment of the mode 4 is shown in FIG. 54(*b*). In FIG. 54(*b*), the soft magnetic rotor shown in FIG. 53 is replaced with a rotor using 546 permanent magnets. The rotor 546 has 10 magnetic poles, and the circumferential width of the magnetic poles is 36°. The circumferential width of the stator magnetic pole is also adjusted to 30°. The circumferential width of the stator magnetic pole is also adjusted to 30°. Circumferential period RHB4 of the rotor magnetic pole is 72°. Further, in the case of a soft magnetic rotor, the direction of the magnetic flux is irrelevant, but since the rotor 546 of FIG. 54(*b*) is a rotor magnetic pole of a permanent magnet, the directions of the magnetic fluxes of the north and south poles are determined. Therefore, it is necessary to arrange the circumferential positions of the BK phase stator magnetic pole 45B and the BK/ phase-stator magnetic pole 45B/ in FIG. 54(*b*) at positions having a specific relationship with the AK phase stator magnetic pole 45A. The circumferential position of the BK phase stator magnetic pole 45B with respect to the AK phase stator magnetic pole 45A is an odd multiple of the rotor magnetic pole width (RHB4/2). Also, in FIG. 54(*b*), 45B is arranged at a position of 36°×3=108° with respect to CCW.

Further, a gap between the AK and BK stator magnetic poles 45A and 45B in the circumferential direction is twice the width of the rotor magnetic pole, and has a width into which two poles, the north pole and the south pole, can be inserted. Therefore, leakage flux absorbing means 547 and 548 are arranged in the openings of those slots, and it is possible to absorb the leakage flux generated by the rotor and short-circuit it inside. When the leakage flux of the rotor is harmful, it can be effectively utilized. Further, although it depends on the characteristics of the leakage flux absorbing means of the magnetic material, it is also possible to magnetically connect to the back yoke portion of the stator as shown in FIG. 54(a). It is also useful in terms of mechanical retention and manufacturability.

The motor of FIG. 54(b) can be driven by the circuit of FIG. 52 in the same manner as the motor of FIG. 45(c). Since a permanent magnet is used, the load of exciting current is small, and since the slot cross-sectional area is wide, winding resistance can be reduced and motor efficiency can be improved. Moreover, the drive circuit is also simple because it can be driven by three transistors. A compact, low-cost motor system can be realized. Further, the motor of FIG. 54(b) can be driven by the circuit of FIG. 47 or FIG. 51 if the stator has the winding configuration of FIG. 45(b).

Next, another embodiment of the mode 4 is shown in FIG. 54(d). It is a 6-pole rotor using 547 permanent magnets, and the circumferential width of the rotor magnetic poles is 60°. The circumferential width of the stator magnetic pole is also adjusted to 60°. The circumferential period of the rotor magnetic poles is 120°. In that respect, FIG. 45(d) is a soft magnetic pole, which has the same circumferential period of 120°. Since the rotor 547 has the polarities of the N pole and the S pole of the permanent magnet, the arrangement of the stator magnetic poles of each phase is as shown in FIG. 54(d). That is, the position in the circumferential direction of the BK-phase stator magnetic pole 45B is an odd multiple of the rotor magnetic pole width (RHB4/2) with respect to the AK-phase stator magnetic pole 45A, which is the same as the arrangement constraint of FIG. 54(d). The circumferential position of the AK/ phase stator magnetic pole 45A/ is an odd multiple of (RHB4/2) with respect to 45A. The circumferential position of the BK/ phase stator magnetic pole 45B/ is an odd multiple of (RHB4/2) with respect to the BK-phase stator magnetic pole 45B.

The motor of FIG. 54(d) can be driven by the circuit of FIG. 47 or FIG. 51 as described above. In the drive circuit of FIG. 47, when a large current is applied to the AB-phase winding 45ab, the transistor 47K shown by the broken line can be added. The same applies to other drive circuits. Further, if the winding of FIG. 54(d) is changed as shown in FIG. 54(b), it can be driven by the circuit of FIG. 52 in the same manner as the motor of FIG. 45(c). Since the AK-phase and the BK-phase can be driven and controlled independently, the continuous output of the CCW torque, which will be described later, is also possible. The number of magnetic poles of the rotor can also be selected.

The embodiment of the mode 4 has been described above. Both the motor and the drive circuit have a simple configuration, and cost reduction is possible. The utilization rate of the windings of the motor is high, and high efficiency can be achieved. Regarding the problem that the magnetic fluxes of the A-phase and the B-phase interfere with each other and the problem that the voltage becomes excessive, a method of connecting two full pitch windings in series to reduce the excessive voltage is shown. There is a problem that it becomes difficult to generate torque at the magnetic pole boundary between the A-phase and the B-phase. However, by independently controlling the A-phase and the B-phase, it is possible to realize continuous torque even though the torque is one-way by applying the technique for expanding the torque generation range described later. Further, as will be described later, a technique of using a permanent magnet to reverse bias the magnetic characteristics of the tooth, a technique of arranging the permanent magnet in the stator in order to reduce the excitation load of the motor, and the like can also be used. Further, the motors shown in FIGS. 45 and 53 can be deformed in various ways. For example, the full pitch winding can be replaced with an annular winding. The number of magnetic poles of the rotor can be selected. The number of pole pairs of the motor can also be 2 or more. As shown in FIG. 18, it is possible to combine two motors with the inner and outer diameters of the motor, and it is also possible to simplify the winding. It can also be combined with a motor in the direction of the rotor shaft.

Twenty-Ninth Embodiment

Next, an embodiment of the mode 5 is shown in FIG. 53(a). Reference numeral 457 is a concentrated winding wound around the AK-phase stator magnetic pole 45A. Reference numeral 458 is a concentrated winding wound around A/ phase stator magnetic pole 45A/. The AK-phase current IaK is applied to the AK-phase winding WaK in which both windings are connected in series. Similarly, reference numeral 459 shows a concentrated winding wound around the BK-phase stator magnetic pole 45B. Reference numeral 45e is a concentrated winding wound around the BK/ phase stator magnetic pole 45B/. The BK-phase current IbK is applied to the BK-phase winding WbK in which both windings are connected in series. The number of turns of both windings is Nwa. The configuration other than the winding of the motor of FIG. 53(a) is the same as that of the motor of FIG. 53(b) described above. A rotor 535 has six rotor magnetic poles, the circumferential width of the rotor magnetic pole and the stator magnetic pole is 30°, and a pitch (angular interval) at which the rotor magnetic poled are arranged is 60°.

The circumferential period of the rotor magnetic poles will be described with reference to the modes 4 and 5. When the number of rotor magnetic poles of the soft magnetic material is RN5, the circumferential period RHB5 of the rotor magnetic poles is (360°/RN5). When the number of rotor magnetic poles of the north and south poles using permanent magnets is RN5, the circumferential period RHB5 of the rotor magnetic poles is (360°/(RN5/2))=(180°/RN5). That is, for example, with the six rotor magnetic poles shown in FIG. 53(c), the circumferential period of the rotor magnetic poles is 60°, and in FIG. 54(a), the number of rotor magnetic poles is 12, but since the N and S poles are paired, the circumferential pitch (angular interval) of the rotor magnetic poles is 60°.

When the rotor magnetic pole is a soft magnetic material, when the A phase stator magnetic pole mainly faces the soft magnetic material of the rotor, the B-phase stator magnetic pole mainly faces the gap portion of the rotor. When the rotor magnetic pole is a permanent magnet, when the A phase stator magnetic pole mainly faces the N-pole rotor magnetic pole, the B phase stator magnetic pole mainly faces the S-pole rotor magnetic pole. The A phase magnetic flux component φa passes through the A-phase stator magnetic pole and the A/ phase stator magnetic pole, and the B phase magnetic flux component φb passes through the B-phase stator magnetic pole and the B/ phase stator magnetic pole.

In the case of the motors shown in FIGS. 45, 53, 54, etc., the average torque is large when the circumferential width of the stator magnetic pole and the circumferential width of the rotor magnetic pole are (RHB5/2) from the viewpoint of a simple model. However, the rotor magnetic pole width and the stator magnetic pole width are not limited to these values, and various measures can be added. For example, the motors of the modes 4 and 5 need to be continuously operated by starting and rotating from a stopped state. As will be shown later, it is necessary to devise the circumferential width of the stator magnetic pole and the rotor magnetic pole, devise the shape, or devise the magnetic resistance inside the rotor.

Next, the characteristics of the motor of FIG. 53($a$) are qualitatively the same as the characteristics of the motor of FIG. 45($a$). However, since the number of rotor magnetic poles is increased from 2 to 6, the operation of energizing the current with respect to the rotation angle of the rotor is tripled, and the frequency is tripled. The AK phase magnetic flux passing through the AK phase winding WaK is defined as φaK, and the equation (129) can be applied to the AK phase voltage VaK. Assuming that the BK phase magnetic flux passing through the BK phase winding WbK is φbK, the equation (130) can be applied to the BK-phase voltage VbK.

In the driving of the motor of FIG. 53($a$), the AK-phase winding WaK and the BK phase winding WbK are concentrated wound windings. Therefore, it can be driven by using two sets of drive circuits out of the three sets of drive circuits shown in FIG. 5. The AK phase current IaK and AK-phase voltage VaK at extremely low speed rotation correspond to IaK and VaK in FIG. 48. The BK-phase current IbK and the BK-phase voltage VbK correspond to the IbK and VbK in FIG. 48. However, the scale of the rotor rotation angle θr needs to be reduced from 360° to 120°, and other angles need to be reduced to ⅓.

Figure 50:
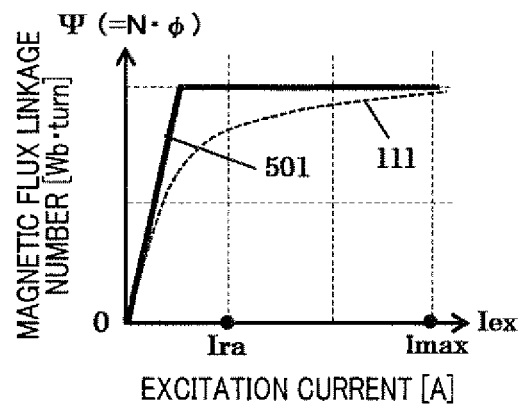
FIG. 50 exemplifies a relationship between excitation currents and the number of magnetic flux linkages.
Figure 55:
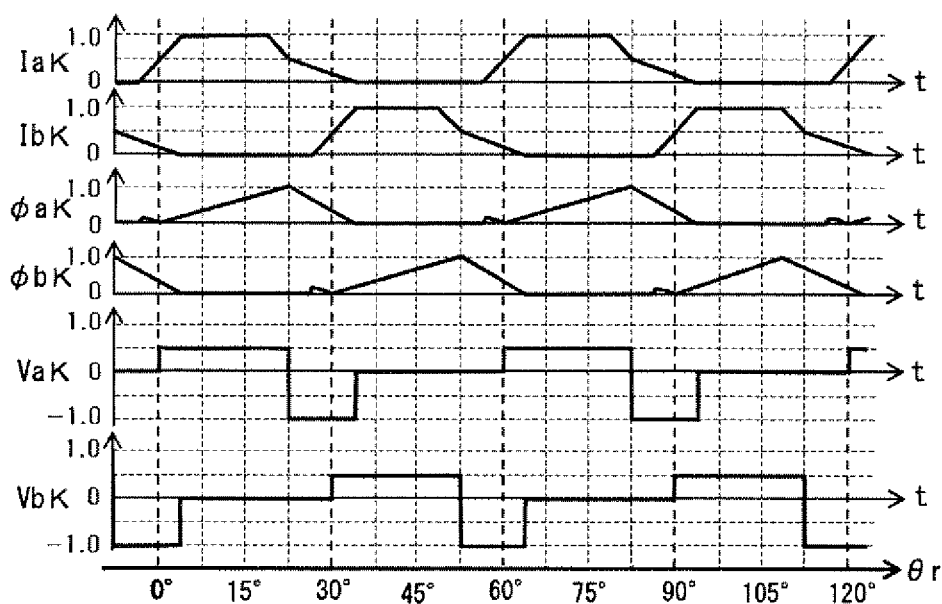
FIG. 55 exemplifies currents, magnetic fluxes, and voltages of the respective phases of a motor according to the present disclosure.

When the motor of FIG. 53($a$) is rotated by generating torque in the CCW direction at a certain high speed, it is shown in FIG. 55, for example. The driving conditions in the example of FIG. 55 are the same as in the examples of FIGS. 49 and 50, and the driving is performed by a current Ira having a magnitude of about twice the current value of magnetic saturation. As shown in FIG. 50, the model has simplified magnetic characteristics. In FIG. 55, the magnetic flux density changes depending on the magnitude of the current value when the currents IaK and IbK are between 0 and 0.5. It is assumed that the magnetic flux density does not change even if the current value changes between 0.5 and 1. Driven using a magnetically non-linear region. The torque value depends on the size of the motor, but is, for example, Ira in FIG. 12, which is a region of about ⅓ of the maximum current Imax.

As shown in FIG. 55, the AK-phase current IaK increases from 0 to 1.0 when the rotor rotation angle position θr is 7.5° from −3.75° to 3.75°. As can be seen from FIG. 53($a$), in the vicinity of θr of 0°, the area where the AK-phase stator magnetic pole 45A and the rotor magnetic pole face each other is small, and the winding inductance is small. Therefore, the rate of current increase is increased. During the period of 15° from 3.75° to 18.75°, IaK=1 is set as a constant value, and the current is reduced from 18.75°. Since it is assumed that magnetic saturation occurs when IaK is 0.5 or more, the current reduction during that period is easy. It can be said that the small amplitude inductance in this region is small. Therefore, when θr is between 18.75° and 22.5°, the rate of current decrease of IaK from 1.0 to 0.5 is increased to be the same as the rate of current increase. When θr is between 22.5° and 33.75°, the magnetic flux φaK changes significantly due to the decrease in IaK, so the rate of current decrease is reduced to ⅓. When θr is between 33.75° and 56.25°, IaK is 0. Hereinafter, the same operation is repeated. The BK phase current IbK in FIG. 55 is 30° behind IaK in phase and has the same waveform shape.

In FIG. 55, the AK-phase magnetic flux at this time is φaK, and θr is slightly generated between −3.75° and 0°. However, at the position where θr is 0°, φaK becomes 0 because the AK-phase stator magnetic pole 45A does not face the rotor magnetic pole. Since the AK-phase current IaK is already 0.5 at the position where θr is 0°, φaK increases in proportion to the increase in the facing area of both magnetic poles when θr is from 0° to 22.5°. When θr is from 22.5° to 33.75°, IaK decreases to 0.5 or less, so φaK also decreases to 0. However, although the decrease in the magnetic flux φaK draws a unique curve, it is simplified here as a linear decrease. The BK-phase magnetic flux φbK in FIG. 55 is 30° behind in phase with φaK and has the same waveform shape.

Even if the AK-phase voltage VaK in FIG. 55 is magnetically non-linear, it is represented by the equation (139), so that the waveform of VaK is roughly as shown in the figure. However, winding resistance and leakage flux are ignored. In particular, when θr is from 22.5° to 33.75°, since the rate of change in magnetic flux is doubled as compared with 0° to 22.5° in which the magnetic flux increases, the amplitude of the negative voltage portion is doubled as compared with the positive voltage portion. The BK phase voltage VbK is represented by the equation (140), has a phase lagging 30° from VaK, and has the same waveform shape. From this, there is a problem that the regenerative time of the magnetic energy of the motor of FIG. 53($a$) and the burden of the regenerative voltage are large. For example, in this case, if the regenerative voltage is equal to the power supply voltage 1.0, the voltage during power running between θr of 0° and 22.5° is 0.5, and only half of the power supply voltage can be used during power running. It must carry twice as much current as when the power running voltage is 1.0. Then, there is a problem that the current capacity of the transistor of the drive circuit becomes large.

That is, from the relationship of the equations (139) and (140), if the regeneration time is shortened, the regeneration voltage becomes large, and the power supply voltage cannot be effectively used for torque generation. On the other hand, if the regeneration voltage is reduced, the regeneration time becomes longer. The current value in the range where the torque is generated in each of the AK phase and the BK-phase is limited, and the torque is limited. In this way, the regeneration time and the winding voltage are in a trade-off relationship.

Figure 56:
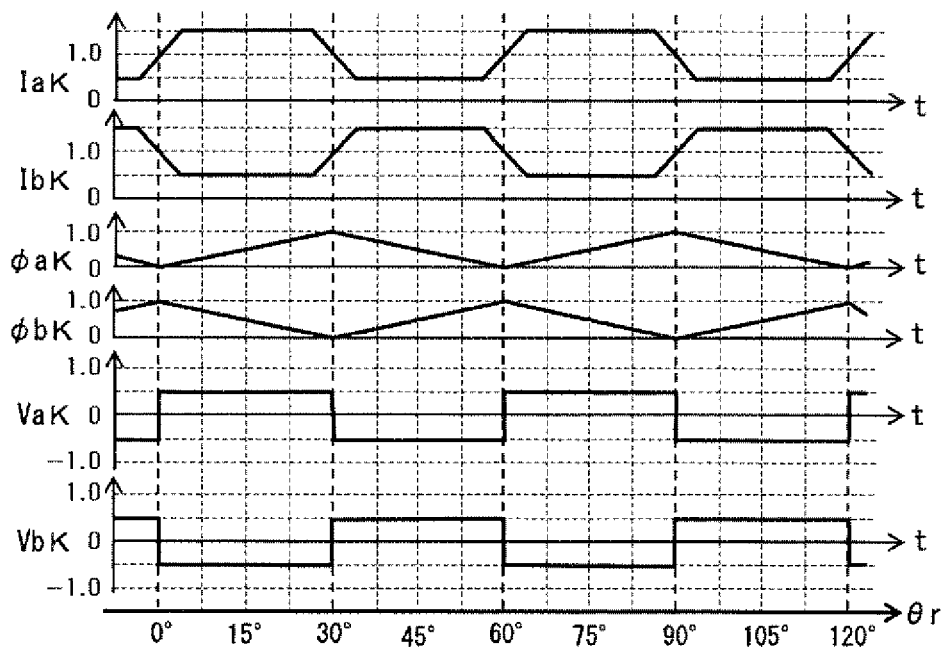
FIG. 56 exemplifies currents, magnetic fluxes, and voltages of the respective phases of a motor according to the present disclosure.

Next, FIG. 56 shows an example of an energization method that alleviates the problems of the regenerative time and the burden of the regenerative voltage. The AK-phase current IaK increases from 0.5 to 1.5 while the rotor rotation angle position θr is 7.5° which is from −3.75° to 3.75°. Between 22.5° from 3.75° to 26.25°, IaK=1.5, which is a constant value. Between 26.25° and 33.75°, IaK is reduced from 1.5 to 0.5. During this period, the current value is 0.5 or more, which is a prerequisite for the magnetic saturation region shown in FIG. 50. Therefore, since there is no change in magnetic flux or change in magnetic flux due to the decrease in current, IaK can be reduced at high speed. When θr is from 33.75° to 56.25°, IaK=0.5, which is a constant value. Hereinafter, the same operation is repeated. The BK-phase current IbK in FIG. 56 has a phase which is delayed 30° from IaK and has the same waveform shape.

In FIG. 56, the current component 0.5 is constantly applied to the AK phase current IaK and the BK phase current IbK to eliminate the change in magnetic flux due to the increase or decrease of the current. As a result, the AK-phase magnetic flux φaK is proportional to the area where the AK-phase stator magnetic pole 45A and the rotor magnetic pole in FIG. 53(a) face each other. Therefore, it has a triangular wavy waveform as shown in φaK of FIG. 56. The phase of the BK-phase magnetic flux φbK is 30° behind φaK, and the waveform shape is the same.

Then, the AK-phase voltage VaK in FIG. 56 has a rectangular waveform according to the equation (139). The BK phase voltage VbK is 30° behind VaK in phase from the equation (140), and has the same waveform shape. From the above result, in FIG. 56, it can be reduced the problem that the voltage at the time of regeneration of the magnetic energy, which was a problem in the AK phase voltage VaK and the BK-phase voltage VbK in FIG. 55, becomes as large as 1.0, and that the time required to regenerate magnetic energy is equivalent to an angle width of 15°, which is a problem that takes a long time. In the method of FIG. 56, even if the maximum current values of the AK-phase current IaK and the BK phase current IbK are increased, the AK phase voltage VaK and the BK phase voltage VbK do not increase, and the problem of FIG. 55 can be alleviated under the precondition of magnetic saturation in FIG. 50.

In the method of FIG. 56, the torques of the AK-phase and the BK-phase corresponding to the current of 0.5 act in opposite directions and cancel each other out. That is, in the conventional permanent magnet type synchronous motor, the north and south poles of the permanent magnet rotor generate local attractive forces on each stator magnetic pole, and the total is the same as the circumferential component of those attractive forces, that is, the torque cancels out. Here, in the example of FIG. 56, the power supply voltage is used only up to 0.5, and the power supply voltage is used only up to 0.5. By modifying the power supply voltage to use up to 1.0, the DC power supply can be used more effectively than in the case of FIG. 55, and the transistor can be effectively used. However, in the state of FIG. 56, the current component 0.5 of the AK phase current IaK and the BK-phase current IbK is additionally energized. Therefore, the current of the transistor will increase, and the copper loss of the winding will also increase. Further, it is possible to control by a method intermediate between FIGS. 55 and 56, or to use the advantages and disadvantages properly according to the driving state of the motor. In addition, other methods for shortening the time for regenerating the magnetic energy to the DC power source will be described later.

Thirtieth Embodiment

Next, another embodiment of the mode 5 will be described. The motor shown in FIG. 54(a) has a rotor 545 configuration using a permanent magnet. The north and south poles are alternately arranged in the circumferential direction to form a 12-pole structure, the rotor magnetic pole width is 30°, and the rotor magnetic pole period is 60°. In terms of the rotor magnetic pole period, in FIG. 54(a) and in FIG. 53(a) are equal, and in FIG. 54(a) shows that the soft magnetic rotor of FIG. 53(a) is changed to a permanent magnet rotor. In the case of the permanent magnet rotor, there is the same restriction between the stator magnetic pole and the rotor magnetic pole as in the case of FIG. 54(d) above. In FIG. 54(a), with respect to the AK-phase stator magnetic pole 45A, the BK-phase stator magnetic pole 45B is arranged at a position of 90° to the CCW, the AK/ phase stator magnetic pole 45A/ is arranged at a position of 150° to the CCW, the BK/ phase stator magnetic pole 45B/ is arranged at a position of 240° in the CCW direction.

Further, the motor of FIG. 54(a) has a configuration in which a concentrated winding is wound around each stator magnetic pole. It is also possible to add a means for absorbing the leakage flux of the permanent magnet and passing it through the back yoke of the stator as shown in reference numerals 541, 542, 543, and 544.

Further, the motor of FIG. 54(c) has a configuration in which the permanent magnet magnetic poles of the rotor of the 549 are 10 poles. The rotor magnetic pole width and the stator magnetic pole width are 36°. With the same restrictions as in the case of FIG. 54(a), with respect to the AK-phase stator magnetic pole 45A, the BK-phase stator magnetic pole 45B is located at 108° in the CCW direction, the AK/ phase stator magnetic pole 45A/ is located at 180° in the CCW direction, and the BK/ phase stator magnetic pole 45B/ is located at 288° in the CCW direction. Note that FIG. 54(b) has the same stator magnetic pole arrangement as FIG. 54(c).

Figure 57:
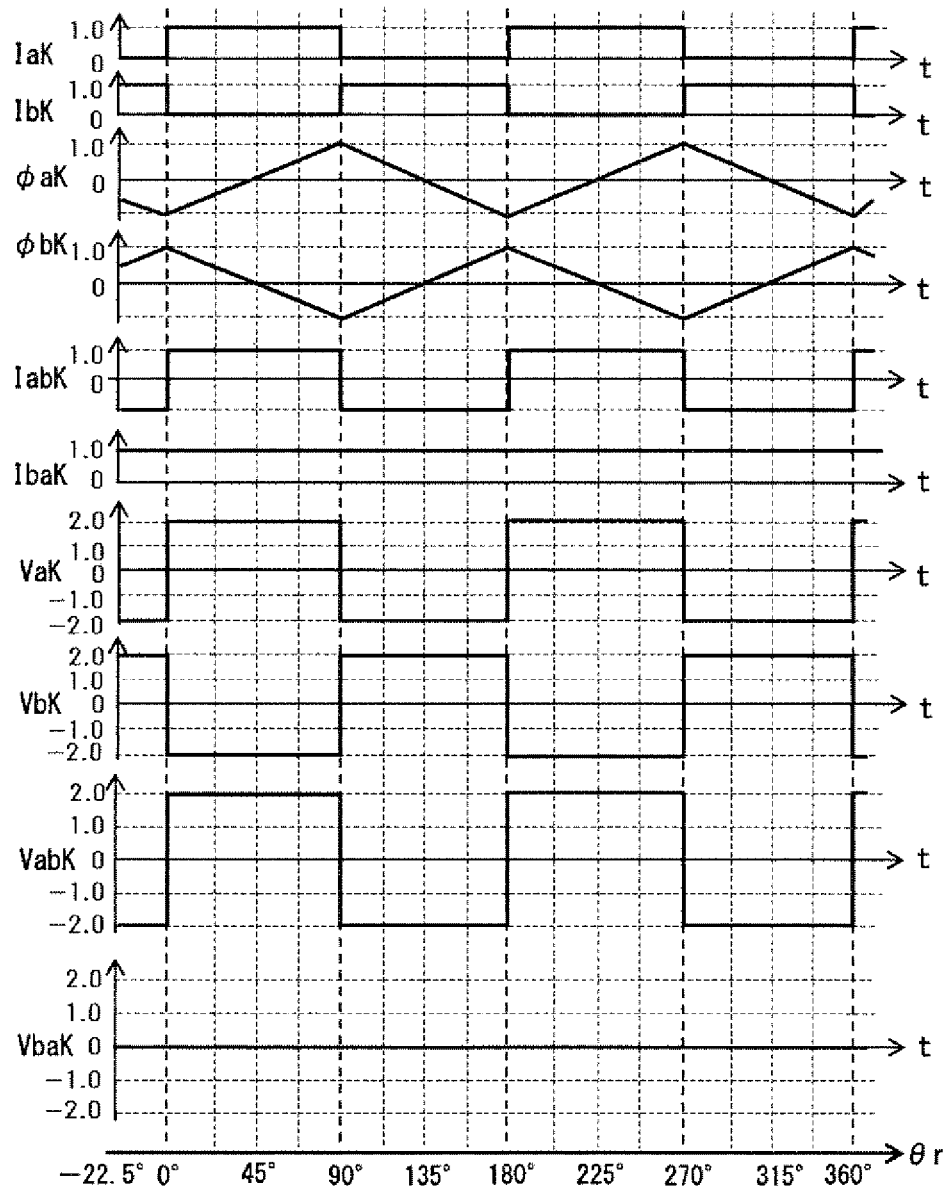
FIG. 57 exemplifies currents, magnetic fluxes, and voltages of the respective phases of a motor according to the present disclosure.

FIG. 57 shows an example in which FIG. 54(c) is rotated in the CCW direction at a constant rotation and a constant torque is output. In addition, the currents and voltages of the full pitch winding windings of FIGS. 54(b) and 54(d) are also shown. In FIG. 57, the motor characteristics are treated as a simple model and the basic characteristics are shown. Here, the winding inductance is set to 0, and the magnetic flux distribution does not change depending on the current value. The AK phase current IaK and the BK phase current IbK are examples of rectangular wave-shaped currents. The AK phase magnetic flux φaK, which is the interlinkage magnetic flux of the AK phase winding WaK, and the BK phase magnetic flux φbK, which is the interlinkage magnetic flux of the BK phase winding WbK, are proportional to the facing areas of the stator magnetic pole and the magnet magnetic pole, and it becomes a triangular waveform. Then, the AK phase voltage VaK and the BK phase voltage VbK become rectangular wavy voltages. From the characteristics of FIG. 57, a uniform torque of CCW is generated. The characteristics of FIG. 57 are common to those of FIGS. 54(a), (b), and (d). However, the value converted to the rotor rotation angle position shown at the bottom of FIG. 57 needs to be converted and changed according to the number of magnetic poles of the rotor.

The motor drive of FIGS. 54(a) and 54(c) can also be driven by using two sets of drive circuits out of the three sets of drive circuits of FIG. 5, similarly to the motor of FIG. 53(a). When the relative permeability of the permanent magnet is close to 1, the inductance of both windings is small. Therefore, since the magnetic energy regenerated from the motor side to the power supply side during rotation is small, the drive circuit can be simplified. Further, since the AK phase and the BK phase can be driven and controlled independently, the continuous output of the CCW torque, which will be described later, is also possible.

The embodiment of the mode 5 has been described above. The slot cross-sectional area is larger than that of the motor shown in FIG. 45(a), and it is expected that the winding resistance and the copper loss will be reduced. Both the motor and the drive circuit have a simple configuration, and cost reduction is possible. In addition, there is a problem that there is a place where it is difficult to generate torque at the magnetic pole boundary portion. However, by applying the technique for expanding the torque generation range described later, it is possible to continuously output the CCW one-way torque. Further, in the case of the soft magnetic rotor magnetic pole of FIG. 53(a), as will be described later, a technique of using a permanent magnet to reverse bias the magnetic characteristics of the cog and a technique of arranging the permanent magnet in the stator to reduce the exciting load of the motor can also be used. Also, in order to reduce the voltage burden due to the regeneration of magnetic energy to the DC power supply, it is also possible to reduce the voltage load by constantly energizing the exciting current component of each phase, which will be described later. Moreover, torque can also be increased by shortening the regeneration time of magnetic energy to the DC power supply.

Further, as shown in FIGS. 45, 53, and 54, the motor can be deformed in various ways. The number of rotor magnetic poles can be changed. The number of pole pairs of the motor can also be two or more. It is also possible to add the leakage flux absorbing means shown in FIG. 54(a) and allow the leakage flux to pass through the stator back yoke by a magnetic bypass path. It is possible to reduce the problem of torque ripple generation due to leakage flux and the problem of increase in eddy current loss due to leakage flux.

Thirty-First Embodiment

Figure 58:
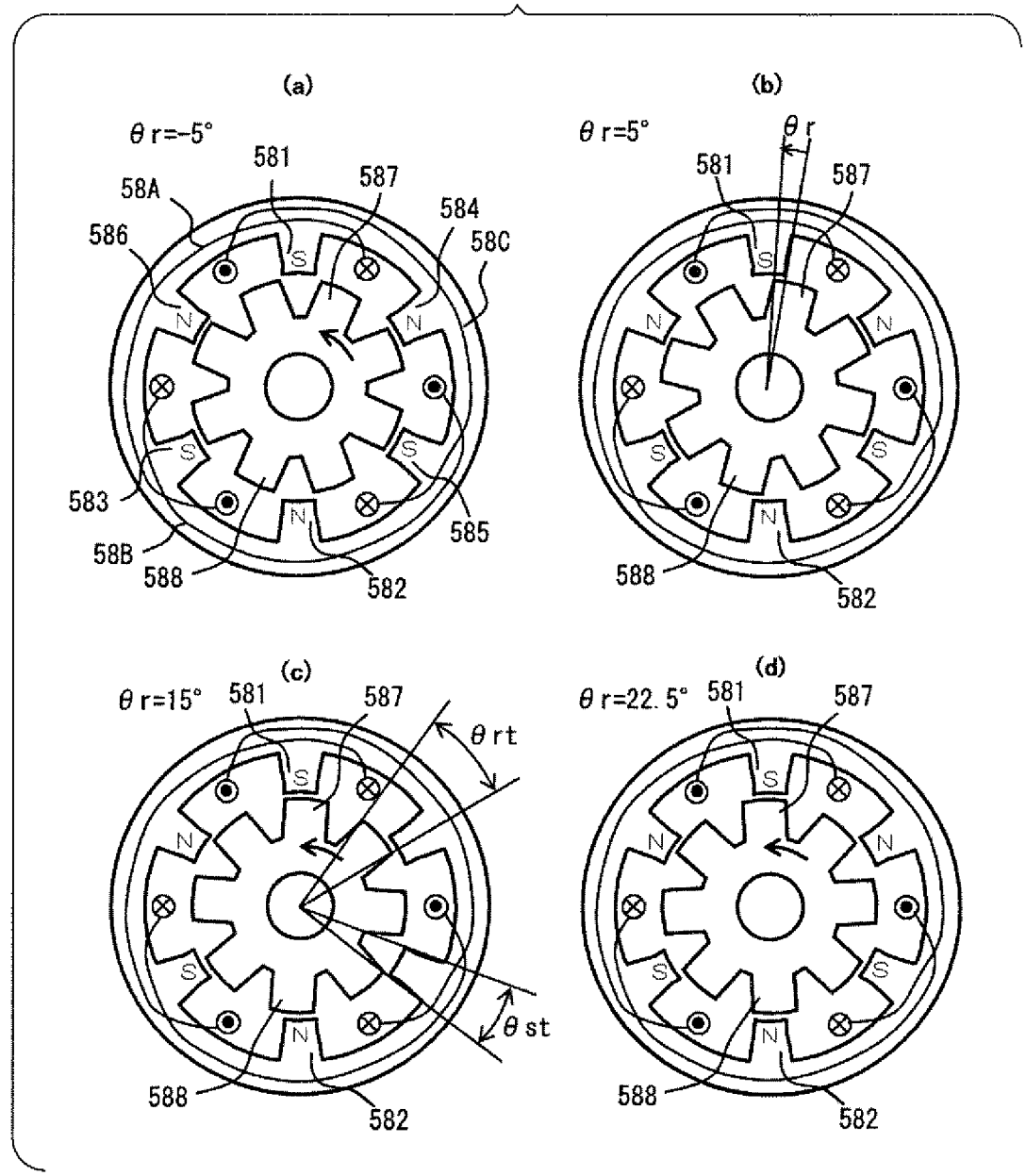
FIG. 58 is a lateral sectional view exemplifying a motor according to the present disclosure.

Next, the embodiment of the mode 6 is shown in the cross-sectional view of the motor of FIG. 58. Although overlapping with the above description, the conventional motor shown in FIG. 83 has a problem that the copper loss becomes large when a large torque is output because the space for arranging the windings is insufficient and the utilization rate is low. In the motor of FIG. 2 and the drive circuit of FIG. 6 of the present invention, the copper loss in the slot due to the full pitch winding can be reduced and the drive circuit can be miniaturized. However, further reduction of copper loss is desired. Also, the motors of FIG. 83, 1 and 2 have a problem of magnetic saturation of the respective teeth when a large current is applied to generate a large torque, as shown in the characteristics of FIG. 13, and the torque tends to decrease. When the rotor magnetic poles face the stator magnetic poles, that is, for example, when the rotor rotation angle θr in FIG. 13 is about 0° to 15°, the magnetic flux density of the opposing portions of both magnetic poles becomes high. However, the magnetic flux density in the central part of each of the teeth is still low, and a large torque can be generated. When θr approaches 30°, the teeth of both magnetic poles gradually move toward magnetic saturation, and the generated torque decreases. Further, the torque is the product of the rotor radius and the force acting on the tip of the rotor magnetic pole in the circumferential direction. Simply, it is advantageous that the rotor radius is large. However, the motors shown in FIG. 83, 1 and 2 lack a space for arranging windings and the like near the stator magnetic poles, and there is a problem that the radial length of the respective teeth of the stator magnetic pole tends to be large and the torque is reduced. In the mode 6, these problems are reduced, the torque of the motor is increased, and the loss is reduced.

The motor of FIG. 58 has six stator magnetic poles and winds three full pitch windings. In this respect, it is the same as the motor of FIG. 1. The circumferential width of the stator magnetic pole in FIG. 58 is θst shown in FIG. 58(c), which is 15°, represented by the angular width of the air gap portion between the stator and the rotor. The circumferential period of the stator magnetic poles is 60°. The opening of the slot between the stator magnetic poles is 45°, the cross-sectional area of the slot is expanded about 1.5 times as compared with FIG. 1, and copper loss can be reduced. On the other hand, the number of rotor magnetic poles in FIG. 58 is eight, and the circumferential width of the rotor magnetic poles is θrt shown in FIG. 58(c), which is 22.5°. The circumferential period of the rotor magnetic poles is 45°, and the opening of the space between the rotor magnetic poles is 22.5°.

The circumferential width of the surface of the stator magnetic pole facing the rotor is 15°. The thickness of the middle part of the tooth and the thickness of the root of the teeth near the stator back yoke are widened so that the magnetic resistance does not increase due to magnetic saturation. This is possible in the motor of FIG. 58 because, as shown in the figure, the slot cross-sectional area where the windings are arranged is widened, so that there is a margin in the space for arranging the stator magnetic poles. In terms of the magnetic properties of the teeth, a decrease in magnetic resistance can be expected by widening the teeth width at the root with respect to the tooth tip by 10% or more. For example, when the magnetic flux density at the tip of the stator magnetic pole is 2.0 [T] and the root is 20% wider, it becomes 1.6 [T], which approaches a linear region where the relative magnetic permeability of the electrical steel sheet is large. It has the effect of improving the average torque. In this respect, the tooth shape shown by the conventional motor of FIG. 83 and the motor of FIG. 1 is square. Further, the shapes of the teeth of the rotor magnetic pole in FIG. 58 are square because the teeth of the rotor are thicker than each of the teeth of the stator and magnetic saturation is less likely to occur.

The magnitude of the magnetic flux passing through the stator magnetic pole of FIG. 58 is ½ that of the motor of FIG. 1 in the model. Therefore, the radial thickness of the back yoke of the stator can be reduced to ½. The rotor diameter can be increased accordingly, and the generated torque can be increased. Further, as shown in FIG. 58, the slot cross-sectional area of the stator is wide and the winding space is wide. Therefore, the length of each of the teeth in the radial direction of the stator magnetic pole can be shortened and the rotor diameter can be increased. The slot cross-sectional area shrinks and copper loss increases, but to some extent the increase in copper loss can be offset by an increase in rotor diameter. As a result, the torque of the motor of FIG. 58 can be increased as compared with the motor torque of FIG. 1. Copper is expensive as a conductive material, and one idea is to increase the torque while suppressing the increase in the amount of copper. On the contrary, since the winding space can be expanded, it is possible to use an aluminum conductor as a conductive material, and the weight of the motor can be reduced.

As shown in FIG. 58, the slot cross-sectional area is relatively large, and a certain amount of large torque output is performed, and in order to obtain continuous torque for rotation, it is necessary to have the following motor configuration. The number of rotor magnetic poles RN needs to be larger than the number of stator magnetic poles SN, and the slot cross-sectional area needs to be relatively large. On the other hand, in order to generate a large torque, the RN needs to be 3 times or less the SN in order to reduce the influence of the leakage flux and the magnetic saturation of each tooth.

The circumferential width rt of the rotor magnetic poles as shown in FIG. 58(c) has an allowable range depending on the number of stator magnetic poles SN, the number of rotor magnetic poles RN, and the electromagnetic attraction, that is, the torque characteristics. The minimum value of θrt that can generate torque around the entire circumference of the rotor is 720°/(SN×RN). The maximum value of θrt is (360°/RN−720°/(SN×RN)). Similarly, the circumferential width θst of the stator magnetic pole as shown in FIG. 58(*c*) also has an allowable range. The minimum value of θst that can generate torque around the entire circumference of the rotor is 720°/(SN×RN). The maximum value of θst is (360°/RN−720°/(SN×RN)).

Assuming that the circumferential width θrt of the rotor magnetic pole and the circumferential width θst of the stator magnetic pole are (180°/RN), the torque average value is the maximum in the simple calculation in which the motor is simply modeled. Considering the torque generation cycle of each stator magnetic pole and the leakage flux around the stator magnetic pole and the rotor magnetic pole, θrt and θst are preferably (180°/RN) or less. Further, for the purpose of expanding the slot cross-sectional area and reducing the copper loss, it is preferable that θst is smaller than θrt. Further, as described above, the motor shape and motor control method related to the output characteristics of the motor are related to that joule heat, that is, increasing the rotor diameter to torque by increasing the slot cross-sectional area to reduce copper loss, especially, to increase the torque by increasing the rotor diameter to reducing the magnetic saturation of the teeth of the stator magnetic poles and reducing the radial thickness of the back yoke.

Then, as will be described later, it is related to reducing the regenerative voltage and reducing the torque reducing action by creating the time for regenerating the magnetic energy in the motor to the power source by the motor structure and the motor control method. It is necessary to be compatible with the reduction of copper loss. Further, securing the regenerative time and reducing the regenerative voltage are related to the time change of the electromagnetic attraction acting on the stator magnetic pole and the rotor magnetic pole. Also, deformation and vibration of each part of the motor can be reduced, and the electromagnetic noise of the motor can be reduced.

Next, a method of securing the regeneration time of the magnetic energy and reducing the winding voltage at the time of regeneration will be described with reference to the motor of FIG. 58 and the time chart of FIG. 59. In that method, it is necessary to secure the regeneration time and reduce the copper loss at the same time both during power running and during power regeneration. In the configuration of the mode 6, this compatibility is easier. Since the reduction of the winding voltage at the time of regeneration is related to the withstand voltage of the transistor of the drive circuit as shown in FIG. 6, it is greatly related to the miniaturization of the drive circuit. In the motors of FIGS. 83, 1, 2 and 14, when the number of revolutions increases during power running, the regeneration time of magnetic energy associated with the exciting current required for torque generation is insufficient, and it is desired to secure the regeneration time. When the regeneration time of this magnetic energy is shortened, the negative voltage at the time of regeneration increases in inverse proportion to the regeneration time. In addition, the power running torque decreases and the pulsating torque increases due to the regeneration of magnetic energy.

Reference numeral 581 of FIG. 58 is an AL-phase stator magnetic pole, and reference numeral 582 is an AL/ phase stator magnetic pole. Reference numeral 583 is a BL-phase stator magnetic pole, and reference numeral 584 is a BL/ phase stator magnetic pole. Reference numeral 585 is a CL phase stator magnetic pole, and reference numeral 586 is a CL/ phase stator magnetic pole. Reference numeral 58A is an ABL phase full pitch winding, energizing an ABL phase current IabL, and an ABL-phase voltage is VabL. Reference numeral 58B is a BCL phase full pitch winding, supplying a BCL phase current IbcL, and a BCL-phase voltage is VbcL. Reference numeral 58C is a CAL-phase full pitch winding, energizes a CAL phase current IcaL, and has a CAL-phase voltage of VcaL. The number of each of these turns is the same as that of the motor of FIG. 1, and is Nwa/2. A magnetic flux passing from the AL phase stator magnetic pole 582 to the AL-phase stator magnetic pole 581 is an AL phase magnetic flux φaL. A magnetic flux passing from the BL/ phase stator magnetic pole 584 to the BL-phase stator magnetic pole 583 is a BL phase magnetic flux φbL. A magnetic flux passing from the CL phase stator magnetic pole 586 to the CL phase stator magnetic pole 585 is a CL phase magnetic flux φcL.

The arrangement of the stator magnetic poles and the arrangement of full pitch winding windings in FIG. 58 are the same as those in the motor of FIG. 1. The relational expressions of each variable such as each phase current, each phase voltage, and each phase magnetic flux in FIG. 58 have the same relation from the equation (1) to the equation (36) except for L at the end of each variable. However, since the motor structure is different, the numerical values such as the current value at the time of control are naturally different. Each name of the motor and L at the end of each variable indicate the motor model.

Regarding the rotation position of the rotor in FIG. 1, as shown in FIG. 58(*b*), the rotation position of the end in the clockwise rotation direction of the stator magnetic pole 581 of the AL phase is defined as the start point of the rotor. As shown in the figure, the rotor rotation angle position θr is the rotation angle from this start point to the end of the rotor magnetic pole 587 in the CCW direction. FIGS. 58(*a*), (*b*), (*c*) and (*d*) show a state in which the rotor rotation angle positions θr are rotated to CCW at −5°, 5°, 15°, and 22.5°, respectively, in the same motor. In each of these figures, the symbol display is omitted for the same part.

Figure 59:
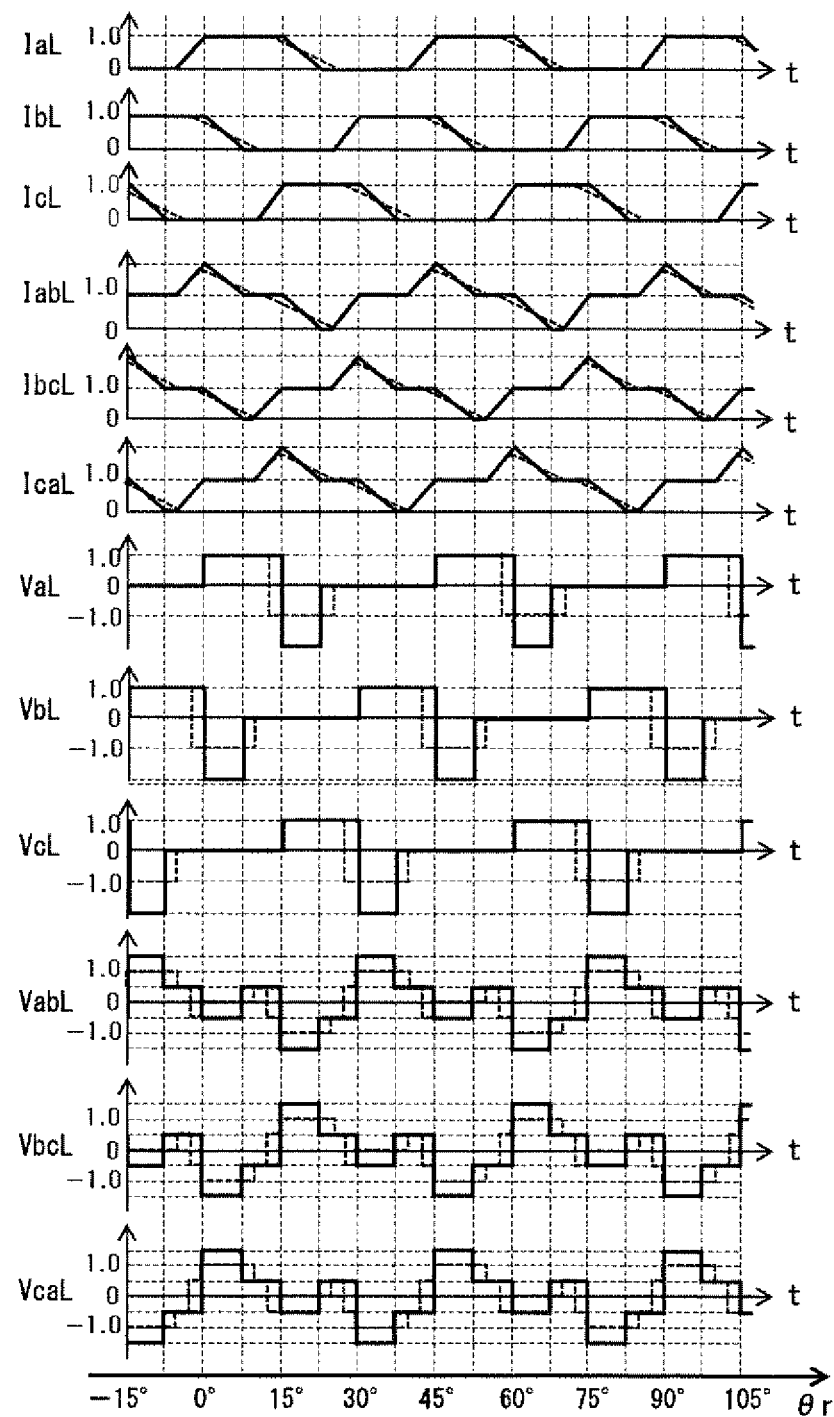
FIG. 59 exemplifies currents, magnetic fluxes, and voltages of the respective phases of a motor according to the present disclosure.

Next, an example of the operation, an example of the current, and an example of the voltage of FIG. 58 will be shown and described in the time charts of FIG. 58(*a*), (*b*), (*c*), and (*d*) and FIG. 59. However, since the reluctance motor utilizes a magnetically non-linear region, the relationship between the current and the magnetic flux is non-linear and complicated as shown in FIG. 11. The relationship between magnetic flux and voltage is accurate in physical equations such as the equation (9), but the relationship between current and voltage is non-linear. In that sense, the current and voltage plots shown in the time chart of FIG. 59 are examples of the characteristics that simplify the electromagnetic characteristics of the soft magnetic material, and are not accurate. Moreover, the leakage flux other than the portion where the stator magnetic pole and the rotor magnetic pole face each other is ignored and simplified. Nevertheless, each waveform in FIG. 59 shows some of the qualitative characteristics of the motor in FIG. 58.

Now, an example of the operation of rotating the motor of FIG. 58 in the CCW direction while generating the torque of CCW at a constant rotation speed of a certain high speed will be described. In particular, the current, voltage, and magnetic flux acting on the AL phase stator magnetic pole 581 and the rotor magnetic pole 587, and the AL/ phase stator magnetic pole 582 and the rotor magnetic pole 588 are considered, and the results are developed for other phases. Further, as shown in the time chart of FIG. 14, regarding the operation of the motor of FIG. 1, the concentrated winding winding wound around the AL phase stator magnetic pole 581 and the concentrated winding winding wound around the AL/ phase stator magnetic pole 582 are First consider the virtual AL phase concentrated winding WaL, AL phase current IaL, and AL phase voltage VaL connected in series. Similarly, consider the BL phase WbL, IbL, VbL, and the CL phase WcL, IcL, VcL. After that, the current and voltage of the full pitch winding are obtained from the current and voltage of the virtual concentrated winding. The number of windings of the concentrated winding WaL, WbL, and WcL is Nwa.

FIG. 58(a) shows the rotor rotation angle position θr=−5°, which is the position where the rotor magnetic pole 587 approaches the AL phase stator magnetic pole 581. As shown in the time chart of FIG. 59, energization of the AL phase current IaL is started. In the time chart of FIG. 59, the horizontal axis is time t, and the relationship with the rotor rotation angle position θr is shown at the bottom. In terms of the motor model, we want to generate CCW torque between the AL phase stator magnetic pole 581 and the rotor magnetic pole 587 at θr=0°. Therefore, the AL-phase current IaL is increased from 0 to a predetermined current value of 1.0 while θr is between −5° and 0°.

FIG. 58(b) shows θr=5°, and the CCW torque is generated between the AL phase stator magnetic pole 581 and the rotor magnetic pole 587. While θr is from 0° to θr=15° in FIG. 58(c), as shown in the figure, the area where the stator magnetic pole 581 and the rotor magnetic pole 587 face each other increases due to the CCW rotation, so that AL phase torque is generated by a suction force As shown in the figure, the area where the stator magnetic pole 581 and the rotor magnetic pole 587 face each other is a constant value between θr=15° in FIG. 58(c) and θr=22.5° in FIG. 58(c). is there, and the AL-phase stator magnetic pole 581 does not generate torque. As shown by the solid line in FIG. 59, the AL phase current IaL is reduced from 1.0 to 0 during this period. In this way, the AL phase current IaL is energized at a cycle of 45° as shown in FIG. 59. Then, the BL phase current IbL is a current whose phase is delayed by 30° with respect to the AL phase current IaL. The CL-phase current IcL is a current whose phase is delayed by 15° with respect to the AL-phase current IaL. The waveforms are shown in FIG. 59. The phase relationship between the BL-phase and the CL phase with reference to the AL phase in FIG. 59 is opposite to that in FIG. 14, which shows the characteristics of the motor in FIG. 1. The reason for this is the geometric reason for the motor configuration due to the increase in the number of rotor magnetic poles in FIG. 58 to eight.

The AL phase voltage VaL has the relationship of the equation (9), and has a waveform shape as shown by the solid line of VaL in FIG. 59. The AL phase current IaL increases while θr in FIG. 58(a) is from −5° to 0°. However, the AL phase stator magnetic pole 581 and the rotor magnetic pole 587 are not yet opposed to each other, and the AL phase magnetic flux φaL is constant at 0 and the VaL is 0 when the peripheral leakage flux is ignored. While θr is from 0° to 15°, the AL phase stator magnetic pole 581 and the rotor magnetic pole 587 face each other, and the facing area increases with the CCW rotation, so that the VaL in FIG. 59 is 1.0. The range of θr from 15° to 22.5° is between FIGS. 58(c) and (d), and the AL phase stator magnetic pole 581 and the rotor magnetic pole 587 face each other. However, since the facing area is constant, the AL-phase magnetic flux φaL decreases with the AL-phase current IaL to 0, and the VaL in FIG. 59 is approximately −2.0 due to the relationship of equation (9). The area of the positive portion and the area of the negative portion of VaL are the same. The BL-phase voltage VbL is a voltage whose phase is delayed by 30° with respect to the AL-phase voltage VaL, and the CL-phase voltage VcL is a voltage whose phase is delayed by 15°. It is the relationship between the magnetic flux and the voltage of the equations (24) and (25).

As described above, an example of the current and voltage of the virtual concentrated winding of FIG. 58 has been obtained and described. The ABL phase current IabL and the ABL phase voltage VabL of the ABL phase full pitch winding 58A of FIG. 58 have the relationship of the equations (1) and (27), and have the waveforms of IabL and VabL of FIG. 59. Similarly, the BCL-phase has the relationship of equations (2) and (29), and the waveforms of IbcL and VbcL in FIG. 59 are obtained. Regarding the CAL phase, there is a relationship of equations (3) and (31), and the waveforms of IcaL and VcaL in FIG. 59 are obtained.

Each current of each winding of FIG. 58 can be driven by the drive circuit of FIGS. 7, 8, 9, and the like. Further, each winding of FIG. 1 can be made into a parallel winding as transformed into the winding of FIG. 2, or can be transformed into a two-pole pair motor as shown in FIG. 15 and driven by the circuit of FIG. 6.

In the configuration of FIG. 58, as described above, the time Tinc for increasing the current, the time Tt for generating the torque, and the time Tdec for decreasing the current are secured. As a result, the motor can be controlled without reducing the current in the rotation range where θr is 0° to 15°, which can generate torque. Then, in the rotation range in which θr reduces the current from 15° to 22.5°, there is no change in the area where the stator magnetic pole 581 and the rotor magnetic pole 587 face each other. Therefore, no negative torque is generated while the current decreases and the AL-phase magnetic flux φaL decreases. Accordingly, the average torque of CCW can be generated efficiently.

Regarding the magnitude of the voltage, the value of VaL in FIG. 59 is 1.0 at the time of power running, and the negative voltage at the time of regeneration of magnetic energy is −2.0. The absolute value of this value of −2.0 is not small compared to the voltage of 1.0 when the θr runs from 0° to 15°. It is desired to reduce this negative voltage. In the AL-phase voltage VaL and the like in FIG. 59, the area of the positive voltage portion and the area of the negative voltage portion in the figure are equal to each other according to Faraday's law of electromagnetic induction, so that the burden of reducing the negative voltage is large. One method of shortening the current reduction time Tdec is to increase the DC power supply voltage.

Here, with considering the characteristics of the motor shown in FIG. 58 and the time chart shown in FIG. 59, the configuration is provided with a time Tdec for reducing the current, and the phase of the current reduction is on the rear side in terms of time. It is possible to select and control the timing more freely. That is, the phase of the negative voltage portion can be selected and controlled more freely. Compared with the motor of FIG. 1 and its time chart FIG. 14, the magnitude of the negative voltage at the time of regeneration is not so different, but the phase of the negative voltage at the time of regeneration is significantly different. Since the number of rotor magnetic poles in FIG. 58 is 8 and the number of rotor magnetic poles in FIG. 1 is 4, it is necessary to convert the period between FIGS. 59 and 14 in the rotor rotation angle θr direction into 45° and 90°.

During the time when the AB phase current Iab of the full pitch winding of the AB-phase in FIG. 14 increases and the rotor rotation angle position θr is between −7.5° and 0°, the reverse induced voltage of the AB-phase voltage Vab is larger than 1.5. It is difficult to energize and increase the AB phase current Iab. The cause of this is that the regenerative operation of the C-phase voltage Vc shown in the equation (27) to the DC power supply and the voltage are superimposed on the AB-phase full pitch winding. Since the magnetic fluxes of all phases are interlinked with the full pitch winding, such a phenomenon and a problem often occur. On the other hand, during the time when the ABL phase current IabL of the full pitch winding of the ABL phase shown in FIG. 59 increases and the rotor rotation angle position θr is between −5° and 0°, the reverse induced voltage of the ABL phase voltage VabL is 0.5. Compared with the configuration shown in FIG. 14, it is reduced to ⅓. The ABL phase current IabL can be energized and increased relatively easily. The reason for this is that the CL phase voltage VcL in FIG. 59 is regenerated to the DC power supply, and the voltage is changed to an operation that does not match the phase in which the ABL phase current IabL increases.

Regarding the magnitude of the current, the ABL phase current IabL in FIG. 59 is larger than 1.0 at −5° to 5° of θr. Also, since the AL-phase current component IaL and the BL-phase current component IbL are superimposed, the maximum value is 2.0, which is twice the value of the current during power running. When the current capacity of the transistor becomes large, the drive circuit becomes large, and a cost problem arises. However, in applications such as motors for the main engine of electric vehicles, a large current is required to output a large torque at low-speed rotation, but the temporal rate of the regeneration time of magnetic energy is small. Therefore, it is possible to control so that the two phase current components do not overlap and become an excessive value. On the other hand, when the maximum torque is output at high speed rotation, it may be controlled by the average torque including the current and torque pulsation within the range allowed by the drive device. By controlling the output of the maximum torque while avoiding the superposition of the current, it is possible to control so as not to exceed the allowable current value of the transistor. Of course, in the control within the range that does not exceed the allowable current value of the transistor, not at the maximum torque, the control that can output a more uniform torque as shown in FIG. 59 may be used.

Next, a method for further reducing each voltage amplitude in FIG. 59 will be described. The method is a method of changing each waveform in FIG. 59 from a solid line waveform to a waveform having characteristics shown by a broken line. For example, specifically, the current reduction range of the AL-phase current IaL is changed from a solid line having a θr of 15° to 22.5° to a broken line from 12.5° to 25°, and the width of the range is extended from 7.5° to 12.5°. As a result, the AL phase voltage VaL changes from a solid line to a broken line characteristic, the negative voltage changes from −2.0 to −1.0, and the voltage amplitude of the negative portion can be reduced by half. By reducing the voltage of each winding in this way, the load on the drive circuit can be reduced.

The voltage waveform of the broken line in the vicinity of θr of the VaL waveform of 12.5° is still increasing in the facing area between the stator magnetic pole and the rotor magnetic pole, and is slightly different to be exact, but is ignored here. Further, IaL of FIG. 59 generates a slightly negative torque in the range of θr of 22.5° to 25°, that is, in the vicinity of FIG. 58(d). Since the current is a small value, the negative torque is also small and can be ignored, but of course, the current phase of the broken line part can be advanced by 2.5°, or the current change of the broken line part can be made slightly larger to eliminate the negative torque.

Note that FIG. 59 shows the waveforms of each current and each voltage, assuming that the maximum voltage is not limited by the DC voltage source. Actually, since it is driven by the drive circuit as shown in FIG. 7, 8, 9, or 15, it is limited to the voltage of the DC voltage source, especially when the negative voltage at the time of regeneration of magnetic energy becomes large. In that case, the regeneration time becomes longer according to the voltage limit, and the current waveform and voltage waveform different from those in FIG. 59 are obtained.

Next, the operation in which the motor regenerates power, charges the current to the DC voltage source, and stores energy will be described. FIGS. 58 and 59 show and explain the rotation position, torque generation, current, and voltage of the rotor during power running. First, comparing the importance of power running and power regeneration, in many applications such as electric vehicles, quality such as torque, torque ripple, and noise during power running is the most important. And, even when the power is regenerated, some functions and quality are required, but not as much as when powering. Further, since the motor having the configuration shown in FIG. 58 or the like starts energizing the current for power regeneration at the rotor rotation position where the winding inductance is large, it is difficult to rapidly increase the current.

The difference between the regeneration of magnetic energy and the regeneration of power will be described with respect to the regenerative operation used in the present invention. In the state of power running as shown in FIG. 58(b), energy for the magnetic energy and torque of the motor is given from the DC voltage source side to the motor side, and the magnetic energy is returned to the DC voltage source side in the latter half of the current cycle. In other words, it is an operation in which the ineffective energy due to the ineffective power component, that is, the magnetic energy is once supplied to the motor side, and the ineffective energy is returned to the DC voltage source side again. In the present invention, this returning operation is referred to as regeneration of magnetic energy.

On the other hand, the operation in which the motor generates a negative torque is an operation in which the AL-phase current IaL component is energized while θr in FIG. 58(d) is between 22.5° and 37.5°, and generate CW torque between the AL phase stator magnetic pole 581 and the rotor magnetic pole 587. In this operation, the mechanical energy on the motor side is stored as electrical energy on the DC voltage source side. Expressing this operation in a little more detail, including the energization of the current IaL component, the IaL component is energized near θr of 22.5° to give magnetic energy to the motor side. Then, mechanical energy is stored as electrical energy on the DC voltage source side via the magnetic flux, and the magnetic energy component is also returned to the DC voltage source side in the latter half of the current cycle. The total supply and recovery of magnetic energy at this time is zero. In the present invention, the regeneration of mechanical energy and the supply and recovery of magnetic energy at this time are collectively referred to as the regeneration of power.

In the regeneration of the power, the AL-phase current IaL component is energized while θr is 22.5° to 37.5°, and a CW torque is generated between the AL-phase stator magnetic pole 581 and the rotor magnetic pole 587. Similarly to this, each phase can generate CW torque so as to generate the continuous CW torque as a whole. In the AL phase current IaL component, since the AL-phase stator magnetic pole 581 and the rotor magnetic pole do not face each other while θr is 37.5° to 45°, the current may be reduced to 0 during this period. The problem with this operation is that it is difficult to instantly increase the AL phase current IaL component to a predetermined value at the rotor position where θr is 22.5°. The CW torque decreases due to the time delay of the current increase, and torque ripple is generated.

One method of solving the above problem is to widen the circumferential width θst of the stator magnetic pole from 15° to, for example, 22.5° to widen the range in which CW torque can be generated. In a specific example of operation, the AL phase current IaL component is increased from 15° to 22.5° to 1.0, when θr is between 22.5° and 37.5°, CW torque is generated to regenerate mechanical energy. Then, the AL-phase current IaL component is reduced from 1.0 to 0 while θr is between 37.5° and 45. Similarly, the other phases can generate continuous CW torque by performing the regenerative operation.

When the circumferential width θst of the stator magnetic pole is widened to the above-mentioned 22.5°, the winding space of the slot becomes the remaining 37.5°, and the copper loss is slightly increased. On the other hand, when the motors of FIGS. 1 and 2 have the above-mentioned equivalent configuration, the circumferential width θst of the stator magnetic poles is widened to 45°. There is a problem with motor efficiency as the winding space of the slot is narrowed to the remaining 15° and the copper loss doubles. As described above, there is a large difference in copper loss between the motor of the mode 6 such as FIG. 58 and the motor according to FIGS. 1 and 2.

Further, when the magnetic energy is rapidly regenerated, the attractive force between the stator magnetic pole and the rotor magnetic pole changes suddenly, and there is a problem that magnetic noise peculiar to the reluctance motor is generated due to deformation of the stator core, etc., and its reduction is desired. Further, since the regeneration time of the magnetic energy is required, there is a problem that the time ratio for generating torque decreases and a problem of torque ripple, and it is also desired to reduce them. The motor of FIG. 58 reduces these problems and improves motor performance.

The example shown in FIGS. 58 and 59 provided as specific examples of the mode 6 has been shown and described above. Since the space around the circumferential direction of each stator magnetic pole can be relatively expanded, even if it is deformed into various shapes, there is little harmful effect and various effects can be produced. The effects of mode 6 are that copper loss can be reduced since the slot cross-sectional area can be expanded, magnetic saturation of the cog of the stator magnetic poles can be reduced, and the rotor diameter is expanded by reducing the back yoke width and the radial length of the stator cog to increase torque. Also, the effects are that it is possible to secure the regeneration time of magnetic energy to the DC voltage source by expanding the width of the stator magnetic pole and the width of the rotor magnetic pole, reduce the magnitude of the regenerative voltage, and achieve both reduction of copper loss.

Moreover, vibration and noise of the stator core and the like can be reduced by reducing the current change rate in a state where the stator magnetic pole and the rotor magnetic pole are electromagnetically acting. Then, the motor of FIG. 58 can be driven by the drive circuits as shown in FIGS. 7, 8 and 9. Alternatively, by winding the windings in parallel as shown in FIG. 2, forming an annular winding, and pairing the two poles as shown in FIG. 15, the drive circuit can be driven by the circuit shown in FIG. 6 and the size of the drive circuit can be reduced. Although FIG. 58 shows an example in which the number of magnetic poles of the stator is 6 and the number of magnetic poles of the rotor is 8, other combinations of the number of magnetic poles can also be applied, and the shape such as the circumferential width of each magnetic pole can be selected according to the purpose. Further, the current waveform shown in FIG. 59 is an example of high-speed rotation to some extent. The current waveform such as the increase time, decrease time, and phase of the current can be changed according to the rotor rotation speed and the magnitude of the current, and an appropriate drive system can be configured by selecting the motor shape and the drive circuit.

Thirty-Second Embodiment

Next, the embodiment according to the mode 7 will now be described with the cross-sectional view of a motor shown in FIG. 60. Since the conventional motor shown in FIG. 83 has an insufficient space for arranging windings and its utilization rate is low, there is a problem that copper loss becomes large when a large torque is output. The problem of torque decreases due to a magnetic saturation of teeth, the problem that the negative voltage during regeneration becomes large due to insufficient time to regenerate the magnetic energy of the motor to the DC voltage source, the attractive force between the stator magnetic pole and the rotor magnetic pole. There is a problem that the noise becomes larger, because of sharp changes.

Figure 60:
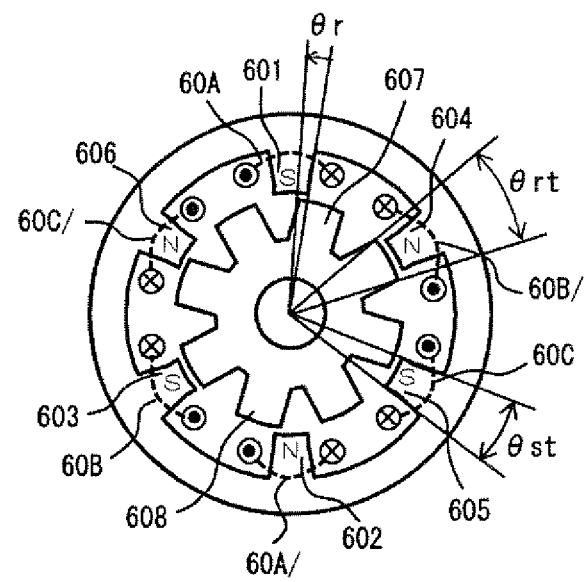
FIG. 60 is a lateral sectional view exemplifying a motor according to the present disclosure.

The motor of FIG. 60 is the same as the motor of FIG. 58, except for the windings. While each phase winding in FIG. 58 is a full-pitch winding, each of the windings in FIG. 60 is a concentrated winding wound around each stator magnetic pole. The number of stator magnetic poles is 6, the circumferential period of the stator magnetic poles is 60°, the circumferential width θst of the stator magnetic poles is 15°, and the slot opening is 45°. The number of rotor magnetic poles in FIG. 60 is eight, the circumferential period of the rotor magnetic poles is 45°, a circumferential angular width θrt of each of the rotor magnetic poles is 22.5°, and the opening of a space between the rotor magnetic poles is 22.5°.

Similarly to the motor of FIG. 58, the motor of FIG. 60 can increase the slot cross-sectional area, so that copper loss can be reduced as compared with FIG. 83, the magnetic saturation of the teeth of the stator magnetic pole can be reduced, the back yoke width can be reduced, and the stator can be reduced. By reducing the radial length of the teeth, the rotor diameter can be increased and the torque can be increased. In addition, vibration and noise of the stator core and the like can be reduced.

A reference numeral 601 in FIG. 60 shows an AL phase stator magnetic pole, and a reference numeral 602 shows an AL/ phase stator magnetic pole. A reference numeral 603 shows a BL phase stator magnetic pole, and a reference numeral 604 shows a BL/ phase stator magnetic pole. A reference numeral 605 shows a CL phase stator magnetic pole, and a reference numeral 606 shows a CL/ phase stator magnetic pole. Reference numerals 60A and 60A/ show concentrated windings for the AL phase, the sum of winding turns of both the windings is Nwa, the AL phase current IaL is supplied, and the AL phase voltage is VaL. Reference numerals 60B and 60B/ show concentrated windings for the BL phase, the sum of winding turns of both the windings is Nwa, the BL phase current IbL is supplied, and the BL phase voltage is VbL. Reference numerals 60C and 60C/ show CL phase concentrated windings, the sum of winding turns of both the windings is Nwa, the CL phase current IcL is supplied, and the CL-phase voltage is VcL.

The magnetic flux passing from the AL/ phase stator magnetic pole 602 to the AL phase stator magnetic pole 601 is AL phase magnetic fluxes φaL. The magnetic flux passing from the BL/ phase stator magnetic pole 604 to the BL phase stator magnetic pole 603 is BL phase magnetic fluxes φbL. The magnetic flux passing from the CL/ phase stator magnetic pole 606 to the CL phase stator magnetic pole 605 is CL phase magnetic fluxes φcL.

The arrangement relationships between the stator magnetic poles and the concentrated windings in FIG. 60 are the same as that in the motor shown in FIG. 83. The motor of FIG. 60 can be driven by the circuit of FIG. Now, an example of the operation of rotating the motor in FIG. 60 will be descried in which the torque in the CCW direction is generated so that the rotor can rotate in the CCW direction at a constant rotation speed which still falls into a higher speed range.

When driving the motor of FIG. 58, as described above, each phase current IaL, IbL, IcL of the virtual concentrated winding and each phase voltage VaL, VbL, VcL are shown in FIG. In the motor of, these are the current and voltage of the concentrated winding of each phase. In particular, in the characteristic of expanding the regeneration time of magnetic energy from 7.5° to 12.5°, which is shown by the broken line in FIG. 59, the voltage at the time of power running and the voltage amplitude at the time of regeneration of each phase voltage VaL, VbL, VcL. Is about the same value and can be driven conveniently. In the case of the motor of FIG. 83, it is possible to increase the regeneration time of magnetic energy and decrease the regeneration voltage by widening the circumferential width of the rotor magnetic poles, but in that case, the slot The cross-sectional area is reduced to about half, copper loss increases, and motor efficiency decreases. In the motor of FIG. 60, both reduction of copper loss and reduction of regenerative voltage can be achieved at the same time. However, when compared with the copper loss in the slot, the copper loss in FIG. 60 is inferior to that in FIG. 58. Since it is a concentrated winding, the utilization rate of the drive circuit shown in FIG. 5 becomes lower.

At lower speed rotation, the rotation angle width of the rotor required to increase the current becomes small, so that the relative time width becomes small. The current waveform and voltage waveform of each phase in FIG. 59 can be controlled with different waveforms according to the rotational speed of the motor and the magnitude of the torque.

Next, an example of an operation in which the motor of the full pitch winding of FIG. 58 is rotated at a constant rotation speed of a certain high speed in the circuit of FIG. 5 will be described. As shown in equations (27), (29), and (31), the voltage of each phase of the full pitch winding tends to be an excessive and complicated voltage because the magnetic fluxes of the other phases are also interlinked. One of the causes of the excessive voltage of each phase in FIGS. 1 and 2 is that although there is no major hindrance to torque generation at low-speed rotation, magnetic energy is regenerated to a DC voltage source during power running operation at moderately high speed rotation. There is a shortage of time to do it. Although the characteristics shown in FIG. 14 are shown as examples of current and voltage, an excessive voltage is generated at high-speed rotation, it becomes difficult to increase the currents of Iab, Ibe, and Ica, and torque ripple is also generated. Further, since the attractive force generated in the stator magnetic pole and the rotor magnetic pole changes abruptly, noise is likely to be generated.

Now, as a prerequisite for the motor and drive circuit, continuous torque can be generated at least at low-speed rotation, torque ripple is small even at high speed rotation to some extent, magnetic energy regeneration time can be secured even at high speed rotation to some extent, and the regeneration voltage does not become excessive. That is, it is easy to increase the currents of the respective phase currents IabL, IbcL, and IcaL in FIG. 59, the motor copper loss is not excessive and the motor efficiency is good, and the utilization rate of each transistor in the drive circuit of FIG. Consider the possibility of reducing the size and cost of the circuit.

As described above, when the motor of the full pitch winding of FIG. 58 is driven by the phase currents IabL, IbcL, and IcaL shown by the broken line in FIG. 59. The excessive voltage as shown by the solid line can be considerably reduced. Then, since the winding voltage when the current of each phase increases is low and the voltage influence due to the change in the magnetic flux of the other phase is reduced, the current of each phase can be easily increased. Further, as described with respect to the operations of FIGS. 58 and 59, continuous torque can be generated. In particular, it is important to secure the regeneration time of magnetic energy, widen the slot cross-sectional area, and reduce the copper loss. Regarding the copper loss, since the motor shown in FIG. 58 is a full pitch winding, the copper loss in the slot is originally smaller than that of the concentrated winding.

Further, considering the utilization rate of each transistor in FIG. 5, as shown in the currents IabL, IbcL, and IcaL of the full pitch winding of each phase in FIG. 59, the currents are compared with the phase currents In, Ib, and Ic in FIG. 84. Therefore, it is possible to increase the power supplied from the DC voltage source to the motor side by energizing in a range of about twice. However, as described above, although the voltage influence due to the change in the magnetic flux of the other phase can be reduced, it is not eliminated, and the voltage peculiar to the full pitch winding is generated. By expanding the current-carrying range and reducing the influence of voltage, it is possible to reduce the total current capacity of the respective transistors of the drive circuit shown in FIG. 5.

As described above, the mode 7 has been described with reference to the motor of FIGS. 60 and 58, the time chart of FIG. 59, and the drive circuit of FIG. 5. Other combinations of the number of magnetic poles can also be used, and the shape such as the circumferential width of each magnetic pole can be selected according to the purpose. For example, when the number of stator magnetic poles is 6, the number of rotor magnetic poles can be selected from 8, 10, 14, and 16. When the number of stator magnetic poles is 10, the number of rotor magnetic poles can be selected from 12, 14, 16, 18, 22, 24, and the like. Depending on the combination thereof, the motor characteristics change, and it is necessary to change the energization method. It is possible to increase the torque, efficiency, and miniaturization of the motor, and it is possible to miniaturize the drive circuit. Further, since the change in the electromagnetic attraction acting between the stator magnetic pole and the rotor magnetic pole can be reduced, the electromagnetic noise of the motor can be reduced. The relationship between the number of stator magnetic poles SN, the circumferential width θst of the stator magnetic poles, the number of rotor magnetic poles RN, the circumferential width θrt of the rotor magnetic poles, the allowable range for generating continuous torque, and the principle of torque generation. The optimum value and the like are the same as those described in the mode 6.

Further, the ABL phase full pitch winding winding 58A, the BCL phase full pitch winding winding 58B, and the CAL phase full pitch winding winding 58C in FIG. 58 can realize equivalent excitation by the annular winding. Then, as shown in FIG. 18, two motors may be configured on the inner diameter side and the outer diameter side of the motor to form a toroidal annular winding. Similarly, two motors may be arranged back to back in the rotor axial direction to form a toroidal annular winding configuration. In this case, since the coil end portion of the winding can be shortened, it is possible to reduce copper loss, reduce the winding material, reduce the weight, facilitate the winding production, improve the winding space ratio, and the like.

Thirty-Third Embodiment

Figure 61:
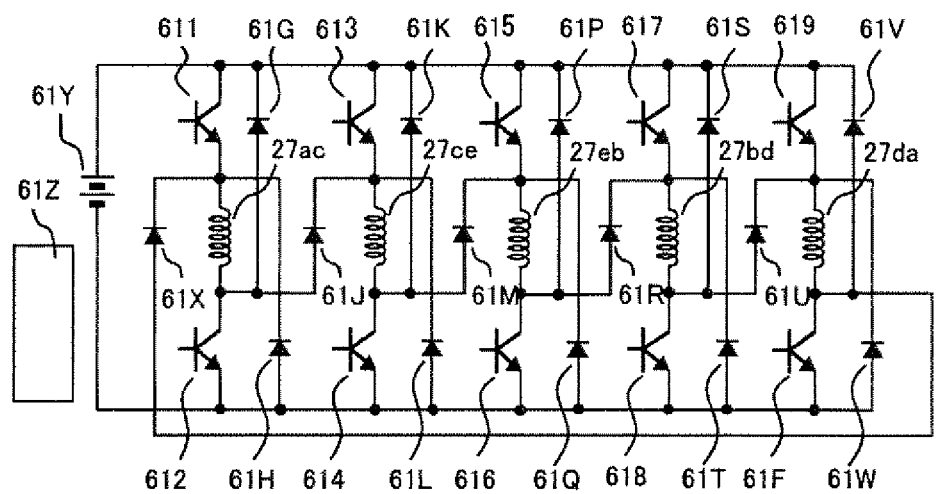
FIG. 61 exemplifies a drive circuit and windings according to the present disclosure.

Next, the embodiment of the mode 8 is shown in FIG. 61. As described above, if full pitch windings are used to reduce the copper loss in the slots of the conventional motor, the magnetic flux of each phase is interlinked and caused by the change in magnetic flux, so that an excessive voltage is generated. Has the problem of becoming complicated. The drive circuit and winding arrangement method shown in FIG. 61 is an example of alleviating these problems, especially in high speed rotation. Further, in low-speed rotation, each phase current can be individually energized, and a large torque at low-speed rotation can be output.

The drive circuit of FIG. 61 is an example of a drive circuit of each full pitch winding winding of a five-phase reluctance motor having ten stator magnetic poles, as shown in FIG. 25(*c*). Each current of each of these windings is a one-way current, which is the relationship of equations (72) to (76). Previously, an example in which the five-phase reluctance motor shown in FIG. 25(*b*) is driven by the drive circuit of FIG. 26 is shown. In particular, FIG. 27 shows an example of each model current and each voltage at low speed rotation. Also in the drive circuit of FIG. 61, an example of model currents and voltages exemplified in FIG. 27 can be used for low-speed rotation. Note that FIG. 27 shows an example in which the stator magnetic pole width and the rotor magnetic pole width are set to 24°, and the magnetic pole width is slightly wider.

Next, the operation of the drive circuit of FIG. 61 will be described. 61Z in FIG. 61 is a control circuit for the entire drive circuit, and 61Y is a DC voltage source. The transistors 611 and 612 in FIG. 61 carry the ACM phase current IacM to the ACM phase full pitch winding 27*ac*. The transistors 613 and 614 have a CEM phase full pitch winding winding 27*ce*, and carry a CEM phase current IceM. The transistors 615 and 616 are EBM phase full pitch winding windings 27*eb*, and the EBM phase current IebM is energized. Transistors 617 and 618 are BDM phase full pitch windings 27*bd*, and a BDM-phase current IbdM is energized. The transistors 619 and 61F are for DAM phase full pitch windings 25*da*, to which the DAM phase current IdaM is supplied.

The diodes 61G and 61H regenerate the ACM phase current IacM to the DC voltage source 61Y when the transistors 611 and 612 are turned from on to off. The diodes 61K and 61L regenerate the CEM phase current IceM to the DC voltage source 61Y when the transistors 613 and 614 are turned from on to off. The diodes 61P and 61Q regenerate the EBM phase current IebM to the DC voltage source 61Y when the transistors 615 and 616 are turned from on to off.

The diodes 61S and 61T regenerate the BDM phase current IbdM to the DC voltage source 61Y when the transistors 617 and 618 are turned from on to off. The diodes 61V and 61W regenerate the DAM phase current IdaM to the DC voltage source 61Y when the transistors 619 and 61F are turned from on to off.

The windings 27*ac*, 27*ce*, 27*eb*, 27*bd*, and 27*da* in FIG. 61 are arranged in series with the diodes 61J, 61M, 61R, 61U, and 61X, respectively, to form an annular connection. The energization mode for each winding includes an individual energization mode in which the windings of each phase are individually energized and a two-winding energization mode in which two windings connected in series are energized. Further, since the above-mentioned 5 windings and 5 diodes are connected in series in a ring shape, an annular current component can flow.

In the individual energization mode, the currents of the respective phases can be individually energized, especially in a region where the winding voltage is small at low-speed rotation. As described above, for example, the upper and lower transistors 611 and 612 of FIG. 61 are turned on, and the ACM phase current IacM flowing through the ACM phase full pitch winding 27*ac* is increased by power running operation, and 611 and 612 are turned off to provide a regenerative motion to reduce the current IacM. Similarly, the windings 27*ce*, 27*eb*, 27*bd*, and 27*da* of each of the other phases can also be controlled by increasing or decreasing the currents IceM, IebM, IbdM, and IdaM in each of the phases, respectively.

Further, as one of the current control operations of the transistors, it is possible to turn on only one of the upper and lower transistors 611 and 612 in FIG. 61 and put the ACM phase current IacM in the flywheel state to moderate the decrease in current. The drive circuit of FIG. 61 has a feature that the diode loss is small because one diode passes through when the current is applied to the flywheel. In this regard, the motor for the main engine of an electric vehicle requires a large torque at low-speed rotation for climbing a steep slope, which is one of the harsh conditions in motor design and inverter design. In this operation mode, the drive ratio of the flywheel energization is high, so the diode loss when the flywheel is energized is an important characteristic. Further, the drive circuit of FIG. 61 is also characterized in that there is little control interference with current control of other phases in the regenerative operation and the flywheel operation.

Next, in the above-mentioned two-winding energization mode, the influence of magnetic fluxes of other phases can be reduced. The voltage of each winding of FIG. 25(*c*) has the values of equations (77) to (81) and equations (82) to (86). Since each full pitch winding is interlinking with the magnetic flux of all phases, it is sometimes an excessive voltage, resulting in a voltage having a complicated relational expression. In particular, the influence of the voltage of the other phase becomes large at high speed rotation and large torque.

As a response to this, it is possible to control the voltage to be relatively simple as shown in equations (87) to (91). That is, it is a method of controlling voltage and current by connecting two full pitch winding windings on both sides of the target stator magnetic pole in series. The sum of the voltages of the two windings becomes the phase voltage of the concentrated winding winding wound around the stator magnetic pole, and becomes the voltage related only to the magnetic flux passing through the stator magnetic pole. Not affected by other magnetic flux components. This action is an effect of arranging the two windings differentially with respect to the stator magnetic poles. Further, the current component energizing these two windings differentially arranged on the stator magnetic pole selectively excites the stator magnetic pole and does not electromagnetically affect the other stator magnetic poles. In order to realize such control, the arrangement order of each phase winding in the drive circuit of FIG. 61 is one of the necessary conditions. The full pitch winding windings or annular windings on both sides in the circumferential direction of the stator magnetic poles to be excited cannot be connected in series unless they are arranged on the left and right sides on the paper surface of the drive circuit shown in FIG. 61, resulting in that the advantages based on the equations (87) to (91) cannot be obtained.

For example, in the time chart of FIG. 27, while the rotor rotation angle position θr rotates while generating a torque of CCW from 0° to 2°, the ACM phase current IacM and the DAM phase current IdaM are energized, and at the same time, the EBM phase. This is a range in which the current IebM and the CEM phase current IceM are energized. This is exactly the state of the rotation angle position θr of FIG. 25(*c*), and the AM phase stator magnetic pole 921 and the AM/ phase stator magnetic pole 922 are the IacM of the equation (72) and the IdaM of the equation (75). It is a state of being excited by the AM phase current component IaM. Then, in the drive circuit of FIG. 61, the AM phase current component IaM is energized from the transistor 619 through the DAM phase winding 27*da*, the diode 61X, the ACM phase winding 27*ac*, and the transistor 612. At this time, the sum of the voltages of both windings becomes the AM phase voltage VaM of the equation (87), and the influence of the voltages of the other phases can be reduced. In this way, the AM phase stator pole 921 and the AM/ phase stator pole 922 are selectively excited by the AM phase current component IaM.

At the same time, in the range where the rotor rotation angle position θr is 0° to 12° in the time chart of FIG. 27, the EM phase stator magnetic pole 929 and the EM/ phase stator magnetic pole 92A are the EBM phase current IebM of the equation (76) and (74). It is excited by the EM phase current component IeM with the CEM phase current IceM of the equation. Then, in the drive circuit of FIG. 61, the EM phase current component IeM is energized from the transistor 613 through the CE6 phase winding 27*ce*, the diode 61M, the EBM phase winding 27*eb*, and the transistor 616. At this time, the sum of the voltages of both windings becomes the EM phase voltage VeM of the equation (91), and the influence of the voltages of the other phases can be reduced. In this way, the EM phase stator magnetic pole 929 and the EM/ phase stator magnetic pole 92A are selectively excited by the EM phase current component IeM. The current components of each phase can be superimposed and energized by the drive circuit shown in FIG. 61.

As can be seen from the time chart of FIG. 27, the energizing current changes every 12° for the rotor rotation angle position θr after 12°, and the CCW torque can be continuously generated to rotate the rotor. In this way, the motor of FIG. 25(*c*) can be driven by combining the individual energization mode in the low speed rotation range and the two winding energization mode in the high speed rotation range in which the two windings connected in series are energized. It should be noted that there is a point similar to the drive circuit of FIG. 26 in that two full pitch winding windings on both sides of the stator magnetic pole are connected in series to energize.

In the drive circuit of FIG. 61 and the winding arrangement of each phase, the currents of all the phases can be superposed by applying the relationships of equations (72) to (91). In the example of the time chart of FIG. 27, the currents of 4 windings among the 5 windings contribute to the torque generation, and in principle, the utilization rate of the windings is as large as 80%. Become. Compared with the concentrated winding of FIG. 25(*a*), the copper loss in the slot can be reduced by half. Compared with the case of driving with the motor of the full pitch winding winding of FIG. 25(*b*) and the drive circuit of FIG. 26, in principle, the same copper loss reduction effect is obtained.

When low-speed rotation is driven by the drive circuit of FIG. 61 and the winding arrangement of each phase, the current of FIG. 27 can be applied because the windings of each phase of FIG. 25 (*c*) and 61 can be energized. When energized, the current can be supplied by 8 of the 10 transistors shown in FIG. 61. However, in high-speed rotation, when driving in the above-mentioned two-winding energization mode, in the example of the time chart of FIG. 27, power is sequentially supplied by four transistors, and the utilization rate of the transistors decreases in a simple principle. The voltage of each winding is complicated as the equations (82) to (86), but it is also possible to positively supply electric power in the control cycle of PWM control by using the windings having a low voltage.

In the motor of FIG. 25(*c*), the time chart of FIG. 27, and the drive circuit of FIG. 61, the 5-phase motor has been described, but the 3-phase motor having 6 stator magnetic poles and the 7-phase and 9-phase motors have been described. The same also applies to motors having 11 or more phases. Although an example of a full pitch winding is shown, an annular winding can also be used, and the number of pole pairs can be set to 2 or more to provide motors with more multiplied pole-pair numbers.

Figure 62:
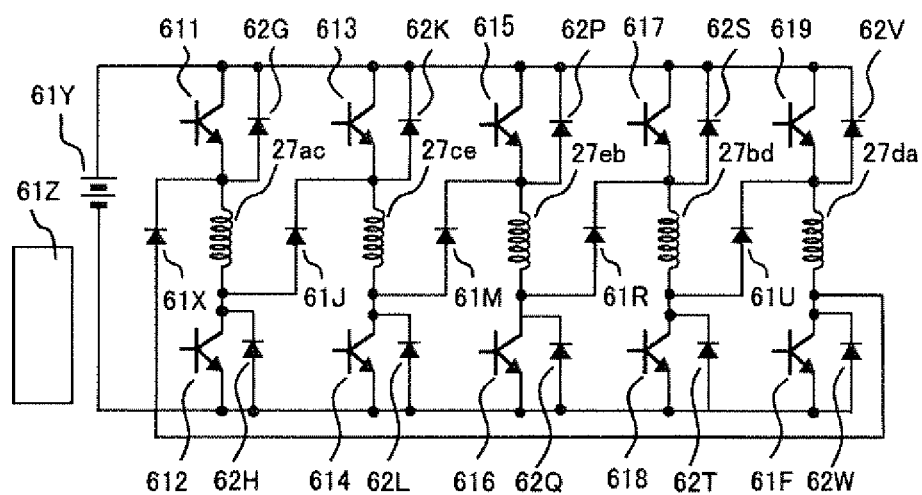
FIG. 62 exemplifies a drive circuit and windings according to the present disclosure.

Next, FIG. 62 shows a modified example of the drive circuit of FIG. 61. The diodes 61G and 61H in FIG. 61 are changed to 62G and 62H in FIG. 62. In FIG. 61, when the ACM phase current IacM flowing through the ACM phase winding 27*ac* is changed from the on state to the off state of the transistors 611 and 612, it passes through the diodes 61G and 61H and regenerates to the DC voltage source 61Y. On the other hand, in FIG. 62, when the transistors 611 and 612 are changed from the on state to the off state, they pass through the diodes 61J and 62K and 61X and 62W and are regenerated to the DC voltage source 61Y. The number of Eids that pass increases from 2 to 4. The diode loss doubles. Further, the ACM phase current IacM will flow to the drive circuit of the CEM phase winding 27*ce* and the drive circuit of the DAM phase winding 27*da*, and the interference in the electric circuit will increase.

The characteristics of the flywheel energization of each winding current of FIG. 62 are also different from those of the drive circuit of FIG. In FIG. 61, when the ACM phase current IacM flowing through the ACM phase winding 27*ac* is turned on by the transistor 611 and turned off by 612, the IacM circulates through the transistor 611, the ACM phase winding 27*ac*, and the diode 61G . . . . On the other hand, in FIG. 62, when the transistor 611 is turned on and the transistor 612 is turned off, the IacM circulates through the transistor 611, the ACM phase winding 27*ac*, the diodes 61J and 62K. The number of diodes passing through increases from one to two. The diode loss doubles. In particular, when the motor is rotated at a low speed, the ratio of the flywheel energization is high, which is disadvantageous in terms of efficiency and heat generation.

Figure 63:
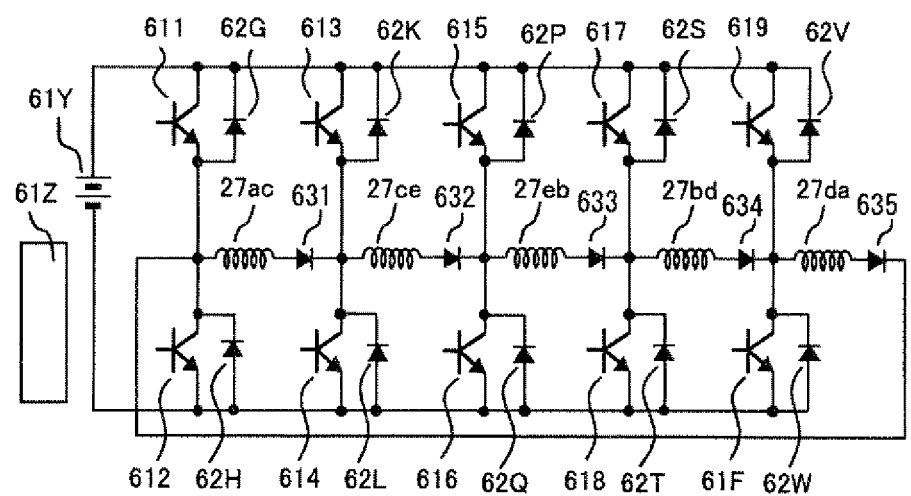
FIG. 63 exemplifies a drive circuit and windings according to the present disclosure.

Next, FIG. 63 shows another modification of the drive circuit of FIG. 61. As shown in FIG. 63, all-phase winding windings 27*ac*, 27*ce*, 27*eb*, 27*bd*, 27*da* and diodes 631, 632, 633, 634, 635 are alternately arranged one by one to form an annular winding. doing. Further, the configuration of FIG. 63 is also a configuration in which a five-phase annular winding is arranged and connected to a five-phase alternating current conventional drive circuit, and a diode that limits the current to one direction is added to each winding. A five-phase AC voltage can be applied to the windings and diodes of each phase. However, since the emitter of the transistor 611 and the collector of 612 of FIG. 63 are directly connected to each other, both transistors cannot be turned on at the same time, and the functions are limited. The same applies to 613 and 614, 615 and 616, 617 and 618, and 619 and 61F arranged vertically on the paper of FIG. 63.

Thirty-Fourth Embodiment

Figure 64:
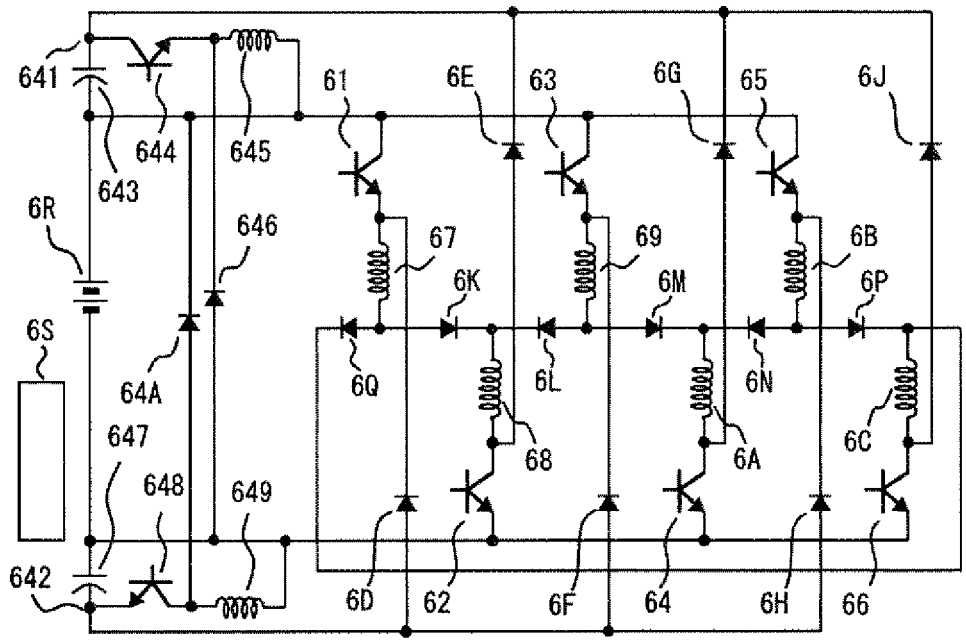
FIG. 64 exemplifies a drive circuit and windings according to the present disclosure.

Next, the embodiment of the mode 9 is shown in FIG. 64. In the drive circuit of FIG. 6, in addition to the DC voltage source VsN1 shown by 6R, a DC voltage source VsN2 for power supply regeneration whose output terminal is 641 is added. A motor whose rotor magnetic pole is made of a soft magnetic material supplies the magnetic energy Em shown in 113 of FIG. 11 to the DC voltage source VsN1 in order to output the motor torque, and when the cycle of the torque generation operation is completed. It is necessary to regenerate the magnetic energy Em to the DC voltage source VsN1. The rotor magnetic pole is attracted to the stator magnetic pole to generate torque, but when the facing area between the rotor magnetic pole and the stator magnetic pole increases, the magnetic energy Em becomes a large value, and a corresponding regeneration time is required for the regeneration. Since it is necessary to regenerate the magnetic energy in the range where the power running torque can be generated, the time for generating the power running torque is reduced. In the case of low-speed rotation, this regeneration time does not impose a large burden on torque generation because there is a time margin. However, as the number of revolutions of the motor increases, there arises a problem that the regeneration time restricts the power running torque.

The voltage Vs [V] at the time of regeneration, the number of turns Nwa [turn], the interlinkage magnetic flux $\Delta\varphi o$ [Wb], the regeneration time $\Delta t$ [Sec], the energizing current Io [A] at that time, and the magnetic energy Emo [J] are used. The regeneration time $\Delta t$ and the magnetic energy Emo are generally given by the following equations.

$$\Delta t = Nwa \times \Delta\varphi o / Vs \quad (139)$$

$$Emo = Nwa \times \Delta\varphi o \times Io/2 \quad (140)$$

By increasing the regenerative voltage Vs, the regeneration time $\Delta t$ can be shortened. Also, when converting the power on the motor side into electric power, it is necessary to regenerate it to a DC voltage source.

Regarding the configuration of FIG. 64, the second DC voltage source VsN2 is composed of a capacitor of 643, a transistor of 644, a choke coil of 645, and a diode of 646, and the output terminal of the DC voltage source VsN2 is 641. The connection destinations of the regenerative diodes 6E, 28G, and 6J shown in FIG. 64 are changed to 641, and the magnetic energy on the motor side charges the capacitor 643. Further, in FIG. 64, a third DC voltage source VsN3 having an output terminal of 642 is added. The VsN3 is composed of a 647 capacitor, a 648 transistor, a 649 choke coil, and a 64A diode, and the output terminal of the DC voltage source VsN3 is 642. The connection destinations of the regenerative diodes 6D, 28F, and 6H shown in FIG. 64 are changed to 642, and the magnetic energy on the motor side charges the capacitor 643. Here, the voltage of the DC voltage source 6R is Vdc, and the potential of the negative terminal thereof is 0 [V]. Let the voltage of the DC voltage source VsN2 be Vcc2 and the voltage of the DC voltage source VsN3 be Vcc3. The other configurations of FIG. 64 are the same as those of FIG. 6.

The regenerative voltage of 641 in FIG. 64 is as large as (Vdc+Vcc1), whereas the regenerative voltage of FIG. 6 was Vdc. As a result, as shown by the equation (139), the regeneration time can be shortened and the ratio of the torque generation time can be increased, so that the average torque can be increased. Similarly, the potential of the output terminal 642 of the third DC voltage source VsN3 is (−Vcc3), and the regenerative voltage on the negative voltage side is as large as (Vdc+Vcc3), so that the regeneration time can be shortened and the average torque can be reduced. Further, the method shown in FIG. 64 can be similarly applied to drive circuits other than those shown in FIG.

Regarding the energy transfer in FIG. 64, since the voltage Vcc2 increases when the capacitor 641 is charged, the transistor 644 discharges the energy to the choke coil 645, converts it like a DC-DC converter, and charges the DC voltage source 6R. Similarly, when the capacitor 642 is charged, the voltage Vcc3 becomes large. Therefore, the transistor 648 discharges the capacitor 642 to the choke coil 649, converts the capacitor 642 like a DC-DC converter, and charges the DC voltage source 6R. By these operations, the magnetic energy of the motor can be regenerated to the DC voltage source 6R. Further, the capacitor 643 and the capacitor 647 may be other types of power sources such as a battery.

Thirty-Fifth Embodiment

Figure 65:
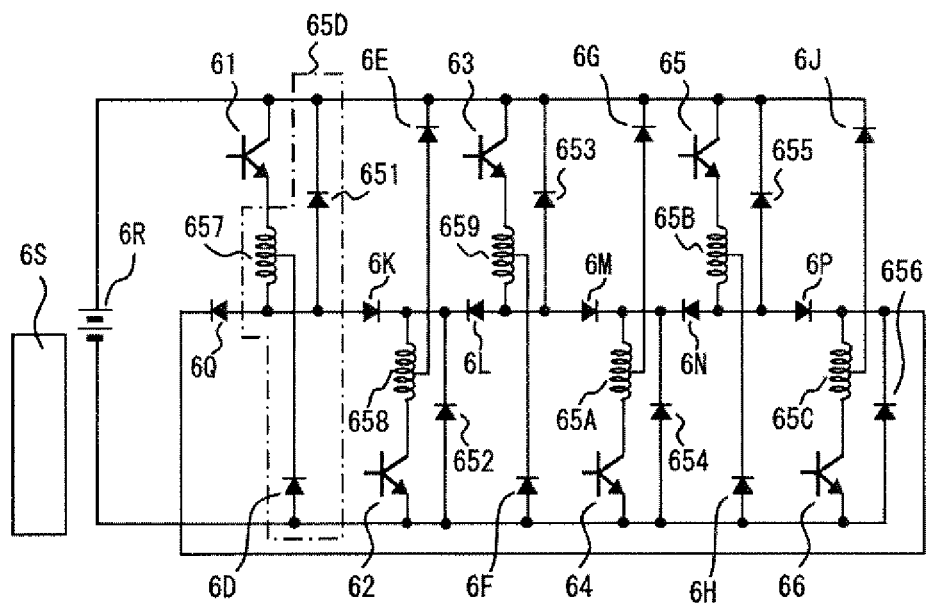
FIG. 65 exemplifies a drive circuit and windings according to the present disclosure.

Next, another embodiment of the mode 9 is shown in FIG. The drive circuit and motor winding of FIG. 65 are partially modified versions of the drive circuit of FIG. The changed part around the transistor 61 is in the range of the alternate long and short dash line 65D in FIG. 65. The AB phase full pitch winding 67 in FIG. 6 is changed to the ABP phase full pitch winding 657 from which the intermediate tap is taken out in FIG. 65. The connection destination of the cathode of the regenerative diode 6D is changed to the intermediate tap. Then, when the transistor 61 is turned off, the regenerative diode 651 that constitutes the path through which the ABP phase current IabP1 is converted and energized is added. As shown in FIG. 65, the peripheral circuits of the other transistors are also changed in the same manner as the range of the alternate long and short dash line 65D. The other configurations of FIG. 65 are the same as those of FIG. 6.

Next, the circuit operation in the range of the alternate long and short dash line 65D and the electromagnetic operation of the motor winding will be described. For example, the state in which the AP phase current IaP is energized from the transistor 61 in FIG. 65 through the ABP phase full pitch winding 657, the diode 6K, the CAP phase full pitch winding 658, and the transistor 62. Now, consider a transient state in which the transistor 61 is shifted from on to off. Then, the number of windings of the ABP phase full pitch winding 657 in FIG. 65 is Nwa/2, the number of windings of the winding 6571 on the upper side of the intermediate tap is Nwa/4, and the number of windings on the lower side of the intermediate tap is Nwa/2. It is assumed that the number of turns of the winding 6572 is Nwa/4. Immediately after the transistor 61 shifts from on to off, the current flowing through the 6571 becomes 0, and the current flowing through the 6572 is halved in the number of turns, so that the current flows twice as much as the current IaP flowing up to that point. Twice the current of IaP (IaP×2) flows through the regenerative diode 6D, IaP flows through the diode 651, and the remaining IaP flows toward the diode 6K, the CAP phase full pitch winding 658, and the transistor 62. At this time, the voltage Vdc of the DC voltage source 6R is applied to the winding 6572 in the opposite direction, and a regenerative operation is performed.

Immediately after the transistor 61 is switched from on to off, the magnetic energy does not change because the number of turns of the energized portion is halved and the current value is doubled according to the equation (140). Conversely, the current value is doubled so that the magnetic energy does not change. Since a period of time Δt required for regeneration is halved from the equation (139), the time Δt is shortened to halved. Then, by shortening the regeneration time, an increase in power running torque can be expected. At this time, the voltage across the AB phase full pitch winding 657 is (−Vdc×2), and it can be considered equivalently that a double regenerative voltage is applied. Further, in fact, since a large voltage (Vdc×2) is applied to the transistor 61 of FIG. 65, it is necessary to increase the withstand voltage of the transistor. In addition, since it is a photomultiplier operation, there is a concern that a spike-like instantaneous overvoltage may occur, and the addition of a snubber circuit or, in the case of a power MOSFET, its avalanche characteristics can be expected.

Thirty-Sixth Embodiment

Figure 66:
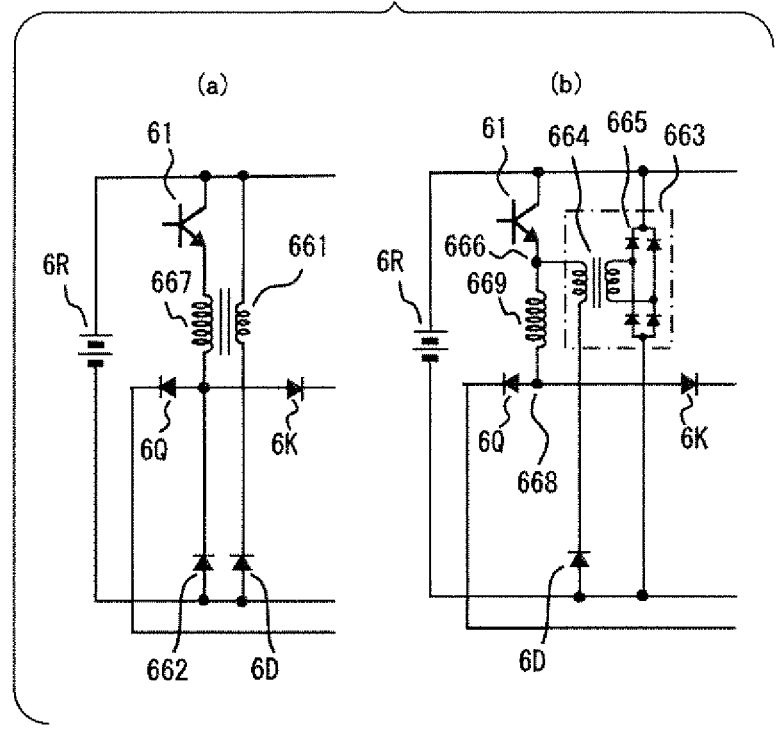
FIG. 66 exemplifies a drive circuit and windings according to the present disclosure.

Next, although different from the method of FIG. 65, a method of shortening the regeneration time by applying an electromagnetic phenomenon is partially shown in FIG. 66(*a*). FIG. 66(*a*) is a diagram partially showing the peripheral circuits of the transistor 61 of FIG. 6 and the AB phase full pitch winding winding, and the windings of other phases and their peripheral circuits have the same configuration. (A) of 66 is a configuration in which a winding is added to the same slot in parallel with the AB phase full pitch winding winding 67 of FIG. 67 in FIG. 6 and 667 in FIG. 66(*a*) are the same, and 661 is an added winding. This is the so-called bifilar volume. However, the winding directions of 667 and 661 are opposite, and the number of windings of each can be freely selected. This ABQ1 phase full pitch winding 667 is connected to the diodes 6Q and 6K as in FIG. 6, and at the same time, is connected to the cathode of the diode 662 to be added, and the anode of the 662 is connected to the negative terminal of the DC voltage source 6R. Connect to potential 0 [V]. On the other hand, the ABQ2 phase full pitch winding 661 is connected to both ends of 6R in series with the regenerative diode 6D, at potentials Vdc [V] and 0 [V].

The operation of the configuration shown in FIG. 66(*a*) is, for example, in a state where the A-phase current Ia is energized from the transistor 61 through the ABQ1 phase full pitch winding 667, the diode 6K, and the CA phase full pitch winding. Consider a transient state in which the transistor 61 is transitioned from on to off. Then, it is assumed that the number of turns of the ABQ1 phase full pitch winding 667 of FIG. 66 (*a*) is Nwa/2, and the number of turns of the ABQ2 phase full pitch winding 661 is Nwa/4. Immediately after the transistor 61 shifts from on to off, the current flowing through the 667 becomes 0, and the current flowing through the 661 and the regenerative diode 6D is twice the current Ia that has been flowing through the 667 until then. Further, on the paper surface of FIG. 66 (*a*), when the current flows from the upper side to the lower side, it passes through the winding 667, and when the current flows from the lower side to the upper side, it passes through the winding 661. On the other hand, since the A-phase current Ia of the CA-phase full pitch winding is also maintained immediately after the transistor 61 is turned off, the A-phase current Ia flows from the diode 662 to 6K. At this time, the voltage Vdc of the DC voltage source 6R is applied to the ABQ2 phase full pitch winding 661 in the opposite direction, and a regenerative operation is performed. The regeneration time can thus be shortened.

The magnetic energy provided immediately after the transistor 61 of FIG. 66(*a*) is switched off from its on state is not changed because the number of turns of the energized portion is halved and the current value is doubled, based on the equation (140). Since the number of turns of the time Δt required for regeneration is halved from the equation (139), the time Δt is shortened to halved. Then, by shortening the regeneration time, an increase in power running torque can be expected. At this time, the voltage across the ABQ1 phase full pitch winding 667 is (−Vdc×2), and it can be considered equivalently that a double regenerative voltage is applied. Further, in fact, since a large voltage (Vdc×2) is applied to the transistor 61 of FIG. 66(*a*), it is necessary to increase the withstand voltage of the transistor. In addition, since it is a photomultiplier operation, there is a concern that a spike-like instantaneous overvoltage may occur, and the addition of a snubber circuit or, in the case of a power MOSFET, its avalanche characteristics can be expected. The operation of FIG. 66 (*a*) is electromagnetically similar to the operation of FIG. 65.

Thirty-Seventh Embodiment

Next, although different from the method explained with FIG. 65 and FIG. 66(*a*), a method of shortening the regeneration time by applying an electromagnetic phenomenon is partially shown in FIG. 66(*b*). FIG. 66(*b*) is a diagram partially showing the peripheral circuits of the transistor 61 of FIG. 6 and the AB phase full pitch winding winding 67, and the windings of the other phases and their peripheral circuits have the same configuration. In FIG. 66(*b*), the AB phase full pitch winding winding 67 is an ABQ3 phase full pitch winding 669. The drive circuit and motor winding shown in FIG. 66(*b*) are obtained by adding a constant voltage circuit surrounded by an alternate long and short dash line 663 to the drive circuit shown in FIG. 6. Reference numeral 664 shows a transformer, and its primary winding is connected to a regenerative diode 6D and an ABQ3 phase full pitch winding winding 669. The secondary winding of 664 is connected to the full-wave rectifier 665, and the output of 665 is connected to the DC voltage source 6R.

The operation of the configuration shown in FIG. 66(*b*) is based on, for example, in a state where the A-phase current Ia is supplied from the transistor 61 through the ABQ3 phase full pitch winding 669, the diode 6K, and the CA-phase full pitch winding. Consider a transient state in which the transistor 61 is transitioned from its on state to its off state. It is assumed that the winding ratio of the primary winding to the secondary winding of the transformer 664 is 1. Immediately after the transistor 61 shifts from on to off, the A-phase current Ia is energized from the regenerative diode 6D through the transformer 664, through the ABQ3 phase full pitch winding 669, and in the direction of the diode 6K. At this time, since the secondary winding of the transformer 664 is short-circuited to the DC voltage source 6R via the full-wave rectifier 665, when the voltage of the primary winding of the transformer 664 exceeds Vdc, the impedance becomes small. Then, the potential of the connection point 666 of the transistor 61 and the ABQ3 phase full pitch winding 669 becomes (−Vdc).

In the case of FIG. 6, since the potential of the 666 immediately after the transistor 61 is switched from on to off is 0 V, in the case of the part (b) of FIG. 66, the regenerative voltage is increased by Vdc. At this time, the magnetic energy of the ABQ3 phase full pitch winding 669 is released to the outside. Assuming that the potential of 668 is V668, the emitted power is (V668−(−Vdc))×Ia=(V668+Vdc)×Ia, and the power of (Vdc×Ia) is regenerated to the DC voltage source 6R. Will be done. Since the regenerative voltage in FIG. 66 (b) is larger than that in the case of FIG. 6, the regenerative time is shortened. Then, by shortening the regeneration time, an increase in power running torque can be expected.

The function of the portion surrounded by the alternate long and short dash line 663 in FIG. 66(b) exhibits a constant voltage characteristic like a Zener diode for a certain limited time width. It does not consume power internally like a Zener diode, but regenerates it to the DC voltage source 6R. However, if the time width is exceeded, magnetic saturation occurs, so that the voltage drops to the amount of the voltage drop of the winding resistance, and the regenerative ability to the power supply is lost. Therefore, it is necessary to consider in terms of control. Further, the full-wave rectifier 665 can be an odd rectifier. Further, the transformer 664 can be configured by utilizing a part of the outer peripheral portion of the stator core of the motor or the like. By manufacturing it integrally with the motor, it is possible to reduce the problem of space and cost of the transformer and the problem of manufacturing burden of winding and its wiring. The methods of FIGS. 65 and 66, which are described above, can also be applied to other drive circuits and motors shown in the present invention, in addition to the drive circuit of FIG. 6.

Thirty-Eighth Embodiment

Figure 67:
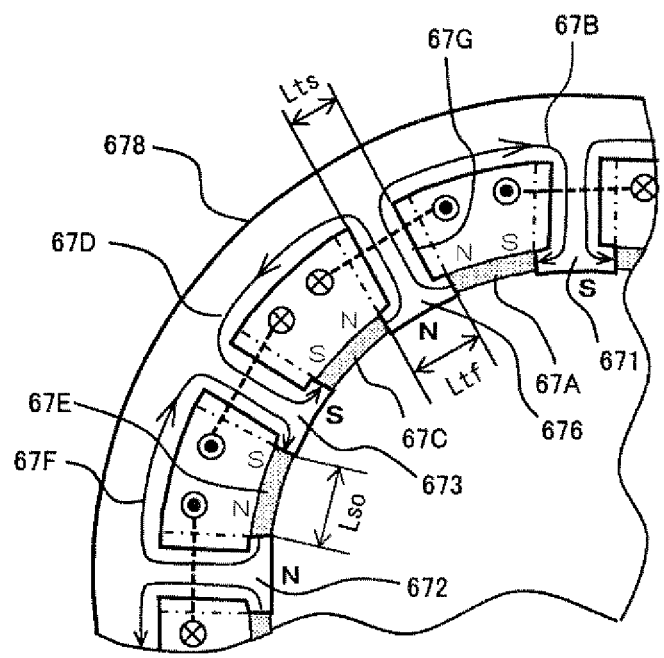
FIG. 67 is a lateral sectional view exemplifying a motor in which a permanent magnet is arranged between teeth provided as stator magnetic poles.

Next, an embodiment of the mode 10 is shown in FIG. 67.

As described above, in the motor of the present invention, a one-way current is applied to each phase winding to excite it, and the magnetic flux direction of each stator magnetic pole is also one-way. Either the north pole or the south pole. Therefore, the soft magnetic material of each stator magnetic pole uses only the unidirectional characteristic of the magnetic characteristic, and the magnetic characteristic in the opposite direction cannot be used. Further, when the current is large, leakage flux between the stator magnetic poles is generated, causing a problem of magnetic saturation of the stator magnetic poles. In the mode 10, by effectively utilizing the magnetic characteristics in the opposite direction, the slot cross-sectional area is expanded, most of the teeth can operate at a relatively linear magnetic operating point with a large relative permeability, and iron loss is also reduced. it can. The problem of leakage flux can also be offset and reduced.

FIG. 67 is an example similar to the stator core of FIG. 15, which has a configuration of 12 stator magnetic poles and 8 rotor magnetic poles, and has a configuration in which the three-phase reluctance motor of FIG. 1 is paired with two poles. In FIG. 67, ¼ of the upper left portion of the motor cross range is shown for partial enlargement. The winding is shown as an example of a concentrated winding for easy understanding. According to the mode 10, the number of stator magnetic poles is not limited, and the winding can be a concentrated winding, a full pitch winding, an annular winding, or the like. The description of the rotor is omitted.

A reference numeral 671 of FIG. 67 shows an A-phase stator magnetic pole and has an S pole, and is wound around an A-phase winding. Reference numeral 672 shows an A/ phase stator magnetic pole having N pole, and the A/ phase winding is wound therearound. Reference numeral 673 shows a B phase stator magnetic pole, which is an S pole, and winds a B phase winding therearound. Reference numeral 676 shows an N pole at the C/ phase stator magnetic pole, and the C/ phase winding is wound therearound.

A reference numeral 67A indicates a permanent magnet, and the polarity of the permanent magnet 67A matches the polarity of both stator magnetic poles between the A-phase stator magnetic pole 671 of the S pole and the C/ phase stator magnetic pole 676 of the N pole near the tip of the stator magnetic pole. Are arranged. The magnetic flux generated by the permanent magnet 67A is 67B, and the direction of the magnetic flux 67B is the direction of the magnetic flux opposite to the direction of the magnetic flux in which the A-phase stator magnetic pole 671 acts on the rotor magnetic pole to generate torque. In the portion where the magnetic flux 67B passes through the C/ phase stator magnetic pole 676, the direction of the magnetic flux 67B is opposite to the direction of the magnetic flux in which the magnetic pole 676 acts on the rotor magnetic pole to generate torque.

Similarly, a reference numeral 67C shows a permanent magnet, and the polarity of the permanent magnet 67C is arranged between the C/ phase stator magnetic pole 676 of the N pole and the B-phase stator magnetic pole 673 of the S pole according to the polarities of both stator magnetic poles. There is. The magnetic flux generated by the permanent magnet 67C is 67D, and the direction of the magnetic flux 67D is opposite to the direction of the magnetic flux in which the C/ phase stator magnetic pole 676 acts on the rotor magnetic pole to generate torque. In the portion where the magnetic flux 67D passes through the B-phase stator magnetic pole 673, the direction of the magnetic flux 67D is opposite to the direction of the magnetic flux in which the 673 acts on the rotor magnetic pole to generate torque.

Similarly, a reference numeral 67E indicates a permanent magnet, and the polarity of the permanent magnet 67E is arranged between the B phase stator magnetic pole 673 of the S pole and the A/ phase stator magnetic pole 672 of the N pole according to the polarities of both stator magnetic poles. There is. The magnetic flux generated by the permanent magnet 67E is 67F, and the direction of the magnetic flux 67F is opposite to the direction of the magnetic flux in which the B-phase stator magnetic pole 673 acts on the rotor magnetic pole to generate torque. In the portion where the magnetic flux 67F passes through the A/ phase stator magnetic pole 672, the direction of the magnetic flux 67F is opposite to the direction of the magnetic flux in which the magnetic pole 672 acts on the rotor magnetic pole to generate torque.

When no current is applied to the windings of each phase, the teeth of each stator magnetic pole have magnetic flux in the opposite direction magnetically and are magnetically negatively biased. For example, when there are no permanent magnets, the magnetic flux when the C/ phase current is applied and the C/ phase stator magnetic pole 676 attracts the rotor magnetic pole to generate torque is from the tooth root direction, that is, the back yoke direction. It is assumed that the magnetic flux toward the tooth tip is +2.0 [T] at that time. Further, here, it is assumed that the saturation magnetic flux density of the soft magnetic material is 2.0 [T]. Then, there are permanent magnets 67A, 67C, etc., and when the energizing current is 0 [A], there are magnetic fluxes 67B, 67D from the C/ phase stator magnetic pole 676 to the root of the tooth, and at that time. It is assumed that the magnetic flux density is −1.0 [T].

In the presence of the permanent magnets 67A, 67C, etc., the magnetic flux density when the C/ phase current is applied and the C/ phase stator magnetic pole 676 attracts the rotor magnetic pole to generate torque is (−1.0+2.0)=+1.0 under the above conditions. Hence, the magnetic fluxes from the root to the tip of the tooth becomes +1.0 [T]. Therefore, in the presence of the permanent magnets 67A, 67C, etc., the magnetic flux density of the central portion of the tooth of the C/ phase stator magnetic pole 676 operates in the range of the magnetic flux density of −1.0 to +1.0 [T]. The magnetic properties of the soft magnetic material are non-linear as shown in FIG. 11, but in the range of the magnetic flux density of −1.0 to +1.0 [T], the magnetic properties are relatively linear and the relative permeability is high. Hence, hysteresis loss is small. At this time, since the exciting magnetic flux and the magnet magnetic flux are combined in the vicinity of the tip of the C1 phase stator magnetic pole 676 facing the rotor magnetic pole, the magnetic flux density is high, and the magnetic flux density near +2.0 [T] such that magnetic saturation occurs.

Next, a method of thinning the teeth of each stator magnetic pole, expanding the slot cross-sectional area, and reducing copper loss will be described. As shown in the example of FIG. 67, since the magnetic flux density of most of the teeth of the C/ phase stator magnetic pole 676 is 1.0 [T] or less, it can be used magnetically even if the tooth width is slightly narrowed. It is possible. For example, assuming that the magnetic flux density is up to 2.0 [T], the tooth width can be reduced to ½, and the slot cross-sectional area can be increased by that amount. Then, the copper loss can be reduced. As for the specific shape at that time, the circumferential width Ltf near the tip of each stator magnetic pole in FIG. 67 cannot be reduced, but the tooth width Lts such as the central portion of the teeth of the stator magnetic pole can be reduced.

How much the tooth width Lts is reduced can be selected depending on the magnetic characteristics of the permanent magnet, the cost of the permanent magnet, the magnetic characteristics of the soft magnetic material, and the like. This reduction of the tooth width Lts can be reduced by 50% as in the above example, but it is effective in terms of hysteresis loss and the like even if the reduction is not performed. Further, between the stator magnetic poles arranged in the circumferential direction, leakage flux between the magnetic poles is generated at the time of a large current, which causes a problem of magnetic saturation of the stator magnetic poles. Regarding this problem, the permanent magnets 671, 672, 67A, and 67C have an effect of canceling the leakage speed. In anticipation of this effect, a stronger permanent magnet can be used. Further, in the example of FIG. 67, the cross-sectional shape of the permanent magnet is elongated. However, for example, in a realistic motor configuration, if the motor has a pole pair number of about 4 pole pairs, the length of the permanent magnet becomes a shape of an image in which the length of the permanent magnet is drawn short.

Thirty-Ninth Embodiment

Figure 68:
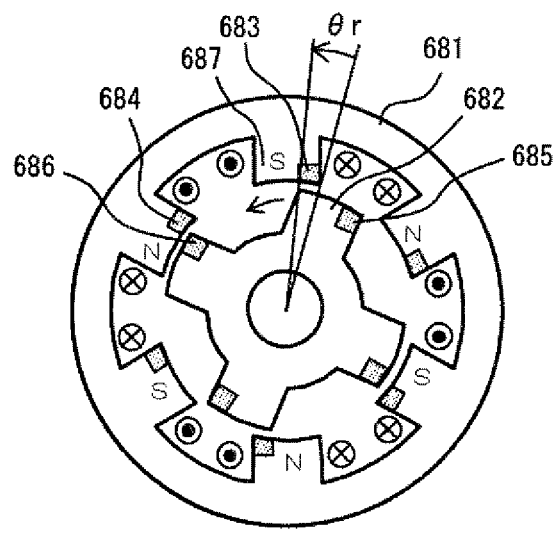
FIG. 68 shows an example of a contrition in which different type materials are arranged partially in the configuration mainly composed of soft magnetic materials.
Figure 69:
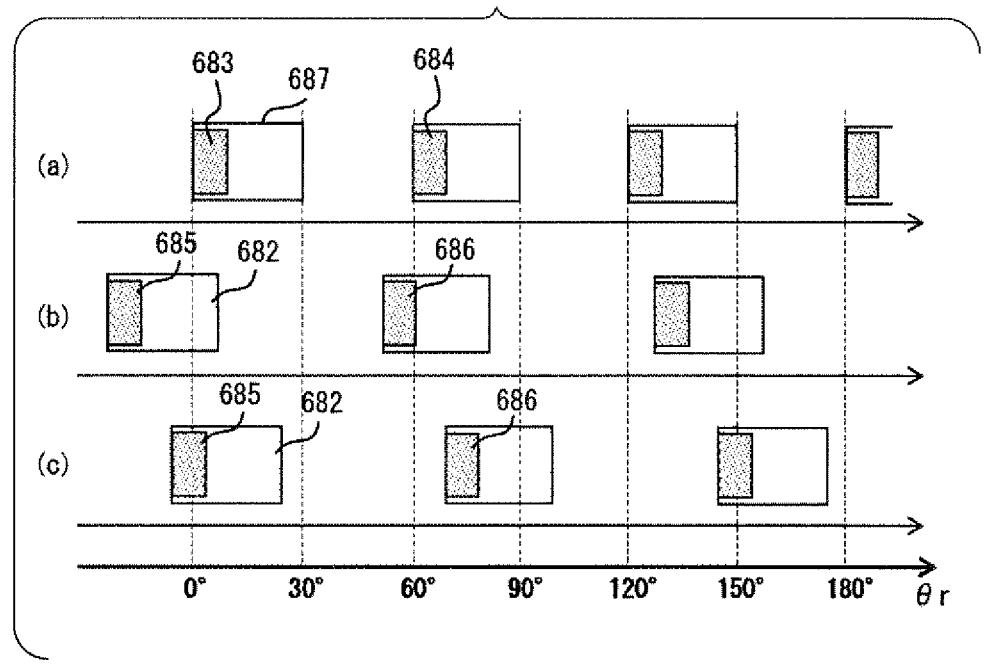
FIG. 69 shows a horizontally developed view of the foregoing motor.

Next, the embodiment of the mode 11 is shown in FIGS. 68 and 69. The reluctance motor shown in FIGS. 1, 2 and the like can be designed frequently on the premise that the main material of the soft magnetic material constituting the core of the stator and the rotor is partially magnetically saturated as described above. For example, as shown in FIG. 13, the rotor rotation angle θr and the magnetic flux φ passing through the teeth have a relationship like 131, and the torque decreases due to magnetic saturation when θr approaches 30° as in 132. In the mode 11, this decrease in torque is reduced.

A reference numeral 681 of FIG. 68 shows a stator, a reference numeral 682 shows one of the rotor magnetic poles, and the stator magnetic poles and rotor magnetic poles of FIGS. 1 and 2 are arranged. For example, a reference numeral 687 shows an A-phase stator magnetic pole. The winding that excites each stator magnetic pole may be a full pitch winding, an annular winding, a concentrated winding, or the like. Now, consider that the motor of FIG. 68 mainly adopts the CCW directional rotation to improve the torque characteristics of the CCW rotation. There are many applications where torque in one direction is important.

Various materials can be used depending on the purpose as the main soft magnetic material of the core through which the magnetic flux is passed by the reluctance motor. For example, an isotropic electromagnetic steel plate for a general motor has a saturation magnetic flux density of about 2.0 [T], and an amorphous iron core has a saturation magnetic flux density of about 1.4 [T] and a large relative permeability, and a ferrite core. Has a low saturation magnetic flux density of about 0.4[T], but has extremely small hysteresis loss and eddy current loss. Some dust cores have a saturation magnetic flux density of about 2.0 [T], and since they can be molded into a three-dimensional shape, complex magnetic circuit configurations such as axial gap motors are possible and are being actively researched. Permendur is known as a material having a high magnetic flux density, and the saturation magnetic flux density is about 2.4 [T], but it is expensive because it contains a large amount of cobalt, and its use is used in racing motors and the like. Applications are thus limited to special uses. Various materials can be used for various purposes, in various parts, and in various shapes.

The motor of FIG. 68 is an example of a motor configuration in which the members of the second soft magnetic material MMC2 shown in 683, 684, 685, and 686 are used in combination in addition to the main soft magnetic material MMC1. The motor of FIG. 68 is a combination in which the rotation of CCW and the torque of CCW are mainly used, and the saturation magnetic flux density of MMC2 is larger than that of MMC1. In FIG. 69, the air gap surface where the stator magnetic pole and the rotor magnetic pole of FIG. 68 face each other is linearly developed to the left and right of the paper surface, and FIG. (b) and (c) indicate the outer diameter side shape of each rotor magnetic pole. The horizontal axis of FIG. 69 is the rotor rotation angle position θr, and the CCW direction of FIG. 68 is to the right on the paper surface of FIG. 69.

In FIG. 69 (b), the rotation angle position θr of the rotor is 10°, the material of the portion 683 where the A-phase stator magnetic pole 687 faces the rotor magnetic pole 682 is the MMC2, and the material of the rotor magnetic pole 682 faces the material of the MMC1. doing. Since the electromagnetic torque is mainly constrained by the lower magnetic flux density, θr becomes the torque 132 in FIG. 13 around 10° and does not become particularly large.

FIG. 69 (c) shows a state in which the rotor further rotates in the CCW direction and θr becomes 25°. As shown in 132 of FIG. 13, this is a region where the torque decreases due to magnetic saturation. In the vicinity of θr of 25°, the member 683 of the MMC2 of the A-phase stator magnetic pole and the member 685 of the MMC2 of the rotor magnetic pole face each other, and act with a larger magnetic flux density to generate a larger torque. It is possible to increase the torque of 132 in the vicinity of θr of FIG. 13 at 25°. However, since the magnetic flux passes from the tip of the stator magnetic pole to the back yoke, it is necessary to take measures such as expanding the magnetic path cross-sectional area so that the magnetic flux can pass through the entire tooth. It is meaningless if the magnetic resistance of the entire magnetic path is large, such as magnetic saturation somewhere in the magnetic path through which the magnetic flux passes.

In the example of the motor of FIG. 68, an example in which the second soft magnetic materials MMC2 683 and 684 are arranged on the CW side of the stator magnetic pole and the rotor magnetic pole is shown. Further, by arranging the second soft magnetic material MMC2 at both the CW side and CCW side corners of the stator magnetic pole and the rotor magnetic pole, both of the above are described in the vicinity of θr of 25° in FIG. 69 (*c*). The MMC2 at the corners face each other at the same time, and the feature of the high magnetic flux density of the MMC2 can double the torque. It should be noted that this effect is effective during bidirectional rotation during CW rotation and CCW rotation. Further, the second soft magnetic material MMC2 can have various shapes, and for example, the members of 683, 684, 685, and 686 can have a long shape from the magnetic pole surface to the back yoke.

In this way, by using two or more types of soft magnetic materials in combination, it is possible to improve the torque characteristics that decrease due to the magnetic saturation characteristics. For example, permendur can be designed with a large magnetic flux density, but it is expensive. However, if the amount used is small, the burden of cost increase is small and it can be effectively used.

Fortieth Embodiment

Next, an embodiment of the mode 12 is shown in FIG. The torque of the reluctance motor shown in FIGS. 1 and 2 and the like requires an exciting load to generate a magnetic flux passing through an air gap portion and the like. For example, as shown in the example of the exciting current and torque characteristics in FIG. 12, the torque is small because the magnetic flux density is low in the region 122 where the current is small, where the continuous rated current is Ira. In the mode 12, the exciting current component is supplemented with a permanent magnet, and there is an effect of increasing torque particularly in a region where the current is small. There are many motor applications with a high operating ratio in the light load region, and the operating efficiency in such applications can be improved. For example, it is a motor operating region as shown in the operating region D of FIG. 10.

Figure 70:
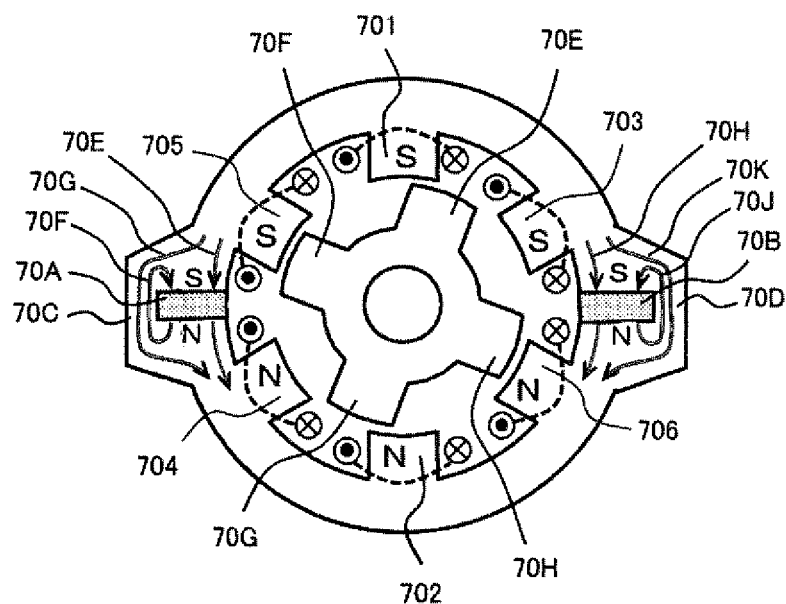
FIG. 70 is a lateral sectional view of a motor according to the present invention, in which permanent magnets are arranged in the back yoke.

The motor shown in FIG. 70 is a motor having six stator magnetic poles and four rotor magnetic poles, and each stator is provided with a concentrated winding winding for energizing a one-way current. The circumferential width of each magnetic pole is an example of 30°. Three S-pole stator magnetic poles are arranged on the upper side of the paper surface of FIG. 70, three N-pole stator magnetic poles are arranged on the lower side, and the same polarity as the polar direction of each stator magnetic pole is placed in the intermediate portion between them. Permanent magnets 70A and 70B in that direction are arranged. On the paper, the upper side of 70A and 70B is the S pole and the lower side is the N pole.

A reference numeral 701 in FIG. 70 shows an A-phase stator magnetic pole, and a reference numeral 702 shows an A/ phase stator magnetic pole. Reference numeral 703 is a B-phase stator magnetic pole, and 704 is a B/ phase stator magnetic pole, which are opposite to those of the motor of FIG. Reference numeral 705 is a C phase stator magnetic pole, and 706 is a C phase stator magnetic pole, which are opposite to those of the motor of FIG. 1.

In the magnetic path through which the magnetic flux passes, the area where the S pole stator magnetic poles of 701, 703, and 705 of FIG. 70 and the rotor magnetic poles of 70E and 70F face each other is constant regardless of the rotation angle position θr of the rotor. The width of the magnetic pole of the stator on the air gap surface is 30°. Similarly, the area on the lower side of the paper surface of FIG. 70 where the N-pole stator magnetic poles of 702, 704, and 706 and the rotor magnetic poles of 70G and 70H face each other is also constant regardless of the rotation angle position θr of the rotor.

Therefore, when the current of each phase is not energized, the magnetic flux generated by the permanent magnets 70A and 70B is a constant magnetic flux from the lower side to the upper side of the rotor on the paper surface of FIG. 70 regardless of the rotation angle position θr of the rotor. It will pass. In this state, the torque generated by the magnetic flux generated by the permanent magnet is a balance between the CW torque and the CCW torque, so that there is no torque ripple in principle. Then, if each phase current is energized in this state as in the respective phase currents Ia, Ib, and Ic shown in FIG. 84, a uniform torque is generated in principle, and the value of the torque increases on the action of the permanent magnet.

Next, a motor configuration will be described when the motor of FIG. 70 requires a large torque at low speed rotation and also requires constant output control at high speed rotation. The structure is provided with soft magnetic magnetic paths 70C and 70D on the side surfaces of the permanent magnets 70A and 70B, and the amount of magnetic flux passing in the vicinity thereof can be changed. When the current of each phase winding is 0 or small, the component of the magnetic flux 70F of the permanent magnet 70A passes through the soft magnetic magnetic path 70C and is closed in the vicinity thereof. Then, the magnetic flux density of the magnetic path 70C becomes large, and the component of the magnetic flux 70E of the permanent magnet 70A that cannot pass through the magnetic path 70C is supplied to the upper and lower back yokes of FIG. 70, and is supplied to the stator magnetic pole and the rotor magnetic pole. The magnetic fluxes 70J and 70H of the permanent magnet 70B have the same relationship.

Next, when the motor of FIG. 70 generates a large torque, a large current is applied to the corresponding winding, the magnetic flux 70F component of the permanent magnet 70A disappears, and the magnetic flux components of the magnetic fluxes 70E and 70G are on the paper surface of FIG. 70, which will pass from the upper side to the lower side. Then, the magnetic flux densities of the corresponding stator magnetic poles and rotor magnetic poles increase, and a large torque is generated. At this time, the component of the magnetic flux 70J of the permanent magnet 70B is also eliminated, and the magnetic fluxes 70H and 70K are supplied and operate in the same manner.

When the motor of FIG. 70 is rotated at high speed, power supply and power regeneration are repeated so that the voltage of the DC voltage source and the winding voltage of the motor are balanced. It is a rotation area of constant output control. At that time, since the amount of magnetic flux passing from the upper side to the lower side on the paper surface in the vicinity of the permanent magnets 70A and 70B is variable, the operation can be performed so as not to hinder the energization operation at high speed rotation. As described above, the motor of FIG. 70 effectively utilizes the permanent magnets 70A and 70B for the output operation at a light load, the output operation of a large torque at a low speed rotation, the constant output operation at a high speed rotation, and the like.

In particular, by adding and applying permanent magnets to the motors shown in FIGS. 45 and 53, a simple and highly efficient motor can be realized. In the range of the electric angle of 360°, the number of stator magnetic poles is 4, and the magnetic flux of the phase passes through the stator magnetic poles having a phase difference of 180°. Therefore, inevitably, the stator magnetic poles of the S pole are in the circumferential direction. Two N-pole stator magnetic poles are lined up in the circumferential direction. The permanent magnets 70A and 70B of FIG. 70 are arranged in the intermediate portion of the stator. The winding can be a full pitch winding, an annular winding, or a concentrated winding.

Forty-First Embodiment

Figure 71:
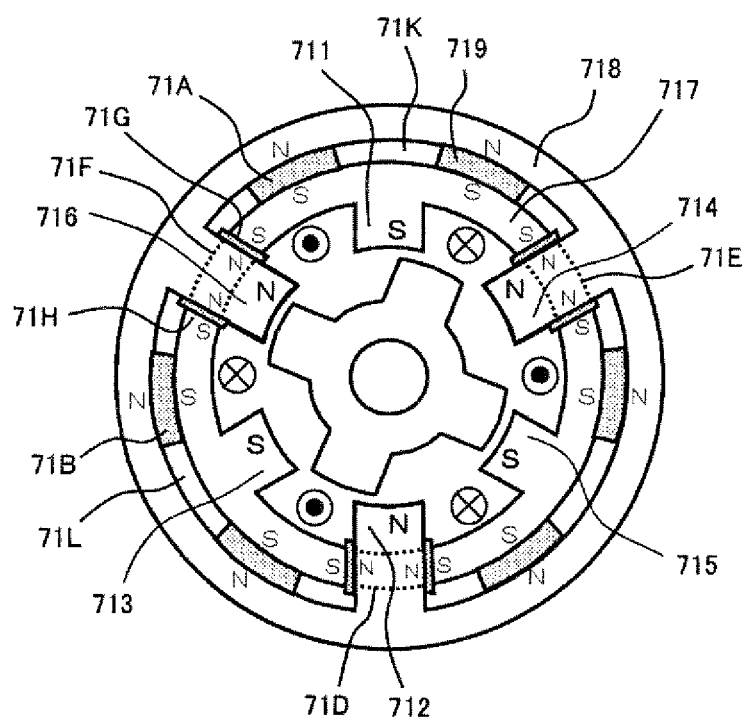
FIG. 71 is a lateral sectional view exemplifying a motor according to the invention, in which the back yoke is separated into N poles and S poles in the radial direction.

Next, an embodiment of the mode 13 is shown in FIG. 71. The torque of the reluctance motor shown in FIGS. 1 and 2 and the like requires an exciting load to generate a magnetic flux passing through an air gap portion and the like.

For example, as shown in the example of the exciting current and torque characteristics in FIG. 12, the torque is small because the magnetic flux density is low in the region 122 where the current is small, where the continuous rated current is Ira. In the mode 13, the exciting current component is supplemented with a permanent magnet, and there is an effect of increasing torque particularly in a region where the current is small. There are many motor applications with a high operating ratio in the light load region, and the operating efficiency in such applications can be improved.

The motor shown in FIG. 71 is a motor having 6 stator magnetic poles and 4 rotor magnetic poles, and the winding for exciting each stator is a full pitch winding as shown in FIGS. 1 and 2, or an annular winding, a concentrated winding, etc. are possible. A reference numeral 711 in FIG. 71 shows an A-phase stator magnetic pole, and a reference numeral 712 shows an A/ phase stator magnetic pole. A reference numeral 713 shows a B-phase stator magnetic pole, a reference numeral 714 shows a B/ phase stator magnetic pole, a reference numeral 715 shows a C phase stator magnetic pole, and a reference numeral 716 is a C/ phase stator magnetic pole. A reference numeral 717 shows a back yoke for the S pole, which is magnetically connected to the stator poles 711, 713, and 715 of the S pole. Reference numeral 718 shows a back yoke for the N pole, which is magnetically connected to the stator poles 712, 714, and 716 of the N pole. Permanent magnets 719, 71A, 71B and the like are arranged between the back yoke 717 for the S pole and the back yoke 718 for the N pole in a direction of polarity that excites each of them.

The magnetic connection between the N-pole back yoke 718 and the N-pole stator poles 712, 714, and 716 located on the outer diameter side penetrates through a part of the S pole back yoke 717 located on the inner diameter side. The structure is such that the magnetic direct connection between 718 and 717 is limited, such as by providing a hole for. For example, 71G and 71H arranged in the portion where 718 and 717 are close to each other are permanent magnets, and the polarities of 71G and 71H are such that the north pole faces 718, the south pole faces 717, and 718 and 717 are oriented. Along with exciting, the leakage flux is reduced. 71K and 71L in FIG. 71 are spaces and keep a distance so as to prevent leakage flux between 718 and 717. Further, a soft magnetic material may be partially arranged between the 717 and the 718, and the magnetic flux passing through the stator magnetic poles may be changed by the current for exciting the stator magnetic poles. It has the effect of suppressing voltage in high-speed rotation operation.

Since the permanent magnets 719, 71A, 71B, 71G, 71H, etc. Shown in FIG. 71 are arranged in a narrow space, the production such as assembly tends to be complicated. As one of the countermeasures, a so-called plastic magnet, which is a mixture of permanent magnet powder and resin, can be utilized. Similar to a plastic injection molding machine, a mixture of permanent magnet powder and resin can be heated, softened and injection molded to fill the permanent magnet of FIG. 71, and its productivity can be improved. However, equipment for injection molding, molds, etc. are required. The magnetism of these permanent magnets can be magnetized all at once after molding.

Since both the back yoke 717 for the S pole and the back yoke 718 for the N pole can pass the magnetic flux to each stator magnetic pole at the same time, the motor does not become particularly large. As described above, productivity can also be improved by utilizing plastic magnets and the like. With the motor configuration shown in FIG. 71, the permanent magnet magnetic flux can be freely supplied without being limited to the arrangement position of each stator magnetic pole. As a result, the permanent magnet can be utilized to improve the efficiency of the motor.

Forty-Second Embodiment

Figure 72:
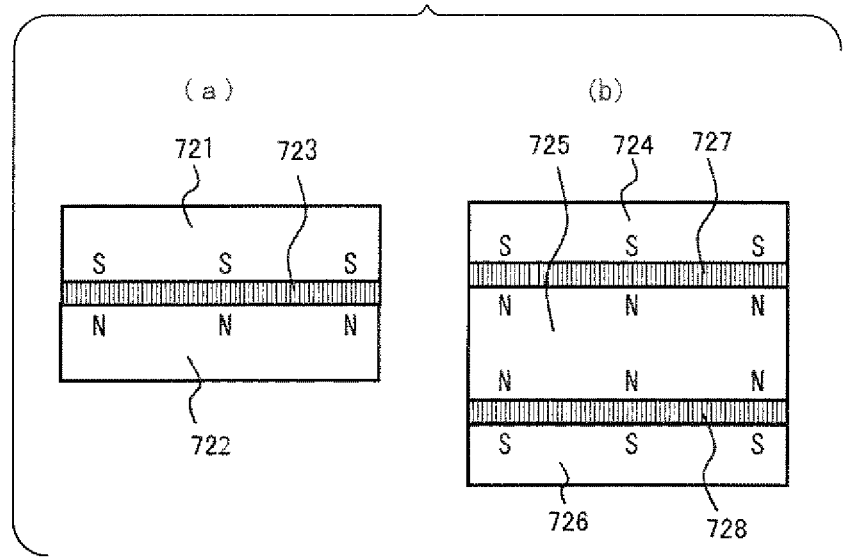
FIG. 72 is a lateral sectional view exemplifying a motor according to the invention, in which the back yoke is separated into N poles and S poles in the rotor axis direction.

Next, FIG. 72 shows an example in which the back yoke for the S pole and the back yoke for the N pole are separately arranged in the rotor axial direction. On the paper of FIG. 72, the vertical direction is the rotor axial direction of the motor, and the horizontal direction is a linear development of the appearance of the outer circumference of the stator. In FIG. 72 (*a*), a reference numeral 721 shows a back yoke for the S pole, 722 is a back yoke for the N pole, and 723 is a disk-shaped permanent magnet that excites 721 and 722 to their respective polarities. The S pole stator pole on the inner diameter side of the motor is magnetically connected to the back yoke 721, and the N pole stator pole is magnetically connected to the back yoke 722. In the case of the configuration (a) shown in FIG. 72, the rotor axial length of the back yoke is about half that of the stator. Therefore, in order to increase the torque, the shape of the stator magnetic pole on the inner diameter side is changed to a three-dimensional shape. It is necessary to increase the length in the rotor axial direction.

FIG. 72(*b*) shows a configuration in which the back yoke for the S pole is divided into two parts, 724 and 726 in the rotor axial direction. In the case of this configuration, since the distance in the rotor axial direction is large, the stator magnetic poles of the S poles on the inner diameter side may also be separated in the rotor axial direction. Reference numeral 725 is a back yoke for N pole, and 727 and 728 are permanent magnets. Further, similarly, the back yoke for the S pole, the back yoke for the N pole, and the disk-shaped permanent magnet can be thinned and alternately stacked in the rotor axial direction. In that case, the magnetic connection between the back yoke of the N pole and the S pole on the outer diameter side and the stator magnetic poles of the N pole and the S pole becomes easier, so that the efficiency of the motor can be expected to be improved. Further, a part of the back yoke 721 for the S pole and the back yoke 722 for the N pole may be connected by a soft magnetic material. It has the effect of suppressing voltage in high-speed rotation operation.

Forty-Third Embodiment

Figure 73:
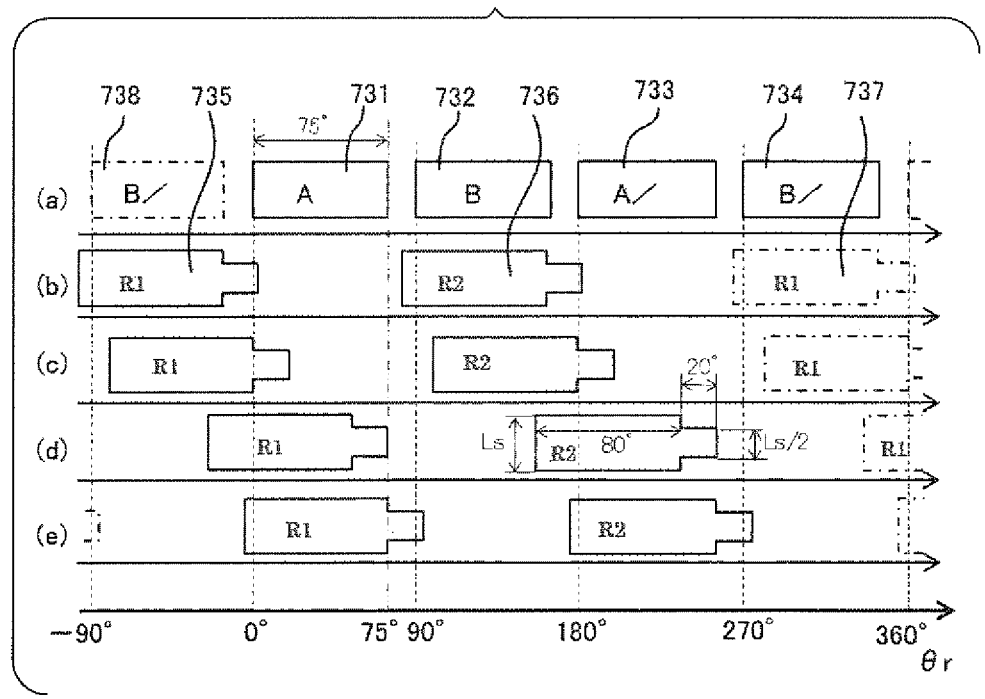
FIG. 73 is a horizontally developmental view showing the stator magnetic poles and the rotor magnetic poles according to the present disclosure.

Next, an embodiment of the mode 14 is shown in FIG. 73. In the case of the motor having four stator magnetic poles and two rotor magnetic poles shown in FIGS. 45 and 46, since it is a two-phase reluctance motor, some ingenuity is required to perform continuous rotation. That is, in the cross-sectional shape of FIGS. 45 and 46, as shown in the examples of the voltage and the current in FIGS. 48 and 49, there is no margin in generating continuous torque for one rotation, which is rather difficult. In the case of the motor having 4 stator magnetic poles and 6 rotor magnetic poles shown in FIG. 53, there is a similar tendency as shown in FIG. 57 as an example of the voltage and current. Further, in the case of the motor having 6 stator magnetic poles and 4 rotor magnetic poles as shown in the drawings such as FIGS. 83, 1 and 2, there is no problem in generating continuous torque for one rotation, but it is shown in FIGS. 84 and 14. As described above, there is a problem that the increase and decrease of the current are steep, the voltage tends to be large, and the fluctuation of the attractive force between the stator magnetic pole and the rotor magnetic pole is steep, so that the motor noise becomes large. Further, the motor of FIG. 58 is a motor having 6 stator magnetic poles and 8 rotor magnetic poles, which reduces the above-mentioned problems, but tends to be similar. According to the mode 14, the torque generation range between the stator magnetic pole and the rotor magnetic pole is expanded to make the torque continuous, the sudden fluctuation of the torque is reduced, and the regeneration time for regenerating the motor magnetic energy to the DC voltage source. As a result, the motor noise can be reduced.

FIG. 73 is an example of a linear development of the circumferential shape of the air gap surface between the stator magnetic pole and the rotor magnetic pole of FIGS. 45 and 46. In particular, it is an example of a stator magnetic pole shape and a rotor magnetic pole shape that make one-way torque of a two-phase reluctance motor continuous. FIG. 73A shows the stator magnetic poles, and 731, 732, 733, and 734 are A-phase stator magnetic poles, B-phase stator magnetic poles, A/ phase stator magnetic poles, and B/ phase stator magnetic poles, respectively, thus corresponding to 45A, 45B, 45A/, 45B/ in FIGS. 45 and 46. On the paper of FIG. 73, the horizontal axis in the horizontal direction is the rotor rotation angle position θr, which corresponds to the rotor rotation direction in the CCW direction in FIGS. 45 and 46. The angular width θst14 in the circumferential direction of each stator magnetic pole is 75°. The vertical axis of FIG. 73 is in the rotor axial direction, and the length in the rotor axial direction in which the stator magnetic pole and the rotor magnetic pole act electromagnetically is Ls. Motors in which the characteristics of one-way rotation and one-way torque are prioritized have many uses such as main motors for electric vehicles and air conditioners.

FIG. 73(b) shows the shapes of the rotor magnetic poles 735 and 736 and their rotation angle positions. The rotation angle position of the rotor represents the right end, that is, the CCW directional end, and the rotation angle position θr in FIG. 73(b) is a position slightly moved to the right from 0°. As shown in FIG. 73, the shape of the rotor magnetic pole has a two-stage shape in the circumferential direction, and the CCW portion has a circumferential width of 20° and a rotor axial length of Ls/2. The shape of the CW directional portion of the rotor magnetic pole has a circumferential width of 80° and a rotor axial length of Ls. The solid line in FIG. 73 shows the actual situation, and the alternate long and short dash line has the same shape separated by 360° in the rotation direction. Reference numerals 735 and 737 show the same rotor poles, and reference numerals 734 and 738 show the same B/ phase stator poles.

The rotor rotation angle position θr in FIG. 73(b) is approximately 0°, and torque is generated in the right direction, that is, in the CCW direction by exciting the A-phase stator magnetic pole 731 and the A/ phase stator magnetic pole 733. Similarly, θr in FIG. 73 (c) is 20°, and torque can be generated in the CCW direction by exciting the A-phase stator magnetic pole 731 and the A/ phase stator magnetic pole 733. Then, the rotor can be driven with the same torque up to the position of θr=75° in FIG. 73 (d).

Regarding the magnitude of the torque, it is assumed here that the torque value from θr=20° in FIG. 73(c) to θr=7° in FIG. 73(d) is 1.0. During this period, the rotor axial length is Ls in the area where the stator magnetic pole and the rotor magnetic pole act electromagnetically. Similarly, the torque values in a rage of θr=0° in FIG. 73(a) to θr=20° in FIG. 73(b) are relatively 0.5, because the rotor axial length on which the rotor magnetic poles act is Ls/2. Similarly, the torque values in a range of θr=75° in FIG. 73(d) to θr=95° in FIG. 73(e) are (Ls−Ls/2)=Ls/2, due to the fact that the rotor magnetic poles act differentially on the rotor axial length, whereby the torque is relatively 0.5.

As described above, between 0° and 95° of the rotor rotation angle position θr, the A-phase stator magnetic pole of 731 and the A/ phase stator magnetic pole 733 are excited to attract the rotor magnetic poles 735 and 736, respectively, thus generating torque. As shown in the figure, the B phase stator magnetic pole 732 and the B/ phase stator magnetic pole 734 differ in the rotational direction position θr by 90° from the A phase and the A/ phase, but since they have the same configuration, similarly, in the range of θr=90° to 185° the CCW torque can be generated. The torque generation width has a margin of 5° for each. Since the torque generation cycle of the reluctance motors of FIGS. 73, 45, and 46 is 180°, the same operation can be repeated to realize continuous rotation and continuous torque to the CCW direction. The relative values of the torque repeats 1.0 and 0.5, but the magnitudes of the exciting current can be changed to correct the pulsation of the torque.

In this way, by reducing the rotor axial width of the right front portion of the rotor magnetic pole, that is, the portion having a width of 20 degrees on the CCW side as Ls/2, the rotation angle width θtt capable of generating CCW torque is 90° or more, which is enlarged to 95°. The stator magnetic pole width θst14 is as small as 75°, in which the rotor magnetic pole width θrt shows an example of (80°+20°) =100°.

One of the conditions under which the motor of FIG. 73 can generate continuous torque in the CCW direction is that the stator magnetic pole width θst14 is smaller than (RHB14/2). RHB14 is the circumferential period of the rotor magnetic poles, which is 180° in the case of FIG. 73. Further, assuming that the circumferential width of the portion where the rotor axial width is Ls/2 on the CCW directional side of the rotor magnetic pole is θrt142 and the circumferential width of the rotor axial width Ls is θrt143, (θrt142+θrt143) is (RHB14/2). Greater conditions are also needed. Further, it is also one of the conditions for generating CCW directional continuous torque that the stator magnetic pole width θst14 is larger than the θrt142. Further, the CCW torque generation width θtt is (θrt142+θst14), and a condition that this value is larger than 90° is also required.

The shapes of the stator magnetic pole and the rotor magnetic pole shown in FIG. 73 can be variously deformed. FIG. 74A is an example of the shape of the rotor magnetic pole, and the total width 744 of the rotor magnetic pole in the circumferential direction and the circumferential width 743 of the CCW directional end can be selected within the above conditions. The lengths 741 and 742 in the rotor axial direction can also be selected. As for the outer peripheral shape, for example, the shape as shown in FIG. 74(b) is also possible.

Figure 74:
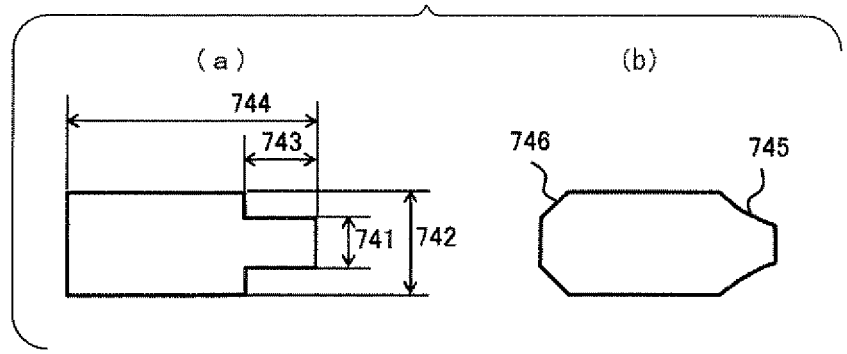
FIG. 74 exemplifies a rotor magnetic sheet.
Figure 75:
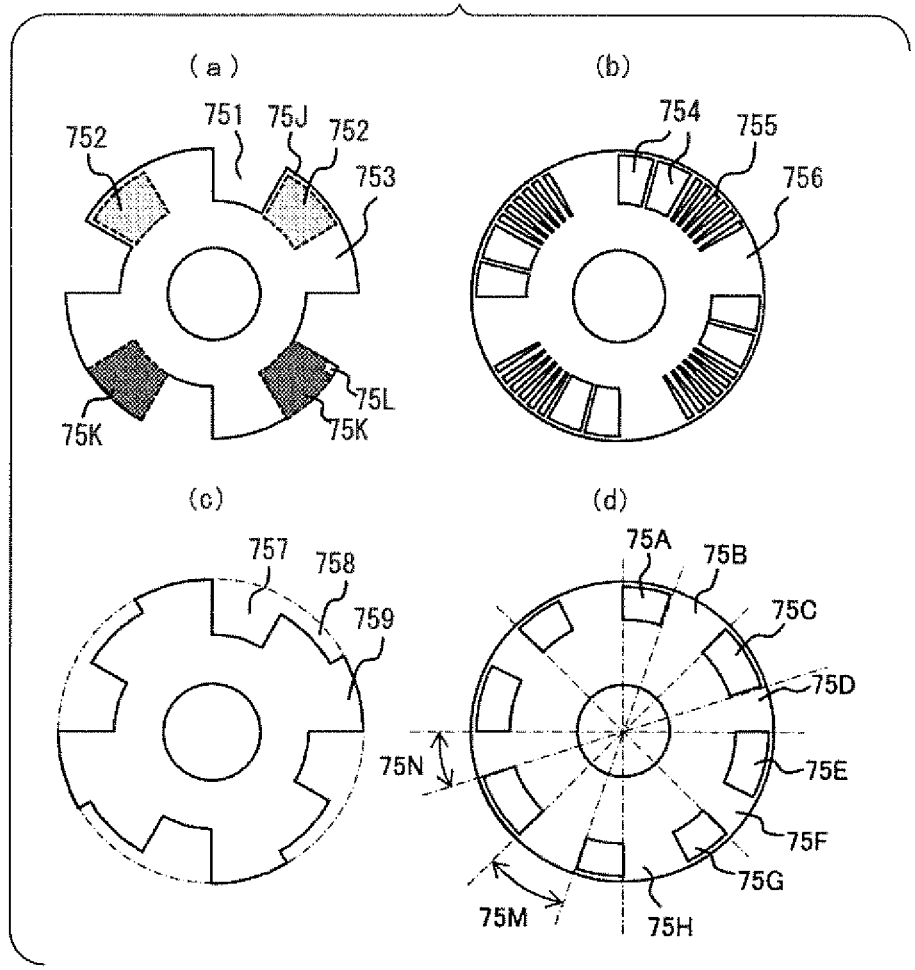
FIG. 75 is a rotor lateral sectional view, in which the magnetic steel is subjected to hole drilling.

In the shapes shown in FIGS. 73 and 74, the method of generating the magnetic resistance in the radial direction of each part of the rotor or the reciprocal of the magnetic resistance is one of the realistic methods, and the rotor is particularly intuitively easy to understand. The axial width is shown as full width Ls and half Ls/2. However, when the soft magnetic material part of the motor is made of electrical steel sheet, it is necessary to consider the problem that the eddy current of the deformed part increases, the manufacturability, and the like. FIG. 75 shows an example in which the productability is good because it can be manufactured by laminating electromagnetic steel sheets, and the increase in iron loss due to eddy current is small.

Parts (A), (b), and (c) of FIG. 75 are examples of a rotor when FIGS. 45 and 46 are transformed into a two-pole pair motor. Reference numeral 753 in FIG. 75A is an electromagnetic steel sheet, and 752 is a soft magnetic material having a smaller saturation magnetic flux density than the portion of 753, such as a ferrite iron core and a stainless electromagnetic steel sheet. Reference numeral 75J is a holding portion for holding the soft magnetic material 752. 751 is a space. The saturation magnetic flux passing in the radial direction can be limited by the magnetic properties of the material.

A reference numeral 75K shows an example in which a part of the electromagnetic steel sheet 753 is thinned by press working or the like. For example, by setting the thickness of the electromagnetic steel sheet of 753 to 0.35 mm and the thickness of the 75K portion to 0.175 mm, the magnetic resistance value MR in the radial direction is halved, and the saturation magnetic flux passing in the radial direction is reduced. It can be limited to ½. With such a configuration, it is possible to realize electromagnetic characteristics equivalent to those of the rotor magnetic pole of FIG. 74. This 75K configuration is excellent in productivity because it is possible to provide a thinning processing stage on the production line for press working of electrical steel sheets. In the case of this configuration, the holding portion 75J is not required for centrifugal force, but there is a problem of fixing in the rotor axial direction, and as shown in 75L, a part of the holding portion 75J is left as a thick plate of 0.35 mm. It is also possible to devise. Further, in laminating the electromagnetic steel sheets, for example, it is possible to sandwich a disk-shaped electromagnetic steel sheet about 1 in 20 sheets. Further, it is possible to obtain the desired electromagnetic characteristics and rotor strength by laminating in combination with an electromagnetic steel plate having another shape. Further, in the 75K configuration, the thickness of the steel plate is changed such as the thick plate portion of 0.35 mm, the 0.24 mm portion and the 0.12 mm portion, and the radial reluctance is changed to a plurality of types depending on the circumferential position. You can also devise.

In FIG. 75(b), a large hole 754 and a long and narrow slit-mounted hole 755 are machined in the electromagnetic steel plate 756. The portion 754 is electromagnetically substantially equivalent to the space portion between the rotor magnetic poles in FIG. 73. The portion where the slit of 755 is arranged is electromagnetically equivalent to the portion where the length in the rotor axial direction is Ls/2 at the front portion of the rotor magnetic pole in FIG. 73. The slit of 755 has a large magnetic resistance in the circumferential direction, and has a configuration in which the radial direction is about doubled. This slit shape is a pointed triangle, and the magnetic path sandwiched between the slits has a uniform width. In this way, it is possible to limit the maximum value of the radial magnetic flux by performing various hole drilling on the electrical steel sheet. The hole shape can be various shapes such as a square hole, a triangular hole, a round hole, and an elliptical hole, and the number, size, and distribution of the holes can also be various. It can be expected to reduce eddy current loss and hysteresis loss, and has excellent magnetic characteristics. Further, it is also possible to limit the maximum value of the radial magnetic flux by laminating two or more kinds of electromagnetic steel sheets having different shapes. In that case, effects such as averaging the discreteness of the magnetic resistance in the circumferential direction caused by the hole and averaging and complementing the rotor strength can be expected. It can also be combined with the above-mentioned thinning technique.

Further, the outer circumference of the rotor in FIG. 75(b) is circular, so that the noise of the rotor cutting the wind can be reduced. Also, electromagnetically, if the outer circumference of the rotor is circular, the harmonic component of the reluctance force can be reduced, and torque ripples and noise can be expected to be reduced. In order to reduce rotor vibration, each hole can be filled with resin or the like.

FIG. 75(c) is an example in which the magnetic characteristics of the rotor are realized by processing the outer peripheral portion of the electromagnetic steel sheet 759 to have a recess. The recessed portion of 758 is expected to have the effect of reducing magnetic flux, and 757 is a space portion. In this way, the electromagnetic steel sheet can be recessed to have characteristics that are electromagnetically close to those of the rotor magnetic pole shown in FIG. 73. It can be manufactured by simple punching and laminating of electrical steel sheets, and the rotor is robust. Further, if the dust core is used, even a complicated three-dimensional shape combining the radial uneven shape of the rotor and the uneven shape in the rotor axial direction can be manufactured by the molding technology using a mold. Hence, productivity can be improved.

FIG. 75(d) shows an example of a rotor in which the configurations shown in FIGS. 45 and 46 are transformed into a four-pole pair motor, and the number of rotor magnetic poles is eight. 75B, 75D, 75F, and 75H are electromagnetic steel sheets, which form each rotor magnetic pole. 75A, 75C, 75E, 75G are holes that form the shape of each rotor pole. As shown in the figure, the CW direction ends of the rotor magnetic poles 75B, 75D, 75F, and 75H are positioned evenly separated by exactly 45°. The circumferential widths of the rotor magnetic poles 75B and 75H are 75M, and (100°/4)=25°. The circumferential widths of the rotor magnetic poles 75D and 75F are 75N, and (80°/4)=20°. Further, the rotor magnetic poles 75B and 75F correspond to the rotor magnetic poles 734 in FIG. 73 when the motor is a one-pole pair. The rotor magnetic poles 75D and 75H correspond to the rotor magnetic poles 736 in FIG. 73 when the motor is a one-pole pair.

Therefore, although the number of pole pairs of the motor is different between the part (d) of FIG. 75 and FIG. 73, assuming that the rotor rotation position is at shown in FIG. 73, both the rotor magnetic poles 75B and 75F are opposed to the A phase stator magnetic pole. The magnetic resistance of the rotor as seen from the phase stator magnetic pole is the average value of 75B and 75F. Considering the average reluctance values of 75B and 75F, the reluctance having a width of 5 at the end in the CCW direction is twice the reluctance having a width of 20° in the CW direction. When converted to the one-pole pair of FIG. 73, the width is 20° and 80°, and the magnetic resistance characteristics are the same as those of the rotor magnetic pole 735 of FIG. 73.

Similarly, both the rotor magnetic poles 75D and 75H are opposed to the A/ phase stator magnetic poles, and the reluctance of the rotor as seen from the A/ phase stator magnetic poles is the average value of those of the rotor magnetic poles 75D and 75H. The average reluctance values are 20° width and 80° width when converted to the one-pole pair of FIG. 73, and have the same reluctance characteristics as the rotor magnetic pole 736 of FIG. 73.

This method is a method in which a motor is multi-polarized, a plurality of rotor magnetic poles having the same phase at an electric angle are made into a plurality of rotor magnetic poles, and a desired magnetoresistance distribution is created by the average magnetic resistance values of the plurality of same-phase rotor magnetic poles. Therefore, it can be said that the rotor of FIG. 75(d) is one of the realized forms of the mode 14, as in the case of FIGS. 75(a) and 75(b). However, the pole logarithm is different. As shown in the figure, the feature of FIG. 75(d) is that each rotor magnetic pole can have a simple shape, so that press punching can be simplified and the rotor strength is also excellent. The left side of the paper in FIG. 75(d) is a point-symmetrical configuration with the right side. Further, since the shape of FIG. 75(d) is point-symmetrical with respect to the center of the rotor, the mass imbalance is 0 in principle.

Further, the electromagnetic steel sheets shown in FIG. 75(d) are laminated one by one or several by rotating at an electric angle of 360° and a mechanical angle of 90°. With such assembly, the rotor magnetic poles 75B and 75F can be arranged next to each other in the rotor axial direction. Then, the rotor magnetic poles 75D and 75H are also arranged next to each other in the rotor axial direction. As a result, the average value of the magnetic resistance can be realized at each position in the rotation direction of the rotor. Then, the circumferential distribution of the reluctance can be realized with high accuracy. That is, in addition to the part (d) of FIG. 75, the rotor in which the electromagnetic steel sheets are rotated by 90° and laminated is, in terms of electromagnetic distributions, substantially equivalent to the part (a) of FIG. 75 and the part (b) of FIG. 75, in which, however, the number of pole pairs is different therebetween.

Figure 76:
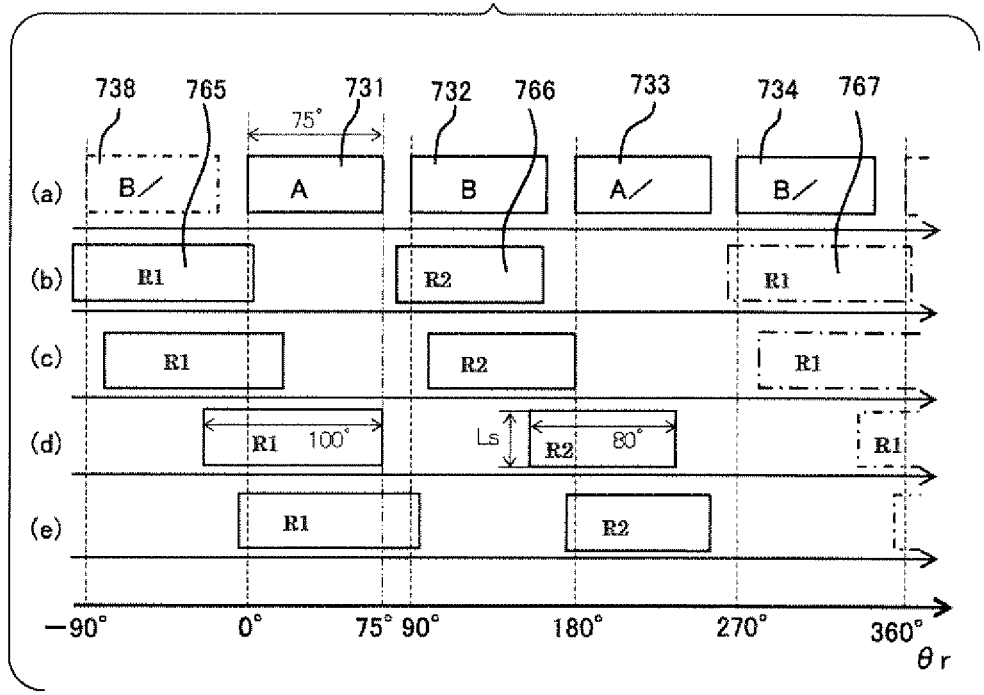
FIG. 76 is a horizontally developed view showing stator magnetic poles and rotor magnetic poles of a motor according to the present disclosure.

Next, a modified example of FIG. 73 is shown in FIG. 76. FIG. 75(d) is a specific description of the case where the motor is a one-pole pair. The rotor magnetic poles 735 and 736 in FIG. 73 are replaced by 765 and 766 in FIG. 76. The other parts are the same. The circumferential angular width of the rotor magnetic pole 765 is 100°, and the circumferential angular width of the 766 is 80°. On the paper surface of 765 and 766, the position in the circumferential direction at the left end is a phase difference of 180°. The distribution of magnetic reluctance in the radial direction is the same as that of 735 and 736 of 73. That is, as shown in the magnetic fluxes φaK and φbK in the cross-sectional view of the motor in FIG. 45, the magnetic flux acting on the motor passes through the two rotor magnetic poles in series to form a magnetic path. Hence, conceptually, there can be provided an ideal that the foregoing configuration acts on the distribution of the average value of the magnetic reluctance of both the rotor magnetic poles 765 and 766 in the radial direction.

However, when viewed partially, there is a part different from the average value operation, and magnetically, the rotor magnetic poles 765 and 766 are unbalanced, so this will be described with reference to FIG. 76. In FIG. 76(b), since the rotor magnetic pole 765 approaches and faces the A-phase stator magnetic pole 731, the A-phase stator magnetic pole 731 and the A/ phase stator magnetic pole 733 are excited to generate CCW torque. However, since the rotor magnetic pole 766 is not yet opposed to the A/ phase stator magnetic pole 733, the magnetic flux does not pass through and torque cannot be generated. The magnetic flux φa76 passing from the rotor magnetic pole 765 to the A-phase stator magnetic pole 731 passes from the B-phase rotor magnetic pole 732, which is not excited at this time, to the rotor magnetic pole 766. At this time, since a portion through which the magnetic flux φa76 passes has a large magnetic flux density but has a wider mutually facing area in which the magnetic flux density is small. Hence, torque is generated to the right of the paper surface, i.e., to the CCW direction in FIG. 45. Most of the exciting power is converted into this CCW directional torque.

In the part (c) of FIG. 76, since the rotor magnetic pole 766 faces the A/ phase stator magnetic pole 733, the motor operation gradually approaches that of FIG. 73. Then, torque can be generated up to the rotation position of θr=75° in FIG. 76(d). However, the rotor magnetic pole 765 and the A phase stator magnetic pole 731 cannot generate CCW torque, and the rotor magnetic pole 766 and the A/ phase stator magnetic pole 733 generate a CCW torque while θr is between 75° and 95°. Similarly, while θr is between 90° and 180°, the B phase stator magnetic pole 732 and the B/ phase stator magnetic pole 734 are excited to generate a CCW torque. Then, these operations can be repeated to continuously rotate to the CCW direction. Since the structure shown in FIG. 76 is simple, it is excellent in manufacturability, and the mass imbalance of the rotor can be eliminated by pairing the two poles.

Figure 77:
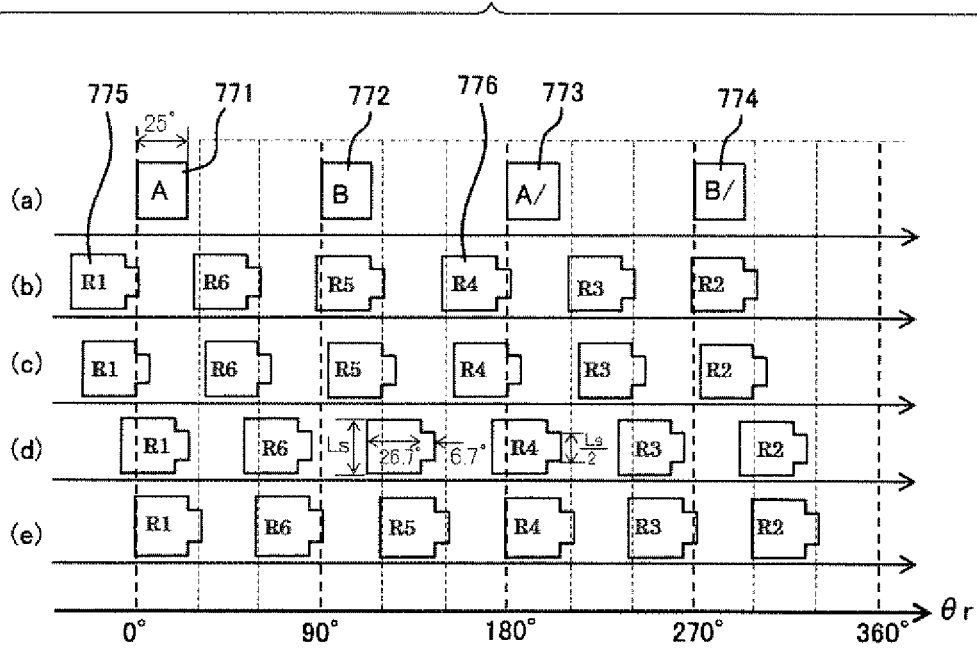
FIG. 77 is a horizontally developed view showing stator magnetic poles and rotor magnetic poles of another motor according to the present disclosure.

Next, another modified example of FIG. 73 is shown in the developed view of FIG. 77 applied to the motor of FIG. 53. The motor of FIG. 53 is a motor in which the number of rotor magnetic poles of FIGS. 45 and 46 is increased from 2 to 6, and the number of stator magnetic poles is 4. The circumferential angular width of the stator magnetic pole shown in FIG. 77 (a) with respect to FIG. 73 is 25°, which is ⅓ of 75°. As shown in FIG. 77 (d), the circumferential angular width of the right convex portion of the rotor magnetic pole is 6.7°, which is ⅓ of 2°, and the rotor axial width is Ls/2. The circumferential angular width of the left side portion of the rotor magnetic pole is 26.7°, which is ⅓ of 80°, and the rotor axial width is LA. Since the number of magnetic poles of the rotor is tripled, the width of each part in FIG. 77 in the circumferential direction is set to ⅓ as compared with that of FIG. 73.

A reference numeral 771 shown in FIG. 77A shows an A phase stator magnetic pole, a reference numeral 773 shows an A/ phase stator magnetic pole, a reference numeral 772 shows a B phase stator magnetic pole, and a reference numeral 774 shows a B/ phase stator magnetic pole. The rotor rotation angle position θr in FIG. 77 (b) is a position slightly advanced from 0°, and the right end of the rotor magnetic pole 775, that is, the CCW side tip is slightly advanced from the θr=0° position to the CCW direction. At this position, the A-phase stator poles 771 and the A/ phase stator poles 773 can be excited to attract the rotor poles of 775 and 776, respectively, to generate torque. Comparison with the part (b) of FIG. 73 can be made. In the case of (b) of FIG. 73, the rotor magnetic poles that generate torque are adjacent to each other in the circumferential direction, and in the part of (b) of FIG. 77, the rotor magnetic poles that generate torque are adjacent to each other. Are separated by three in the circumferential direction, and the angular width in the circumferential direction is reduced to ⅓.

In a range of 6.7° from the part (b) to the part (c) in FIG. 77, torque is generated by suction at the right tip of the rotor magnetic poles 775 and 776. In a range of 26.7° from the part (c) to the part (d) in FIG. 77, torque is generated by suction at the left side portion of the rotor magnetic poles 775 and 776. Moreover, in a range 6.7° from the part (d) to the part (e) in FIG. 77, the right side portion and the left side portion of the rotor magnetic poles 775 and 776 act differentially to generate torque. By such an operation of the A phase stator magnetic pole 771 and the A/ phase stator magnetic pole 773, whereby a CCW torque is generated at the rotor rotation angle position θr belonging to the range of 0° to 31.7°.

Similarly, when the rotor rotation angle position θr is from 30° to 61.7°, the CCW torque can be generated by the B phase stator magnetic pole 772 and the B/ phase stator magnetic pole 774. Then, these operations are repeated to generate the continuous CCW torque, and the CCW rotation is performed. The CW rotational torque can also be generated, a through being a little discontinuous. FIGS. 73 and 77 show the same operation, although there is a difference between the circumferential angle and the acting rotor magnetic pole. Further, the techniques of FIGS. 74, 75, and 76 can be similarly applied to the motor shown in FIG. 77.

By applying the rotor of FIG. 77 to the motor of FIG. 53, the winding space can be increased, so that copper loss can be reduced, and the rotor diameter is increased to increase the torque due to the space around the winding, etc. Although it is one-way in the CCW directions, torque can be output continuously. The permanent magnet utilization technology of the present invention can also be applied, and since the motor and the drive circuit have a simple configuration, the motor and the drive circuit are highly competitive in terms of performance, size, cost, and the like.

Forty-Fourth Embodiment

Figure 78:
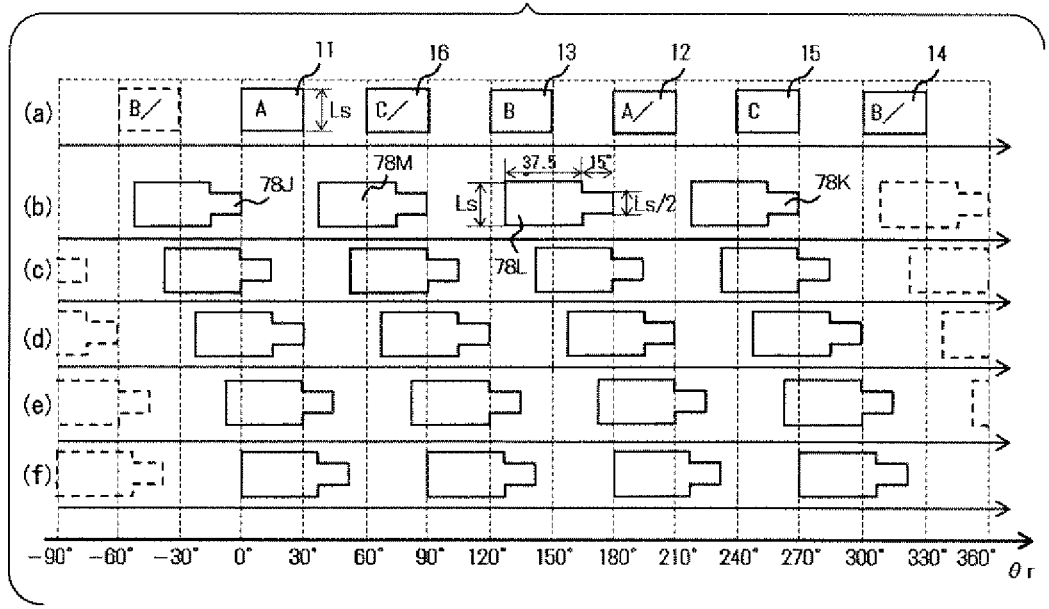
FIG. 78 is a horizontally developed view showing stator magnetic poles and rotor magnetic poles of another motor according to the present disclosure.
Figure 79:
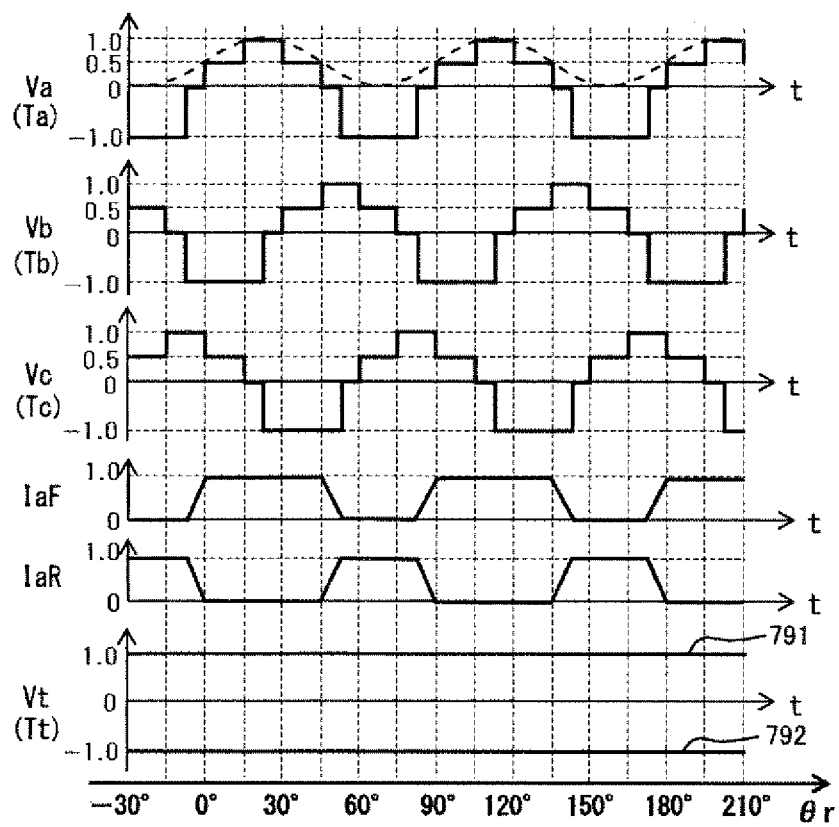
FIG. 79 exemplifies voltages and currents of each of the phases of a motor according to the present disclosure.

Next, another embodiment of the mode 14 is shown in FIGS. 78 and 79. As described above, in the motors of FIGS. 83, 1 and 2, as shown in FIGS. 84 and 14, the current increases and decreases sharply, the voltage tends to increase, and the stator magnetic poles tend to increase. There is a problem that the motor noise becomes large because the fluctuation of the attractive force between the magnet and the rotor magnetic pole is steep. As shown in FIG. 78, by devising the shape of the rotor magnetic pole, it is possible to expand the torque generation region, reduce the torque ripple, reduce the noise, and the like to solve these problems. Since the torque is generated by the relative action of the stator magnetic pole and the rotor magnetic pole, the same effect can be obtained by changing the shape of the stator magnetic pole.

FIG. 78 is an example of a linear development of the circumferential shape of the air gap surface between the stator magnetic pole and the rotor magnetic pole of the motor as shown in FIG. 1 etc. The horizontal axis of FIG. 78 is the rotor rotation angle position θr, and the vertical axis is the rotor axis direction. The right direction in FIG. 78 shows the CCW direction in FIG. 1. In particular, due to the shape of the rotor magnetic poles, the circumferential distribution of the magnetic resistance in the radial direction of the rotor magnetic poles is unevenly changed to obtain new torque characteristics. Reference numeral 11 in FIG. 78A is an A phase stator magnetic pole, which is the same as the A phase stator magnetic pole 11 in FIG. Reference numeral 12 denotes an A/ phase stator magnetic pole, which is the same as the A/ phase stator magnetic pole 12 in FIG. Similarly, 13 in FIG. 78 is a B phase stator magnetic pole, and 14 is a B/ phase stator magnetic pole, which are the same as 13 and 14 in FIG. 1, respectively. 15 in FIG. 78 is a C phase stator magnetic pole, and 16 is a C/ phase stator magnetic pole, which are the same as 15 and 16 in FIG. 1, respectively. The circumferential period of each stator magnetic pole is 60°, the circumferential width is 30°, and the rotor axial length is Ls.

FIG. 78 (b) shows the shape of each rotor magnetic pole facing the stator direction and the rotor rotation angle position θr. The four rotor magnetic poles of 78J, 78K, 78L, and 78M are evenly arranged in a 90° cycle. The rotor magnetic pole 78J of FIG. 78(b) is the rotor magnetic pole 1K of FIG. 1, the right end of the rotor magnetic pole 78J coincides with the left end of the stator magnetic pole 11, and the rotor rotation angle position θr is 0°. As shown in FIG. 78, the right portion of each rotor magnetic pole has a circumferential width of 15° and the rotor axial width is Ls/2, and the left portion of each rotor magnetic pole has a circumferential width of 37.5°. The width in the rotor axial direction is Ls. By magnetically exciting the A phase stator magnetic pole 11 and the A/ phase stator magnetic pole 12 in the state of FIG. 78(b), the rotor magnetic poles 78J and 78L can be attracted and CCW torque can be generated, respectively. The A phase and the A/ phase are paired to generate a CCW torque.

In a range from the state shown in the part (b) of FIG. 78 to θr=15° shown in the part (c) of FIG. 78, the right portion 15° of the rotor magnetic pole 78J faces the stator magnetic pole 11. Further, in a range from the state shown in the part (c) of FIG. 78 to θr=30° shown in the part (d) of FIG. 78, the right portion 15° of the rotor magnetic pole 78J faces the stator magnetic pole 11. Assuming that the CCW torque when θr is between 15° and 30° is 1.0, the CCW torque is 0.5 in the range of θr which is between 0° and 15°.

In a range of θr=30° to 45° shown in the part (d) to (e) of FIG. 78, the area of the rotor magnetic pole 78J facing the stator magnetic pole 11 increases differentially, so that the CCW torque becomes 0.5. At this time, as shown between the parts (d) and (e) in FIG. 78, a CCW torque of 0.5 can be generated even between the B phase stator magnetic pole 13 and the rotor magnetic pole 78M. Then, the B phase stator magnetic pole 13 generates CCW torque with a phase delay of 30°, similar to the operation of the A-phase stator magnetic pole 11. Further, the C phase stator magnetic pole 15 generates a CCW torque with a phase delay of 60°, similarly to the operation of the A-phase stator magnetic pole 11.

Further, since the A-phase stator magnetic pole 11 cannot generate the CCW torque while the angular position θr in FIG. 78(f) is 45° to 52.5°. The current component of the A-phase stator magnetic pole 11 rescues, whereby the magnetic energy can be regenerated to the DC voltage source.

Next, the rotor of FIG. 78 is arranged by the stator of FIG. 1, and a constant current component having a certain degree of large constant current, which excites the A phase stator magnetic pole 11 and the A/ phase stator magnetic pole 12, is energized to make the rotor run at a constant speed. The A-phase voltage component Va when rotating by rotation is shown in Va in FIG. 79. The positive part of this Va generates a CCW torque, and the negative part shows a CW directional torque. This waveform shape is also the torque characteristic of the A phase, ignoring the exciting current component of the magnetic flux, and the A phase torque Ta is added in parentheses. The horizontal axis of FIG. 79 is time, and the lowermost stage shows the relationship with the rotor rotation angle position θr.

As shown in FIG. 79, the B-phase voltage component Vb and the B-phase torque Tb have a phase lag of 30° as compared with the A-phase, and the C-phase voltage component Vc and the C-phase torque Tc have a phase delay of 60° as compared with the A-phase. Phase lag. When only the CCW torque is generated in the A phase, the IaF of FIG. 79 may be energized as the A phase current component Ia. Similarly. The B-phase current component IbF whose phase is delayed by 30° is energized to the B phase, and the C-phase current component IcF whose phase is delayed by 60° is energized. As a result, the total CCW torque becomes a constant value shown by a reference numeral 791 in Vt and Tt graphs shown in FIG. 79.

Similarly, when generating the CW torque, a current IaR of FIG. 79 may be energized as the A-phase current component Ia. Similarly. The B-phase current component IbR whose phase is delayed by 30° is energized to the B phase, and the C-phase current component IcR whose phase is delayed by 60° is energized. As a result, the total CW torque becomes a constant value shown by a reference numeral 792 in Vt and Tt graphs shown in FIG. 79. However, as shown in this figure, the CW torque of each phase increases and decreases sharply.

Here, the A phase voltage component Va and the A phase torque Ta change stepwise as shown in FIG. 79, and the basic component of the waveform can be considered as a sine wave as shown by a broken line. The same applies to the B phase and the C phase. Although it is a reluctance motor, it has torque characteristics similar to those of a three-phase sine wave-driven synchronous motor, and is expected to reduce vibration and noise of the stator core. It is also possible to reduce the circumferential width of the stator magnetic poles in FIG. 78 from 30° to increase the slot cross-sectional area and increase the regeneration time. On the contrary, it can be increased from 30°, the shape of the rotor magnetic pole can be changed, and the torque generation width can be expanded.

Further, the shape of the rotor magnetic pole of FIG. 78 can be deformed, and the techniques shown in FIGS. 74, 75, and 76 can be similarly applied. Further, the techniques of FIGS. 78 and 79 can be applied to the motors of the 6 stator magnetic poles and the 8 rotor magnetic poles of FIG. 58 as in the relationship between FIGS. 73 and 77. Further, it can be applied to motors having different number of stator magnetic poles and different number of rotor magnetic poles. According to the mode 14, since the rotation width for generating the torque of each phase can be expanded, the discontinuous torque of each phase generated alternately with the rotation can be continuously and conveniently connected. In addition, noise can be reduced by increasing and decreasing the torque more smoothly. Further, by expanding the rotation width in which the stator magnetic pole and the rotor magnetic pole face each other, it is possible to increase the regeneration time for regenerating the motor magnetic energy to the DC voltage source without generating negative torque.

Forty-Fifth Embodiment

Figure 80:
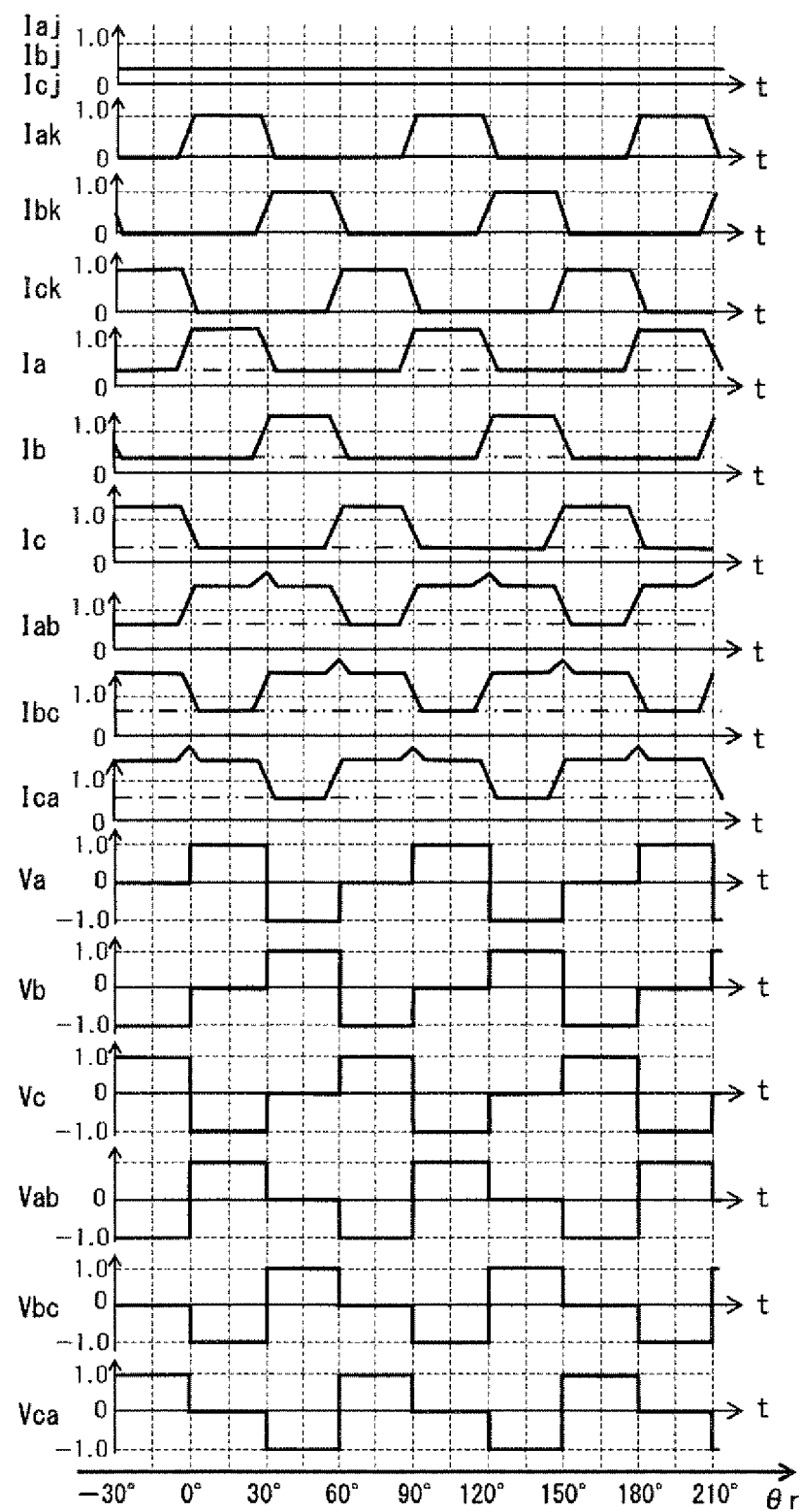
FIG. 80 also exemplifies voltages and currents of each of the phases of a motor according to the present disclosure.

Next, the time chart of the embodiment of the mode 15 is shown in FIG. 80. Previously, using FIG. 14, there has bee described an example of driving by energizing the current of each phase. The currents Ia, Ib, Ic, Iab, Ibc, and Ica of each phase shown in FIG. 14 are repeatedly increased and decreased according to the rotor rotation angle position θr. In this control, the phase current is controlled to 0 in the range where torque cannot be generated. From this state, when entering the motor operating region where the torque load is large at higher speed rotation, the ratio of the time for regenerating the magnetic energy of each phase is increased, while the time for controlling the current to 0 is reduced. At the same time, the winding voltage increases because the current is rapidly increased or decreased.

The mode 15 employs a method of constantly supplying a current component that excites the field magnetic flux of the motor, that is, a method of constantly energizing a constant direct current component that excites the magnetic flux to each phase winding. As a result, although there is a fluctuation in the field magnetic flux depending on the rotor rotation angle position θr, the fluctuation in the field magnetic flux depending on the increase/decrease in each phase current is reduced. In particular, the amplitude of the excessive and complex voltage generated in the full pitch winding is reduced, and the voltage complexity is also improved. Further, the control of the drive circuit is mainly in charge of increasing/decreasing the fluctuating current component. As a result, the inductance is reduced, the fluctuation current component can be easily increased or decreased, and the torque can be increased.

FIG. 80 shows a specific example of energization. The voltage, torque, and power of each phase will be described by energizing each phase current with use of the motor of FIG. 1. In this explanation, however, it is assumed that the magnetic flux passes through the portions where the stator magnetic poles and the rotor magnetic poles face each other, there is no leakage flux in the space around them, and the winding resistance is 0. As for the magnetic characteristics of the soft magnetic material, it is assumed that the soft magnetic material is magnetically saturated at a magnetic flux density of 2.0 [T], such as the polygonal line 115 shown by the broken line in FIG. 11.

Reference numerals Iaj, Ibj, and Icj in FIG. 80 are constant current components that energize the virtual concentrated windings Wa, Wb, and We in FIG. 1, and are direct current components. Similarly, Iak, Ibk, and Ick in FIG. 80 are variable current components that energize the windings Wa, Wb, and Wc. The virtual concentrated winding Wa, Wb, and We of FIG. 1 have the following relationships with the virtual phase current components Ia, Ib, and Ic. It is a continuous current control that constantly energizes the current.

$$Ia = Iaj + Iak \qquad (141)$$

$$Ib = Ibj + Ibk \qquad (142)$$

$$Ic = Icj + Ick \qquad (143)$$

The current Iab that energizes the AB phase full pitch winding Wab, the current Ibc that energizes the BC phase full pitch winding Wbc, the current Ica that energizes the CA phase full pitch winding Wca, and the phase currents Ia, Ib, and Ic based on the equations (141), (142) and (143) are related based on the equations (1), (2), and (3).

The A phase current component Ia in FIG. 80 has the relationship of the equation (141), and the direct current component Iaj, which is always a constant value, is superimposed. (2×Iaj), which is twice the direct current component Iaj, is superimposed on the Iab and Ica based on the equations (1) and (3). The magnetomotive force due to the direct current component Iaj always superimposes on the A-phase stator magnetic pole 11 and the A/ phase stator magnetic pole 12 in FIG. 1. Therefore, the magnetic flux passes through the portions of the rotor magnetic poles facing the two stator magnetic poles regardless of the rotation direction and the rotation speed. This also applies to the B-phase stator magnetic poles 13 and 14, and the C-phase stator magnetic poles 15 and 16, based on the equations (142) and (143), respectively. This state exhibits the same characteristics as those in which permanent magnets matching their polarities are attached to the surface of the stator magnetic poles. Then, the total torque generated by these DC current components is 0 because of offsetting both the CCW torque and the CW torque, except for the component of the cogging torque ripples, The A phase current component Ia based on the equation (141) also includes the fluctuating current component Iak, and since the Iak of FIG. 80 assumes the nonlinear magnetic characteristic 115 of FIG. 11, the magnetic flux density is constant, and on a simplified motor model, The inductance on the drawing of FIG. 80 is set to 0. Therefore, under the assumed condition, the voltage load is small and the fluctuation of the A-phase fluctuating current component Iak can be increased or decreased at high speed. Compared with the A-phase current component Ia of FIG. 14, the fluctuating current component Iak of FIG. 80 makes the waveform of the increase/decrease of the current steeper. Although the difference is not so noticeable, the average torque value improves, and the difference increases as the number of revolutions increases. As can be seen by comparing FIGS. 14 and 80 with respect to the current of each phase, the DC current component and the waveform of each current are different from each other.

The voltage components Va, Vb, and Vc of each phase in FIG. 80 have simple voltage waveforms as shown, assuming that the magnetic flux densities are constant. Compared with FIG. 14, the negative voltage amplitude decreases and the time width of the negative voltage increases. The voltages Vab, Vbc, and Vca of each full pitch winding winding have the relation of the equations (26) to (31). As shown in FIG. 80, the voltage waveform is simple. Compared with FIG. 14, the problems of excessive voltage and complicated voltage waveform are solved. However, the actual motor is different from the simplified motor model. Therefore, the magnetic characteristics are complicated and non-linear, and there is also leakage flux around each stator magnetic pole. Therefore, it is not a simple voltage waveform like the voltages Vab, Vbc, and Vca shown in FIG. 80.

The voltage components Va, Vb, Vc and the current components Ia, Ib, Ic of the concentrated winding of each phase of FIG. 80 can of course be driven by the conventional drive circuit of FIG. Further, the problem of excessive voltage of the voltages Vab, Vbc, and Vca of each full pitch winding winding in FIG. 80 is solved. In addition, the influence of the induced voltage at the timing when the currents Iab, Ibc, and Ica of each phase increase is also reduced. Therefore, it can be driven by the conventional drive circuit shown in FIG. In the motor configuration of the full pitch winding winding shown in FIG. 1, the copper loss in the slot can be reduced to ½ as compared with the copper loss in the slot of the concentrated winding configuration. The utilization rate of each transistor in the drive circuit shown in FIG. 5 is almost the same between the concentrated winding system and the full pitch winding system, and therefore, there is no big difference in the simplified motor model. In the double winding method here, the utilization rate of each transistor with respect to the fluctuating current component is about 33% at the maximum.

The output power of a motor in which the windings in FIG. 1 are changed to concentrated windings can be expressed by the sum of products between the phase currents Ia, Ib, Ic based on the equations (141), (142), and (143) and the phase voltages Va, Vb, Vc. On the other hand, the output power of a motor in which the full pitch windings are adopted in FIG. 1 can be expressed by the sum of products between the phase currents Ia, Ib, Ic based on the equations (141), (142), and (143) and the voltages based on the equations (27), (29), and (31). For this reason, the latter is a little more complicated. In FIG. 80, each phase voltage has a relatively simple voltage waveform, but becomes complicated when the conditions are slightly changed.

As described, when the motor of the full pitch winding winding of FIG. 1 is driven by the drive circuit of FIG. 6, the total current capacity of each transistor of FIG. 6 can be halved, and therefore the drive is performed. The circuit can thus be miniaturized. For example, when driving with the winding arrangement of FIG. 6, it can be transformed into a motor of FIG. 2 in which each winding of FIG. 1 is wound in parallel, a motor of FIG. 15 having a two-pole pair configuration, and the like. Then, as shown in FIG. 6, when the windings of the two phases are connected in series so that the voltages Va, Vb, and Vc across the windings based on the equations (32), (33), and (34) can be obtained. A phase current having a value of ½ of each of the phase currents Iab, Ibc, and Ica in FIG. 80 is supplied.

FIG. 80 is an example of a simplified motor model. That is, each of the phase voltages Vab, Vbc, and Vca has a value of positive voltage 1.0 only in the range of 30°, and is a slightly extremely simplified voltage waveform. Based on these current and voltage waveforms, it is assumed that the motor is driven by the drive circuit of FIG. The electric power PoR supplied from the DC voltage source 6R to the motor in this state will be described. First, theoretically, the supplied power PoR2 can be obtained by multiplying the current and the voltage for each of the six windings in FIG. 6 and summing the values for all the windings. That is, the equations (141), (142), and (143) are substituted into the equations (1), (2), and (3), and a value halved of the value obtained as a result is obtained. The current of each phase of ½ thereof and the voltage of each phase represented by the equations (26), (27), and (28) may be multiplied for each phase, and the power of each phase may be applied. Since the number of terms increases, the calculation equation in the middle is omitted, but it is strict and accurate under that condition.

$$PoR2 = Nwa \times (d\varphi a/dt \times Iak + d\varphi b/dt \times Ibk + d\varphi c/dt \times Ick + d(\varphi a + \varphi b + \varphi c)/dt \times 2 \times Iaj) \tag{144}$$

In this equation, it is set that the direct current component is $Iaj = Ibj = Icj$.

Further, assuming that the sum of the magnetic flux components of the three phases is constant and $d(\varphi a + \varphi b \varphi c)/dt = 0$, the power PoR3 to be supplied is given by the following equation.

$$PoR3 = Nwa \times (d\varphi a/dt \times Iak + d\varphi b/dt \times Ibk + D\varphi c/dt \times Ick) \quad (145)$$

$$= Va \times Iak + Vc \times Ibk + Vc \times Ick \quad (146)$$

In equation (146), in the range where the rotor rotation angle position θr in FIG. 80 is 0° to 30°, the variable current component Iak of the A phase effectively acts on PoR3, and in the range where θr is 30° to 60°, the B-phase fluctuating current component Ibk effectively acts on PoR3, and the C-phase fluctuating current component Ick effectively acts on PoR3 in the range where θr is 6° to 90°. Further, the value of the equation (145) of PoR3 is the same value of an equation for the electric power PoR1 when the motor of FIG. 1 is used as the concentrated winding and the currents Ia, Ib, and Ic of the concentrated windings are appropriately energized.

Next, in a case where the current of each of the windings in FIG. 6 have a value of ½ of each of the currents Iab, Ibc, and Ica in FIG. 80, and the voltage of each of the windings in FIG. 6 are Vab, Vbc, and Vca, the operating state will be described in terms of their respective waveforms, in which the increase time and decrease time of each phase current are set to 0, and the description is simplified.

First, in the range where the rotor rotation angle position θr in FIG. 80 is from 0° to 30°, Ibk=0 and Ick=0. Therefore, from the equations (141), (142), and (143), and (1), (2), and (3), each current is expressed by the following equations. Here, since the current value in FIG. 6 is set to be ½ and there are two in-phase windings in FIG. 6, they can be offset. Therefore, in the power calculation of the following equation, the current value will not be set to ½.

$$Iab = Iak + 2 \times Iaj \quad (147)$$

$$Ibc = 2 \times Iaj \quad (148)$$

$$Ica = Iak + 2 \times Iaj \quad (149)$$

From FIG. 80, assuming that Vab=1.0×Vx, Vbc=−1.0×Vx, and Vca=0 in this range, the power PoR4 in this range is given by the following equation.

$$PoR4 = Vx \times (Iak + 2 \times Iaj) - Vx \times 2 \times Iaj - Vx \times Iak \quad (150)$$

Similarly, in the range where the rotor rotation angle position θr in FIG. 80 is from 30° to 60°, Iak=0, Ick+0, and Vab=0, Vbc+1.0×Vx, Vca=−1.0×Vx. Hence, values of respective currents and power PoR5 in such range are given by the following equations.

$$Iab = Ibk + 2 \times Iaj \quad (151)$$

$$Ibc = Ibk + 2 \times Iaj \quad (152)$$

$$Ica = 2 \times Iaj \quad (153)$$

$$PoR5 = Vx \times (Ibk + 2 \times Iaj) - Vx \times 2 \times Iaj = Vx \times Ibk \quad (154)$$

Similarly, in the range where the rotor rotation angle position θr in FIG. 80 is 60° to 90°, Iak=0, Ibk=0, and Vab=−1.0×Vx, Vbc=0, Vca=1.0×Vx. Hence, values of respective currents and power PoR5 in this range are given by the following equations.

$$Iab = 2 \times Iaj \quad (155)$$

$$Ibc = Ick + 2 \times Iaj \quad (156)$$

$$Ica = Ick + 2 \times Iaj \quad (157)$$

$$PoR5 = -Vx \times 2 \times Iaj + Vx \times (Ick + 2 \times Iaj) = Vx \times Ick \quad (158)$$

As a result of the above, it has been confirmed that there is a match between the equation (146) and the equations (150), (154) and (158) derived from the waveform of FIG. 80. Further, the current energizing each transistor in the driving method of FIG. 6 is a value of ½ of the current energizing each transistor in the driving method of FIG. 1. Therefore, the total current capacity of the transistor of FIG. 6 can be reduced by half, and therefore the drive device can be reduced in size and cost.

Next, based on the foregoing results, an explanation will now be provided about which transistor in FIG. 6 supplies which current to which range, which current component passes through which winding, and in which range contributes to the output of equation (146). Then, how much each transistor contributes to power supply in which range will also be described.

The transistor 61 of FIG. 6 will now be focused on and described. Although the operation has already been described, it will be described again because it is related to the current and voltage in FIG. 80. Further, since 6 windings are driven in FIG. 6, the motor of FIG. 2 in which each winding of FIG. 1 is parallelized will be described. As described above, the AB phase full pitch winding waves 21 and 22 in FIG. 2 correspond to 67 and 6A in FIG. Similarly, BC phase full pitch winding Wbcs 23 and 26 correspond to 69 and 6C in FIG. Similarly, the CA phase full pitch winding Wcas 22 and 25 correspond to 68 and 6B in FIG. To each winding, ½ of the current represented by the equations (141), (142), and (143), and the equations (1), (2), and (3) is supplied.

In each waveform of FIG. 80, in the range where the rotor rotation angle position θr is 0° to 30°, ½ of the currents of the equations (147), (148) and (149) are energized in each winding. Therefore, the total output power to the motor is represented by PoR4=Vx×Iak of the equation (150). A current Iab/2=(Iak+2×Iaj)/2, which is ½ of the value based on the equation (147), is energized from the transistor 61 to the AB phase full pitch winding Wab; 67. Among them, a current of (Iak+Iaj)/2 passes through the diode 6k and is supplied to the CA phase full pitch winding Wca: 68. A current Iaj/2, which is a ¼ value based on the equation (148), is supplied to the winding 68 through the diode 6L. Therefore, the current supplied to the winding 68 is halved of the value based on the equation (149). This current is supplied through the transistor 62. However, there are two windings for each phase. Once again, the product of the voltage and current of each winding is given by the following equation.

$$PoR4 = (Vab \times Iab + Vbc \times Ibc + Vca \times Ica)/2 \times 2 = \quad (159)$$
$$((Va + Vb - Vc)/2 \times (Iak + 2 \times Iaj) +$$
$$(-Va + Vb + Vc)/2 \times 2 \times Iaj + (Va - Vb + Vc)/2 \times (Iak + 2 \times Iaj)) =$$
$$(Va + Vc) \times Iak/2 + (Va + Vb) \times Iak/2 + (Va + Vc) \times Iaj$$
$$= Va \times Iak \quad (160)$$

The range where θr is 0° to 30° will now be described. In this range, the first term of equation (159) is the product of the voltage of winding 67 and the current Iab. Further, Va×Iak/2 excites the A phase magnetic flux φa of FIG. 2 with the component of the current Iak/2 of the winding 21 to generate a CCW torque component. Further, −Vc×Iak/2 excites the C phase magnetic flux φc of FIG. 2 with a current Iak/2, and mathematically, generates a CW torque component. The second term of the equation (159) is the product of the voltage and the current of the winding 68. Further, Va×Iak/2 excites the A-phase magnetic flux φa of FIG. 2 with the component of the current Iak/2 of the winding 22 to generate a CCW torque component. Vc×Iak/2 excites the C phase magnetic flux φc of FIG. 2 with a current Iak/2 to generate a CCW torque component.

In this configuration, the magnetomotive force generated by the current Iak/2 acting on the C-phase magnetic flux φc is offset by positive and negative. As will be described in detail later, in the circuit configuration and winding arrangement configuration of FIG. 6, the A phase current component flows in the two series windings in opposite directions. Therefore, the magnetic flux φc of the C phase is not electromagnetically affected. Further, the third term of the equation (159) becomes 0 because the A phase and the C phase act in opposite directions. As described above, in the range where θr is 0° to 30°, the transistor 61 supplies the electric power PoR4 to the motor.

Next, similarly, in the range where the rotor rotation angle position θr is 30° to 60°, a current halved of the values based on the equations (151), (152), and (153) is applied to each of them. The total output power to the motor is PoR5=Vx× Ibk based on equation (150). A current Iab/2=(Ibk+2×Iaj)/2, which is ½ of the value based on the equation (151), is supplied from the transistor 61 to the AB phase full pitch winding Wave: 67. Among them, a current component (Ibk+Iaj)/2 passes through the diode 6Q and is supplied to the BC phase full pitch winding Wbc: 6C. A current component Iaj/2, which is ¼ of the value based on the equation (153), is supplied from the diode 6P to the 6C. Therefore, the current supplied to 6C is ½ of the value based on the equation (152), and this current is supplied through the transistor 66. However, there are two windings for each phase. Once again, the product of the voltage and current of each winding is given by the following equation.

$$PoR5 = (Vab \times Iab + Vbc \times Ibc + Vca \times Ica)/2 \times 2 = \quad (161)$$
$$((Va + Vb - Vc)/2 \times (Ibk + 2 \times Iaj) +$$
$$(-Va + Vb + Vc)/2 \times (Ibk + 2 \times Iaj) + (Va - Vb + Vc)/2 \times 2 \times Iaj) =$$
$$(Va + Vb) \times Ibk/2 + (-Va + Vb) \times Ibk/2 + (Va + Vb) \times Iaj$$
$$= Vb \times Ibk \quad (162)$$

In the interval of θr from 30° to 60°, the first term of equation (161) is the product of the voltage of the winding 67 and the current Iab. Further, Vb×Ibk/2 excites the B-phase magnetic flux Tb of FIG. 2 with the component of the current Ibk/2 of the winding 21 to generate a CCW torque component. Va×Ibk/2 excites the A-phase magnetic flux φa in FIG. 2 with a current Ibk/2 to generate a CCW torque component. The second term of the equation (161) is the product of the voltage and the current of the winding 6C. Further, Vb×Ibk/2 excites the B-phase magnetic flux φb of FIG. 2 with the component of the current Ibk/2 of the winding 23 to generate a CCW torque component. Further, −Va×Ibk/2 excites the A-phase magnetic flux φa in FIG. 2 with a current Ibk/2, and mathematically generates a CW torque component. The magnetomotive force generated by the current Ibk/2 acting on the A-phase magnetic flux (pa is canceled by its positive and negative values. The B-phase current component flows in the two series windings in opposite directions. Therefore, the A-phase magnetic flux φa is not electromagnetically affected. The third term of equation (161) is 0 because the A phase and the B phase act in opposite directions. In this way, the transistor 61 supplies the electric power PoR5 to the motor even in the range where θr is 30° to 60°.

Further, the AB phase voltage Vab in FIG. 80 is 0 in the range where θr is 30° to 60°. However, it is not that the current Iab of the AB phase winding 67 does not work electromagnetically. This current Iab does two jobs. One task is to increase the B-phase magnetic flux φb to generate CCW torque. The second task is to cancel the magnetomotive force applied to the A-phase magnetic flux φa by the current Ibc of the BC-phase winding 1E.

As described above, in the case of the drive system of FIG. 6, the transistor 61 has a θr range of 0° to 60° even when the winding voltage of FIG. 2 has a biased voltage characteristic such as the voltages Vab, Vbc, and Vca of FIG. 2. It has been shown that power can be supplied in such a range. Since the circuit configuration of FIG. 6 is symmetrical, the same applies to the other transistors, and each transistor can supply and output electric power in a range having a width of 60°. In the case of the drive circuit of FIG. 5, in the case of the biased voltage characteristics such as the voltages Vab, Vbc, and Vca of FIG. 80, the range in which each transistor in FIG. 5 can supply power is 30°, thus narrowing the range during which the power can be output in the structure in FIG. 5.

Next, one of the problems of the motor with full pitch winding windings shown in FIGS. 1, 2, and 15 will be described. In the motor of FIG. 1, when the CCW torque is generated in the range where the rotor rotation angle position θr is 0° to 30°, the current Iab for the AB phase full pitch winding Wab: 1D and the current for the CA phase full pitch winding Wca: 1F are energized to cause the A phase magnetic fluxes φa, thus generating the CCW torque. In this state, when the current Ibc of the BC phase full pitch winding Wbc (1E) is energized, the BC phase current Idc acts to weaken the magnetic flux φa, thus reducing the CCW torque. This is not inconvenient.

During the rotation of the rotor in the CCW direction, there is a timing immediately before the rotation position θr approaches 0°. At this timing, the BC phase current Ibc generates a C phase magnetic flux (pc together with the CA phase current Ica of the CA phase winding 1F, and generates a CCW torque. Immediately after that, when θr exceeds 0°, if Ibe, which decreases with a delay, is not yet 0, Ibc acts to weaken the A-phase magnetic flux φa and reduces the CCW torque.

Further, immediately before the rotor magnetic pole approaches the 13 B-phase stator magnetic pole, that is, immediately before θr is 30°, when the Ibc is energized and increased in preparation for the generation of the B-phase torque, the current Ibc also becomes the A-phase. Weak magnetic flux φa. Therefore, the CCW torque is reduced. As described above, the BC phase current Ibc in which θr is between 0° and 30° has an effect of reducing the CCW torque, which is inconvenient. Similarly, the other two-phase currents Iab and Ica have the same inconvenience of reducing the CCW torque. Since the current of the motor as a whole increases, the copper loss increases and the motor becomes larger. Since the current of the drive circuit also increases, the size of the device also increases.

As described above, when the motor of the full pitch winding winding of FIG. 1 is driven by the circuit of FIG. 5, a current component other than a predetermined range becomes an obstructive factor. As described above, for example, in the BC phase current Ibc during CCW rotation, the current component between 0° and 30° reduces the CCW torque of phase A, and the current component between 30° and 60° is phase B. CCW torque is generated, and the current component between 60° and 90° produces a negative CCW torque of phase B, that is, CW torque. And there is no range where the presence or absence of Ibc does not affect the torque.

In the case of continuous current control in which the currents of each phase are continuously energized according to the mode 15, the CCW torque can be generated in the range of 30° as described in the CCW torque cause by the current Ibc. But, in the remaining 60° range, due to the fact that the current Ibc acts on generating a CW torque component in the opposite way, there are many restrictions on the control of the current Ibc.

On the other hand, when the concentrated winding motor of FIG. 83 is driven by the circuit of FIG. 5, there is no action or undesired effect of mutual interference with other phases with respect to the generation of torque of three phases. For example, the A-phase winding in which the concentrated winding 837 and 83C are connected in series generates only the A phase magnetic flux φa by the A phase current Ia, and does not electromagnetically affect the magnetic fluxes φb and φc of the other phases. Since the A-phase winding does not interlink with φb and φc, it is not affected by other phases. Further, as shown in FIG. 84, the A-phase current Ia generates the CCW torque when θr is 0° to 30°, the CW torque is generated between 30° and 60°, and 60° to 90°. There is a free range that does not affect the torque. Therefore, when the continuous current control is performed, the CCW torque can be effectively generated if the A-phase current Ia is controlled to be small only between 30° and 60°. The degree of freedom in controlling the current is large, and large torque output at high speed rotation is easily realized. However, as described above, the concentrated winding motor of FIG. 83 has a winding utilization rate of 33% and a large winding resistance, which causes a problem of large copper loss and a problem of a similarly large drive circuit.

On the other hand, in the case of the full pitch winding motor shown in FIG. 2 and the drive circuit shown in FIG. 6, the values of the energizing currents of the respective phase currents Iab, Ibc, and Ica are limited by the circuit configuration and the winding arrangement. As described above, for example, energization is not possible in which the current flowing through the AB phase windings 67 and 6A in FIG. 6 is 5 and the currents of the other phases are 0. The current relations are the equations (1), (2) and (3), and the equations (4), (5) and (6). The phase currents Iab, Ibc, and Ica are a combination of the current components Ia, Ib, and Ic of the virtual concentrated winding. Then, according to the circuit configuration and winding arrangement of FIG. 6, the currents flowing through the two windings connected in series are Ia, Ib, and Ic, respectively. For example, the current component flowing from the AB phase winding 67 to the CA phase winding 68 in FIG. 6 is Ia/2. The current component flowing from the AB phase winding 67 to the BC phase winding 6C is Ib/2. The current component flowing from the BC phase winding 69 to the CA phase winding 68 is Ic/2. Then, these two series windings are differentially arranged on the stator magnetic poles of the corresponding phase in the winding arrangement of FIG. 2 as if they were crossed. As a result, these current components Ia, Ib, and Ic can selectively excite the stator magnetic poles of the corresponding phase, and do not excite the stator magnetic poles of the other phases. At the same time, the voltage across these two series windings is unaffected by the magnetic fluxes of the other phases. The relationships of the equations (32), (33) and (34) can thus be realized.

For example, in the motor of FIG. 2, when the CCW torque is generated in the range where the rotor rotation angle position θr is 0° to 3°, the AB phase full pitch winding winding 21 and the CA phase full pitch winding winding 22 are connected in series. The A phase current component Ia/2 is energized. At the same time, the CA phase full pitch winding winding 25 and the AB phase full pitch winding winding 24 are connected in series to energize the A phase current component Ia/2. These windings are windings 67 and 68 and 6B and 6A of FIG. 6. These two sets of current components Ia/2 excite the A-phase magnetic flux φa shown in 1G of FIG. 6 to generate the CCW torque.

If BC phase current Ibc/2 flows through 23 and 26 in FIG. 2 in this state, as can be seen from the arrangement on the paper in FIG. 2, it acts to weaken the magnetic flux φa and reduces the CCW torque. It is a problem to do. However, on the circuit of FIG. 6, even if the BC phase current Ibc/2 flows through the winding 69, the current flows through the CA phase winding 68 as a C phase current component Ic/2, and the rest is AB phase winding. It flows to the line 6A as a B phase current component Ib/2. As a result, the C-phase current component Ic/2 energizes the windings 69 and 68 in series to selectively excite the magnetic flux φc of the C phase stator magnetic pole, and does not electromagnetically affect φa and φb. The remaining B-phase current component Ib/2 energizes 69 and 6A in series to selectively excite the magnetic flux φb of the B-phase stator magnetic pole, and does not electromagnetically affect φa and φc. The same applies to the remaining BC phase current Ibc/2 flowing through the BC phase winding 6C. From the results described above, even if the BC phase current Ibc/2 assumed above flows, it does not act to reduce the A phase magnetic flux φa. The characteristic that each of these phases is non-interfering is similar to the characteristic of the concentrated winding shown in FIG. 83.

From the above description, in the case of the full pitch winding motor shown in FIG. 2 and the drive circuit shown in FIG. 6, the A-phase current component Ia is the A-phase magnetic flux to the A phase stator magnetic pole 11 and the A/ phase stator magnetic pole 12. φa is selectively excited, and this A phase magnetic flux φa is not electromagnetically affected by the currents of other phases. This A phase current component Ia generates the CCW torque when θr is 0° to 30°, the CW torque is generated between 30° and 60°, and does not affect generating the torque between 60° and 90°, which is a free range. Therefore, when the continuous current control is performed, CCW torque can be effectively generated if the A-phase current Ia is controlled to be small only between 30° and 60°. The degree of freedom in controlling the current is large, and large torque output at high speed rotation is easy. Further, the other B phase current component Ib and the C phase current component Ic have the same action and effect as the A phase current component Ia, although their phases are different from those of the A phase current component Ia.

The above-mentioned actions and effects are summarized. The following can be said about the full pitch winding motor shown in FIG. 2 and the drive circuit shown in FIG. 2. For example, in the A-phase excitation of the A phase stator 11 and the A/ phase stator magnetic pole 12 in FIG. 2, the AB phase full pitch winding winding 21 and the CA phase full pitch winding winding 22 adjacent to each other in the circumferential direction are combined in series. As a result, the voltage across them can be a simple voltage as in equation (34). Therefore, the problem of excessive voltage and the problem of complicated voltage can be solved. As a result, the A-phase current component Ia/2 to both windings can be easily energized. The magnetic fluxes φb and φc of the other phases interlink with both 21 and 22 and affect the voltages of both windings, but they cancel each other out as the sum of the voltages of both windings. The A-phase magnetic flux φa can be selectively excited by exciting the A-phases 11 and 12 by the A-phase current component Ia/2 to both windings. At the same time, there is no electromagnetic effect on the B-phase magnetic flux φb and the C phase magnetic flux φc. Further, even if θr is energized between 60° and 90°, the A phase current component Ia/2 does not reduce the CCW torque. These actions are the same for the remaining AB phase full pitch winding winding 24 and CA phase full pitch winding winding 25, and the current component Ia/2 thereof. The same applies to the B phase and the C phase.

As a result, the currents Iab, Ibc, Ica, and the current components Ia, Ib, and Ic of each phase can be continuously energized (supplied) to output a large torque at high speed rotation. For example, it is a motor operating region such as the operating region B in FIG. 10. Further, since the copper loss in the slot of the motor can be reduced, the size and cost can be reduced. Since the total current capacity of the transistors in the drive circuit can be reduced, the size and cost can be reduced. Further, the motor can be further miniaturized and noise can be reduced by combining with other technologies of the present invention utilizing permanent magnets.

As described above, an example of energizing the motors of FIGS. 1, 2, 15, etc. with continuous currents Iab, Ibc, and Ica as shown in FIG. 80 has been described. This is a method of constantly energizing the direct current components Iaj, Ibj, and Icj. Since the so-called small amplitude inductance, which is the practical inductance when the fluctuating current components Iak, Ibk, and Ick increase or decrease, becomes a small value, the increase/decrease time can be shortened. Then, a more effective fluctuating current component can be energized. It should be noted that the current control between FIGS. 80 and 14 is also possible according to the motor rotation speed and the load torque.

When the motors shown in FIGS. 1, 2, 15 etc. rotate at high speed in the CCW direction and the load torque increases, the values of the currents Iab, Ibc, and Ica of each phase also increase. In addition, when the voltage Vdc of the DC voltage source 6R of FIG. 6 is used in most of the time zones, each phase current is supplied. Then, as the motor rotation speed increases, the energization phases of the fluctuating current components Iak, Ibk, and Ick can be accelerated, and the energization width can be optimized. In this way, the amplitude, width, and phase of the current can be appropriately controlled.

A state in which the motors of FIGS. 1, 2, 15, etc. are controlled from the base rotation speed to CCW at high speed will be described. In this state, the direct current components Iaj, Ibj, Icj and the torque current components Iak, Ibk, Ick are variably controlled. In the power feeding operation of the drive circuit of FIG. 6, the upper limit of the voltage is restricted by the voltage Vdc of the DC voltage source 6S. This variable control is accompanied by operations such as the feeding start phase, feeding, and feeding end phase of the transistors corresponding to the currents Iab, Ibc, and Ica of each phase. Since the upper limit of the power supply voltage is restricted to Vdc, the field weakening operation in the high-speed rotation region exceeding the base rotation speed is also controlled by balancing the DC current components Iaj, Ibj, Icj and the fluctuating current components Iak, Ibk, Ick in a controlled manner.

Further, the generation of CW torque during high-speed rotation to CCW, that is, the regenerative operation can be controlled following the operation. This regenerative operation is performed by controlling the feeding start phase, feeding, feeding end phase, and the like of the corresponding transistor. Further, from the viewpoint of utilization efficiency of the drive circuit at the time of high-speed rotation, it is possible to use an energization method that can fully utilize the power supply voltage Vdc. Therefore, it is also a method of efficiently driving the DC voltage source and the drive circuit. Although the motors of FIGS. 1, 2 and 15 have been described, the continuous current control can be similarly applied to motors having different numbers of stator magnetic poles, rotor magnetic poles, magnetic pole widths and magnetic pole shapes.

Forty-Sixth Embodiment

Figure 81:
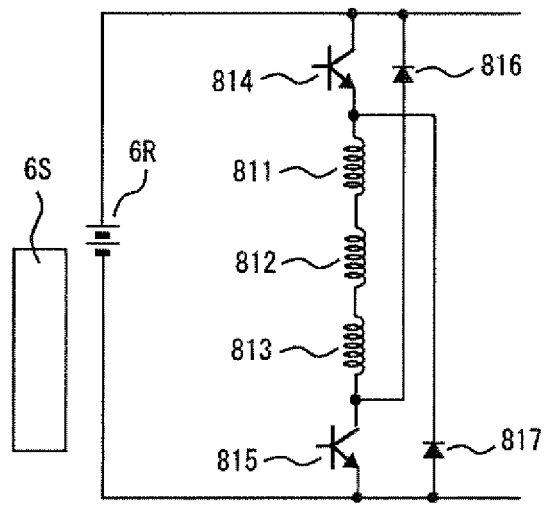
FIG. 81 is a circuit diagram showing field windings and a drive circuit according to the present disclosure.

Next, the winding configuration and the circuit configuration of the embodiment of the mode 16 are shown in FIG. 81. In the motor of FIG. 1, a DC exciting winding for energizing the DC current components Iaj, Ibj, and Icj shown in the equations (141), (142), and (143) is added, and the DC current component is energized by another drive circuit. It is a configuration to do. In the state where a constant DC current component is superimposed in the configuration of FIG. 1 and the state of FIG. 81, it is almost the same at low speed rotation, but at high speed rotation, the leakage inductance and magnetic energy of each winding are different, and the difference is large. Become. Further, the DC currant components Iaj, Ibj, and Icj may be divided into the DC excitation winding side and the AB phase winding, the BC phase winding, and the CA phase winding, and may be shared and energized.

Reference numerals 811, 812, and 813 in FIG. 81 indicate DC excitation windings that excite the field magnetic flux of each stator of FIG. This DC excitation winding is composed of a concentrated winding, a full pitch winding, an annular winding, or the like. For example, in the case of a concentrated winding, a concentrated winding is added to the A-phase stator magnetic pole 11 and the A/ phase stator magnetic pole 12 in FIG. 1 and wound, and connected in series to be A-phase DC excitation winding. Form a line Waf. This winding Waf functions as the DC excitation winding 811 of FIG. 81. Similarly. For the B phase and C phase, the B phase DC excitation winding Wbf and the C phase DC excitation winding Wcf are additionally wound to form the DC excitation windings 812 and 813 shown in FIG. 81, respectively. 814 and 815 are transistors that carry field currents, and 816 and 817 are diodes for power regeneration. When it is not necessary to sharply increase or decrease the field current component, the transistor 814 may be removed, both ends thereof may be short-circuited, and the diode 817 may be removed. Although FIG. 81 shows the control circuit 6S, the DC voltage source 6R, the additional drive circuit, and the winding, the description of most of the remaining drive circuits in FIG. 6 is omitted. Further, when the drive circuit of FIG. 6 is used, it is necessary to convert and transform the motor of FIG. 1 into FIG. 2 or FIG. 15.

When the DC exciting winding of FIG. 81 is the above Waf Wbf, Wcf, the DC current component Iaj shown in FIG. 80 is energized. The currents Iab, Ibc, and Ica of the full pitch winding windings 1D, 1E, and 1F in FIG. 1 are variable current components. In FIG. 1, when the rotor rotates with the DC current component being a constant value of Iaj and the fluctuating current components Iab, Ibc, and Ica being 0, the magnetic energy of each phase changes with the rotation, but the total in the motor. Magnetic energy does not fluctuate. Then, the energy is transferred to each other between the DC excitation windings 811, 812, and 813 of FIG. 81. Therefore, in that state, the transistors 814 and 815 only energize the direct current component Iaj, and the voltage output is small.

When the motor of FIG. 1 outputs torque, the fluctuating current components Iab, Ibc, and Ica are energized by the drive circuit of FIG. 6, and the values are obtained from the fluctuating current components Iab, Ibc, and Ica shown in FIG. 80, respectively. The value obtained by subtracting twice the current of the direct current component Iaj. Due to the relationship of the equations (1), (2), and (3), the fluctuating current components Iab, Ibc, and Ica in FIG. 80 contain twice as much current as Iaj.

Next, the configuration and operation when a DC excitation winding of full pitches is added to the motor of FIG. 1 will be described. When the DC exciting winding is a full pitch winding, the AB phase DC exciting winding Wabf, the BC phase DC exciting winding Wbcf, and the CA phase DC are arranged in parallel with each of the full pitch winding windings 1D, 1E, and 1F in FIG. The exciting winding Weaf is wound. Then, Wabf, Wbcf, and Wcaf are arranged as the DC excitation windings 811, 812, and 813 of FIG. 81. The value of the current energized here is twice the current of the direct current component Iaj.

In the configuration in which the DC exciting windings 811, 812, and 813 of FIG. 81 are added to the motor of FIG. 1, a current obtained by subtracting the DC current component from each current of FIG. 80 is energized. When the load torque increases at high speed rotation, the values of the currents Iab, Ibc, and Ica of each phase also increase, and the state of continuous current control is established. Then, the torque is controlled by controlling the phases of increase and decrease of the fluctuating current components Iab, Ibc, and Ica.

Further, in the drive circuit of FIG. 81, since the DC current component is energized in the DC excitation winding, the total current capacity of the drive circuit shown in FIG. 6 can be reduced. The single transistor 815 of FIG. 81 reduces the current capacitance of the six transistors of FIG. 6. Although the motors of FIGS. 1, 2 and 15 have been described, the same can be applied to other types of motors having different numbers of stator magnetic poles and rotor magnetic poles. It can also be used in combination with other technologies such as the above-mentioned permanent magnet utilization technology.

Forty-Seventh Embodiment

Figure 82:
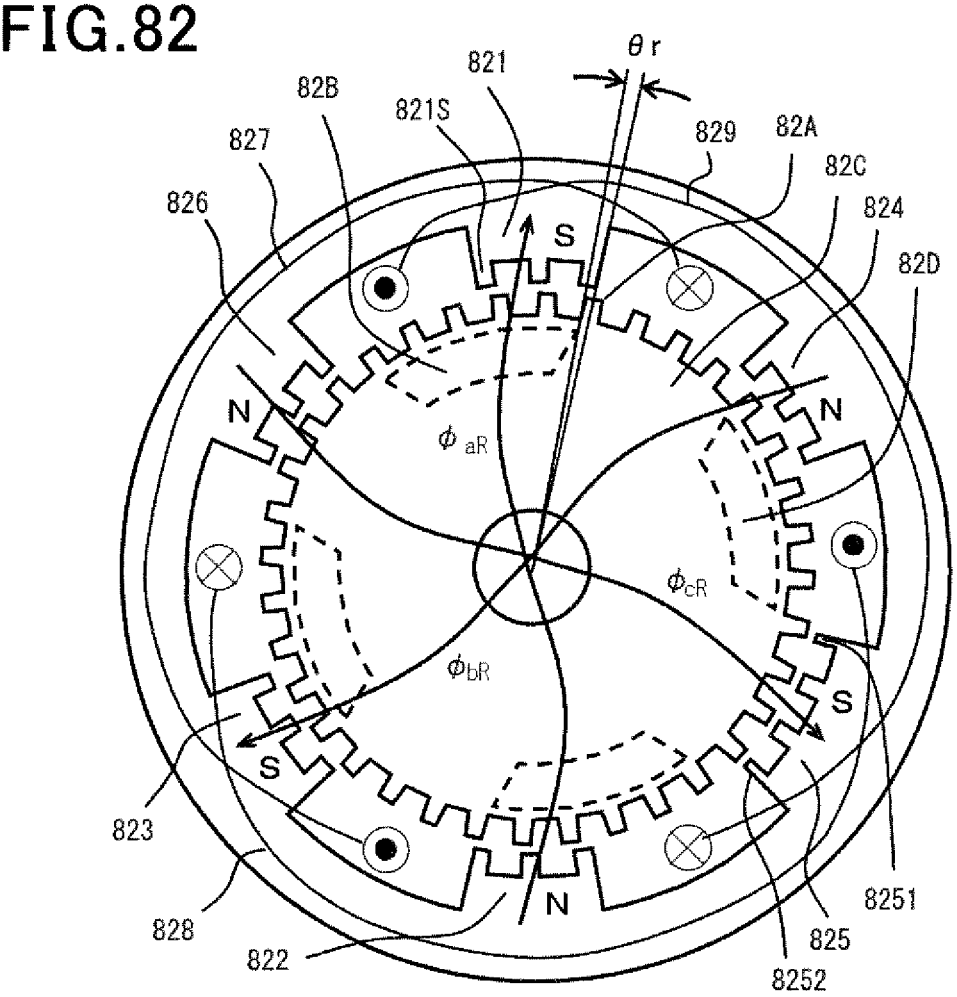
FIG. 82 is a lateral sectional view exemplifying a motor according to the present invention, wherein the motor is provided three salient poles formed on each of the stator magnetic poles and a rotor is sparse/dense magnetic poles.

Next, an embodiment of the mode 17 is shown in FIG 82. Although some motors and their drive circuits have been described above, in the main motors of electric vehicles and the like, it may be required to further increase the torque at low speed rotation. Specifically, it is a hill-climbing operation or the like, and is a motor operating area as shown in the operating area A in FIG. 10. The motor of FIG. 82 is a technique for increasing torque at low speed rotation.

The motor of FIG. 82 is a motor having a configuration in which the stator magnetic poles and rotor magnetic poles of the motor of FIG. 1 are multipolarized. The rotor is provided with 36 rotor magnetic pole RPKs having a small salient pole of 82A all around the rotor. The circumferential period of the rotor magnetic pole RPK is 100, and the salient pole width is 3.3°, which is ⅓ of that. 82B and 82SD shown by the broken line are gaps added in the mode 18, which will be described later.

In the stator of FIG. 82, 821 is an AR phase stator magnetic pole, and three small salient poles of the stator magnetic pole SPK of 821S are provided on the rotor side surface thereof. The circumferential period of these three stator magnetic pole SPKs is 10°, and the salient pole width is 3.3 °, which is ⅓ of 10 °. Reference numeral 822 is an AR/ phase stator magnetic pole, which also includes three small salient poles of the stator magnetic pole SPK. The AR phase magnetic flux φaR passes from the AR/ phase stator magnetic pole 822 to the AR phase stator magnetic pole 821. Similarly, 823 is a BR phase stator magnetic pole, 824 is a BR/ phase stator magnetic pole, and as shown, a BR phase magnetic flux φbR passes through. Reference numeral 825 is a CR phase stator magnetic pole, and 826 is a CR/ phase stator magnetic pole, through which the CR phase magnetic flux φcR passes, as shown.

827 is an ABR phase full pitch winding, 828 is a BCR phase full pitch winding, and 829 is a CAR phase full pitch winding. Whereas the number of rotor magnetic poles in FIG. 1 was 4 and the rotor magnetic pole pitch was 90°, the number of rotor magnetic poles in FIG. 82 was 36 and the rotor magnetic pole pitch was 10°, which is 9 times more multipolar. Further, in order to have such a multipolar structure, the circumferential period of the stator magnetic pole SPK of the small salient pole is adjusted to the circumferential period of 10° of the rotor magnetic pole. The angle 10° in FIG. 82 corresponds to an angle 90° in FIG. 1.

Next, the operation of the rotor of FIG. 82 will be described. The starting point of the rotor is the CW end of the AR phase stator magnetic pole 821, and as shown, the rotor rotation angle position θr is the CCW end of the rotor magnetic pole 82A. The circumferential width of the stator magnetic pole SPK having a mechanical angle of 3.3° in FIG. 82 is multiplied by 9 to obtain an electric angle of 30°.

The ABR phase current that energizes the ABR phase full pitch winding 827 of FIG. 82 is IabR, the BCR phase current that energizes the BCR phase full pitch winding 828 is IbcR, and the CAR phase full pitch winding 829 is energized. Let the CAR phase current be IcaR. Assuming an equivalent concentrated winding winding that excites the AR phase stator pole 821 and the AR/ phase stator pole 822 in FIG. 82, WaR is assumed, and the AR phase current is IaR. Assuming an equivalent concentrated winding winding that excites the BR phase stator magnetic pole 823 and the BR/ phase stator magnetic pole 824, WbR is assumed, and the BR phase current is IbR. Assuming an equivalent concentrated winding winding that excites the CR phase stator magnetic pole 825 and the CR/ phase stator magnetic pole 826, WcR is assumed, and the CR phase current is IcR. These current relationships are given by the following equations. It has the same form as the equations (1), (2), and (3).

$$IabR = IaR + IbR \tag{163}$$

$$IbcR = IbR + IcR \tag{164}$$

$$IcaR = IcR + IaR \tag{165}$$

These winding names, current names, voltage names, etc. in FIG. 82 are the same as those in FIG. 1, except for R, which is a model symbol of the motor. However, the mechanical angle of the rotor rotation angle position θr has a difference of 9 times. However, the same applies to θr if it is expressed in terms of electrical angle. The characteristics of FIG. 14 showing an example of each current and each voltage of the motor of FIG. 1 are the same as each current, each voltage and waveform shape of the motor of FIG. 82 shown by the electric angle of θr. Although the drive circuit of FIG. 6 can be used to drive the motor of FIG. 82, it is necessary to correct the number of windings so that the motor of FIG. 1 is transformed into the motor of FIGS. 2 and 15.

Next, the current, voltage, torque, and rotation speed of the motor of FIG. 82 will be described. When the number of windings, the energizing current, and the rotor diameter of the windings of FIGS. 1 and 82 are the same, the motor of FIG. 82 has the stator magnetic flux SPK of its small salient pole tripled. The rate of change in rotation of the cross magnetic flux is tripled, and in simple logic, a voltage tripled and a torque tripled are generated. Therefore, it is an effective motor in applications that require a large torque at low speed rotation. However, since the drive frequency is tripled, the rotation speed limit is lowered and the high-speed rotation characteristic is deteriorated.

The motor of FIG. 82 is an example of the mode 17, and various modifications such as the number of stator magnetic pole SPKs of small salient poles arranged on the stator magnetic poles, the number of rotor magnetic poles, and the shape of each magnetic pole can be made. Moreover, although the motor form of FIGS. 1, 2 and 15 has been described, it can also be applied to other types of motors having different numbers of stator magnetic poles and rotor magnetic poles. It can be used in combination with other technologies such as the permanent magnet utilization technology and continuous current control technology, which improves the competitiveness of the motor and is very effective.

Forty-Eighth Embodiment

Next, an embodiment of the mode 18 will be described by adding a hole shown by a broken line in FIG. 82.

The motor of FIG. 82 has a motor configuration that improves not only a large torque at low speed rotation but also a torque characteristic at high speed rotation, and a control method thereof will also be described. The motor for the main engine of an electric vehicle is required to have a large torque characteristic as shown in the operating region A of FIG. 10 in uphill driving and the like, while the high-speed rotation characteristic of the operating region B of FIG. 10 is required during high-speed driving. In order to achieve both the characteristics of the operating areas A and B at the same time, the size of the main engine motor and its control device has increased, and the cost burden has also increased. Further, due to the imperfections of the motor shown in FIG. 82, there is a problem that some torque ripple is generated at low speed rotation and a problem that some torque ripple is generated at high speed rotation. It also describes how to solve these problems. Further, the winding is not limited to the full pitch winding shown in FIG. 82, the motor in which the number of each phase winding is two or more as shown in FIGS. 2 and 15, or the annular winding winding. It can also be a concentrated winding that winds around each stator magnetic pole.

Reference numerals 82B and 82D shown by the broken lines shown in the rotor of FIG. 82 are holes made in the electromagnetic steel plate and are spatial RAPs. The 82C magnetically separated from the RAP constitutes the rotor magnetic pole RBP and corresponds to the rotor magnetic pole 1K in FIG. 1. Four rotor magnetic pole RBPs such as 82C are made all around the rotor. Since the number of rotor magnetic pole RPKs of the small salient poles shown in the rotor 82A is 36 all around, the number of rotor magnetic poles is 1/9 in comparison. Note that 82B and 82D may be other members having a large magnetic resistance instead of space.

In high-speed rotation, it is driven by using six stator magnetic poles of the stator 821, 822, 823, 824, 825, and 826 and four rotor magnetic poles RBP such as the rotor 82C. In the example of FIG. 82, the drive frequency is reduced to 1/9 as compared with the low-speed rotation, and it is possible to simply drive up to 9 times the rotation speed. Further, when the rotation speed changes from low speed rotation to high speed rotation, or when driving at a rotation speed intermediate between low speed rotation and high speed rotation, for example, switching can be performed at a certain rotation speed. However, frequent switching operations at the switching rotation speed are practically problematic. This problem can also be solved by providing hysteresis between the switching rotation speed while the rotation speed is increasing and the switching rotation speed while the rotation speed is decreasing.

Further, the SPK of the small salient poles of the stator magnetic poles of the AR phase, BR phase, and CR phase of FIG. 82 creates a phase difference of 3.3° and 6.7° relative to the RPK of the small magnetic poles of the rotor. When a large magnetic pole such as the stator 824 is driven by using four large rotor magnetic poles RBP such as the rotor 82C, there is a problem that an error due to this phase difference occurs. As a countermeasure for this, as shown in the example of the SPKs of 8251 and 8252 of the CR phase stator magnetic poles 825 of FIG. 82, one SPK is divided into two and arranged at the corresponding positions to function as the SPK. Can be moved in the circumferential direction without changing the average position of the CR phase stator magnetic pole 825.

As described above, the motor of FIG. 82 can be driven to achieve both large torque at low speed rotation and high speed rotation. That is, the ratio between the base rotation speed and the maximum rotation speed can be increased. As a result, as a motor for the main engine of the electric vehicle, a large torque in the operating area A in FIG. 10 in climbing operation and the like and a high-speed rotation characteristic in the operating area B in FIG. 10 during high-speed traveling can be obtained. By achieving both of these, the motor for the main engine and its control device can be miniaturized and the cost can be reduced. There are many applications that require a wide rotation speed range, such as home appliances and industrial machines.

As described above, the motor of FIG. 82 can be driven to achieve both large torque at low speed rotation and high speed rotation. That is, the ratio between the base rotation speed and the maximum rotation speed can be increased. As a result, as a motor for the main engine of the electric vehicle, a large torque in the operating area A in FIG. 10 in climbing operation and the like and a high-speed rotation characteristic in the operating area B in FIG. 10 during high-speed traveling can be obtained. By achieving both of these, the motor for the main engine and its control device can be miniaturized and the cost can be reduced. There are many applications that require a wide rotation speed range, such as home appliances and industrial machines.

Countermeasures for these problems can be provided. The torque ripple at low speed rotation is a value peculiar to the rotor rotation position and is a relatively low frequency component. Therefore, the torque pulsation can be offset by controlling the amplitude correction of the current. On the other hand, the torque pulsation at high speed rotation has a high frequency component, and there is no practical problem of torque. However, the shapes of the stator magnetic poles and the rotor magnetic poles can be modified mainly for the purpose of reducing noise.

As another countermeasure against the above problem, the torque pulsation can be offset by having two sets of the motor configurations shown in FIG. 82. Specifically, it is provided with two sets of a motor system MSYS1 composed of a motor MOT1 and a drive device DRV1 and a motor system MSYS2 composed of a motor MOT2 and a drive device DRV2, and the total torque of the two motor systems MSYS1 and MSYS2. Is configured to be output. That is, it is composed of a combination of two motors as shown in FIG. 82 and two sets of drive circuits as shown in FIG. 6.

When the stator magnetic pole SPK of the motor MOT1 faces the rotor magnetic pole RPK, the stator magnetic pole SPK of the motor MOT2 does not face the rotor magnetic pole RPK. Naturally, the drive devices DRV1 and DRV2 are controlled differently, and the motors MOT1 and MOT2 are controlled by different currents. In parallel, the rotor hole RAP is also configured such that when the stator magnetic pole 821 of the motor MOT1 faces the rotor hole RAP, the stator magnetic pole 821 of the MOT2 does not face the rotor hole RAP. The relationship of magnetic resistance between the stator and the rotor is reversed. Such two motor systems MSYS1 and MSYS2 can be integrally combined and configured, and can be driven by canceling the torque pulsation component.

As described above, the features of the motor system combined in this way are that it is possible to output a large torque at low speed rotation, which is a feature of each, and that it is possible to drive at high speed rotation. In addition, since torque pulsation can be reduced by the above technique, high quality torque can be output from low speed rotation to high speed rotation. In addition, the rotation range width of the constant output characteristic required for the main motor of an electric vehicle is, in principle, several times higher than that of the rotation range width of the constant output characteristic of the conventional motor. Motor characteristics more suitable for automobiles and the like can be obtained.

However, since the drive system becomes complicated, there is a problem of simplification. For example, the motors MOT1 and MOT2 are arranged coaxially as close as possible to reduce wasted space. For the drive devices DRV1 and DRV2, it is possible to integrate the arithmetic unit and the circuit mounting. Then, the DC voltage source is shared, and the transistor groups of DRV1 and DRV2 shown in FIG. 6 are arranged in parallel. In this case, the total current capacity of the transistor does not increase in order to obtain the desired motor output. The motor of FIG. 82 is a three-phase motor of ABR phase, BCR phase, and CAR phase, but it can be seen that the MOT1 and MOT2, and the DRV1 and DRV2 have a configuration similar to that of a six-phase motor configuration.

Further, as another countermeasure against the above problem, the two motor functions of the motors MOT1 and MOT2 are incorporated on the same circumference of one motor. The motor configuration is such that FIG. 82 is a pair of two poles. However, in this case, since the torque phases generated by MOT1 and MOT2 are opposite to each other, the number of rotor magnetic poles as in 82C is 9 or 10 instead of 8 which is twice 4. The slot, which is a circumferential gap between the stator magnetic pole group of MOT1 and the stator magnetic pole group of MOT2, becomes slightly wider. Although it is apparently one motor, the DRV1 and DRV2 are required.

When the winding of this motor is a full pitch winding, the currents of the slots at the circumferential boundary between MOT1 and MOT2 need to have different current values. However, the current direction of each winding is the current direction shown in FIG. 82, and since it is the same direction, energization is possible. The two phase currents for exciting the two stators at the boundary in the circumferential direction may be obtained as shown in equations. (1), (2), and (3), and energized. Further, when the winding of the motor is a concentrated winding, of course, the two phase currents for exciting the two stators at the boundary in the circumferential direction are energized by the separate windings, so that there is no problem.

The hole RAP of the rotor can be changed to a substance having a large magnetic resistance instead, and may be another means for increasing the magnetic resistance. Further, as another motor configuration, torque pulsation can be reduced by increasing the number of phases of a motor such as 5-phase or 7-phase rather than 3-phase. It is also possible to change the number of stator magnetic poles and the number of rotor magnetic poles. Further, in FIG. 82, SPK and RPK of small salient poles are shown in a rectangular shape, but the corners of the rectangle can be made into a smooth shape in consideration of peripheral leakage flux, torque ripple, and the like. Similarly, the driving current waveform can be changed from a rectangular shape to a smooth waveform shape at the corners.

Further, the technique of achieving both a large torque at low speed rotation and a high speed rotation drive can be applied not only to the full pitch winding shown in FIG. 82 but also to an annular winding winding and a concentrated winding winding. In particular, in the case of a motor shape having a short rotor axial length and a large motor diameter, the coil end length in the case of full pitch winding becomes long and copper loss increases. In such cases, a concentrated winding motor may be able to reduce copper loss. Further, it can be used in combination with other technologies such as the permanent magnet utilization technology and the continuous current control technology, which improves the competitiveness of the motor and is very effective.

Although the present invention has been described above, combinations of the techniques of each mode, various modifications, applications, and the like are possible. For example, in the motor of FIG. 15, the permanent magnet of the mode 10 is used to narrow the tooth width and reduce the magnetic flux density, and further, all the techniques of the modes 13 and 15 are applied. It can be driven by the drive circuit of FIG. Further, the techniques of the modes 16, 17 and 18 can be added. Further, in the winding arrangement in the circuit for driving the motor, among the windings described in the examples and the like, the windings having the same phase current and voltage can be exchanged. The number of pole pairs of the motor can be increased to 2-pole pairs, 4-pole pairs, and the like. Various combinations of the number of stator magnetic poles and the number of rotor magnetic poles can be selected. That is, various number of stator phases and rotor poles can be selected.

The motor type can also be transformed into an outer rotor type motor, an axial gap type motor, a linear motor, or the like, and can be combined with other types of motors. Regarding the combination of motors, as shown in FIG. 18, two sets of motors are incorporated on the outer diameter side and the inner diameter side of the motor, and the outer diameter side stator and the inner diameter side stator are integrated to significantly reduce the coil end portion of the winding, thus being simplified greatly. Similarly, by combining the first and second motors in the rotor axial direction and integrating the first stator and the second stator, the coil end portion of the winding can be greatly simplified. Further, the first and second four motors on the outer diameter side, the inner diameter side, and the rotor axial direction can be integrated into one body.

As the motor material, various soft magnetic materials such as a dust core, an amorphous steel sheet, a stainless electromagnetic steel sheet, and a permendur steel sheet having a high magnetic flux density can be used. Various permanent magnets can also be used. It is also possible to change the permanent magnet with the current for the motor, or to change the permanent magnet with a dedicated device. Various new power devices such as silicon transistors, power MOSFETs, GaN semiconductors, and SiO semiconductors can also be used as power devices. It is also possible to utilize sensor-less position detection technology that utilizes the fact that the induced voltage and magnetic characteristics of each winding change with the rotation of the rotor.

INDUSTRIAL AVAILABILITY

According to the present invention, it is possible to realize miniaturization, weight reduction, and cost reduction by reducing the copper loss of the motor and the drive circuit having high utilization efficiency. Specific applications include motors for main engines of electric vehicles, industrial motors, motors for home appliances, and the like. The present invention also includes a technique for prioritizing one-way rotation characteristics, but one-way rotation characteristics such as an air conditioner drive motor, a fan motor, a home appliance motor, and an electric vehicle main engine motor are prioritized. There are many uses. Further, the present invention includes technologies such as noise reduction, reduction of torque ripple, increase of peak torque, and expansion of high-speed rotation region, and there are many applications in which they are effective.

PARTIAL REFERENCE SINGS LIST

67 AB1 phase winding
68 CA1 phase winding
69 BC1 phase winding
6A AB2 phase winding
6B CA2 phase winding
6C BC2 phase winding
61, 62, 63, 64, 65, 66 transistor (power element)
6Q, 6K, 6L, 6M, 6N, 6P diode
6D, 6E, 6F, 6G, 6H, 6J regenerating diode
6S control circuit for overall motor driving device
6R DC voltage source

The invention claimed is:

1. A motor and control apparatus therefor, characterized in that the motor and control apparatus comprises:
a stator STR1, comprising
"SN1×MN1" pieces or more stator magnetic poles arranged in a circumferential direction of the stator STR1, the magnetic poles being stator magnetic poles SP11, SP12, SP13, and SP14 arranged in the circumferential direction,
a slot SL11 located between the stator magnetic poles SP11 and SP12,
a slot SL12 located between the stator magnetic poles SP12 and SP13,
a slot SL13 located between the stator magnetic poles SP13 and SP13,
a winding SW11 arranged at the slot SL11, the winding SW11 being a full-pitch winding SWF wound at two different slots whose electric angle positions are separated by 180 degrees or an annular winding SWR wound in a toroidal form from a slot to a back yoke,
a winding SW12 arranged at the slot SL12 in the same manner, and
a winding SW13 arranged at the slot SL13 in the same manner;
a rotor RTR1 equipped with rotor magnetic poles RP arranged on the rotor along a circumferential direction thereof and composed of "RN1×MN1" pieces soft magnetic members;
a power element PE11 electrically connected in series to the winding SW11;
a power element PE12 electrically connected in series to the winding SW11; and
a power element PE13 electrically connected in series to the winding SW12,
wherein the power element PE11, the winding SW11, the winding SW12, and the power element PE12 are electrically connected in series to each other,
the power element PE13, the winding SW13, the winding SW12, and the power element PE12 are electrically connected in series to each other, and
the serially connected windings and power elements supply excitation currents to excite the respective stator poles,
wherein the respective windings are allowed to be replaced by electromagnetically equivalent windings in arrangement on a circuit,
wherein the numeral SN1 is a positive integer of 6 or more, the numeral RN is a positive integer of 2 or more, and the numeral MN1 shows the numeral of pole pairs and is a positive integer of 1 or more.

2. The motor and control apparatus therefor according to claim 1, characterized in that
the number SN3 of the stator magnetic poles SP is ((2×KN31)×MN3),
the rotor RTR is a rotor RTR3 provided with rotor magnetic poles composed of permanent magnets,
the rotor RTR3 is provided with rotor magnetic poles RP whose number RN3 is ((2+4×KN32)×MN3),
wherein the numeral KN31 is a positive integer of 3 or more, the numeral KN32 is a positive integer of 2 or more, and the numeral MN3 indicates the number of pole pairs of 1 or more.

3. The motor and control apparatus therefor according to claim 2, wherein
as a current for each phase, the current includes a DC current component Ij which is supplied continuously and a variable current component Ik which is varied depending on a rotor rotation angle position θr.

4. The motor and control apparatus therefor according to claim 2, comprising:
a DC excitation winding SWME exciting the respective phase stator magnetic poles; and
a power element PEG1 suppling the DC current component Ij to the field winding SWME.

5. The motor and control apparatus therefor according to claim 2, comprising:
"SNH×MNH"-pieces stator magnetic poles SPB arranged in the circumferential direction of the stator;
"SKH"-pieces small salient poles SPK arranged at a pitch of 360 degrees/(RNH×MNH) in the circumferential direction in a surface of the stator which is opposed to the stator magnetic poles SBP; and
"RNH×MNH"-pieces rotor magnetic poles RPK arranged in the circumferential direction of the rotor RTRH,
wherein the numeral SNH is a positive integer of 6 or more, the numeral SKH is a positive integer of 2 or more, the numeral RNH is a positive integer of "SNH×MNH×SKH" or more, the numeral MNH indicates the number of pole pairs and is a positive integer of 1 or more.

6. A motor and control apparatus therefor according to claim 1, characterized in that the motor and control apparatus, the stator magnetic poles comprise "SN6×MN6"-piece stator magnetic poles SP61, SP62, SP63 and SP64 which are arranged in the circumferential direction of the stator;

the motor comprises a rotor RTR6 provided with rotor magnetic poles whose number is "SN6×MN6"-piece or more, but "3×SN6×MN6" or less, wherein each of the stator magnetic poles has a circumferential angle width θst6 which is smaller than "360°/RN6−720°/(SN6×RN6)", and each of the rotor magnetic poles has a circumferential angle width θrt6 which is smaller than "360°/RN6−720°/(SN6×RN6)", wherein the numeral SN6 is a positive integer of 6 or more, the angle is an electrical angle, and the numeral MN6 indicates the number of pole pairs and is a positive integer of 1 or more.

7. The motor and control apparatus therefor according to claim 1, comprising:

an N-pole stator magnetic pole SPA1 and an S-pole stator magnetic pole SPA2 which are arranged in line in the circumferential direction;

a permanent magnet PMA1 arranged between, closely to, a tip portion of a tooth of the N-pole stator magnetic pole SPAT and a tip portion of a tooth of the S-pole stator magnetic pole SPA2.

8. The motor and control apparatus therefor according to claim 1, comprising:

N-pole stator magnetic poles SPD1 arranged in a circumference of the stator;

S-pole stator magnetic poles SPD2 arranged in the circumference of the stator;

a back yoke BYSD1 magnetically connecting the N-pole stator magnetic poles SPD1;

a back yoke BYSD2 magnetically connecting the S-pole stator magnetic poles SPD2; and a permanent magnet PMD1 arranged between the back yoke BYSD1 and the back yoke BYSD2 in conformity with magnetic properties of the stator magnetic poles.

9. The motor and control apparatus therefor according to claim 1, wherein as a current for each phase, the current includes a DC current component Ij which is supplied continuously and a variable current component Ik which is varied depending on a rotor rotation angle position θr.

10. The motor and control apparatus therefor according to claim 1, comprising:

a DC excitation winding SWME exciting the respective phase stator magnetic poles; and a power element PEG1 stippling the DC current component Ij to the field winding SWME.

11. The motor and control apparatus therefor according to claim 1, comprising:

"SNH×MNH"-pieces stator magnetic poles SPB arranged in the circumferential direction of the stator;

"SKH"-pieces small salient poles SPK arranged at a pitch of 360 degrees/(RNH×MNH) in the circumferential direction in a surface of the stator which is opposed to the stator magnetic poles SBP; and "RNH×MNH"-pieces rotor magnetic poles RPK arranged in the circumferential direction of the rotor RTRH, wherein the numeral SNH is a positive integer of 6 or more, the numeral SKH is a positive integer of 2 or more, the numeral RNH is a positive integer of "SNH×MNH×SKH" or more, the numeral MNH indicates the number of pole pairs and is a positive integer of 1 or more.

12. The motor and control apparatus therefor according to claim 11, characterized in that the motor and control apparatus therefor, comprising:

"SNH×MNH"-pieces stator magnetic poles SPB arranged in the circumferential direction of the stator;

"SKH"-pieces small salient poles SPK arranged at a pitch of 360 degrees/(RNH×MNH) in the circumferential direction in a surface of the stator which is opposed to the stator magnetic poles SBP; and "RNH×MNH"-pieces rotor magnetic poles RPK arranged in the circumferential direction of the rotor RTRH, wherein the numeral SNH is a positive integer of or more, the numeral SKH is a positive integer of 2 or more, the numeral RNH is a positive integer of "SNH×MNH×SKH" or more, the numeral MNH indicates the number of pole pairs and is a positive integer of 1 or more.

13. A motor and control apparatus therefor, characterized in that the motor and control apparatus comprises:

stator magnetic poles SP71, SP72 and SP73 whose number is "SN7×MN7" pieces, arranged in a circumferential direction of the stator, a winding SW71 wound to magnetically excite the stator magnetic pole SP71, a winding SW72 wound to magnetically excite the stator magnetic pole SP72, a winding SW73 wound to magnetically excite the stator magnetic pole SP73, a power element PE71 electrically connected in series to the winding SW71, a power element PE72 electrically connected in series to the winding SW72, and a power element PE73 electrically connected in series to the winding SW73, a rotor RTR7 provided with rotor magnetic poles whose number is a RN7 piece which is defined as being "SN7×MN7"-piece or more and "3×SN7×MN7" or less, wherein each of the stator magnetic poles has a circumferential angle width θst7 which is smaller than "360°/RN7−720°/(SN7×RN7)", and each of the rotor magnetic poles has a circumferential angle width θrt7 which is smaller than "360°/RN7−720°/(SN7×RN7)", wherein the numeral SN7 is a positive integer of 6 or more, the angle is an electrical angle, and the numeral MN7 indicates the number of pole pairs and is a positive integer of 1 or more.

14. The motor and control apparatus therefor according to claim 13, comprising:

N-pole stator magnetic poles SPD1 arranged in a circumference of the stator;

S-pole stator magnetic poles SPD2 arranged in the circumference of the stator;

a back yoke BYSD1 magnetically connecting the N-pole stator magnetic poles SPD1;

a back yoke BYSD2 magnetically connecting the S-pole stator magnetic poles SPD2; and a permanent magnet PMD1 arranged between the back yoke BYSD1 and the back yoke BYSD2 in conformity with magnetic properties of the stator magnetic poles.

15. The motor and control apparatus therefor according to claim 13, wherein
as a current for each phase, the current includes a DC current component Ij which is supplied continuously and a variable current component Ik which is varied depending on a rotor rotation angle position θr.

16. The motor and control apparatus therefor according to claim 13, comprising:
a DC excitation winding SWME exciting the respective phase stator magnetic poles; and
a power element PEW suppling the DC current component Ij to the field winding SWME.

17. The motor and control apparatus therefor according to claim 13, comprising:
"SNH×MNH"-pieces stator magnetic poles SPB arranged in the circumferential direction of the stator;
"SKH"-pieces small salient poles SPK arranged at a pitch of 360 degrees/(RNH×MNH) in the circumferential direction in a surface of the stator which is opposed to the stator magnetic poles SBP; and
"RNH×MNH"-pieces rotor magnetic poles RPK arranged in the circumferential direction of the rotor RTRH,
wherein the numeral SNH is a positive integer of 6 or more, the numeral SKH is a positive integer of 2 or more, the numeral RNH is a positive integer of "SNH× MNH×SKH" or more, the numeral MNH indicates the number of pole pairs and is a positive integer of 1 or more.

18. The motor and control apparatus therefor according to claim 13, comprising:
an N-pole stator magnetic pole SPA1 and an S-pole stator magnetic pole SPA2 which are arranged in line in the circumferential direction;
a permanent magnet PMA1 arranged between, closely to, a tip portion of a tooth of the N-pole stator magnetic pole SPA1 and a tip portion of a tooth of the S-pole stator magnetic pole SPA2.

* * * * *